(12) United States Patent
Camelio et al.

(10) Patent No.: US 11,168,161 B2
(45) Date of Patent: Nov. 9, 2021

(54) BIARYL PHENOXY GROUP IV TRANSITION METAL CATALYSTS FOR OLEFIN POLYMERIZATION

(71) Applicant: Dow Global Technologies LLC, Midland, MI (US)

(72) Inventors: Andrew M. Camelio, Midland, MI (US); Endre Szuromi, Lake Jackson, TX (US); David D. Devore, Midland, MI (US); Robert D. J. Froese, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/621,492

(22) PCT Filed: Jun. 20, 2018

(86) PCT No.: PCT/US2018/038492
§ 371 (c)(1),
(2) Date: Dec. 11, 2019

(87) PCT Pub. No.: WO2018/236996
PCT Pub. Date: Dec. 27, 2018

(65) Prior Publication Data
US 2020/0157254 A1    May 21, 2020

Related U.S. Application Data

(60) Provisional application No. 62/522,213, filed on Jun. 20, 2017.

(51) Int. Cl.
*C08F 210/16* (2006.01)
*C08F 4/64* (2006.01)
(Continued)

(52) U.S. Cl.
CPC .............. *C08F 210/16* (2013.01); *C07F 7/28* (2013.01); *C08F 4/64058* (2013.01);
(Continued)

(58) Field of Classification Search
CPC ................ C08F 210/16; C08F 4/64058; C08F 4/65908; C08F 4/65912
See application file for complete search history.

(56) References Cited

U.S. PATENT DOCUMENTS

2006/0052554 A1    3/2006    Boussie et al.
2009/0286944 A1    11/2009    Ackerman et al.
2020/0190228 A1    6/2020    Szuromi et al.

FOREIGN PATENT DOCUMENTS

WO    03091262 A1    11/2003
WO    2005108406 A1    11/2005
(Continued)

OTHER PUBLICATIONS

International Search Report and Written Opinion pertaining to PCT/US2018/038492, dated Sep. 27, 2018.
(Continued)

*Primary Examiner* — Catherine S Branch
(74) *Attorney, Agent, or Firm* — Dinsmore & Shohl LLP

(57) ABSTRACT

Embodiments are directed to catalyst systems comprising at least one metal ligand complex and to processes for poly-
(Continued)

olefin polymerization incorporating the catalyst systems. The metal ligand complexes have the following structures:

(I)

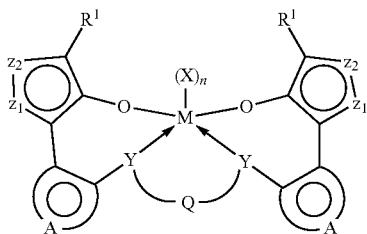

(I)

17 Claims, 4 Drawing Sheets

(51) Int. Cl.
C08F 4/659 (2006.01)
C07F 7/28 (2006.01)

(52) U.S. Cl.
CPC ...... *C08F 4/65908* (2013.01); *C08F 4/65912* (2013.01); *C08F 2420/05* (2013.01)

(56) References Cited

FOREIGN PATENT DOCUMENTS

| WO | 2012004675 A2 | 1/2012 |
| WO | 2012006230 A1 | 1/2012 |
| WO | 2013013111 A1 | 1/2013 |
| WO | 2013036546 A2 | 3/2013 |
| WO | 2013052585 A2 | 4/2013 |

OTHER PUBLICATIONS

Office Action dated Dec. 8, 2020 pertaining to U.S. Appl. No. 16/624,564, filed Dec. 19, 2019, 10 pgs.

BIARYL PHENOXY GROUP IV TRANSITION METAL CATALYSTS FOR OLEFIN POLYMERIZATION

CROSS REFERENCE TO RELATED APPLICATION

This application is a National Stage Entry under 35 U.S.C. § 371 of International Patent Application No. PCT/US2018/038492, filed Jun. 20, 2018, which claims the benefit of U.S. Provisional Patent Application Ser. No. 62/522,213, filed Jun. 20, 2017, which are hereby incorporated by reference in their entirety.

TECHNICAL FIELD

Embodiments of the present disclosure generally relate to olefin polymerization catalyst systems and processes, and, more specifically, the synthesis of biaryl phenoxy group IV transition metal catalysts for olefin polymerization and to olefin polymerization processes incorporating the catalyst systems.

BACKGROUND

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and optionally one or more co-monomers are present in liquid diluents, such as an alkane or isoalkane, for example isobutane. Hydrogen may also be added to the reactor. The catalyst systems for producing polyethylene may typically comprise a chromium-based catalyst system, a Ziegler-Natta catalyst system, or a molecular (either metallocene or non-metallocene) catalyst system. The reactants in the diluent and the catalyst system are circulated at an elevated polymerization temperature around the reactor thereby producing polyethylene homopolymer or copolymer. Either periodically or continuously, part of the reaction mixture, including the polyethylene product dissolved in the diluent, together with unreacted ethylene and one or more optional co-monomers, is removed from the reactor. The reaction mixture when removed from the reactor may be processed to remove the polyethylene product from the diluent and the unreacted reactants, with the diluent and unreacted reactants typically being recycled back into the reactor. Alternatively, the reaction mixture may be sent to a second reactor, e.g. reactor, serially connected to the first reactor where a second polyethylene fraction may be produced.

Despite the research efforts in developing catalyst systems suitable for olefin polymerization, such as polyethylene or polypropylene polymerization, there is still a need for a pro-catalyst and a catalyst system exhibiting a higher efficiency and comonomer incorporation than comparative catalyst systems, which are capable of producing polymer with high molecular weights and a narrow molecular weight distribution.

SUMMARY

According to some embodiments, a catalyst system includes a metal-ligand complex according to formula (I):

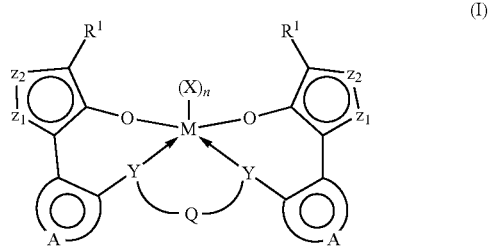

(I)

In formula (I), M is a metal chosen from titanium, zirconium, or hafnium, the metal having a formal oxidation state of +2, +3, or +4; and each X is a monodentate or bidentate ligand independently chosen from unsaturated $(C_2-C_{50})$heterohydrocarbon, unsaturated $(C_2-C_{50})$hydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, $-N(R^N)_2$, and $-NCOR^C$. Subscript n of $(X)_n$ is an integer 1, 2, or 3. Subscript m is 1 or 2. The metal-ligand complex of formula (I) has 6 or fewer metal-ligand bonds and may be charge neutral or have a positive charge associated with the metal center. Each Y is independently selected from oxygen or sulfur.

In formula (I), each $R^1$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^P)_2P(O)-$, $(R^C)_2C=N-$, $R^CC(O)O-$, $R^COC(O)-$, $R^CC(O)N(R)-$, $(R^C)_2NC(O)-$, halogen, and $-H$. For each individual ring containing groups $z_1$ and $z_2$, each of $z_1$ and $z_2$ is independently selected from the group consisting of sulfur, oxygen, $-N(R^R)-$, and $-C(R^R)-$, provided that at least one of $z_1$ or $z_2$ is $-C(R^R)-$.

In formula (I), each A is independently chosen from $-z_3-z_4-z_5-$ or $-C(R^3)C(R^4)C(R^5)C(R^6)-$, such that when A is $-z_3-z_4-z_5-$, each of $z_3$, $z_4$, and $z_5$ is selected from the group consisting of sulfur, oxygen, $-N(R^R)-$, and $-C(R^R)-$, provided that exactly one of $z_3$, $z_4$, or $z_5$ is $-C(R^R)-$ or that exactly two of $z_3$, $z_4$, or $z_5$ are $-C(R^R)-$. When A is $-C(R^3)C(R^4)C(R^5)C(R^6)-$, each $R^3$, $R^4$, $R^5$, and $R^6$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^P)_2P(O)-$, $(R^C)_2C=N-$, $R^CC(O)O-$, $R^COC(O)-$, $R^CC(O)N(R)-$, $(R^C)_2NC(O)-$, halogen, or $-H$.

Each $R^C$, $R^N$, and $R^P$ in formula (I) is independently a $(C_1-C_{50})$hydrocarbyl; and each $R^R$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^P)_2P(O)-$, $(R^C)_2C=N-$, $R^CC(O)O-$, $R^COC(O)-$, $R^CC(O)N(R)-$, $(R^C)_2NC(O)-$, halogen, or $-H$, wherein any two $R^R$ groups bonded to neighboring atoms are optionally linked.

DETAILED DESCRIPTION

Figure 1:
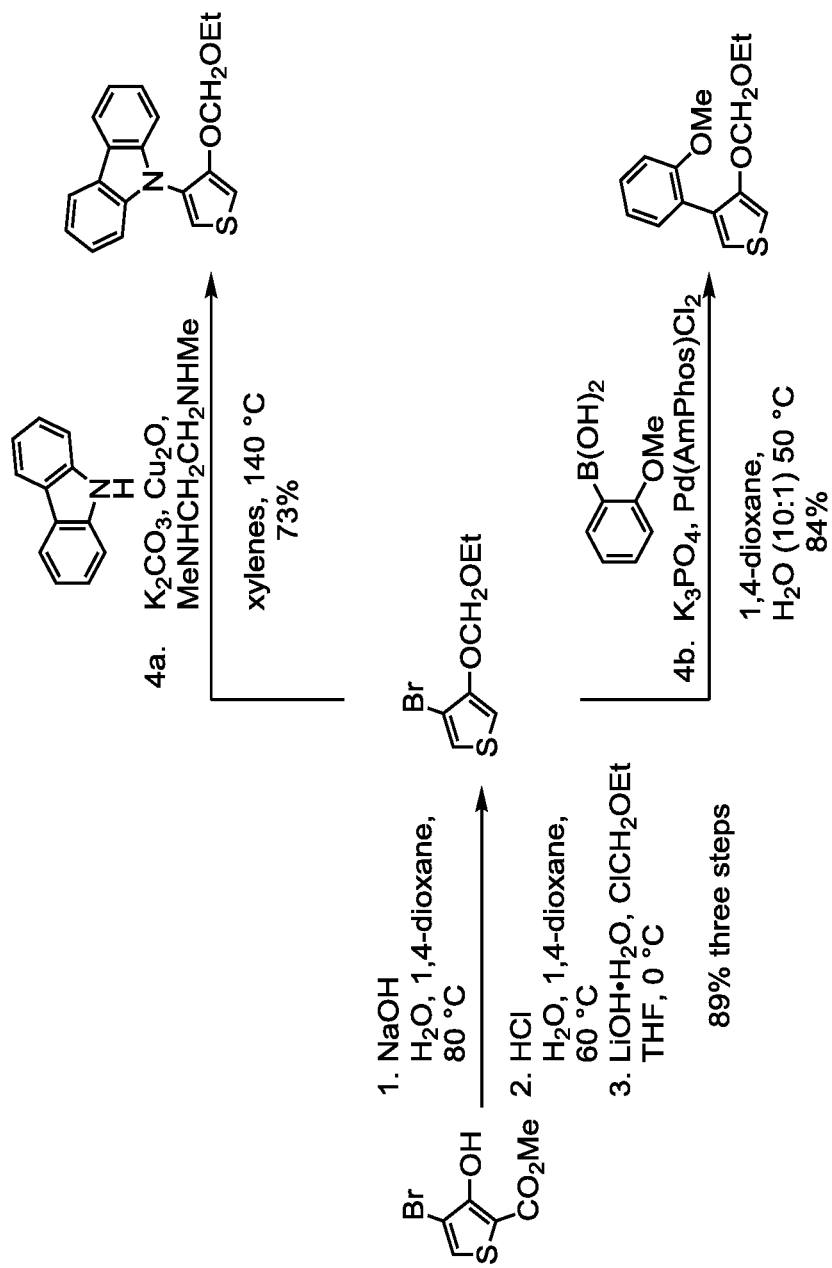
FIG. 1 depicts a three step synthetic scheme to synthesize the precursors to the ligands.

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2O$: diethyl ether; $CH_2Cl_2$ dichloromethane; CV: column volume (used in column chromatography); EtOAc: ethyl acetate; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; $Cu_2O$: Copper (I) Oxide; N,N'-DMEDA: N,N'-dimethylethylenediamine; $K_3PO_4$: Potassium phosphate tribasic; $Pd(AmPhos)Cl_2$: Bis(di-tert-butyl(4-dimethylaminophenyl)phosphine)dichloropalladium(II); Pd(dppf)$Cl_2$: [1,1'-Bis(diphenylphosphino)ferrocene]palladium(II) dichloride; $K_2CO_3$: potassium carbonate; $Cs_2CO_3$: cesium carbonate; i-PrOBPin: 2-isopropoxy-4,4,5,5-tetramethyl-1,3,2-dioxaborolane; $BrCl_2CCCl_2Br$: 1,2-dibromotetrachloroethane; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $ZrBn_2Cl_2(OEt_2)$: zirconium (IV) dibenzyl dichloride mono-diethyletherate; $HfBn_2Cl_2(OEt_2)$: hafnium (IV) dibenzyl dichloride mono-diethyletherate; $TiBn_4$: titanium (IV) tetrabenzyl; $N_2$: nitrogen gas; PhMe: toluene; PPR: parallel polymerization reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; $R_f$: retention fraction; TLC; thin layered chromatography; rpm: revolution per minute.

The term "independently selected" is used herein to indicate that the variable groups, such as, $R^1$, A, $z_{1-5}$, can be identical or different. A chemical name attached to an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—$C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and [$C_{45}$]alkyl. The term "[$C_{45}$]alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6\text{-}C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6\text{-}C_{50})$aryl include: unsubstituted $(C_6\text{-}C_{20})$aryl, unsubstituted $(C_6\text{-}C_5)$aryl; 2-$(C_1\text{-}C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrenyl. Examples of substituted $(C_6\text{-}C_{40})$aryl include: substituted $(C_1\text{-}C_{20})$aryl; substituted $(C_6\text{-}C_{18})$aryl; 2,4-bis([$C_{20}$]alkyl)-phenyl; polyfluorophenyl; pentafluorophenyl; and fluoren-9-one-1-yl.

The term "$(C_3\text{-}C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x\text{-}C_y)$cycloalkyl) are defined in an analogous manner as having from x to y carbon atoms and being either unsubstituted or substituted with one or more $R^S$. Examples of unsubstituted $(C_3\text{-}C_{40})$cycloalkyl are unsubstituted $(C_3\text{-}C_{20})$cycloalkyl, unsubstituted $(C_3\text{-}C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3\text{-}C_{40})$cycloalkyl are substituted $(C_3\text{-}C_{20})$cycloalkyl, substituted $(C_3\text{-}C_{10})$cycloalkyl, cyclopentanon-2-yl, and 1-fluorocyclohexyl.

Examples of $(C_1\text{-}C_{50})$hydrocarbylene include unsubstituted or substituted $(C_6\text{-}C_{50})$arylene, $(C_3\text{-}C_{50})$cycloalkylene, and $(C_1\text{-}C_{50})$alkylene (e.g., $(C_1\text{-}C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2\text{-}C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6\text{-}C_{50})$arylene α,ω-diradicals include phenyl-1,4-diyl napthalen-2,6-diyl, or napthalen-3,7-diyl.

The term "$(C_1\text{-}C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1\text{-}C_{50})$alkylene are unsubstituted $(C_1\text{-}C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)—, —(CH$_2$)$_8$—, —CH$_2$C*HCH$_3$, and —(CH$_2$)C*(H)(CH$_3$)—, in which "C*" denotes a carbon atom from which a hydrogen atom is removed to form a secondary or tertiary alkyl radical. Examples of substituted $(C_1\text{-}C_{50})$alkylene are substituted $(C_1\text{-}C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1\text{-}C_{18})$alkylene, examples of substituted $(C_1\text{-}C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo [2.2.2]octane.

The term "$(C_3\text{-}C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si($R^C$)$_2$, P($R^P$), N($R^N$), —N═C($R^C$)$_2$, —Ge($R^C$)$_2$—, or —Si($R^C$)—, where each $R^C$ and each $R^P$ is unsubstituted $(C_1\text{-}C_{18})$hydrocarbyl or —H, and where each $R^N$ is unsubstituted $(C_1\text{-}C_{18})$hydrocarbyl. The term "heterohydrocarbon" refers to a molecule or molecular framework in which one or more carbon atoms of a hydrocarbon are replaced with a heteroatom. The term "$(C_1\text{-}C_{50})$heterohydrocarbyl" means a heterohydrocarbon radical of from 1 to 50 carbon atoms, and the term "$(C_1\text{-}C_{50})$heterohydrocarbylene" means a heterohydrocarlbon diradical of from 1 to 50 carbon atoms. The heterohydrocarbon of the $(C_1\text{-}C_{50})$heterohydrocarbyl or the $(C_1\text{-}C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1\text{-}C_{50})$heterohydrocarbyl and $(C_1\text{-}C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1\text{-}C_{50})$heterohydrocarbyl may be unsubstituted or substituted. Non-limiting examples of the $(C_1\text{-}C_{50})$heterohydrocarbyl include $(C_1\text{-}C_{50})$heteroalkyl, $(C_1\text{-}C_{50})$hydrocarbyl-O—, $(C_1\text{-}C_{50})$hydrocarbyl-S—, $(C_1\text{-}C_{50})$hydrocarbyl-S(O)—, $(C_1\text{-}C_{50})$hydrocarbyl-S(O)$_2$—, $(C_1\text{-}C_{50})$hydrocarbyl-Si($R^C$)$_2$—, $(C_1\text{-}C_{50})$hydrocarbyl-N($R^N$)—, $(C_1\text{-}C_{50})$hydrocarbyl-P($R^P$)—, $(C_2\text{-}C_{50})$heterocycloalkyl, $(C_2\text{-}C_{19})$heterocycloalkyl-$(C_1\text{-}C_{20})$alkylene, $(C_3\text{-}C_{20})$cycloalkyl-$(C_1\text{-}C_{19})$heteroalkylene, $(C_2\text{-}C_{19})$heterocycloalkyl-$(C_1\text{-}C_{20})$heteroalkylene, $(C_1\text{-}C_{50})$heteroaryl, $(C_1\text{-}C_9)$heteroaryl-$(C_1\text{-}C_{20})$alkylene, $(C_6\text{-}C_{20})$aryl-$(C_1\text{-}C_{19})$heteroalkylene, or $(C_1\text{-}C_{19})$heteroaryl-$(C_1\text{-}C_{20})$heteroalkylene.

The term "$(C_4\text{-}C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x\text{-}C_y)$heteroaryl generally, such as $(C_4\text{-}C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radicals containing one to fifty carbon atoms, or fewer carbon atoms and one or more of the heteroatoms. The term "$(C_1-C_{50})$heteroalkylene" means a saturated straight or branched chain diradicals containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorous, or carbon-silicon double bonds, not including double bonds that may be present in substituents $R^S$, if any, or in (hetero) aromatic rings, if any.

Embodiments of this disclosure include catalyst systems that include a metal-ligand complex according to formula (I):

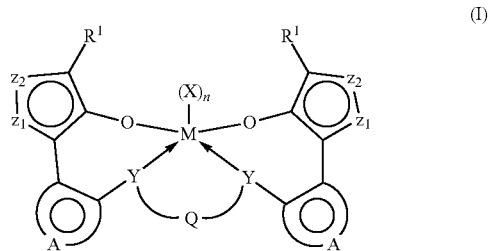

In formula (I), M is a metal chosen from titanium, zirconium, or hafnium, the metal having a formal oxidation state of +2, +3, or +4. Each X is a monodentate or bidentate ligand independently chosen from unsaturated $(C_2-C_{50})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, —$N(R^N)_2$, and —$NCOR^C$. The subscript n of $(X)_n$, referring to a number of ligands X bonded to or associated with the metal M, is an integer 1, 2, or 3. The subscript m is 1 or 2. The metal-ligand complex has 6 or fewer metal-ligand bonds and can be overall charge-neutral or may have a positive-charge associated with the metal center. Each Y is independently selected from oxygen or sulfur.

In embodiments, the catalyst system may include a metal-ligand complex according to formula (I), in which each $R^1$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, —$Si(R^C)_3$, —$Ge(R^C)_3$, —$P(R^P)_2$, —$N(R^N)_2$, —$OR^C$, —$SR^C$, —$NO_2$, —$CN$, —$CF_3$, $R^CS(O)$—, $R^CS(O)_2$—, $(R^C)_2C$=$N$—, $R^CC(O)O$—, $R^COC(O)$—, $R^CC(O)N(R)$—, $(R^C)_2NC(O)$—, halogen, and —H.

In some catalyst systems of this disclosure, the catalyst system may include a metal-ligand complex according to formula (I), in which for each individual ring containing groups $z_1$ and $z_2$, each of $z_1$ and $z_2$ is independently selected from the group consisting of sulfur, oxygen, —$N(R^R)$—, or —$C(R^R)$—, and at least one of $z_1$ or $z_2$ is —$C(R^R)$—. Any two $R^R$ groups bonded to neighboring atoms are optionally linked. In some embodiment, for each individual ring containing groups $z_1$ and $z_2$, one of $z_1$ and $z_2$ is a sulfur atom, and the other of $z_1$ and $z_2$ is —$C(H)$—.

In formula (I), each A is independently chosen from -$z_3$-$z_4$-$z_5$- or —$C(R^3)C(R^4)C(R^5)C(R^6)$—. When A is -$z_3$-$z_4$-$z_5$-, at least one $z_3$, $z_4$, and $z_5$ is selected from the group consisting of sulfur, oxygen, —$N(R^R)$—, and —$C(R^R)$—, provided that exactly one of $z_3$, $z_4$, or $z_5$ is —$C(R^R)$— or that exactly two of $z_3$, $z_4$, or $z_5$ are —$C(R^R)$—. Each $R^R$ is independently chosen from $(C_1-C_{50})$hydrocarbyl, $(C_1-C_{50})$heterohydrocarbyl, $(C_6-C_{50})$aryl, $(C_4-C_{50})$heteroaryl, halogen, or —H. When A is —$C(R^3)C(R^4)C(R^5)C(R^6)$—, each $R^3$, $R^4$, $R^5$, and $R^6$ is independently chosen from $(C_1-C_{50})$hydrocarbyl, $(C_1-C_{50})$heterohydrocarbyl, $(C_6-C_{50})$aryl, $(C_4-C_{50})$heteroaryl, —$Si(R^C)_3$, —$Ge(R^C)_3$, —$P(R^P)_2$, —$P(O)(R^P)_2$, —$N(R^N)_2$, —$OR$, —$SR^C$, —$NO_2$, —$CN$, —$CF_3$, $R^CS(O)$—, $R^CS(O)_2$—, $(R^C)_2C$=$N$—, $R^CC(O)O$—, $R^COC(O)$—, $R^CC(O)N(R)$—, $(R^C)_2NC(O)$—, halogen, or —H, wherein any two $R^R$ groups bonded to neighboring atoms are optionally linked. In formula (I), each $R^C$, $R^N$, and $R^P$ in formula (I) is independently a $(C_1-C_{30})$hydrocarbyl.

In formula (I), each ring containing A and each ring containing $z_1$ and $z_2$ is aromatic, as indicated by the delocalized π-bonds.

In some embodiments, the catalyst system includes a metal-ligand complex according to formula (I), in which M is zirconium or hafnium; each X is independently chosen from $(C_6-C_{20})$aryl, $(C_4-C_{20})$heteroaryl, $(C_4-C_{12})$diene, or a halogen; each Y is oxygen; and each $R^1$ is independently chosen from $(C_1-C_{50})$aryl, $(C_4-C_{50})$heteroaryl.

In some catalyst systems of this disclosure, the catalyst system may include a metal-ligand complex according to formula (I), in which each individual ring containing groups $z_1$ and $z_2$, one of $z_1$ and $z_2$ is sulfur, and the other is —C(H)—. In some embodiments, each A is —C($R^3$)C($R^4$)C($R^5$)C($R^6$)—, and each $R^3$, $R^4$, $R^5$, and $R^6$ is —H.

In some embodiments, each $R^1$ may be chosen from carbazol, carbazol-9-yl substituted with $R^S$ or more than one $R^S$; phenyl, phenyl substituted with $R^S$ or more than one $R^S$; anthracenyl, or anthracene-9-yl substituted with $R^S$ or more than one $R^S$, in which $R^S$ may be a $(C_1-C_{30})$hydrocarbyl. In other embodiments, each $R^1$ may be chosen from carbazol-9-yl; 3,6-di-tert-butylcarbazol-9-yl; 2,7-di-tert-butylcarbazol-9-yl; anthracene-9-yl; 3,5-di-tert-butylphenyl; 1,1':3',1"-terphenyl-5'-yl; 3,3",5,5"-tetra-tert-butyl-1,1':3',1"-terphenyl-5'-yl; 3,5-diphenylphenyl; 2,4,6-trimethylphenyl; 2,4,6-tri(iso-propyl)phenyl; or 3,5-di-tert-butylphenyl. In some embodiments, each $R^S$ is independently chosen from methyl, ethyl, propyl, 2-propyl, n-butyl, tert-butyl, n-octyl, or tert-octyl.

In one or more embodiments, the catalyst system includes a metal-ligand complex according to formula (I), in which each Y independently is O, S, $N(C_1-C_{50})$hydrocarbyl, or $P(C_1-C_{50})$hydrocarbyl. In some embodiments, when m is 2, each Y is different and may be selected from oxygen and $N(C_1-C_{50})$hydrocarbyl, (for example, $NCH_3$). In other embodiments, when m is 2, each Y may be independently selected from O and S or independently selected from S and $N(C_1-C_{50})$hydrocarbyl. In further embodiments, when m is 2, each Y may be the same and selected from O and S.

In one or more embodiments, the catalyst system may include a metal-ligand complex according to formula (I), in which each individual ring containing groups $z_1$ and $z_2$, one of $z_1$ and $z_2$ is sulfur, and the other is —C(H)—.

In one or more embodiments of the catalyst system according to metal-ligand complex of formula (I), $R^1$ may be chosen from radicals having formula (V), radicals having formula (VI), or radicals having formula (VII):

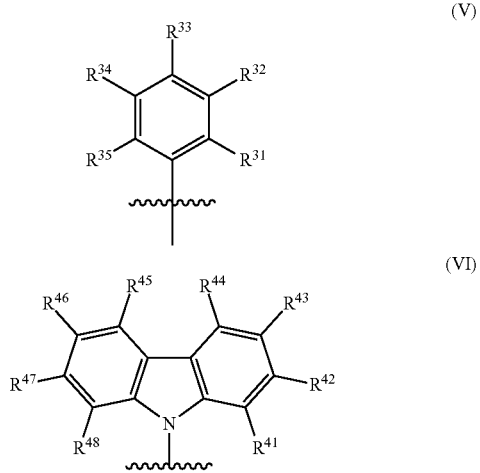

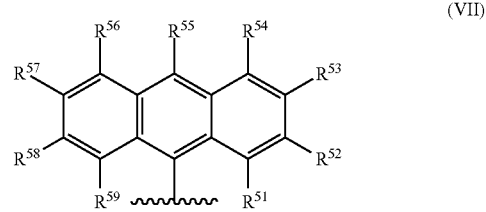

When present in the metal-ligand complex of formula (I) as part of a radical having formula (V), formula (VI), or formula (VI), the groups $R^{31-35}$, $R^{41-48}$, and $R^{51-59}$ of the metal-ligand complex of formulas (I) are each independently chosen from $(C_1-C_{40})$hydrocarbyl, $(C_1-C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_{2C}$=N—, $R^CC(O)O$—, $R^COC(O)$—, $R^CC(O)N(R^N)$—, $(R^N)_2NC(O)$—, halogen, hydrogen (—H), or combinations thereof. Independently each $R^C$, $R^P$, and $R^N$ are unsubstituted $(C_1-C_{18})$hydrocarbyl, $(C_1-C_{30})$heterohydrocarbyl, or —H.

In some embodiments, any or all of the chemical groups (e.g., X, $R^1$, $R^{31-59}$, z, A, and Y) of the metal-ligand complex of formula (I) may be unsubstituted. In other embodiments, none, any, or all of the chemical groups X, $R^1$, $R^{1-59}$, z, A, and Y of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X, $R^1$, $R^{31-59}$, and Z may be persubstituted with $R^S$. In the chemical groups that are persubstituted with $R^S$, the individual $R^S$ may all be the same or may be independently chosen.

Each $R^1$ in the metal-ligand complex of formula (I) are chosen independently of one another. For example, one group $R^1$ may be chosen from a radical having formula (V), (VI), or (VII) and the other group $R^1$ may be a $(C_1-C_{40})$hydrocarbyl; or one group $R^1$ may be chosen from a radical having formula (V), (VI), or (VII) and the other group $R^1$ may be chosen from a radical having formula (V), (VI), or (VII) the same as or different from that of $R^1$. Both group $R^1$ may be radicals of formula (V), for which the groups $R^{31-35}$ are the same or different in each $R^1$. In other examples, both groups $R^1$ may be radicals of formula (VI), for which the groups $R^{41-48}$ are the same or different in each $R^1$; or both groups $R^1$ may be radicals of formula (VII), for which the groups $R^{51-59}$ are the same or different in each $R^1$.

In some embodiments of the metal-ligand complex of formula (I), at least one of $R^1$ is a radical having formula (V), where $R^{32}$ and $R^{34}$ are tert-butyl.

In some embodiments the metal-ligand complex of formula (I), when at least one of $R^1$ is a radical having formula (VI), one of or both of $R^{43}$ and $R^{46}$ is tert-butyl and each of $R^{41-42}$, $R^{44-45}$, and $R^{47-48}$ are —H. In other embodiments, one of or both of $R^{42}$ and $R^{47}$ is tert-butyl and $R^{41}$, $R^{43-46}$, and $R^{48}$ are —H. In some embodiments, both $R^{42}$ and $R^{47}$ are —H.

In one or more embodiments of the catalyst system according to metal-ligand complex (I), each $R^1$ is chosen from 2,4,6-trimethylphenyl; carbazolyl; 3,6-di-tert-butylcarbazol-9-yl; 2,7-di-tert-butylcarbazol-9-yl; or 3,5-di-tert-butylphenyl.

In one or more embodiments, Q is $(C_1-C_{12})$alkylene, $(C_1-C_{12})$heteroalkylene, $(C_1-C_{50})$arylene, $(C_1-C_{50})$heteroarylene, $(-CH_2Si(R^C)_2CH_2-)$, $(-CH_2CH_2Si(R^C)_2CH_2CH_2-)$, $(-CH_2CH_2Ge(R^C)_2CH_2CH_2-)$, or $(-CH_2Ge(R^C)_2CH_2-)$, in which $R^C$ is $(C_1-C_{30})$hydrocarbyl; and subscript n of $(X)_n$ is 1 or 2. In some embodiments, Q is chosen from $-(CH_2)_x-$, where subscript x is from 2 to 5. In other embodiments, subscript x of $-(CH_2)_x-$ is 4.

In some embodiment of the metal-ligand catalyst according to formula (I), $R^1$ is chosen from 3,5-di-tert-butylphenyl; 2,4,6-trimethylphenyl; 2,4,6-triisopropylphenyl; 3,5-di-isopropylphenyl; 3,5-bis-phenyl phenyl; 3,5-bis-(2,4,6-trimethylphenyl)phenyl; 3,5-(2,4,6-triisopropylphenyl)phenyl; 3,5-bis-(3,5-di-tert-butylphenyl)phenyl; m-terphenyl; carbazolyl; 3,6-di-tert-butylcarbazolyl; 3,6-bis-(2,4,6-trimethylphenyl)carbazolyl; 3,6-bis-(2,4,6-triisopropylphenyl)carbazolyl; 3,6-bis-(3,5-di-tert-butylphenyl)carbazolyl; 2,6-di-tert-butylanthracenyl; and 2,7-di-tert-butyl-9-(3,5-di-tert-butylphenyl)anthracenyl.

In illustrative embodiments, the catalyst systems may include a metal-ligand complex according to any of formulas (I) having the structure of any of Procatalysts 10-65:

Procatalyst 10

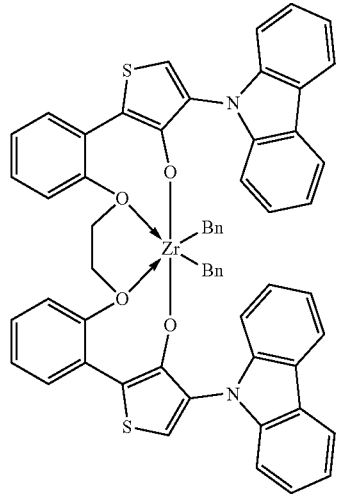

Procatalyst 11

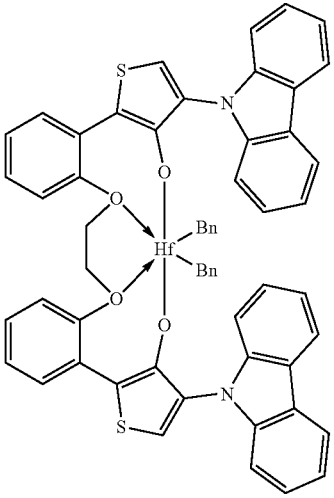

Procatalyst 12

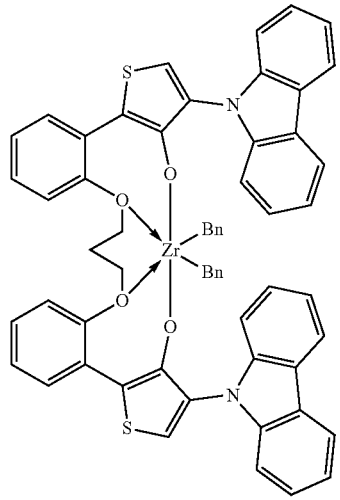

Procatalyst 13

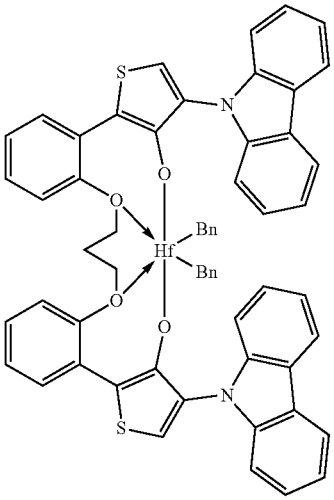

Procatalyst 14

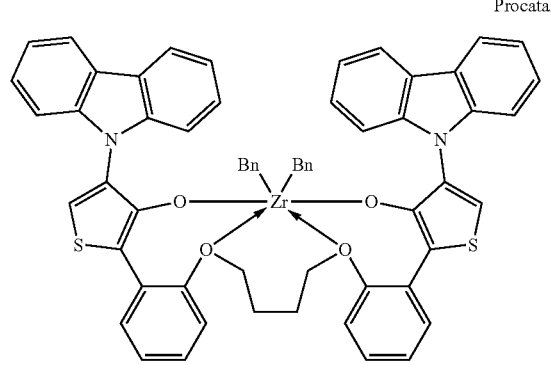

Procatalyst 15

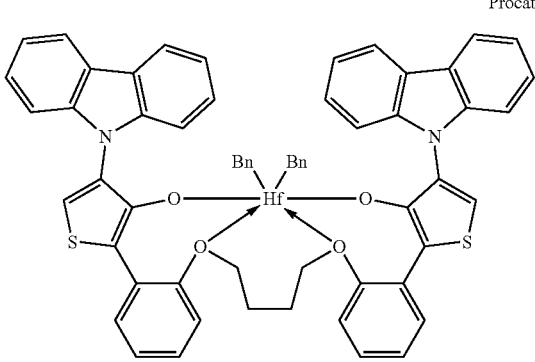

-continued
Procatalyst 16
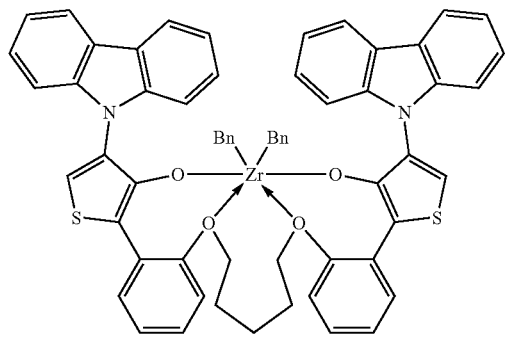
Procatalyst 17
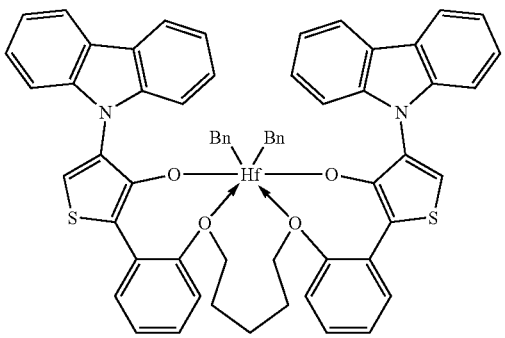
Procatalyst 18
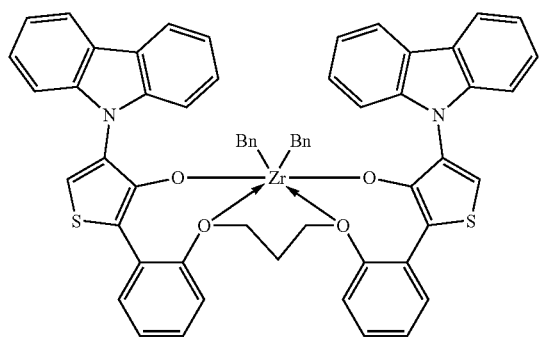
Procatalyst 19
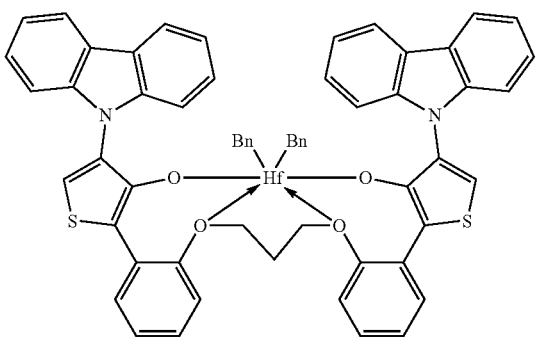
Procatalyst 20
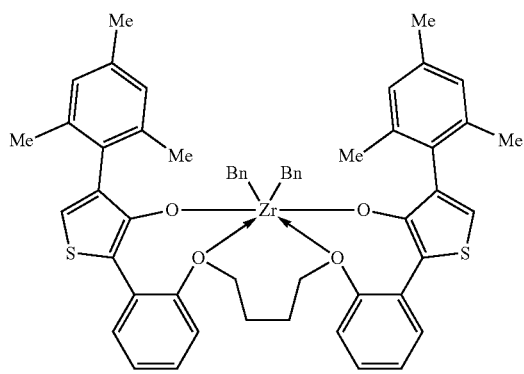
Procatalyst 21
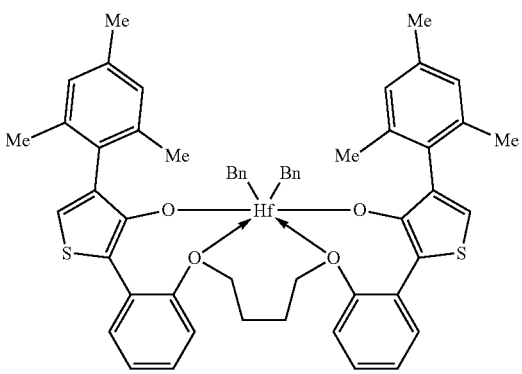
Procatalyst 22
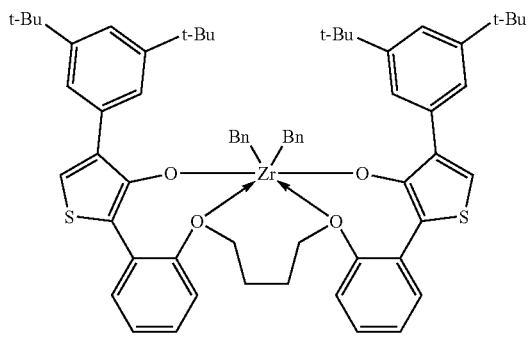
Procatalyst 23
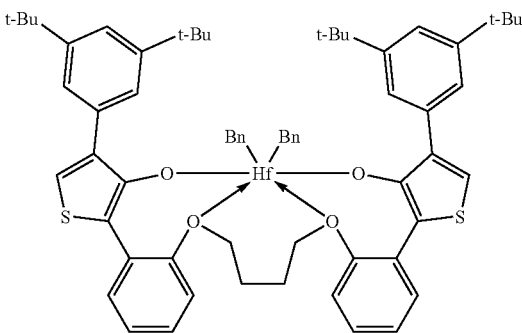

-continued
Procatalyst 24
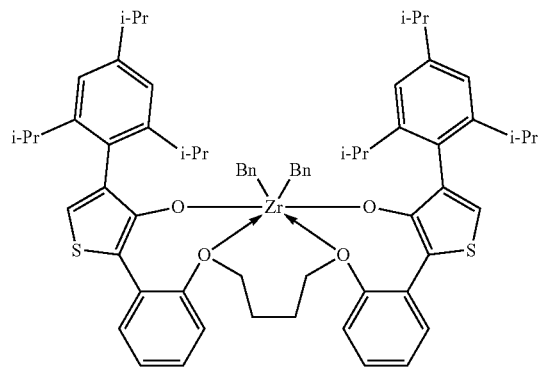
Procatalyst 25
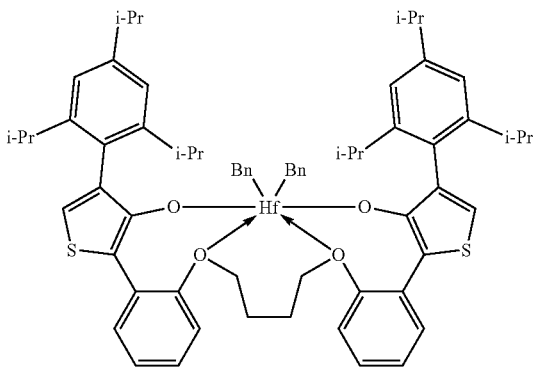
Procatalyst 26
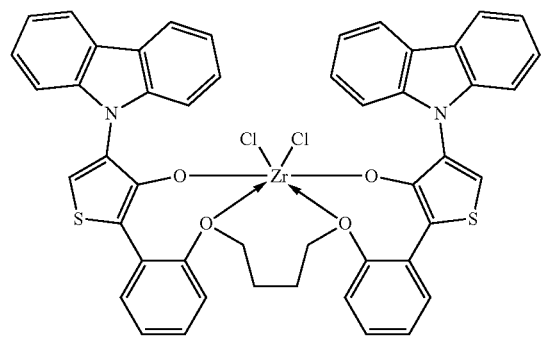
Procatalyst 27
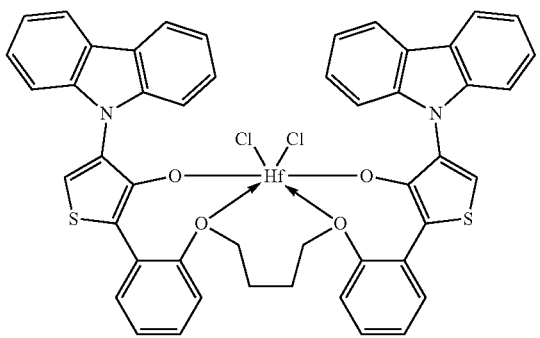
Procatalyst 28
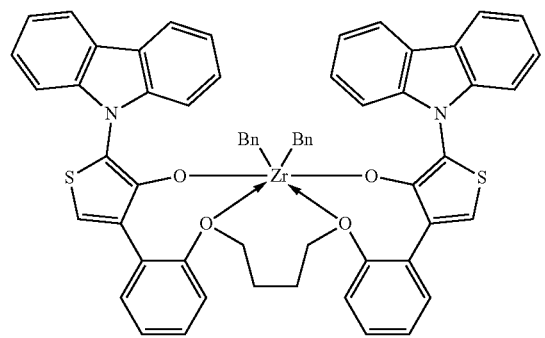
Procatalyst 29
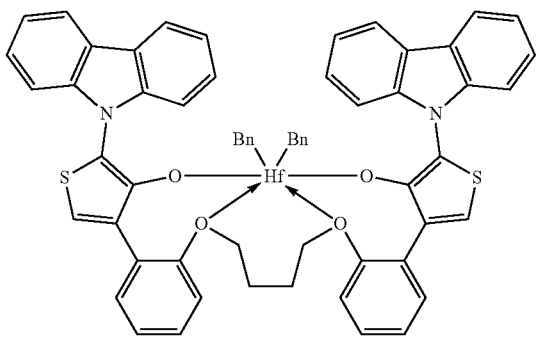
Procatalyst 30
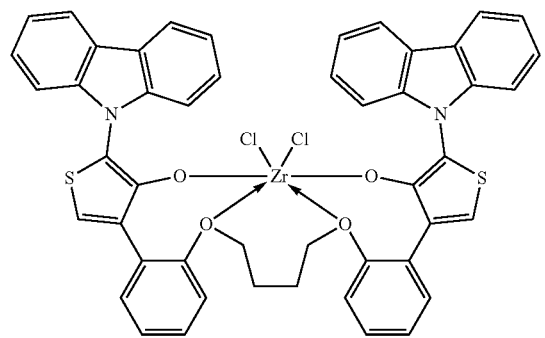
Procatalyst 31
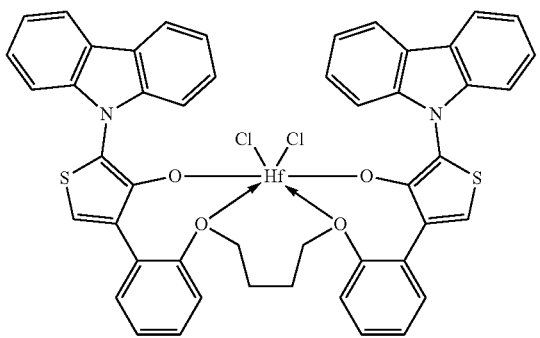

-continued
Procatalyst 32
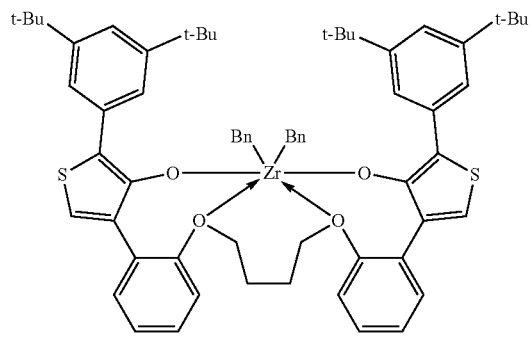
Procatalyst 33
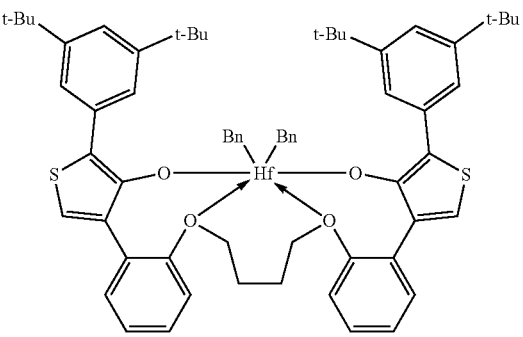
Procatalyst 34
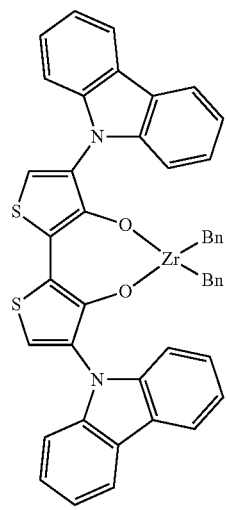
Procatalyst 35
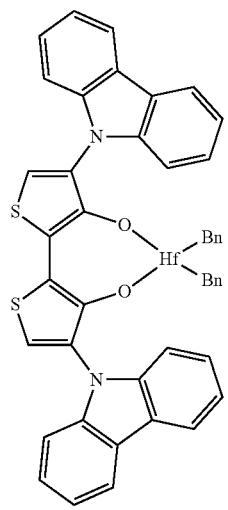
Procatalyst 36
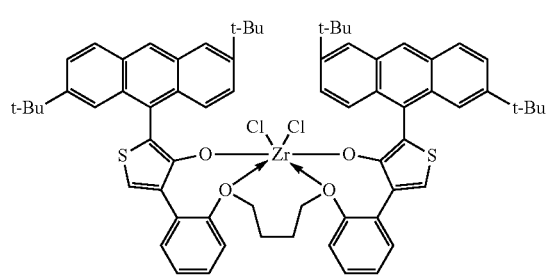
Procatalyst 37
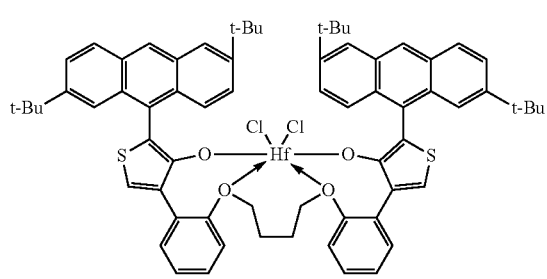
Procatalyst 38
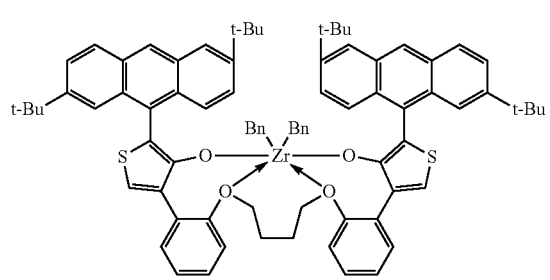
Procatalyst 39
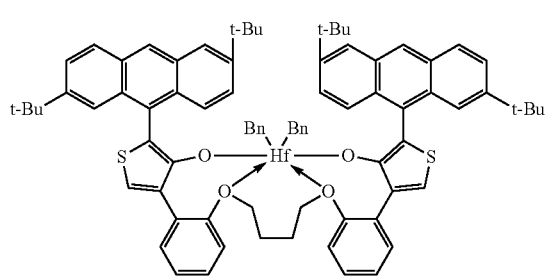

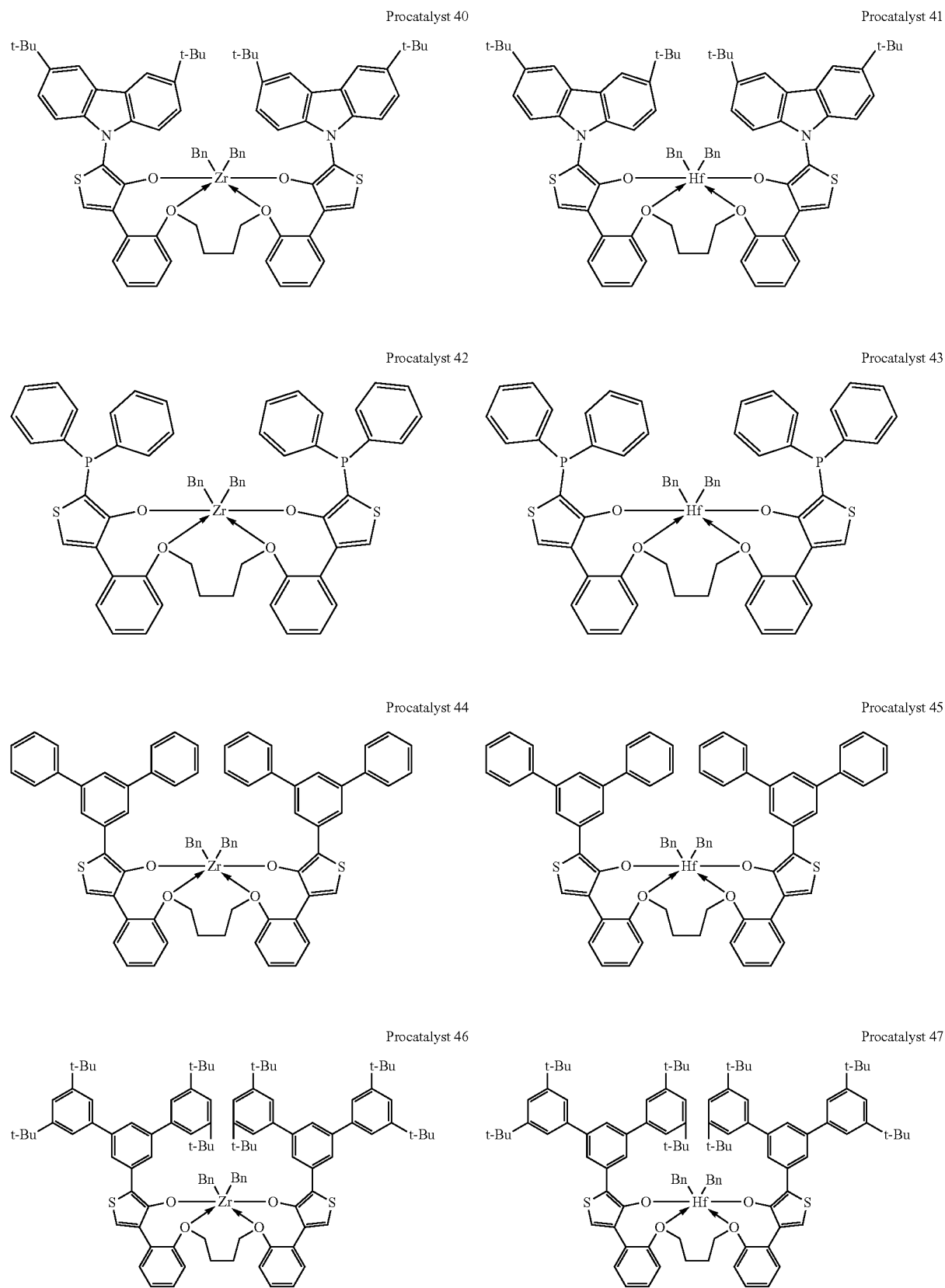

Procatalyst 48
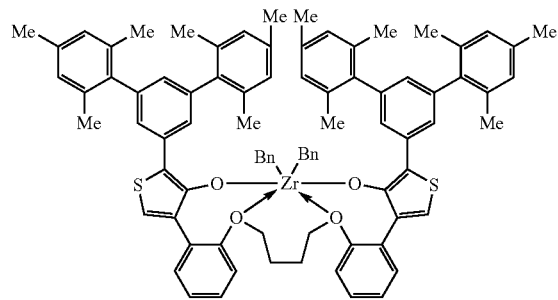
Procatalyst 49
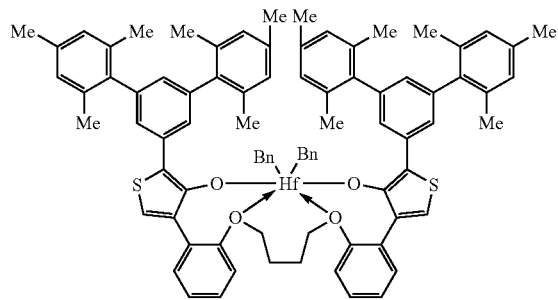
Procatalyst 50
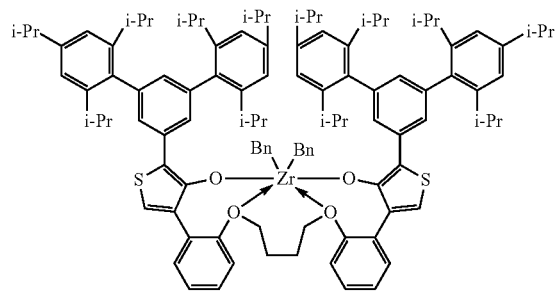
Procatalyst 51
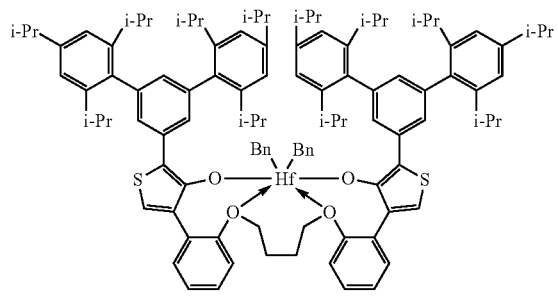
Procatalyst 52
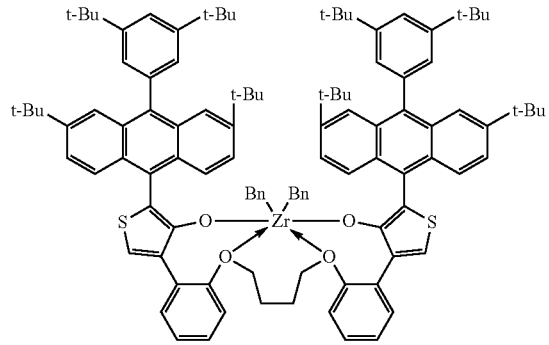
Procatalyst 53
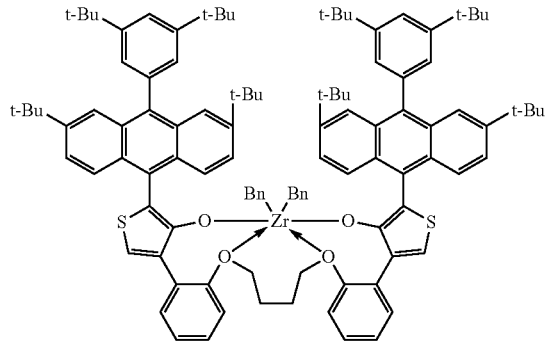
Procatalyst 54
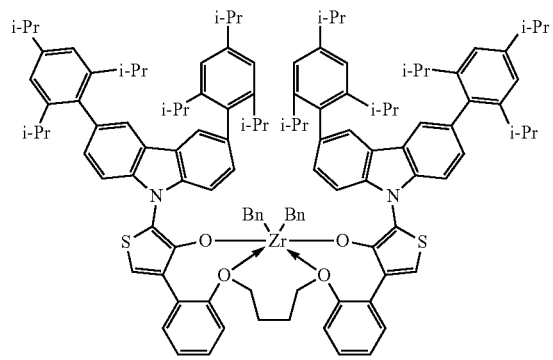
Procatalyst 55
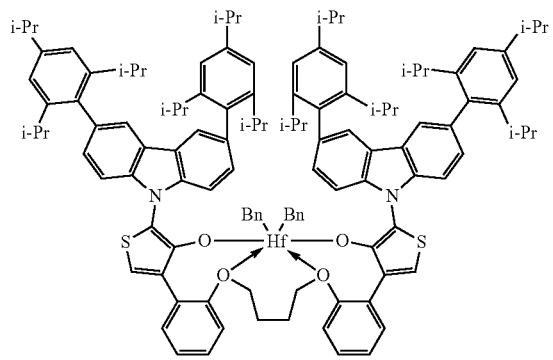

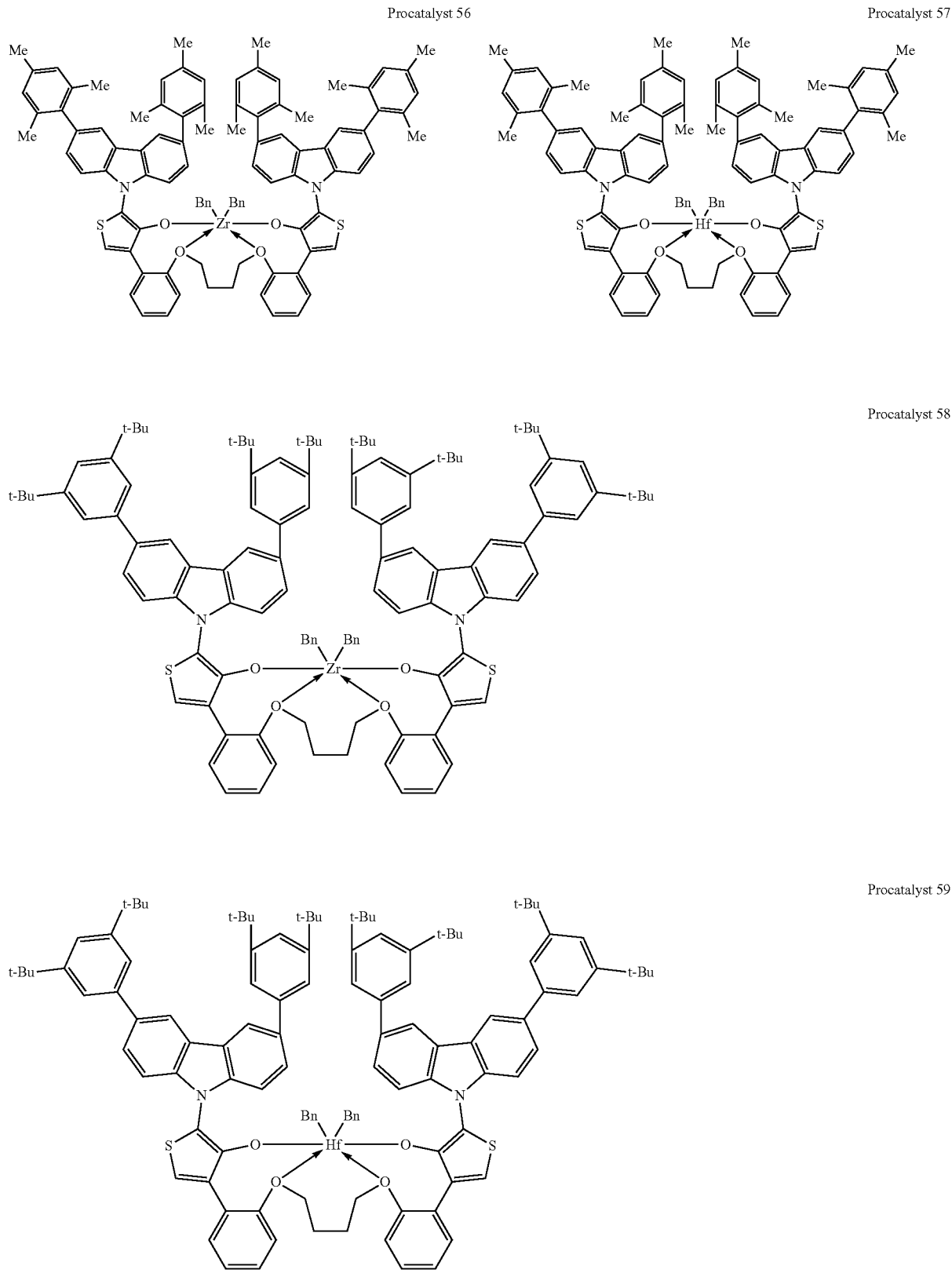

-continued
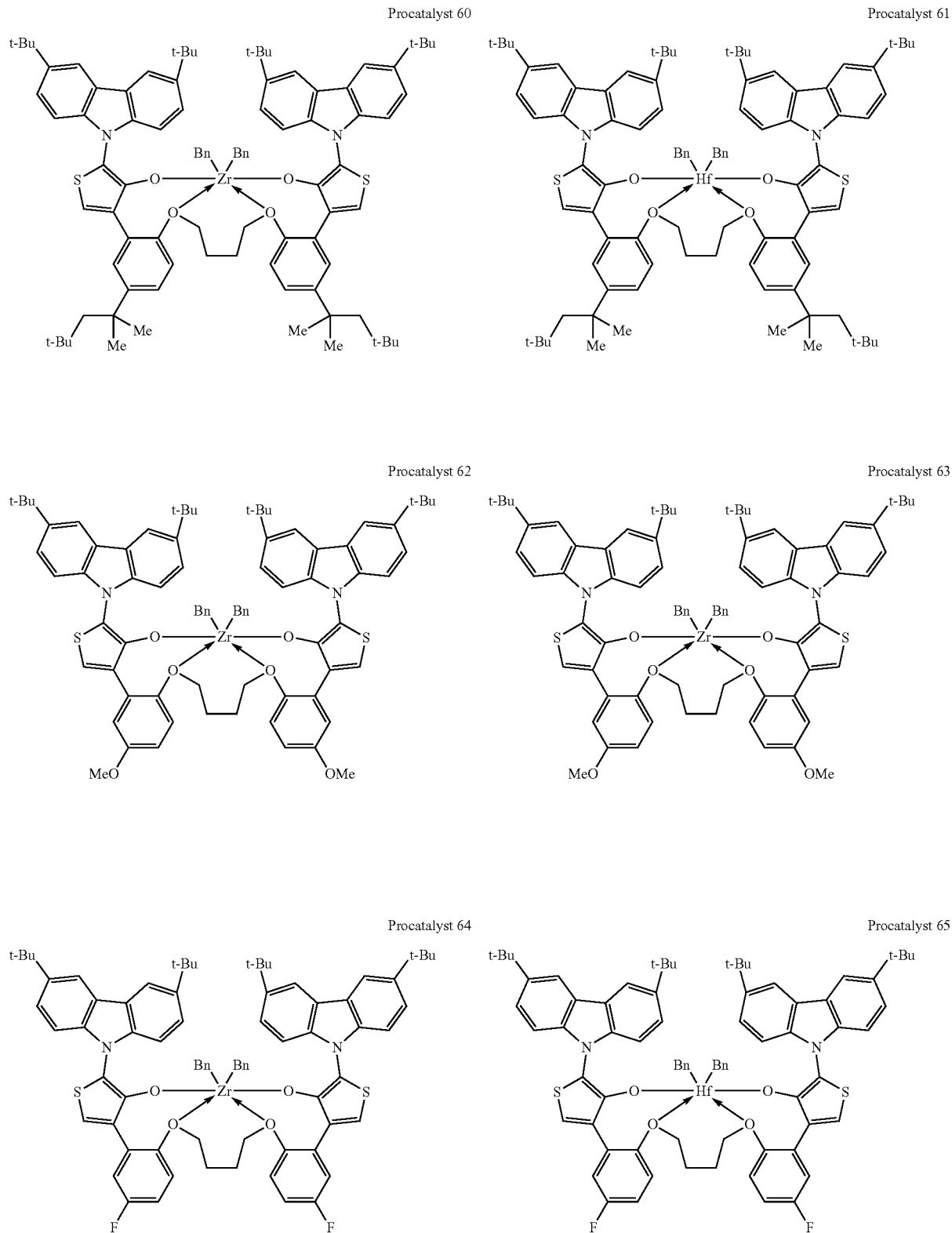

In illustrative embodiments, the metal-ligand complex according to any of formula (I) having the structure of any of Procatalysts 10-65 may be formed from Ligands 4-28.
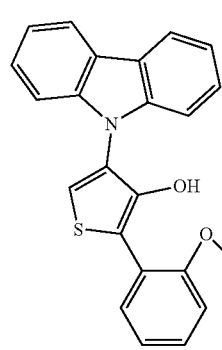
L-4
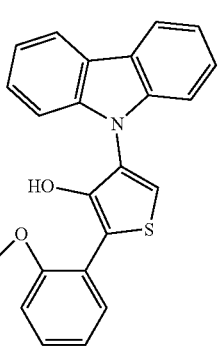
L-5
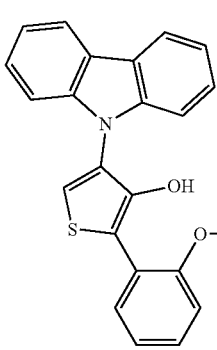
L-6
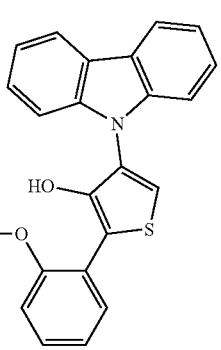
L-7
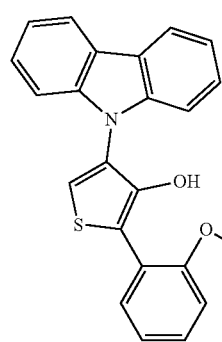
L-8
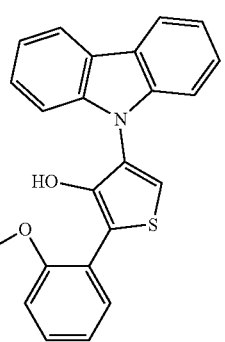
L-9
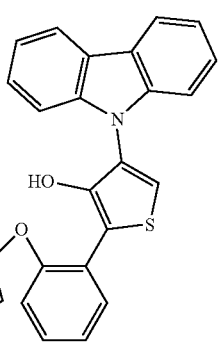
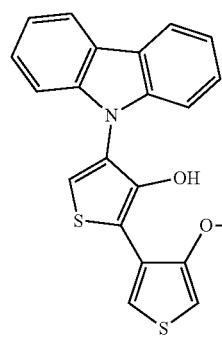
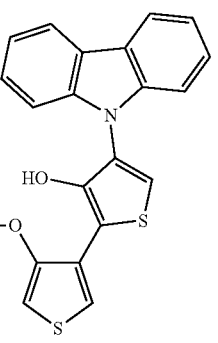
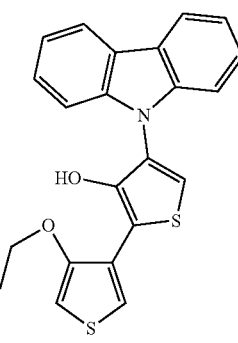
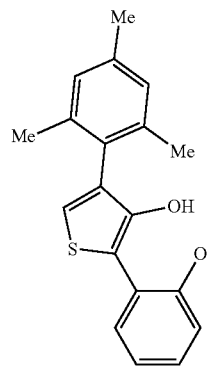
L-10
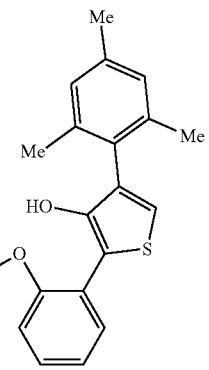
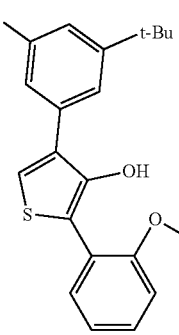
L-11
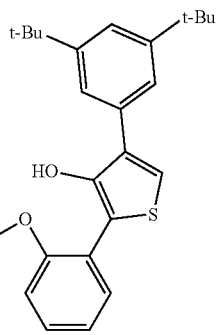

-continued
L-12
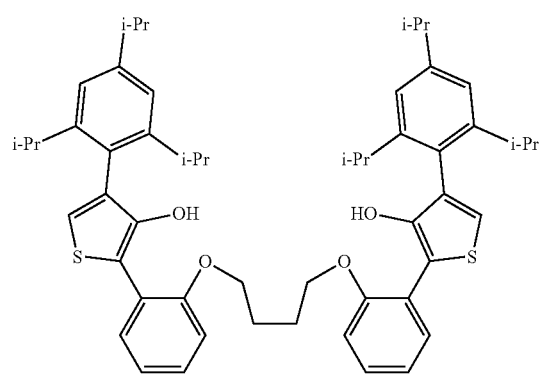
L-13
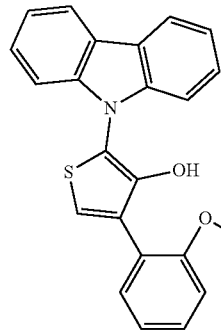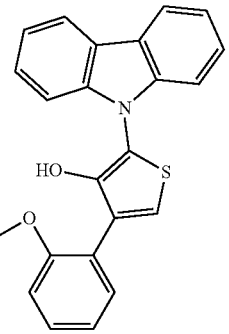
L-14
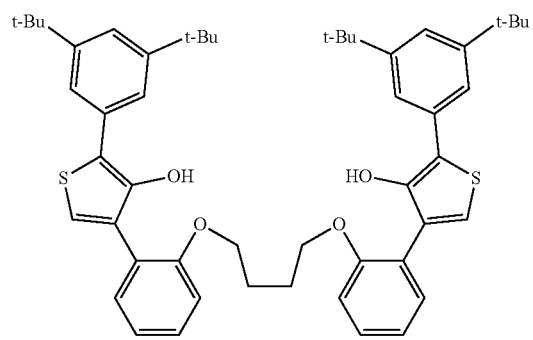
L-15
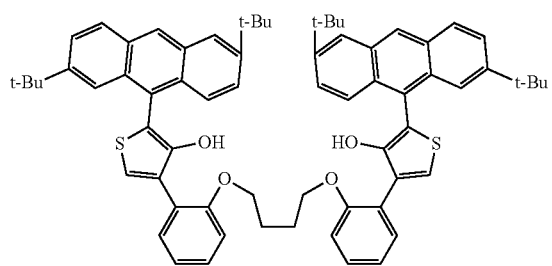
L-16
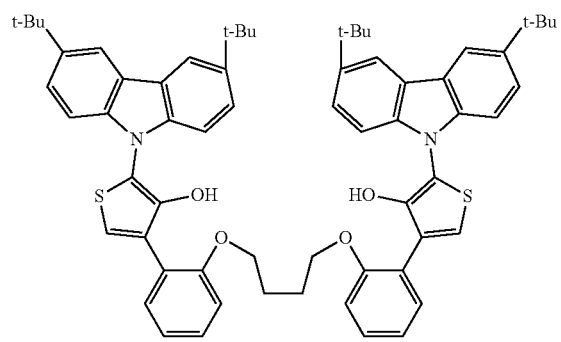
L-17
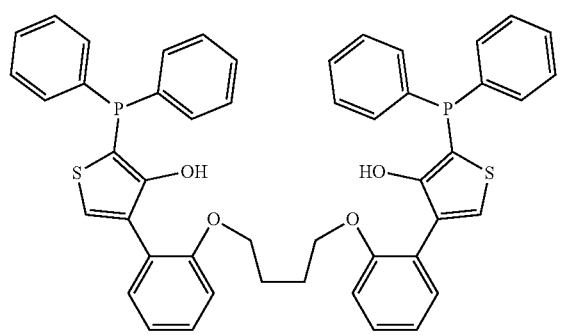
L-18
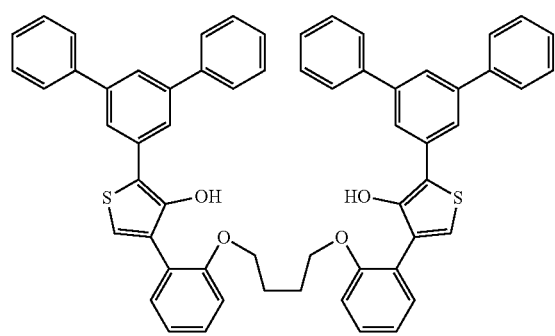
L-19
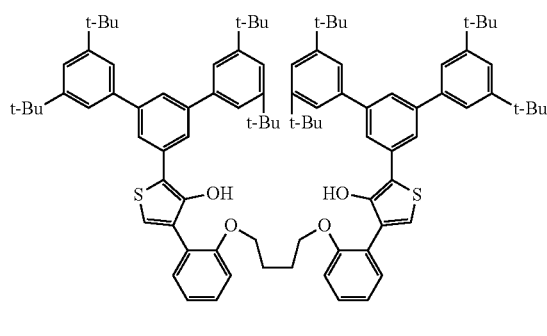

-continued
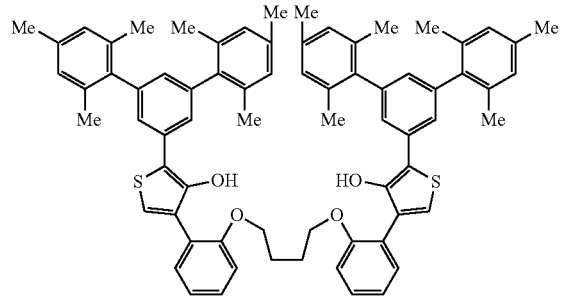
L-20
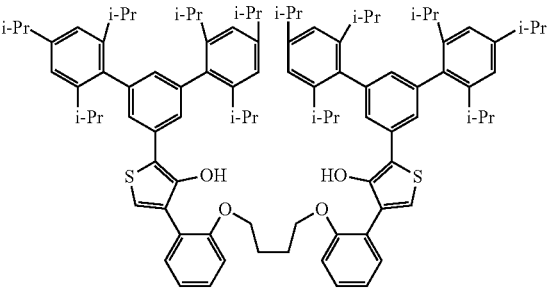
L-21
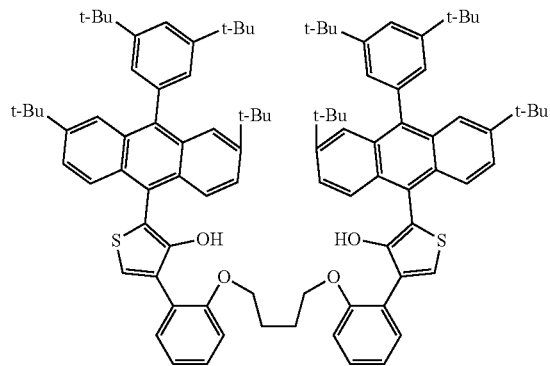
L-23
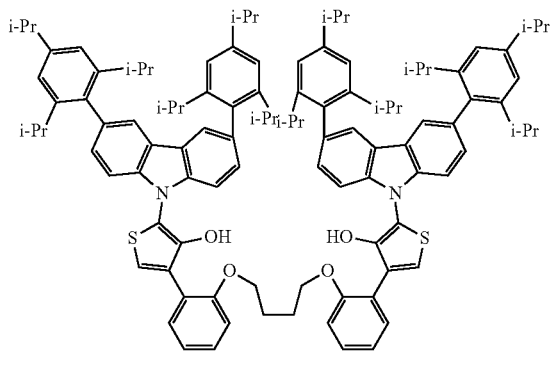
L-22
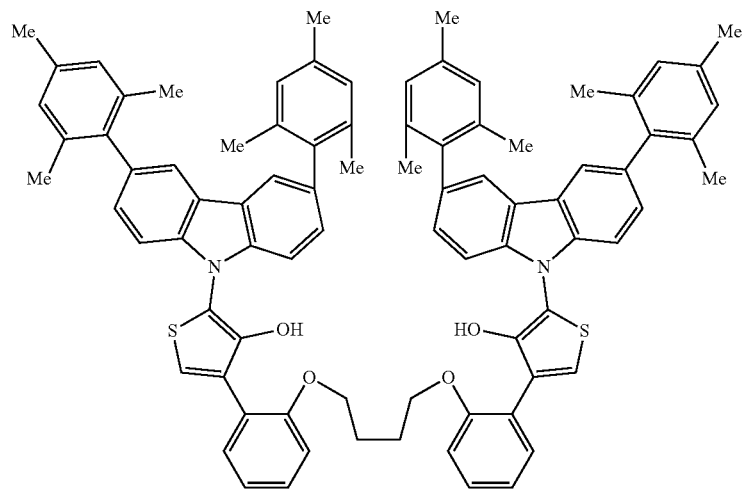
L-24

-continued

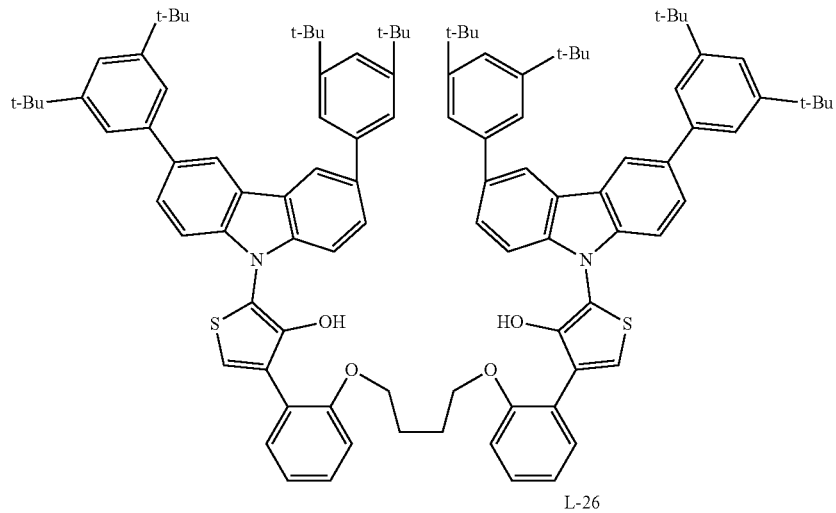

L-25

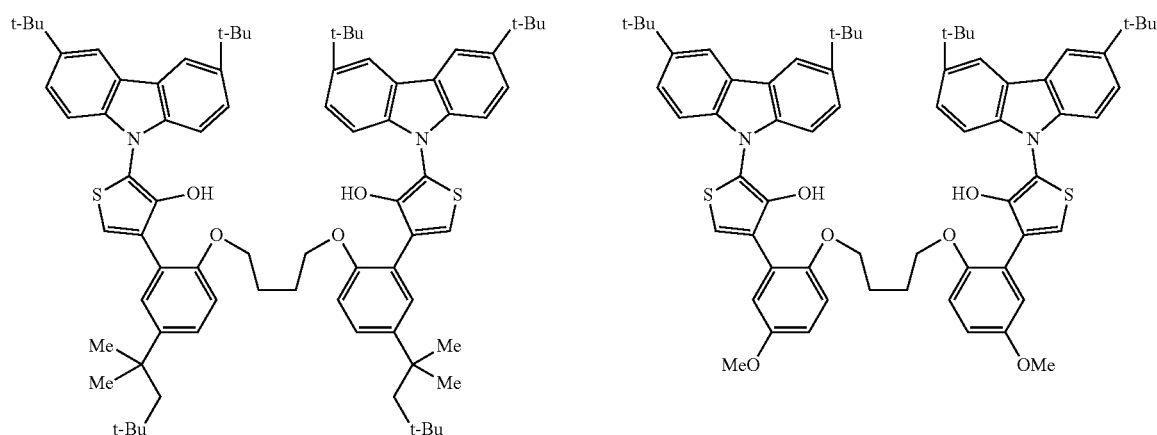

L-26

L-27

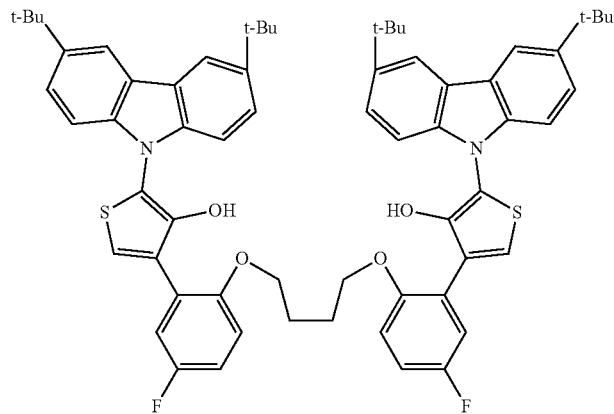

L-28

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activating co-catalysts include mixtures comprising a combination of a tri (($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluoropheny)borane with a polymeric or oligomeric alumoxane. Ratios of numbers of moles of (metal-ligand complex): (tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 1 mole percent (mol %) to 25 mol %; and in further embodiments the amount of additional α-olefin includes at least 5 mol % to 103 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene based polymers and the one or more additives. The ethylene-based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm³ to 0.950 g/cm³, from 0.880 g/cm³ to 0.920 g/cm³, from 0.880 g/cm³ to 0.910 g/cm³, or from 0.880 g/cm³ to 0.900 g/cm³, for example.

In another embodiment, the polymer resulting from the catalyst system that includes the metal-ligand complex of formulas (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formulas (I) has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. 1H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for 1H NMR data are reported in ppm downfield from internal tetramethylsilane (TMS, δ scale) using residual protons in the deuterated solvent as references. $^{13}C$ NMR data are determined with $^1H$ decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel polymerization reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, 1-octene, chain shuttling agent solutions as appropriate to the experiment, and catalyst solutions) are added to the single-cell reactors via robotic syringes. Gaseous reagents (i.e. ethylene, $H_2$) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc.); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 µL aliquot of the sample. The GPC is equipped with two Polymer Labs PLgel 10 µm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 46 g ethylene and 303 g 1-octene in 611 g of IsoparE, and the standard conditions at 150° C. are 43 g ethylene and 303 g 1-octene in 547 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

EXAMPLES

Figure 2:
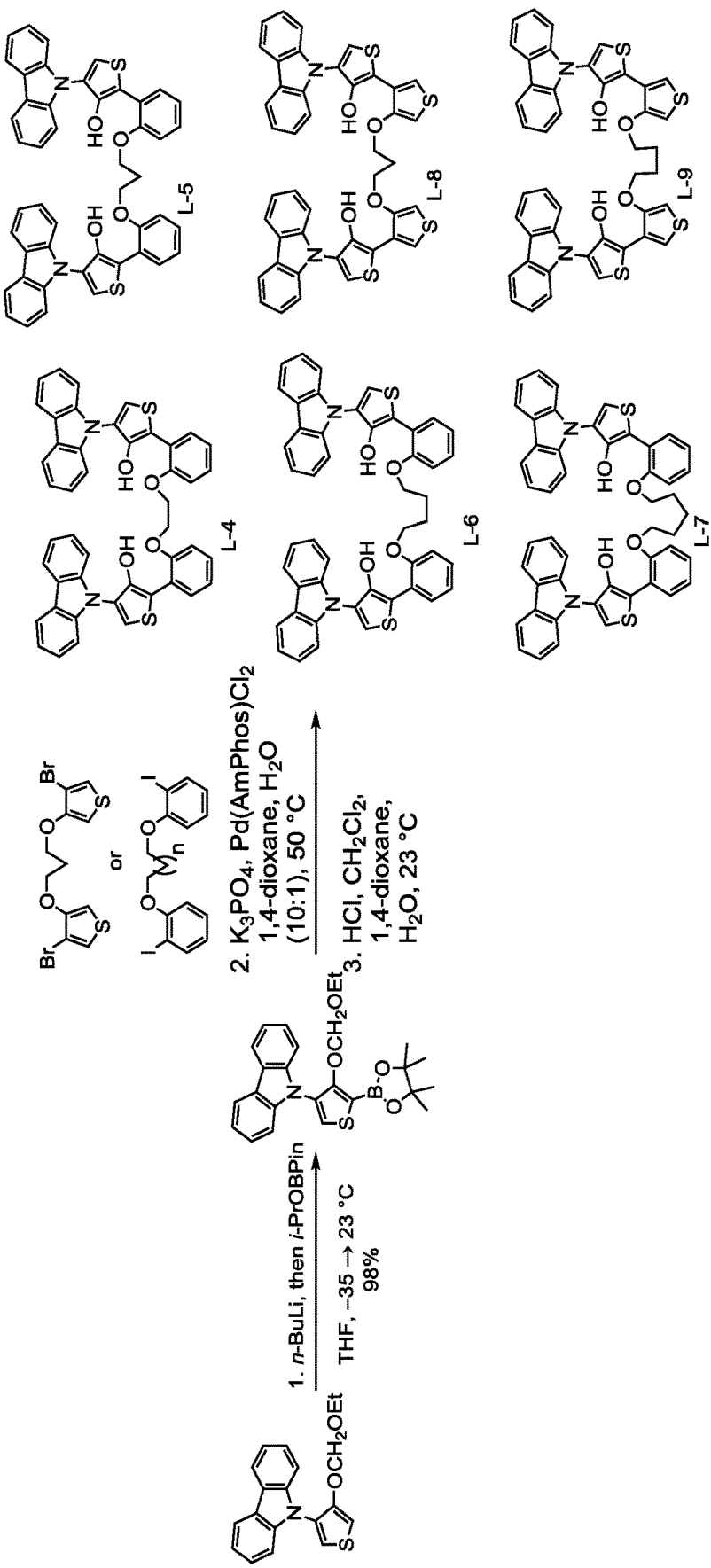
FIG. 2 depicts a three step synthetic scheme to synthesize ligands 4-9 (L-4 to L-9), in which the reagent in the second step is altered depending on the ligand.
Figure 3:
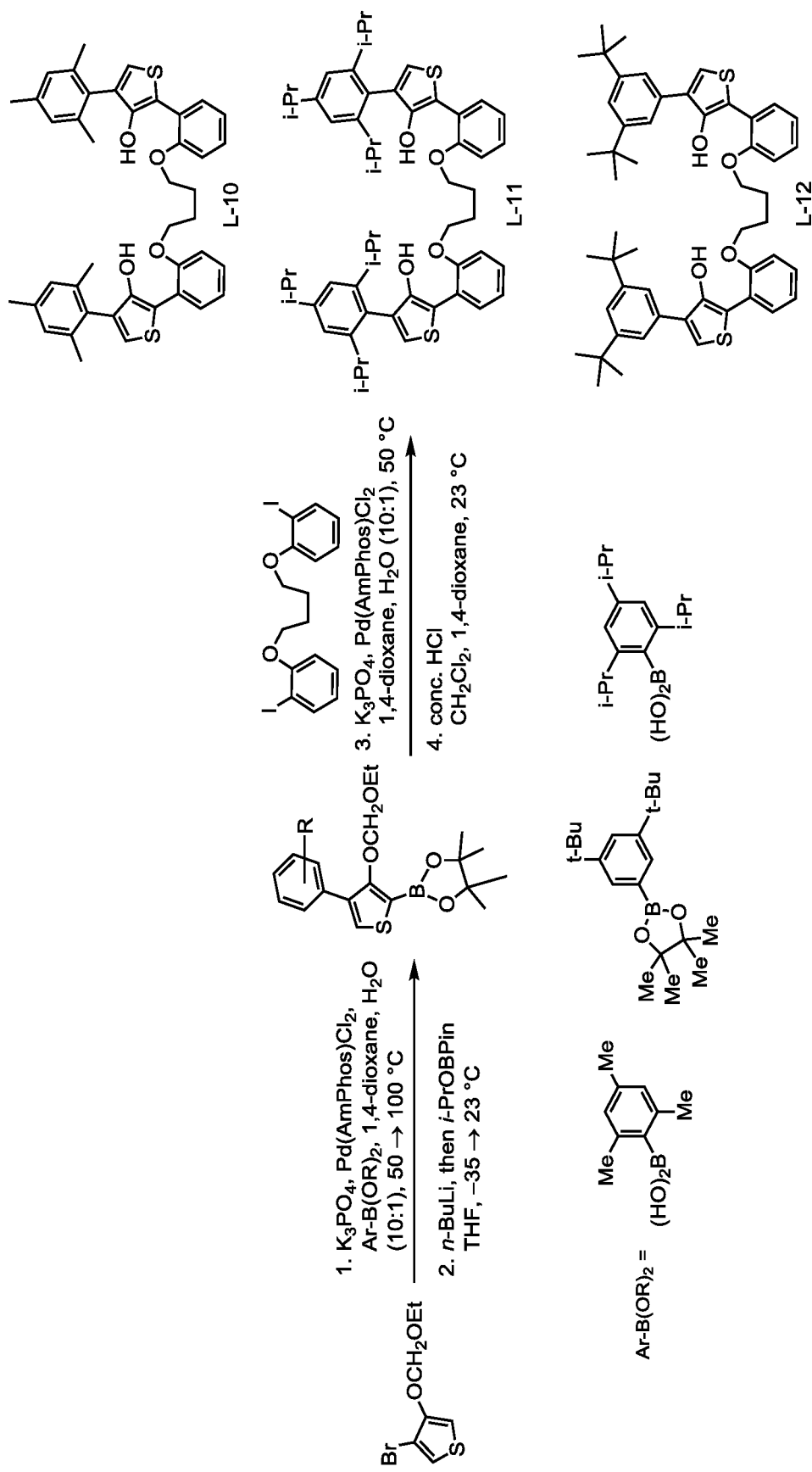
FIG. 3 depicts a four step synthetic scheme to synthesize ligands 10-12 (L-10 to L-12), in which the reagent in the first step is altered depending on the ligand.
Figure 4:
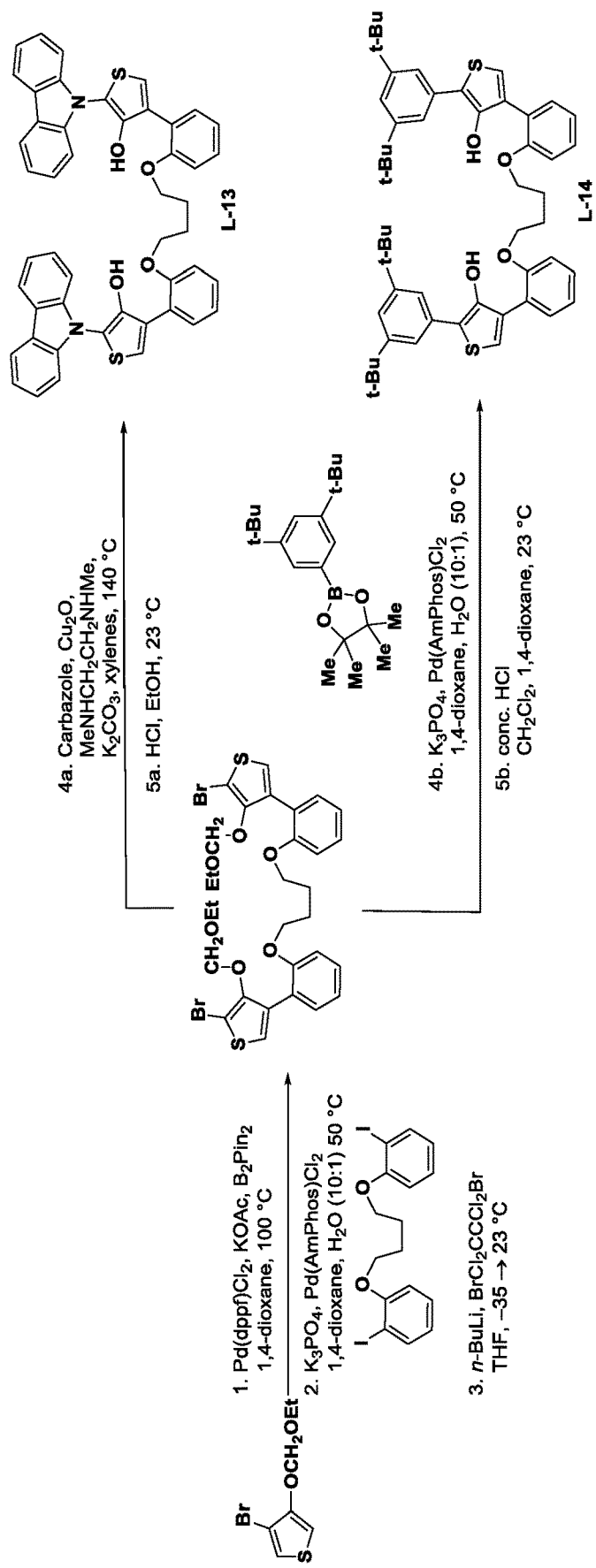
FIG. 4 depicts a five step synthetic scheme to synthesize ligands 13 and 14 (L-13 to L-14), in which the reagent in the fourth step is altered depending on the ligand.

Examples 1 to 117 are synthetic procedure for intermediates of the ligands, ligands, and the isolated procatalysts, and refer to FIGS. 1-4. One or more features of the present disclosure are illustrated in view of the examples as follows:

Procatalysts 10 to 65 were synthesized from Ligands 4 to 28, which are presented in FIGS. 2-4. Ligands 4 to 9 were synthesized by a scheme shown in FIG. 2. Ligands 10 to 12 were synthesized by a scheme shown in FIG. 3, and Ligands 13 and 14 were synthesized by a scheme shown in FIG. 4.

Example 1: Synthesis of Hydroxy-Thiophene Intermediate—Steps 1 and 2 in FIG. 1

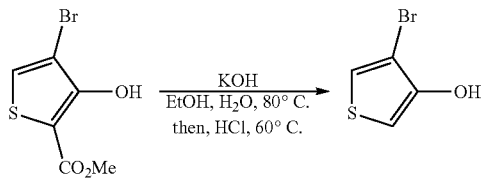 [SMILES: COC(=O)c1scc(Br)c1O ; "KOH" ; "EtOH, H2O, 80° C.then, HCl, 60° C." ; Oc1cscc1Br]

To a suspension of the hydroxyl-thiopene (9.000 grams, 37.964 mmol, 1.00 eq) in EtOH/H$_2$O (150 mL, 1:1) under nitrogen was added NaOH (42.200 g, 1.055 mol, 27.79 eq) all at once. The now yellow-orange mixture was equipped with a reflux condenser and placed in a mantle heated to 80° C. After stirring (500 rpm) for 2.5 hrs TLC of the now golden orange solution indicated complete conversion of the starting thiophene to a lower R$_f$ spot. The mixture was removed from the heating mantle, allowed to gradually cool to 23° C., placed in an ice water bath for 60 mins, aqueous HCl (250 mL, 1 N) was added followed by concentrated HCl (30 mL, 37%), and then EtOH (25 mL) was added to the now white heterogeneous mixture to aid solubility of the carboxylic acid intermediate. The now white mixture was removed from the ice water bath, placed in a mantle heated to 60° C., after stirring vigorously (1000 rpm) for 5 hrs the golden orange solution was removed from the mantle, allowed to cool gradually to 23° C., poured into a separatory funnel, diluted with CH$_2$Cl$_2$ (100 mL), partitioned, organics were washed with aqueous HCl (2×100 mL, 1 N), residual organics were extracted from the aqueous layer using CH$_2$Cl$_2$ (2×50 mL), dried over solid Na$_2$SO$_4$, decanted, carefully concentrated, diluted with CH$_2$Cl$_2$ (20 mL), suction filtered over silica gel, eluted with CH$_2$Cl$_2$ (4×25 mL), the pale golden filtrate solution was concentrated onto celite, and purified via silica gel chromatography using an ISCO chromatography purification system; 10% CH$_2$Cl$_2$—50% CH$_2$Cl$_2$ in hexanes to afford the bromo-hydroxythiophene as a pale golden brown oil (6.072 g, 33.912 mmol, 90%). NMR indicated pure product which exists as a mixture of keto-enol tautomers. The hydroxy-thiophene was used in the subsequent reaction without further purification. The product yield was a combination of a mixture of keto-enol tautomers. The ketone tautomer is represented by an asterisk (*).

$^1$H NMR (400 MHz, Chloroform-d) δ (8.34 (s, 1H)*), 7.12 (d, J=3.7 Hz, 1H), 6.43 (d, J=3.7 Hz, 1H), 5.49 (s, 1H), (3.72 (s, 2H)*). $^{13}$C NMR (101 MHz, Chloroform-d) δ (210.23*), 195.46, 160.19, (149.69*), 121.43, (111.65*), (103.07*), 100.24, (37.05*).

Example 2: Step 3 in FIG. 1—Synthesis of Precursor to Ligands 1-14

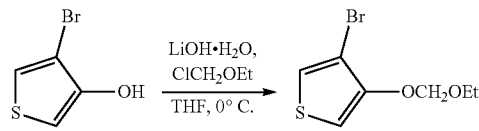

A clear golden yellow solution of the hydroxyl-thiophene (10.119 g, 56.521 mmol, 1.00 eq) in non-anhydrous THF (600 mL) under nitrogen was placed in an ice water bath, and the clear solution was sparged with nitrogen for 1 hr, and then placed under a positive flow of nitrogen upon which solid lithium hydroxide-monohydrate (4.741 g, 113.04 mmol, 2.00 eq) was added followed by deionized water (1.0 mL). The mixture changed to a golden red-brown solution after stirring vigorously (1000 rpm) for 1 hr upon which neat chloromethylethyl ether (15.7 mL, 169.56 mmol, 3.00 eq) was added via syringe in a quick dropwise manner. After stirring for 2 hrs at 0° C. the red-orange solution was diluted with aqueous NaOH (200 mL, 1 N), stirred for 2 mins, THF was removed in vacuo, the biphasic mixture was diluted with CH$_2$Cl$_2$ (100 mL), poured into a separatory funnel, partitioned, organics were washed with aqueous NaOH (2×100 mL, 1 N), residual organics were extracted from the aqueous using CH$_2$Cl$_2$ (2×50 mL), combined, dried over solid Na$_2$SO$_4$, decanted, and carefully concentrated to afford a brown amorphous oil which was diluted with CH$_2$Cl$_2$ (25 mL), suction filtered over a pad of silica gel, rinsed with CH$_2$Cl$_2$ (4×50 mL), and the filtrate was concentrated to afford the thiophene-ether as a pale golden brown oil (11.275 g, 47.551 mmol, 84%).

$^1$H NMR (400 MHz, Chloroform-d) δ 7.15 (d, J=3.6 Hz, 1H), 6.61 (d, J=3.5 Hz, 1H), 5.19 (s, 2H), 3.73 (q, J=7.1 Hz, 2H), 1.22 (t, J=7.1 Hz, 3H). $^{13}$C NMR (101 MHz, Chloroform-d) δ 151.51, 121.50, 103.84, 101.55, 95.07, 64.53, 15.05.

Example 3: Synthesis of a Carbazoyl Thiopene—Step 4a in FIG. 1

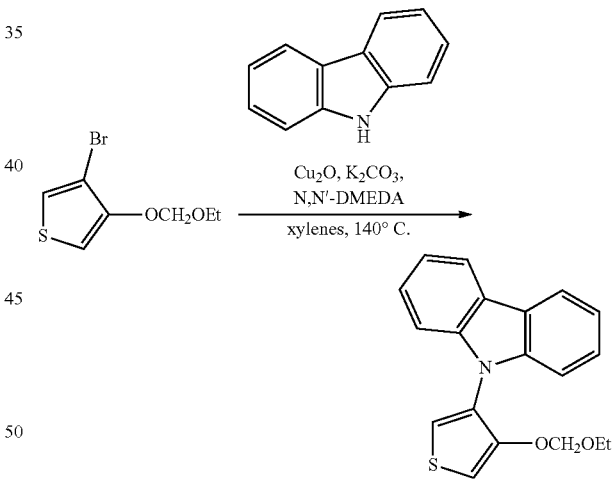

A mixture of the bromothiophene (1.034 g, 4.361 mmol, 1.00 eq), carbazole (1.604 g, 9.594 mmol, 2.20 eq), Cu$_2$O (1.248 g, 8.722 mmol, 2.00 eq), and K$_2$CO$_3$ (6.027 g, 43.610 mmol, 10.00 eq) was evacuated, back-filled with N$_2$, this process was repeated 4× more, deoxygenated anhydrous xylenes (22 mL) was added via syringe followed by N,N'-DMEDA (1.90 mL, 17.440 mmol, 4.00 eq) via syringe, the mixture placed in a mantle heated to 140° C., stirred (500 rpm) for 72 hrs, removed from the mantle, the now deep red-black mixture was allowed to cool gradually to 23° C., silica gel was added, the mixture was suction filtered over a pad of silica gel, washed with CH$_2$Cl$_2$ (4×30 mL), and the golden brown filtrate was concentrated onto celite, and purified several times via silica gel chromatography using an ISCO chromatography purification system; 15% $CH_2Cl_2$ in hexanes to afford the thiophene-carbazole product as a white crystalline solid (1.006 g, 3.110 mmol, 71%). Mixed fractions were collected and re-purified using the same method.

$^1$H NMR (500 MHz, Chloroform-d) δ 8.12 (dt, J=7.7, 1.0 Hz, 2H), 7.43-7.38 (m, 3H), 7.31-7.26 (m, 4H), 6.90 (d, J=3.6 Hz, 1H), 5.04 (s, 2H), 3.53 (q, J=7.1 Hz, 2H), 1.14 (t, J=7.0 Hz, 3H). $^{13}$C NMR (126 MHz, Chloroform-d) δ 150.82, 141.23, 127.05, 125.77, 123.17, 120.78, 120.14, 119.80, 110.17, 102.44, 94.75, 64.42, 14.99.

Example 4: Synthesis of the Thiophene Boropinacolate Ester—Step 5a FIG. 1

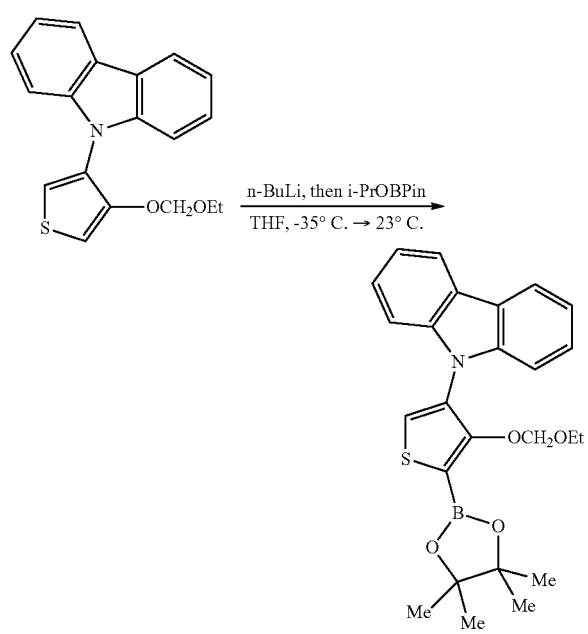

A clear pale yellow solution of the thiophene (0.410 g, 1.268 mmol, 1.00 eq) in anhydrous deoxygenated THF (30 mL) in a nitrogen filled glovebox was placed in the freezer cooled to −35° C. for 12 hrs upon which pre-cooled n-BuLi (0.73 mL, 1.902 mmol, 1.50 eq, titrated 2.61 M in hexanes) was added in a quick dropwise manner. After 3 hrs in the freezer isopropoxy-boronpinacolate (0.52 mL, 2.536 mmol, 2.00 eq) was added neat via syringe in a quick dropwise manner. The pale yellow solution changed to a slightly pale yellow mixture which was removed from the freezer, and after stirring for 2 hrs at 23° C. the white heterogeneous mixture was removed from the glovebox, neutralized with an aqueous phosphate buffer (50 mL, pH=8, 0.05 M), concentrated to remove THF, diluted with $CH_2Cl_2$ (20 mL), poured into a separatory funnel, partitioned, organics were washed with an aqueous phosphate (2×50 mL, pH=8, 0.05 M), residual organics were extracted from the aqueous using $CH_2Cl_2$ (2×20 mL), combined, dried over solid $Na_2SO_4$, decanted, and concentrated. The crude yellow mixture was dissolved in $CH_2Cl_2$ (10 mL), suction filtered through a pad of silica gel, rinsed with $CH_2Cl_2$ (4×20 mL), and concentrated to afford the thiophene boropinacolate as an amorphous white foam (0.560 g, 1.246 mmol, 98%). NMR indicated product which contains trace impurities including the undesired isomer and starting i-PrO-BPin. The slightly impure product was used in the subsequent reaction without further purification.

$^1$H NMR (400 MHz, Chloroform-d) δ 8.08 (dt, J=7.8, 1.0 Hz, 2H), 7.65 (s, 1H), 7.38 (ddd, J=8.2, 7.0, 1.2 Hz, 2H), 7.31 (dt, J=8.2, 1.0 Hz, 2H), 7.28-7.22 (m, 2H), 4.88 (s, 2H), 2.80 (q, J=7.1 Hz, 2H), 1.36 (s, 9H), 0.48 (t, J=7.1 Hz, 3H). $^{13}$C NMR (126 MHz, Chloroform-d) δ 159.02, 141.07, 130.52, 127.88, 125.96, 123.07, 119.99, 119.91, 110.45, 98.40, 84.27, 64.43, 24.81, 14.07.

Example 5: Synthesis of 3-Bromo-2-$OCH_2$OEt-Thiopene Precursor—3-Bromo-2-$OCH_2$OEt-Thiopene is a Reagent in Step 6a in FIG. 1

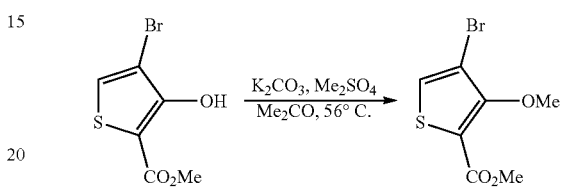

A pale purple heterogeneous mixture of the hydroxyl-thiophene (1.000 g, 4.218 mmol, 1.00 eq), $K_2CO_3$ (1.749 g, 12.654 mmol, 3.00 eq), and $Me_2SO_4$ (0.42 mL, 4.429 mmol, 1.05 eq) in acetone (40 mL) equipped with a reflux condenser under nitrogen was placed in a mantle heated to 60° C. After stirring (500 rpm) for 4 hrs TLC of the mixture indicated full consumption of SM, the heterogeneous mixture was removed from the heating mantle, allowed to cool gradually to 23° C., diluted with $CH_2Cl_2$ (50 mL), stirred vigorously (1000 rpm) for 2 minutes, suction filtered through a pad of celite, and the pale purple filtrate was concentrated to afford the ether as a white solid (1.029 g, 4.098 mmol, 97%). NMR indicated pure product.

$^1$H NMR (500 MHz, Chloroform-d) δ 7.38 (d, J=1.4 Hz, 1H), 4.01 (d, J=1.5 Hz, 3H), 3.88 (d, J=1.4 Hz, 3H). $^{13}$C NMR (126 MHz, Chloroform-d) δ 160.68, 158.65, 127.02, 116.76, 108.42, 62.49, 52.17.

Example 6: Reactant in Step 2 FIG. 2

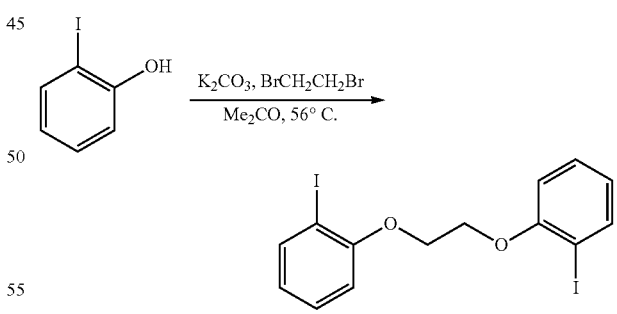

A white heterogeneous mixture of 2-iodophenol (2.000 g, 9.091 mmol, 2.00 eq), $K_2CO_3$ (2.513 g, 18.180 mmol, 4.00 eq), and 1,2-dibromoethane (0.39 mL, 4.545 mmol, 1.00 eq) in acetone (25 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred for 2 mins, suction filtered over a pad of celite, rinsed with $CH_2Cl_2$ (4×20 mL), the resultant pale yellow filtrate was concentrated, NMR indicated a mixture of product, starting phenol, and other impurities, the crude mixture was dissolved in $CH_2Cl_2$ (20 mL), poured into a separatory funnel, washed with aqueous NaOH (3×20 mL, 1 N), residual organics were extracted from the aqueous using $CH_2Cl_2$ (2×10 mL), concentrated onto celite, and purified via silica gel chromatography using an ISCO chromatography purification system; 25% $CH_2Cl_2$ in hexanes to afford the iodophenyl ether as a white solid (0.521 g, 1.118 mmol, 25%). NMR indicated pure product.

$^1$H NMR (500 MHz, Chloroform-d) δ 7.79 (dd, J=7.8, 1.6 Hz, 2H), 7.32 (td, J=7.8, 1.6 Hz, 2H), 6.98 (dd, J=8.2, 1.4 Hz, 2H), 6.83-6.67 (m, 2H), 4.43 (s, 4H). $^{13}$C NMR (126 MHz, Chloroform-d) δ 157.35, 139.59, 129.56, 123.17, 113.19, 86.97, 67.99.

Example 7: Reactant of Step 2 FIG. 2

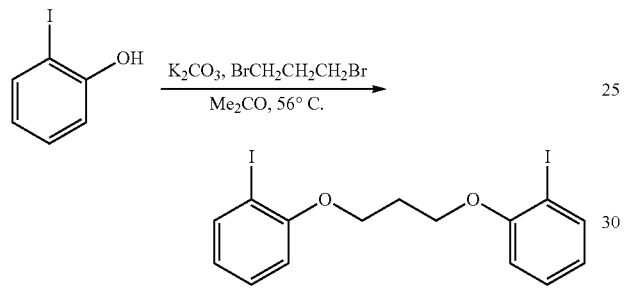

This procedure was similar to Example 6. The reaction provided a 79% yield of a white solid.

$^1$H NMR (500 MHz, Chloroform-d) δ 7.76 (dt, J=7.8, 1.2 Hz, 2H), 7.32-7.27 (m, 2H), 6.89 (dd, J=8.3, 1.3 Hz, 2H), 6.71 (tt, J=7.6, 1.2 Hz, 2H), 4.30 (t, J=6.0 Hz, 4H), 2.37 (p, J=6.0 Hz, 2H). $^{13}$C NMR (126 MHz, Chloroform-d) δ 157.27, 139.35, 129.52, 122.60, 112.28, 86.70, 65.55, 29.14.

Example 8: Reactant of Step 2 FIG. 2

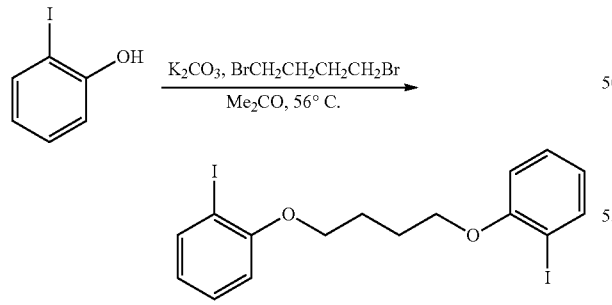

This procedure was similar to Example 6. The reaction provided a 90% yield of a white solid.

$^1$H NMR (500 MHz, Chloroform-d) δ 7.77 (dd, J=7.8, 1.8 Hz, 2H), 7.34-7.22 (m, 2H), 6.83 (d, J=8.2 Hz, 2H), 6.70 (t, J=7.6 Hz, 2H), 4.14 (d, J=5.3 Hz, 4H), 2.17-2.06 (m, 4H). $^{13}$C NMR (126 MHz, Chloroform-d) δ 157.42, 139.39, 129.44, 129.43, 122.42, 112.11, 112.09, 86.68, 68.61, 26.04.

Example 9: Reactant of Step 2 FIG. 2

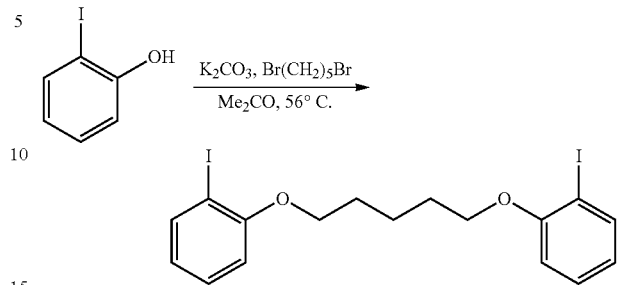

This procedure was similar to Example 6. The reaction provided a 91% yield of a white solid.

$^1$H NMR (500 MHz, Chloroform-d) δ 7.77 (dd, J=7.6, 1.9 Hz, 2H), 7.28 (t, J=8.0 Hz, 2H), 6.81 (d, J=8.2 Hz, 2H), 6.70 (t, J=7.6 Hz, 2H), 4.06 (t, J=6.2 Hz, 4H), 1.95 (p, J=6.7 Hz, 4H), 1.81 (q, J=8.3 Hz, 2H). $^{13}$C NMR (126 MHz, Chloroform-d) δ 157.49, 139.39, 129.41, 122.35, 112.02, 86.74, 68.91, 28.79, 22.92.

Example 10: Synthesis of the Precursor to Ligand 4—Step 2 FIG. 2

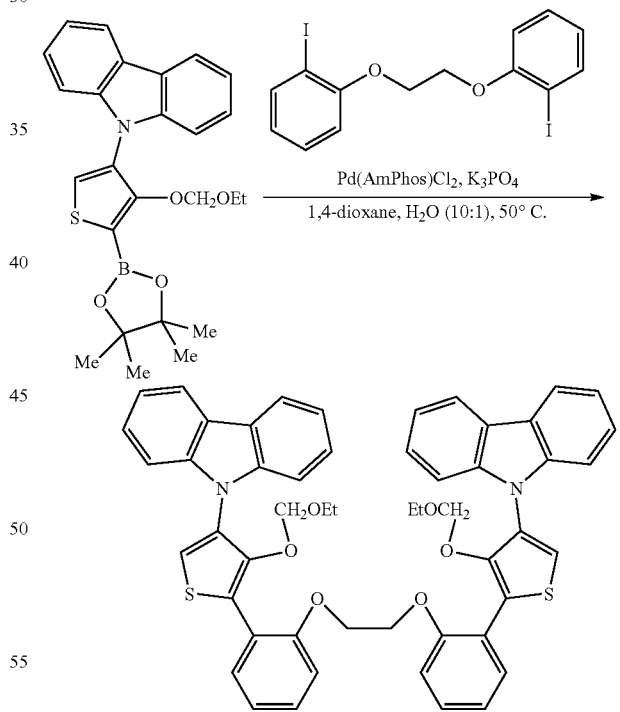

A mixture of Pd(AmPhos)Cl$_2$ (16.4 mg, 0.0231 mmol, 0.20 eq, product of Example 4), thiophene boropinacolate ester (140.0 mg, 0.3116 mmol, 2.70 eq, product of Example 6), the bis-iodophenyl ether (54.0 mg, 0.1154 mmol, 1.00 eq), and K$_3$PO$_4$ (198.0 mg, 0.9347 mmol, 8.10 eq) in a vial equipped with a stirbar was evacuated, then back-filled with nitrogen, this evacuation/back-fill process was conducted 4× more, then freshly deoxygenated 1,4-dioxane (5.6 mL) and then freshly deoxygenated water (0.56 mL) were added sequentially, the vial was capped under a positive flow of N₂, placed in a mantle heated to 50° C., the magenta solution was stirred (500 rpm) for 12 hrs, removed from the mantle, the now dark purple solution was allowed to cool to 23° C., diluted with CH₂Cl₂ (10 mL), suction filtered over a pad of silica gel, rinsed with CH₂Cl₂ (4×20 mL), and the resultant filtrate was concentrated, residual 1,4-dioxane was azeotropically removed using PhMe (4×5 mL), the resultant dark purple foam was dissolved in CH₂Cl₂ (10 mL), concentrated onto celite, and purified via silica gel chromatography; 20%-100% CH₂Cl₂ in hexanes and then purified a 2$^{nd}$ time using hexanes—60% CH₂Cl₂ in hexanes to afford the bis-coupled thiophene as an off-white amorphous foam (56.0 mg, 0.0654 mmol, 57%). NMR indicated product along with minor impurities as well as residual hexanes and CH₂Cl₂. The material was used in the subsequent deprotection without further purification.

¹H NMR (500 MHz, Chloroform-d) δ 8.09 (d, J=7.6 Hz, 4H), 7.91 (d, J=7.6 Hz, 2H), 7.43-7.29 (m, 11H), 7.29-7.20 (m, 5H), 7.10 (dt, J=12.0, 6.2 Hz, 4H), 4.58 (s, 4H), 4.40 (s, 4H), 2.71 (q, J=7.1 Hz, 4H), 0.43 (t, J=7.0 Hz, 6H). ¹³C NMR (126 MHz, Chloroform-d) δ 155.34, 147.41, 140.96, 131.19, 129.15, 128.85, 125.91, 124.40, 123.05, 121.78, 121.16, 119.97, 119.93, 119.83, 112.20, 110.47, 96.93, 66.96, 64.48, 14.05. HRMS (ESI): calc'd [M+Na]⁺ as 879.2533; found 879.2586.

Example 11: Synthesis of Ligand 4—Step 3 FIG. 2

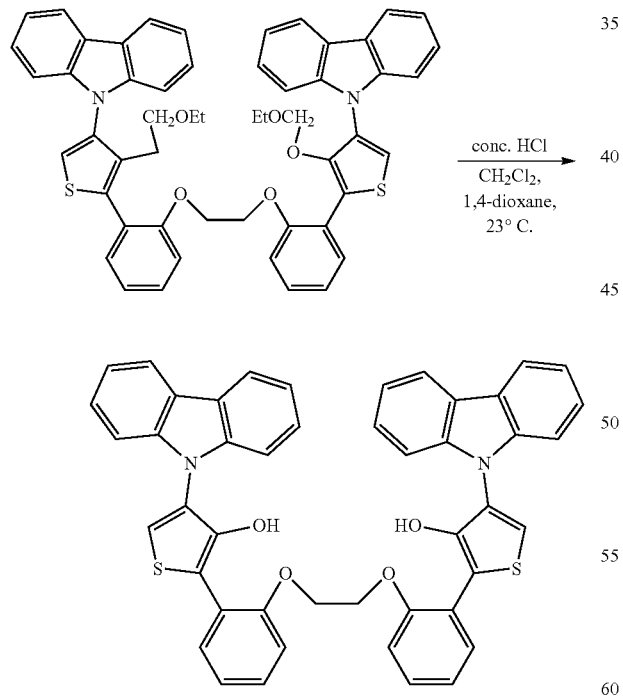

To a solution of the bis-protected thiophene (55.0 mg, 0.0642 mmol, 1.00 eq) in 1,4-dioxane/CH₂Cl₂ (6 mL, 1:2) under nitrogen was added concentrated HCl (4 mL). The golden brown biphasic solution was stirred vigorously (1000 rpm) for 24 hrs, diluted with aqueous HCl (10 mL, 1 N), diluted with CH₂Cl₂ (10 mL), poured into a separatory funnel, partitioned, organics were washed with aqueous HCl (2×10 mL, 1 N), residual organics were extracted from the aqueous layer using CH₂Cl₂ (2×10 mL), combined, dried over solid Na₂SO₄, decanted, concentrated, residual dioxane was azeotropically removed using PhMe (4×5 mL), the resultant dark brown amorphous foam was dissolved in CH₂Cl₂ (5 mL), suction filtered over a pad of silica gel, rinsed with CH₂Cl₂ (4×20 mL), and the resultant golden yellow filtrate solution was concentrated to afford the diol Ligand 4 as an amorphous golden brown foam (44.5 mg, 0.0601 mmol, 94%). NMR indictated pure product.

¹H NMR (400 MHz, Chloroform-d) δ 8.13-8.04 (m, 4H), 7.57-7.48 (m, 2H), 7.24-7.16 (m, 13H), 7.13-7.07 (m, 4H), 6.98-6.96 (m, 1H), 6.89-6.85 (m, 2H), 6.84 (br s, 2H), 4.38 (s, 4H). HRMS: calc'd [M+Na]⁺ as 763.1695; found 763.1714.

Example 12: Synthesis of the Precursor to Ligand 5—Step 2 FIG. 2

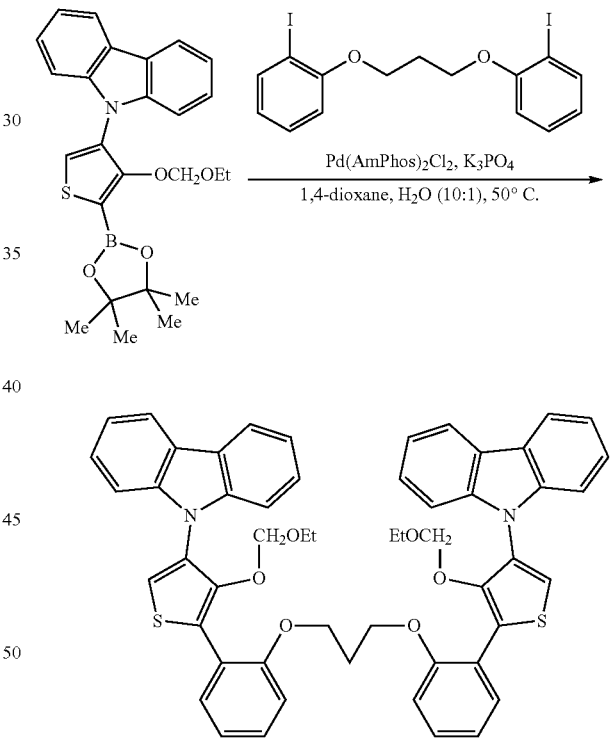

The procedure was similar to Example 10. The reaction provided a 55% yield of a pale yellow amorphorus foam.

¹H NMR (500 MHz, Chloroform-d) δ 8.13 (d, J=7.6 Hz, 4H), 7.78-7.74 (m, 2H), 7.47-7.40 (m, 8H), 7.33-7.25 (m, 5H), 7.16-7.10 (m, 2H), 6.96 (q, J=7.5, 6.7 Hz, 2H), 6.81 (d, J=8.2 Hz, 2H), 4.39 (t, J=5.6 Hz, 4H), 4.35-4.29 (m, 4H), 2.56 (q, J=7.0 Hz, 4H), 2.48 (p, J=5.9 Hz, 2H), 0.37 (td, J=8.5, 7.0, 3.5 Hz, 6H). ¹³C NMR (126 MHz, Chloroform-d) δ 155.72, 147.33, 141.11, 130.96, 129.33, 129.12, 125.94, 124.41, 123.11, 121.06, 120.50, 120.07, 119.93, 119.49, 112.01, 110.40, 96.72, 64.93, 64.31, 29.30, 13.96. HRMS (ESI): calc'd [M+Na]⁺ as 893.2689; found 893.2743.

Example 13: Synthesis of Ligand 5—Step 3 in FIG. 2

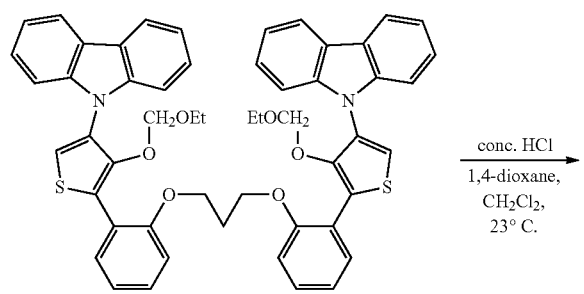

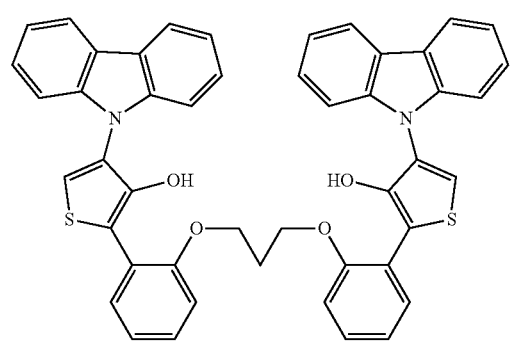

The procedure was similar to Example 11. The reaction provided a 93% yield of a golden brown foam.

$^1$H NMR (400 MHz, Chloroform-d) δ 8.10 (ddd, J=7.7, 1.3, 0.8 Hz, 4H), 7.57 (dd, J=7.7, 1.8 Hz, 2H), 7.38 (s, 2H), 7.34 (ddd, J=8.2, 6.9, 1.2 Hz, 4H), 7.30-7.21 (m, 5H), 7.17 (ddd, J=8.2, 7.4, 1.8 Hz, 3H), 7.14-7.06 (m, 4H), 6.96 (s 2H), 6.83 (dd, J=8.2, 1.3 Hz, 2H), 4.23 (t, J=5.9 Hz, 6H), 2.20 (d, J=5.6 Hz, 3H). HRMS: calc'd [M+Na]$^+$ as 777.1852; found 777.1887.

Example 14: Synthesis of the Precursor to Ligand 6—Second Step in FIG. 2

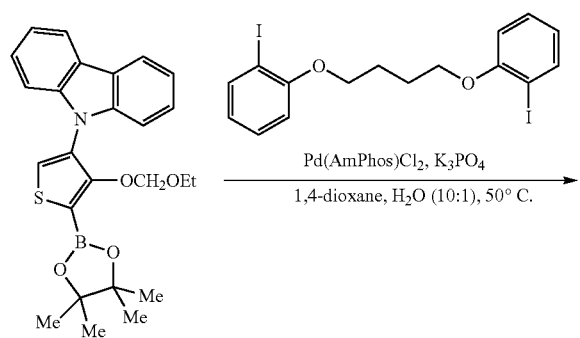

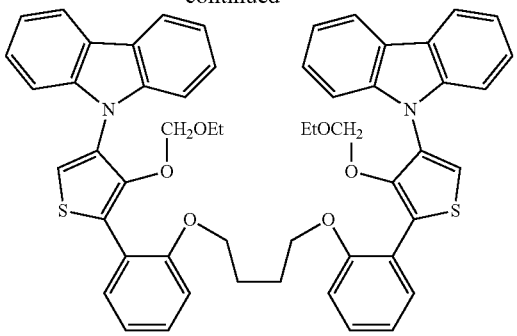

The procedure was similar to Example 10. The reaction provided a 63% yield of a pale yellow amorphous foam.

$^1$H NMR (500 MHz, Chloroform-d) δ 8.10 (d, J=7.8 Hz, 4H), 7.89 (dd, J=7.7, 1.7 Hz, 2H), 7.46-7.34 (m, 8H), 7.26 (d, J=1.7 Hz, 6H), 7.07-6.96 (m, 6H), 4.42 (d, J=1.6 Hz, 4H), 4.20 (s, 4H), 2.76-2.64 (m, 4H), 2.21 (s, 4H), 0.44 (td, J=7.0, 1.5 Hz, 6H). $^{13}$C NMR (101 MHz, Chloroform-d) δ 155.73, 147.30, 140.98, 130.95, 129.15, 128.94, 125.91, 124.37, 123.06, 121.30, 120.59, 120.01, 119.87, 119.45, 111.99, 110.44, 96.94, 68.21, 64.48, 26.24, 14.03. HRMS (ESI): calc'd [M+Na]$^+$ as 907.2846; found 907.2883.

Example 15: Synthesis of Ligand 6—Step 3 in FIG. 2

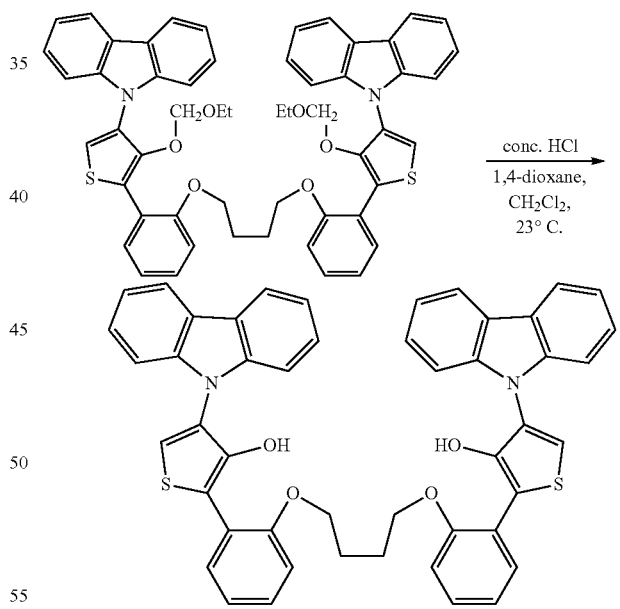

The procedure was similar to Example 11. The reaction provided a 85% yield of a amorphorus golden brown foam.

$^1$H NMR (500 MHz, Chloroform-d) δ 8.12 (d, J=7.8 Hz, 4H), 7.61 (dd, J=7.6, 1.7 Hz, 2H), 7.40-7.12 (m, 16H), 6.99 (s, 2H), 6.87 (d, J=8.3 Hz, 2H), 4.02 (d, J=5.1 Hz, 4H), 1.87 (q, J=2.9 Hz, 4H). $^{13}$C NMR (126 MHz, Chloroform-d) δ 153.65, 146.41, 141.19, 130.45, 129.02, 128.82, 128.22, 127.08, 125.77, 125.51, 123.22, 123.03, 120.73, 120.20, 119.85, 114.10, 110.19, 69.86, 30.32. HRMS (ESI): calc'd [M+Na]$^+$ as 791.2008; found 791.2012.

Example 16: Synthesis of Procatalyst 14

Example 17: Synthesis of Procatalyst 15

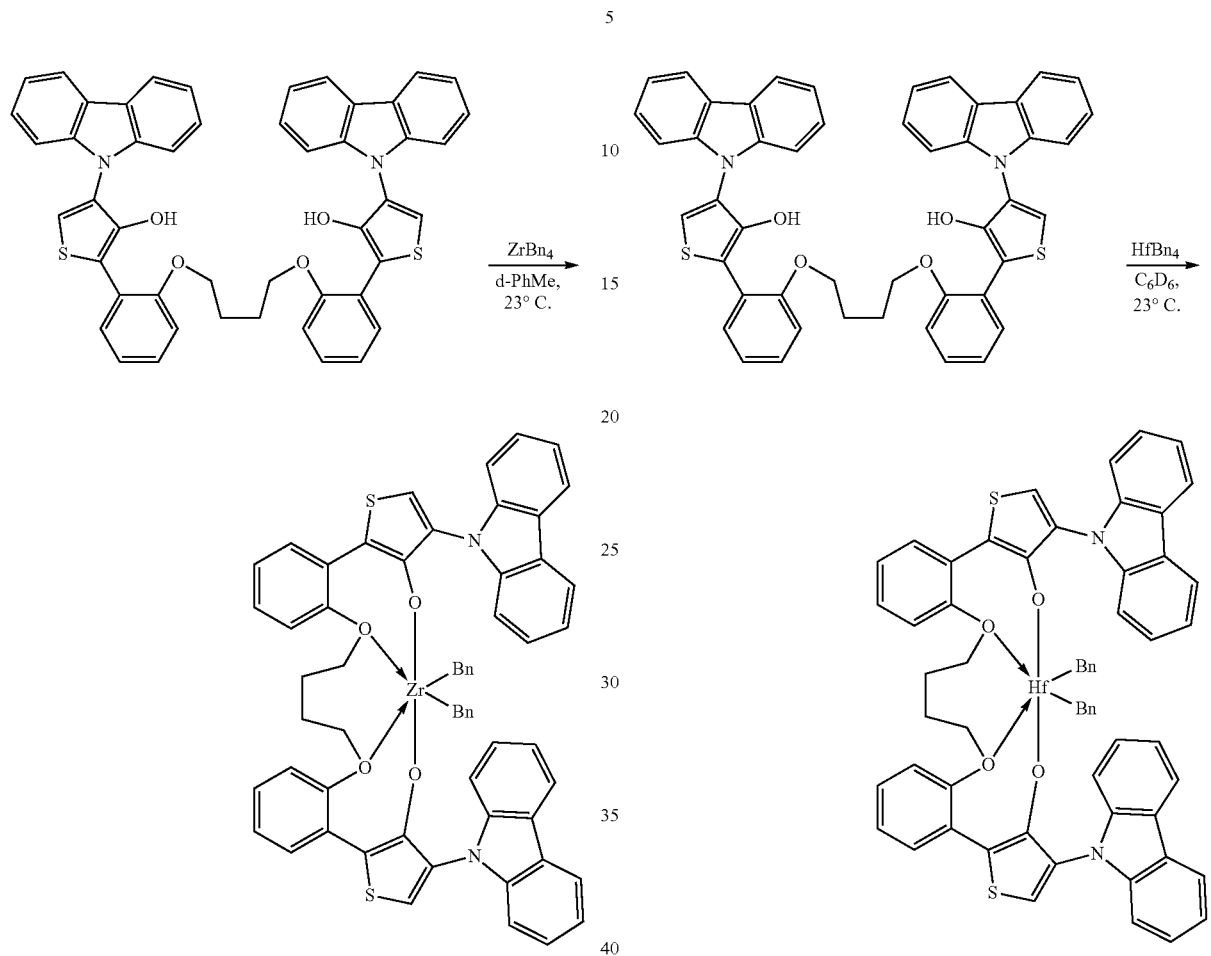

The thiophene ligand was azeotropically dried using PhMe (4×10 mL) prior to use. To a suspension of the thiophene, L-6, (6.5 mg, 0.00850 mmol, 1.00 eq) in d-PhMe (1.50 mL) in a nitrogen filled glovebox at 23° C. was added a solution of ZrBn₄ (3.9 mg, 0.00850 mmol, 1.00 eq) in d-PhMe (0.16 mL) in a dropwise manner. After stirring (500 rpm) for 1 hr the golden yellow solution was filtered using a 0.20 µm PTFE submicron filter to afford the zirconium complex as a 0.005 M solution in d-PhMe. NMR indicated product is ~87% pure with residual oligomer. Concentration of the complex to isolate the solid complex can be accomplished, but this promotes further oligomerization.

¹H NMR (400 MHz, Toluene-ds) δ 8.17-8.10 (m, 2H), 7.83 (dt, J=7.7, 1.0 Hz, 2H), 7.34-7.20 (m, 12H), 7.14-6.95 (m, 2H), 6.93 (ddd, J=9.2, 7.5, 1.8 Hz, 4H), 6.81 (s, 2H), 6.80-6.68 (m, 6H), 6.06-5.99 (m, 4H), 4.93 (dd, J=8.2, 1.3 Hz, 2H), 3.92 (t, J=10.7 Hz, 2H), 3.24 (dd, J=12.0, 4.7 Hz, 2H), 0.91 (d, J=12.3 Hz, 2H), 0.81 (t, J=9.4 Hz, 2H), 0.64 (t, J=11.4 Hz, 2H), 0.43 (d, J=12.3 Hz, 2H). ¹³C NMR (101 MHz, Toluene-ds) δ 155.86, 152.25, 146.57, 140.83, 140.75, 130.80, 128.87, 126.96, 126.42, 125.81, 124.54, 123.40, 122.35, 120.69, 120.38, 120.31, 119.79, 119.63, 117.78, 117.02, 112.53, 109.07, 80.70, 74.68, 25.86.

To a suspension of the ligand, L-6, (8.1 mg, 10.53 µmol, 1.00 eq) in anhydrous C₆D₆ (1.0 mL) in a nitrogen filled glovebox at 23° C. was added a solution of HfBn₄ (5.7 mg, 10.53 µmmol, 1.00 eq) in C₆D₆ (0.30 mL) in a slow dropwise manner. Upon completion of the addition the initial mixture transitioned to a clear pale yellow solution. After stirring (500 rpm) at 23° C. for 20 mins NMR indicated complete consumption of the starting ligand. The pale yellow solution was filtered through a 0.20 am PTFE filter, rinsed with anhydrous deoxygenated PhMe (3×3 mL), and the filtrate was concentrated to afford the hafnium complex as an off-white powder (11.1 mg, 9.840 µmol, 93%). NMR indicated pure product.

¹H NMR (400 MHz, Benzene-d₆) δ 8.16-8.07 (m, 2H), 7.82 (dt, J=7.7, 1.0 Hz, 2H), 7.33-7.27 (m, 2H), 7.27-7.20 (m, 6H), 7.20-7.15 (m, 4H), 7.02 (ddd, J=7.9, 7.1, 1.0 Hz, 2H), 7.00-6.93 (m, 4H), 6.74 (s, 2H), 6.73-6.65 (m, 6H), 6.13-6.06 (m, 4H), 4.95-4.89 (m, 2H), 3.93-3.84 (m, 2H), 3.20 (dd, J=11.9, 4.7 Hz, 2H), 0.84 (d, J=13.3 Hz, 2H), 0.71-0.62 (m, 2H), 0.39 (d, J=12.0 Hz, 2H), 0.19 (d, J=13.3 Hz, 2H). ¹³C NMR (101 MHz, Benzene-d₆) δ 155.54, 152.27, 147.45, 140.79, 140.66, 130.77, 129.59, 128.03, 127.13, 127.07, 126.67, 126.10, 124.95, 124.53, 123.67, 122.27, 120.79, 120.46, 120.35, 119.80, 119.70, 117.92, 116.45, 112.57, 109.14, 81.71, 78.29, 25.98.

Example 18: Synthesis of Procatalyst 26

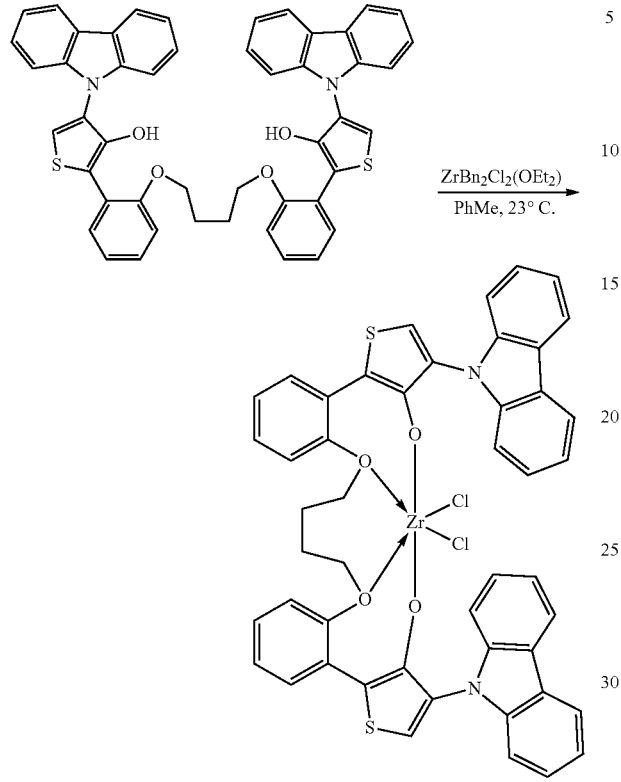

The thiophene ligand, L-6, was azeotropically dried using PhMe (4×10 mL) prior to use. To a suspension of the thiophene (13.0 mg, 0.0169 mmol, 1.00 eq) in anhydrous deoxygenated PhMe (3.0 mL) in a nitrogen filled glovebox at 23° C. was added a solution of ZrBn$_2$Cl$_2$(OEt$_2$) (7.8 mg, 0.0186 mmol, 1.10 eq) in PhMe (0.34 mL) in a dropwise manner. After stirring (500 rpm) for 45 mins the now golden yellow solution was filtered using a 0.20 μm PTFE submicron filter to afford the zirconium complex as a 0.005 M solution in PhMe which was used directly in the polymerization experiments. The complex solution can be concentrated to afford the solid dichloride complex (15.0 mg, 0.0167 mmol, 99%) free of Et$_2$O.

$^1$H NMR (500 MHz, Benzene-d$_6$) δ 8.18-8.11 (m, 2H), 8.04 (dt, J=7.7, 1.0 Hz, 2H), 7.28-7.13 (m, 8H), 7.11-7.07 (m, 4H), 7.03-6.87 (m, 4H), 6.74 (s, 2H), 6.70-6.62 (m, 4H), 5.31-5.24 (m, 2H), 4.04 (s, 2H), 3.11-3.01 (m, 2H), 0.72-0.64 (m, 2H), 0.48 (d, J=11.9 Hz, 2H).

Example 19: Synthesis of Procatalyst 27

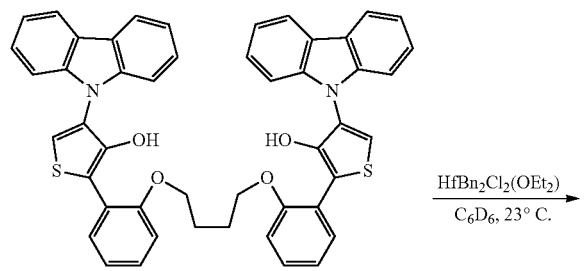

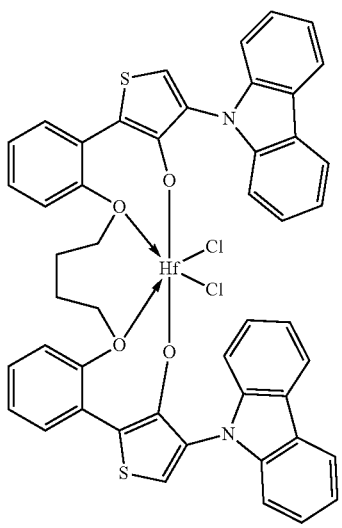

The thiophene ligand, L-6, was azeotropically dried using PhMe (4×10 mL) prior to use. To a white suspension of the thiophene (8.9 mg, 0.01157 mmol, 1.00 eq) in anhydrous C$_6$D$_6$(2.07 mL) in a nitrogen filled glovebox at 23° C. was added a solution of HfBn$_2$Cl$_2$(OEt$_2$) (5.9 mg, 0.01157 mmol, 1.00 eq) in C$_6$D$_6$(0.24 mL) in a dropwise manner. After stirring (500 rpm) for 1 hr the pale golden yellow solution was filtered using a 0.20 μm PTFE submicron filter to afford the hafnium complex as a 0.005 M solution in C$_6$D6. NMR indicated product of ~89% purity which contains Et$_2$O (1.00 eq). The same procedure can be used with PhMe to prepare the procatalyst solution, which is used directly after filtration for the polymerization experiments.

$^1$H NMR (500 MHz, Benzene-d$_6$) δ 8.15-8.13 (m, 2H), 8.04 (ddd, J=7.7, 1.3, 0.8 Hz, 2H), 7.27-7.23 (m, 3H), 7.23-7.19 (m, 5H), 7.19-7.14 (m, 4H), 6.77 (s, 2H), 6.68-6.62 (m, 4H), 5.27 (dd, J=7.6, 2.0 Hz, 2H), 4.14 (t, J=10.8 Hz, 2H), 3.17-3.09 (m, 2H), 0.69 (t, J=9.7 Hz, 2H), 0.44 (d, J=12.1 Hz, 2H). $^{13}$C NMR (126 MHz, Benzene-d$_6$) δ 152.08, 140.91, 140.71, 129.90, 129.52, 128.27, 126.74, 126.11, 124.82, 124.65, 124.21, 124.18, 122.11, 120.76, 120.23, 119.88, 119.38, 118.29, 117.09, 112.64, 112.54, 108.96, 84.28, 31.95.

Example 20: Synthesis of the Precursor to Ligand 7—Step 2 FIG. 2

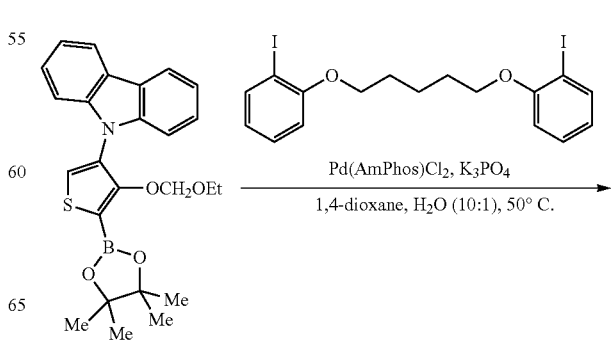

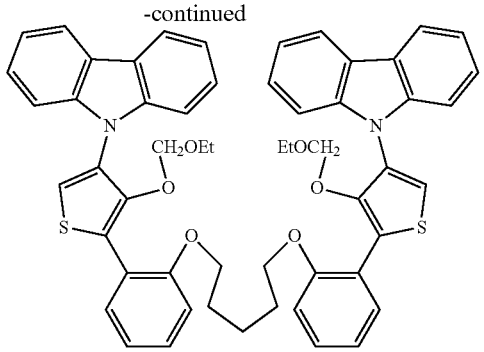

The procedure was similar to Example 10. The reaction provided a 38% yield of a pale yellow amorphorus foam.

¹H NMR (500 MHz, Chloroform-d) δ 8.14 (d, J=7.8 Hz, 4H), 7.91 (dd, J=7.7, 1.8 Hz, 2H), 7.50-7.41 (m, 6H), 7.38 (s, 2H), 7.33-7.26 (m, 6H), 7.03 (t, J=7.5 Hz, 2H), 6.96 (d, J=8.3 Hz, 2H), 4.45 (s, 4H), 4.13 (t, J=6.3 Hz, 4H), 2.71 (q, J=7.0 Hz, 4H), 2.08 (p, J=6.6 Hz, 4H), 1.87 (tt, J=9.7, 6.2 Hz, 2H), 0.45 (t, J=7.0 Hz, 6H). ¹³C NMR (126 MHz, Chloroform-d) δ 155.85, 147.35, 141.03, 130.92, 129.17, 128.99, 125.97, 124.46, 123.12, 121.32, 120.55, 120.05, 119.93, 119.42, 112.06, 110.52, 96.99, 68.53, 64.50, 29.04, 22.93, 14.07.

Example 21: Synthesis of Ligand 7—Step 3 FIG. 2

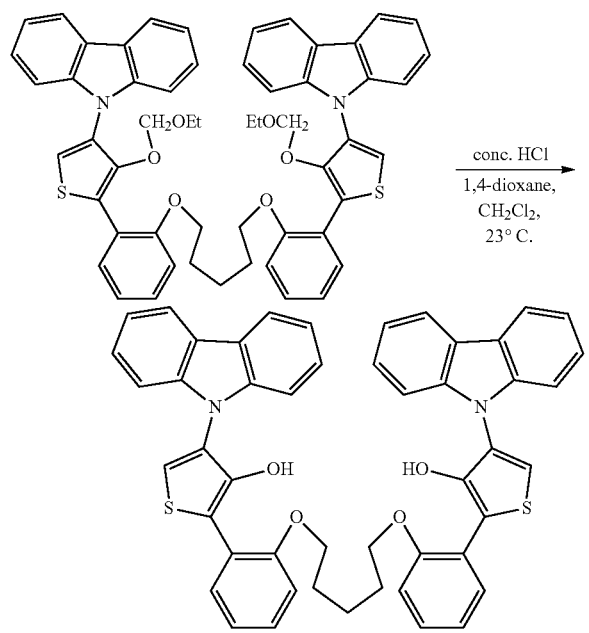

The procedure was similar to Example 11. The reaction provided a 98% yield of a amorphorus golden brown foam.

¹H NMR (500 MHz, Chloroform-d) δ 8.09 (dt, J=7.7, 1.0 Hz, 4H), 7.60 (dd, J=7.7, 1.7 Hz, 2H), 7.47 (s, 2H), 7.41 (s, 2H), 7.37-7.34 (m, 6H), 7.29-7.19 (m, 6H), 7.13 (td, J=7.5, 1.1 Hz, 2H), 6.86 (dd, J=8.3, 1.2 Hz, 2H), 3.92 (t, J=6.4 Hz, 4H), 1.73 (p, J=6.7 Hz, 4H), 1.51-1.42 (m, 2H). ¹³C NMR (126 MHz, Chloroform-d) δ 153.72, 146.47, 141.17, 130.37, 128.76, 127.21, 125.74, 123.20, 122.95, 122.92, 120.53, 120.20, 119.84, 115.69, 114.17, 110.23, 70.05, 28.61, 22.33.

Example 22: Synthesis of Precursor to Ligand 10—Step 1 in FIG. 3

A mixture of Pd(AmPhos)₂Cl₂ (60.0 mg, 0.0844 mmol, 0.10 eq), thiophene bromide (200.0 mg, 0.8436 mmol, 1.00 eq), the boronic acid (208.0 mg, 1.265 mmol, 1.50 eq), and K₃PO₄ (804.0 mg, 3.796 mmol, 4.50 eq) in a vial equipped with a stirbar was evacuated, then back-filled with nitrogen, this evacuation/back-fill process was conducted 4× more, then freshly deoxygenated 1,4-dioxane (10.0 mL) and freshly deoxygenated water (1.0 mL) were added sequentially, the vial was capped under a positive flow of N₂, placed in a mantle heated to 50° C., the magenta solution was stirred (500 rpm) for 24 hrs, removed from the mantle, the now dark purple solution was allowed to cool to 23° C., diluted with CH₂Cl₂ (10 mL), suction filtered over a pad of silica gel, rinsed with CH₂Cl₂ (4×20 mL), and the resultant filtrate was concentrated, residual 1,4-dioxane was azeotropically removed using PhMe (4×5 mL), the resultant dark purple foam was dissolved in CH₂Cl₂ (10 mL), concentrated onto celite, and purified via silica gel chromatography; 5%-25% CH₂Cl₂ in hexanes to afford the mesityl-thiophene as a clear colorless oil (155.0 mg, 0.5608 mmol, 66%). NMR indicated pure product.

¹H NMR (500 MHz, Chloroform-d) δ 6.95 (s, 2H), 6.91 (d, J=3.4 Hz, 1H), 6.74 (d, J=3.4 Hz, 1H), 5.11 (s, 2H), 3.63 (q, J=7.1 Hz, 2H), 2.33 (s, 3H), 2.09 (s, 6H), 1.21 (t, J=7.1 Hz, 3H). ¹³C NMR (126 MHz, Chloroform-d) δ 153.05, 137.51, 137.14, 132.90, 131.48, 127.93, 121.39, 101.08, 94.52, 64.03, 21.14, 20.40, 20.39, 15.13.

Example 23: Synthesis of Precursor to Ligand 10—Step 2 in FIG. 3

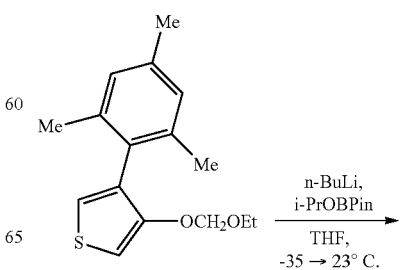

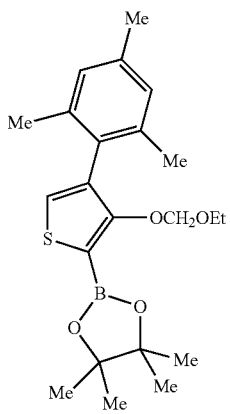

The procedure was similar to Example 4. The reaction provided a 84% yield of an off-white solid.

¹H NMR (500 MHz, Chloroform-d) δ 7.21 (s, 1H), 6.92-6.89 (m, 2H), 4.98 (s, 2H), 3.22 (q, J=7.1 Hz, 2H), 2.31 (s, 3H), 2.09 (s, 6H), 1.36 (s, 12H), 0.96 (t, J=7.1 Hz, 3H). ¹³C NMR (126 MHz, Chloroform-d) δ 161.36, 137.50, 136.96, 136.42, 131.63, 129.13, 127.82, 98.05, 83.84, 64.26, 24.80, 21.04, 20.59, 14.76.

Example 24: Synthesis of Ligand 10—Third and Fourth Steps in FIG. 3

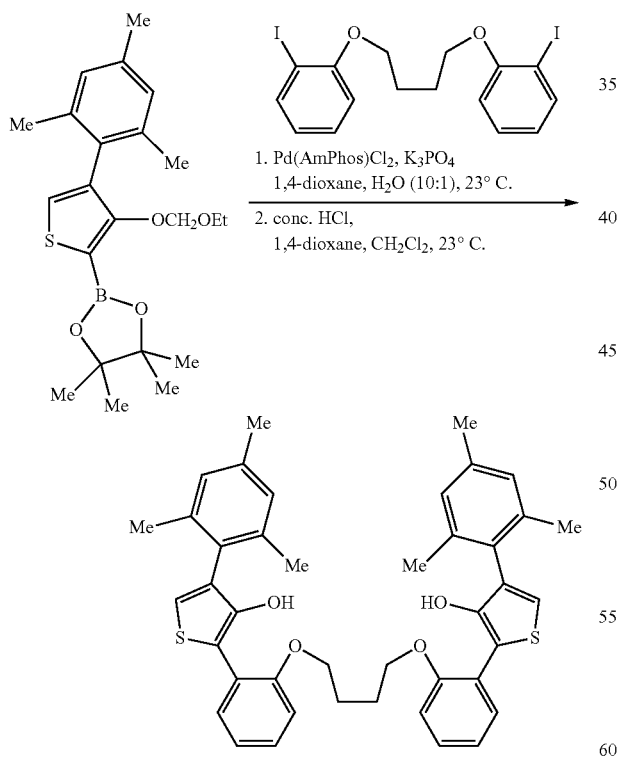

The procedure was similar to Example 10. The reaction provided a 77% two steps (Suzuki coupling and deprotection) yield of a white foam.

¹H NMR (500 MHz, Chloroform-d) δ 7.57 (dd, J=7.7, 1.7 Hz, 2H), 7.25 (d, J=6.9 Hz, 2H), 7.23 (s, 2H), 7.13-7.08 (m, 2H), 6.97 (d, J=8.2 Hz, 2H), 6.93 (d, J=6.0 Hz, 4H), 6.93 (s, 2H), 4.10 (d, J=5.2 Hz, 4H), 2.31 (s, 6H), 2.10 (s, 12H), 1.91 (q, J=2.9 Hz, 4H). ¹³C NMR (126 MHz, Chloroform-d) δ 153.58, 148.41, 137.42, 137.26, 133.66, 131.68, 130.95, 128.12, 128.03, 123.79, 122.98, 121.46, 114.49, 114.34, 69.81, 25.66, 21.11, 20.37.

Characterization of the Protected Ligand:

¹H NMR (500 MHz, Chloroform-d) δ 7.78 (dd, J=7.6, 1.8 Hz, 2H), 7.28-7.23 (m, 2H), 6.99 (td, J=7.5, 1.1 Hz, 2H), 6.95 (dd, J=8.3, 1.1 Hz, 2H), 6.92 (d, J=6.7 Hz, 6H), 4.55 (s, 4H), 4.08 (q, J=2.9 Hz, 4H), 3.02 (q, J=7.0 Hz, 4H), 2.31 (s, 6H), 2.18 (s, 12H), 2.07-2.01 (m, 4H), 0.81 (t, J=7.1 Hz, 6H). ¹³C NMR (126 MHz, Chloroform-d) δ 155.90, 149.49, 137.43, 136.89, 134.68, 132.21, 131.23, 128.62, 127.90, 123.24, 122.22, 120.76, 120.40, 112.13, 96.64, 68.13, 64.31, 26.06, 21.05, 20.61, 14.64.

Example 25: Synthesis of Procatalyst 20

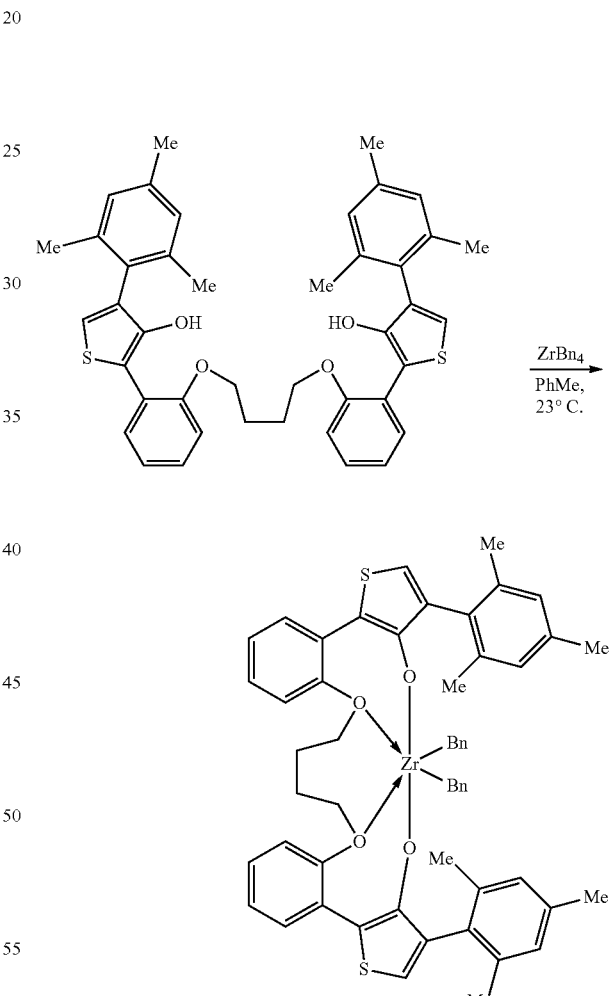

The procedure was similar to Example 16

¹H NMR (500 MHz, Benzene-d₆) δ 7.65 (dd, J=7.8, 1.7 Hz, 2H), 7.18 (td, J=7.6, 1.3 Hz, 2H), 7.03-6.93 (m, 2H), 6.92 (q, J=2.8, 2.0 Hz, 2H), 6.91-6.79 (m, 6H), 6.76 (d, J=1.7 Hz, 2H), 6.70 (s, 2H), 5.77 (dd, J=8.1, 1.3 Hz, 2H), 3.17 (d, J=7.9 Hz, 2H), 2.73 (dd, J=12.9, 8.0 Hz, 2H), 2.39 (s, 6H), 2.26 (s, 2H), 2.18 (s, 2H), 2.01 (s, 6H), 1.99 (s, 6H), 1.47 (q, J=11.6 Hz, 2H).

Example 26: Synthesis of Procatalyst 21

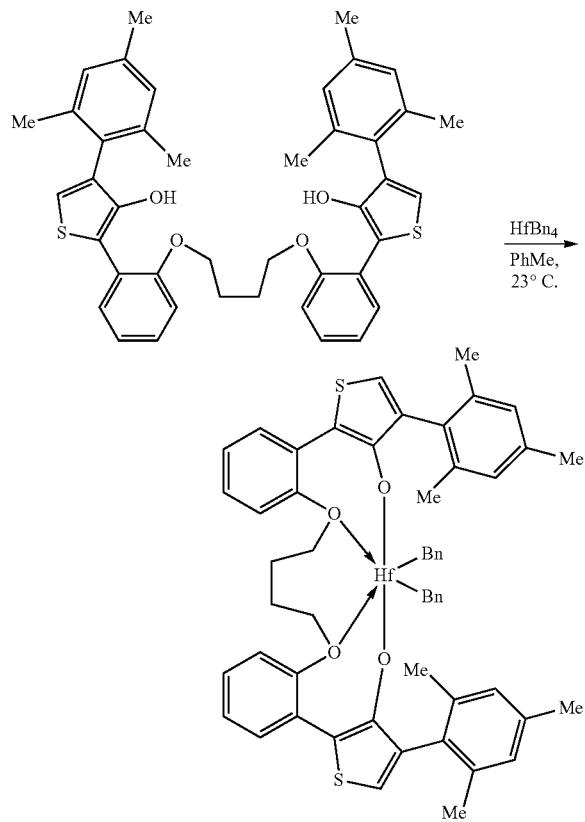

The procedure was similar to Example 17.

$^1$H NMR (500 MHz, Benzene-d6) δ 7.47-7.43 (m, 2H), 6.97 (td, J=7.7, 1.7 Hz, 4H), 6.94 (s, 2H), 6.88-6.84 (m, 6H), 6.70 (ddt, J=8.7, 7.3, 1.4 Hz, 2H), 6.66 (s, 2H), 6.51-6.48 (m, 1H), 6.43 (d, J=8.0 Hz, 1H), 6.35 (dt, J=8.3, 1.6 Hz, 2H), 6.32-6.29 (m, 2H), 4.20 (t, J=10.7 Hz, 2H), 3.59-3.52 (m, 2H), 2.22 (s, 6H), 2.18 (s, 6H), 2.10 (s, 6H), 2.07 (d, J=12.9 Hz, 2H), 1.33 (d, J=12.9 Hz, 2H), 0.88 (d, J=9.9 Hz, 2H), 0.66 (d, J=13.1 Hz, 2H). $^{13}$C NMR (126 MHz, Benzene-d6) δ 155.71, 155.28, 147.75, 139.93, 136.72, 135.11, 134.20, 131.70, 131.46, 129.87, 129.11, 128.61, 128.56, 128.50, 128.17, 127.30, 126.73, 126.32, 124.02, 121.08, 120.84, 116.20, 81.21, 78.13, 26.10, 21.04, 20.76, 20.33.

Example 27: Synthesis of Precursor to Ligand 11—First Step in FIG. 3

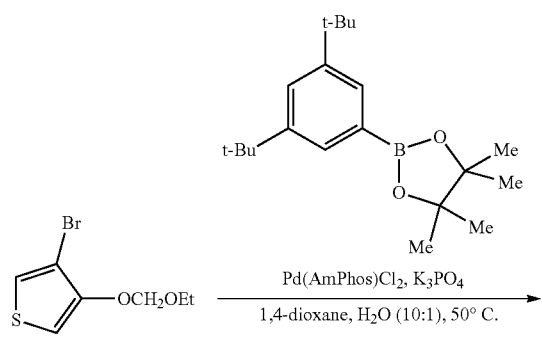

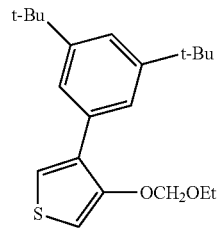

A solid mixture of the thiophene (200.0 mg, 0.8436 mmol, 1.00 eq produce of Example 1), boronic ester (400.0 mg, 1.265 mmol, 1.50 eq, product of Example 43, infra), K$_3$PO$_4$ (804.0 mg, 3.796 mmol, 4.50 eq), and Pd(AmPhos)Cl$_2$ (60.0 mg, 0.0844 mmol, 0.10 eq) in a vial equipped with a stirbar was evacuated, then back-filled with nitrogen, this process was repeated 4× more, upon which deoxygenated 1,4-dioxane (10.0 mL) and deoxygenated water (1.0 mL) were added sequentially via syringe. The vial was sealed with a PTFE cap under a purging flow of nitrogen and placed in a mantle heated to 50° C. After stirring vigorously (1000 rpm) for 24 hrs, the dark red-black mixture was removed from the mantle, allowed to cool gradually to 23° C., diluted with CH$_2$Cl$_2$ (20 mL), suction filtered over silica gel using CH$_2$Cl$_2$ as the eluent, the golden orange filtrate was concentrated onto celite, and purified via silica gel chromatography using an ISCO chromatography purification system; 10%-25% CH$_2$Cl$_2$ in hexanes to afford the 3,5-di-tert-butylphenyl thiophene as an off white foam (217.0 mg, 0.6262 mmol, 74%). NMR indicated pure product.

$^1$H NMR (500 MHz, Chloroform-d) δ 7.53 (d, J=2.0 Hz, 2H), 7.48 (d, J=1.9 Hz, 1H), 7.30 (d, J=3.5 Hz, 1H), 6.75 (d, J=3.4 Hz, 1H), 5.27 (s, 2H), 3.82 (q, J=7.1 Hz, 2H), 1.44 (s, 18H), 1.31 (t, J=7.1 Hz, 3H). $^{13}$C NMR (126 MHz, Chloroform-d) δ 152.66, 150.49, 135.02, 133.94, 122.58, 121.30, 121.10, 101.68, 94.88, 64.41, 34.95, 31.58, 15.16.

Example 28: Synthesis of Precursor to Ligand 11—Step 2 in FIG. 3

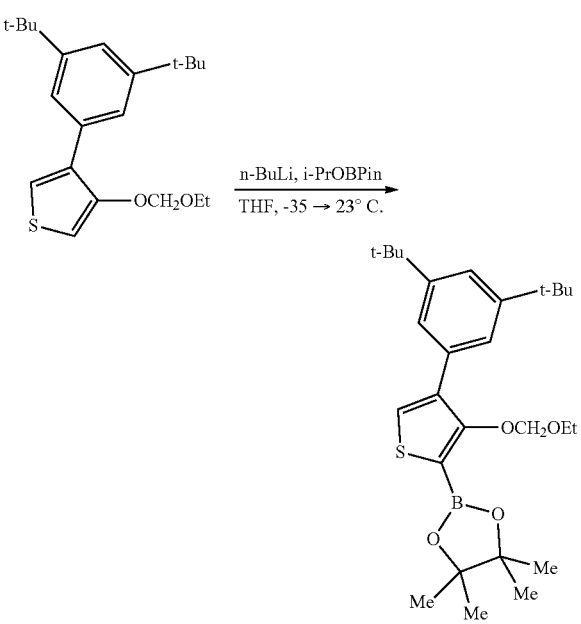

The procedure was similar to Example 4. The reaction provided a 83% yield of an off-white solid.

$^1$H NMR (500 MHz, Chloroform-d) δ 7.53 (d, J=1.1 Hz, 1H), 7.45 (d, J=1.8 Hz, 2H), 7.40 (q, J=1.5 Hz, 1H), 5.11 (d, J=1.0 Hz, 2H), 3.39 (qd, J=7.1, 0.9 Hz, 2H), 1.38 (s, 12H), 1.37 (s, 18H), 0.83 (td, J=7.1, 1.0 Hz, 3H). $^{13}$C NMR (126 MHz, Chloroform-d) δ 161.11, 150.55, 138.93, 134.08, 128.93, 122.87, 122.51, 121.07, 99.17, 83.94, 64.75, 34.90, 31.51, 24.77, 14.61.

Example 29: Synthesis of Ligand 11—Steps 3 and 4 in FIG. 3

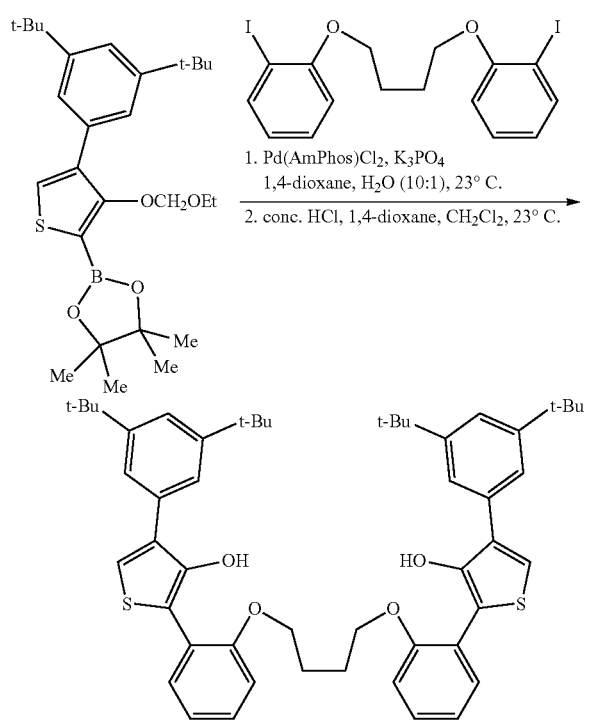

The procedure was similar to Example 10. The two-step reaction provided a 43% yield golden brown amorphous foam.

$^1$H NMR (500 MHz, Chloroform-d) δ 7.54 (tq, J=3.2, 1.7 Hz, 6H), 7.48 (d, J=2.2 Hz, 2H), 7.43 (p, J=1.8, 1.3 Hz, 2H), 7.30-7.16 (m, 4H), 7.10 (t, J=7.5 Hz, 2H), 6.94 (d, J=8.2 Hz, 2H), 4.16 (d, J=5.6 Hz, 4H), 2.02 (p, J=3.6, 3.1 Hz, 4H), 1.38 (s, 36H). $^{13}$C NMR (126 MHz, Chloroform-d) δ 153.67, 150.50, 148.24, 135.49, 134.35, 131.14, 129.04, 128.34, 125.53, 123.64, 122.92, 122.40, 121.29, 120.96, 115.32, 114.37, 69.97, 34.92, 31.53, 25.80.

Characterization of the Protected Ligand:

$^1$H NMR (500 MHz, Chloroform-d) δ 7.82 (dd, J=7.7, 1.8 Hz, 2H), 7.49 (dd, J=1.9, 0.6 Hz, 4H), 7.38 (t, J=1.8 Hz, 2H), 7.27-7.23 (m, 4H), 7.00 (td, J=7.5, 1.0 Hz, 2H), 6.94 (dd, J=8.3, 1.1 Hz, 2H), 4.66 (s, 4H), 4.12 (d, J=5.2 Hz, 4H), 3.16 (q, J=7.0 Hz, 4H), 2.15-2.09 (m, 4H), 1.37 (d, J=0.7 Hz, 36H), 0.76-0.69 (m, 6H). $^{13}$C NMR (126 MHz, Chloroform-d) δ 155.89, 150.55, 149.17, 136.79, 134.62, 131.46, 128.72, 124.29, 122.51, 122.04, 120.94, 120.45, 120.40, 112.10, 97.17, 68.07, 64.68, 34.90, 31.52, 26.04, 14.53.

Example 30: Synthesis of Procatalyst 22

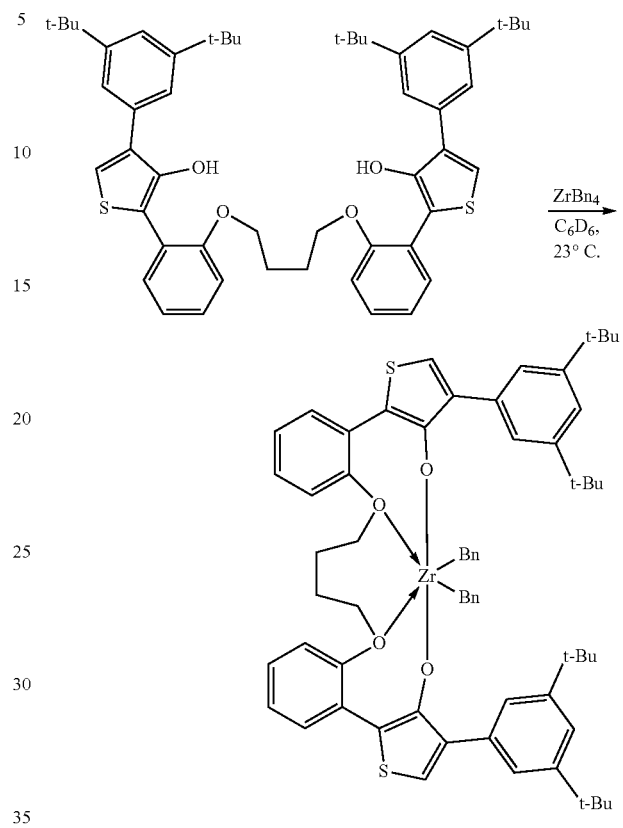

The procedure was similar to Example 16

$^1$H NMR (500 MHz, Benzene-d$_6$) δ 7.61 (t, J=1.8 Hz, 2H), 7.59 (d, J=1.8 Hz, 4H), 7.40-7.37 (m, 2H), 7.04-7.00 (m, 4H), 6.87 (s, 2H), 6.87-6.80 (m, 4H), 6.74 (tt, J=7.2, 1.2 Hz, 2H), 6.62-6.57 (m, 4H), 5.86-5.83 (m, 2H), 4.18 (dd, J=11.9, 9.9 Hz, 2H), 3.49 (dd, J=12.0, 4.9 Hz, 2H), 2.60 (d, J=12.0 Hz, 2H), 1.67 (d, J=12.0 Hz, 2H), 1.35 (s, 36H), 0.77 (t, J=9.4 Hz, 2H), 0.43 (d, J=11.7 Hz, 2H). $^{13}$C NMR (126 MHz, Benzene-d$_6$) δ 156.38, 155.01, 150.85, 147.58, 137.32, 135.57, 131.38, 129.14, 128.91, 128.47, 128.14, 126.09, 123.64, 123.22, 122.08, 121.03, 119.79, 116.54, 81.38, 76.58, 34.71, 31.40, 26.85.

Example 31: Synthesis of Procatalyst 23

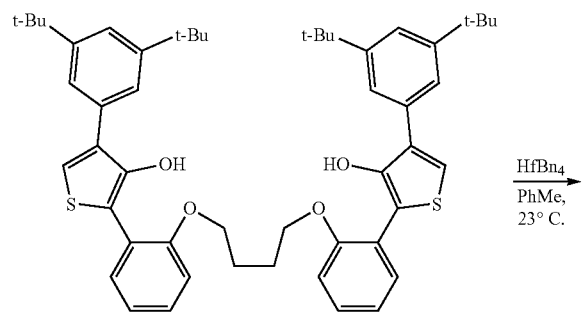

-continued

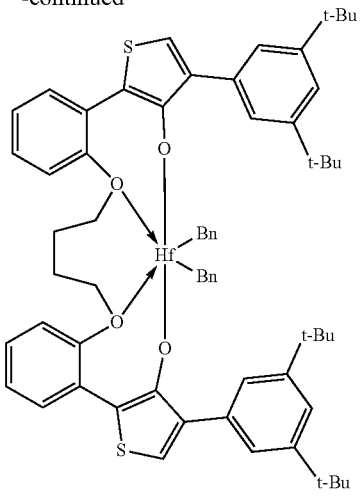

The procedure was similar to Example 17

¹H NMR (500 MHz, Benzene-d₆) δ 7.62 (q, J=1.8 Hz, 2H), 7.55 (d, J=1.9 Hz, 4H), 7.38 (dt, J=7.6, 2.0 Hz, 2H), 7.06-7.02 (m, 4H), 6.89-6.80 (m, 4H), 6.87 (s, 2H), 6.72 (ddd, J=8.8, 6.9, 1.5 Hz, 2H), 6.59 (dt, J=8.6, 1.8 Hz, 4H), 5.86 (dd, J=8.0, 1.5 Hz, 2H), 4.28 (t, J=10.7 Hz, 2H), 3.60-3.53 (m, 2H), 2.37 (d, J=12.8 Hz, 2H), 1.45 (d, J=12.7 Hz, 2H), 1.35 (s, 36H), 0.78 (t, J=9.8 Hz, 2H), 0.38 (d, J=12.0 Hz, 2H). ¹³C NMR (126 MHz, Benzene-d₆) δ 156.20, 154.97, 150.83, 147.85, 137.74, 135.51, 131.37, 129.10, 128.91, 128.50, 128.15, 126.67, 126.38, 125.28, 123.79, 123.25, 122.07, 121.19, 119.84, 116.00, 82.15, 80.04, 34.71, 31.40, 31.25, 27.01.

Example 32: Synthesis of Precursor to Ligand 12—First Step in FIG. 3

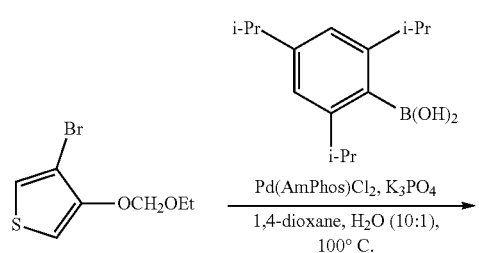

The procedure was similar to Example 22. The reaction provided a 44% yield of a white solid.

¹H NMR (500 MHz, Chloroform-d) δ 7.06 (d, J=1.5 Hz, 2H), 6.91 (dd, J=3.4, 1.5 Hz, 1H), 6.74 (dd, J=3.4, 1.5 Hz, 1H), 5.10 (d, J=1.4 Hz, 2H), 3.62 (qd, J=7.1, 1.4 Hz, 2H), 2.95 (p, J=6.9 Hz, 1H), 2.75-2.65 (m, 2H), 1.32 (dd, J=6.9, 1.4 Hz, 6H), 1.21 (td, J=7.1, 1.5 Hz, 3H), 1.13 (td, J=6.9, 1.5 Hz, 12H). ¹³C NMR (126 MHz, Chloroform-d) δ 153.83, 148.19, 147.89, 132.52, 129.19, 121.65, 120.50, 100.21, 94.34, 63.91, 34.18, 30.59, 24.46, 24.00, 23.75, 15.10.

Example 33: Synthesis of Precursor to Ligand 12—Second Step in FIG. 3

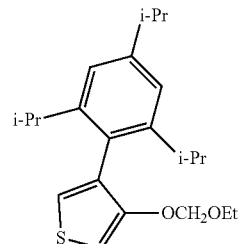

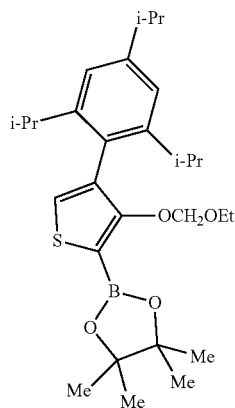

The procedure was similar to Example 4. The reaction provided a 93% yield of an off-white solid.

¹H NMR (500 MHz, Chloroform-d) δ 7.21 (s, 1H), 7.02 (s, 2H), 4.95 (s, 2H), 3.26 (q, J=7.1 Hz, 2H), 2.91 (p, J=6.9 Hz, 1H), 2.69 (p, J=6.8 Hz, 2H), 1.36 (s, 12H), 1.28 (d, J=6.8 Hz, 6H), 1.18 (d, J=6.9 Hz, 6H), 1.05 (d, J=6.8 Hz, 6H), 0.92 (t, J=7.1 Hz, 3H). 13C NMR (126 MHz, Chloroform-d) δ 160.86, 148.41, 147.90, 135.62, 129.43, 129.29, 120.45, 97.05, 83.86, 64.17, 34.33, 30.55, 30.32, 25.44, 24.82, 24.74, 24.11, 23.17, 14.85.

Example 34: Synthesis of Ligand 12—Steps 3 and 4 in FIG. 4

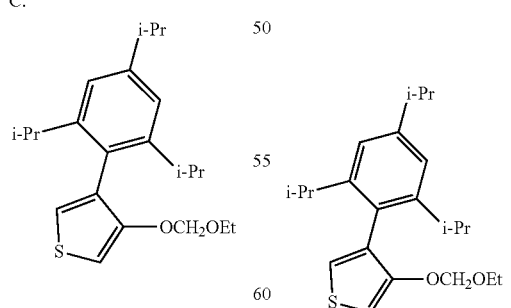
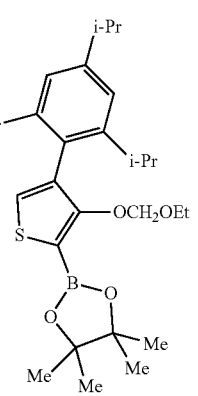
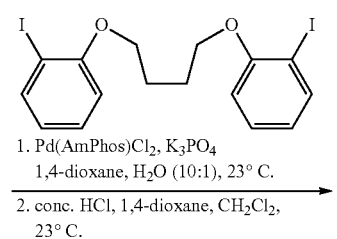

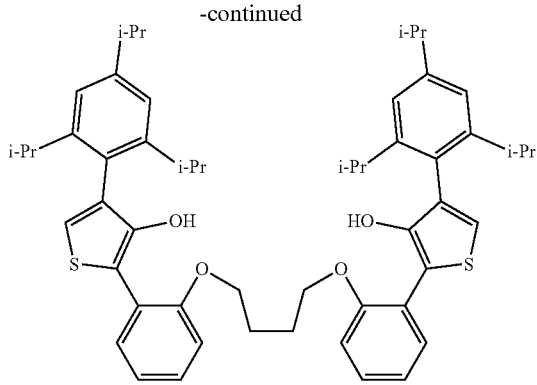

The procedure was similar to Example 10 and Example 11. The two-step reaction provided a 97% of a pale golden brown amorphous foam.

$^1$H NMR (500 MHz, Chloroform-d) δ 7.63 (d, J=7.7 Hz, 2H), 7.26 (d, J=3.7 Hz, 4H), 7.12 (t, J=7.6 Hz, 2H), 7.08 (s, 4H), 6.96 (d, J=10.0 Hz, 4H), 4.12 (d, J=5.5 Hz, 4H), 2.95 (p, J=6.9 Hz, 2H), 2.83 (hept, J=8.1, 6.9 Hz, 4H), 1.95 (q, J=4.3, 2.8 Hz, 4H), 1.32 (d, J=6.9 Hz, 12H), 1.14 (dd, J=10.4, 6.9 Hz, 24H). $^{13}$C NMR (126 MHz, Chloroform-d) δ 153.50, 149.14, 148.42, 147.90, 133.34, 131.06, 129.54, 129.04, 128.23, 128.10, 123.75, 122.91, 121.77, 120.70, 114.19, 113.81, 69.73, 34.31, 30.68, 25.70, 24.56, 24.06, 23.84.

Characterization of the Protected Ligand:

$^1$H NMR (500 MHz, Chloroform-d) δ 7.89 (dd, J=7.6, 1.8 Hz, 2H), 7.31-7.25 (m, 2H), 7.08 (s, 4H), 7.03 (t, J=7.5 Hz, 2H), 6.99 (d, J=7.8 Hz, 4H), 4.59 (s, 4H), 4.14 (d, J=5.4 Hz, 4H), 3.06 (q, J=7.0 Hz, 4H), 2.92 (dh, J=27.2, 6.8 Hz, 6H), 2.15-2.08 (m, 4H), 1.32 (d, J=6.9 Hz, 12H), 1.26 (d, J=6.8 Hz, 12H), 1.15 (d, J=6.8 Hz, 12H), 0.82 (t, J=7.1 Hz, 6H). $^{13}$C NMR (126 MHz, Chloroform-d) δ 155.85, 149.67, 148.44, 147.92, 134.16, 131.20, 129.96, 128.59, 122.91, 122.28, 121.25, 120.61, 120.50, 112.16, 96.23, 68.14, 64.33, 34.37, 30.67, 26.02, 25.71, 24.16, 23.27, 14.74.

Example 35: Synthesis of the Precursor to Ligands 13 and 14—Step 1 in FIG. 4

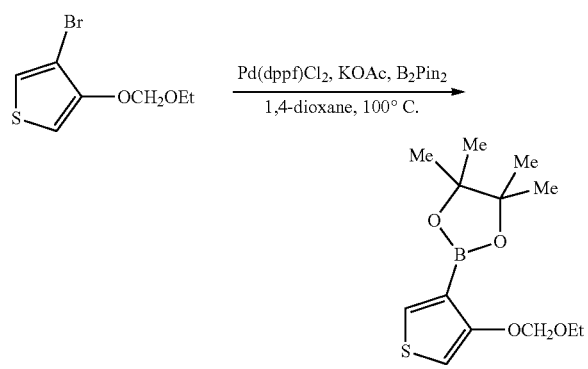

To vial equipped with a stirbar was added the bromothiophene (0.428 g, 1.805 mmol, 1.00 eq, product of Example 2), KOAc (0.531 g, 5.415 mmol, 3.00 eq), Pd(dppf)Cl$_2$ (0.147 g, 0.1805 mmol, 0.10 eq), and B$_2$Pin$_2$ (0.504 g, 1.986 mmol, 1.10 eq). The mixture was evacuated, then back-filled with nitrogen, this process was repeated 3× more, then deoxygenated anhydrous 1,4-dioxane (10.0 mL) was added via syringe. The vial was sealed with a PTFE cap under a purging flow of nitrogen, and then placed in a mantle heated to 100° C. After stirring (1000 rpm) for 24 hrs the black mixture was removed from the mantle, allowed to cool gradually to 23° C., suction filtered over a pad of silica gel, washed with CH$_2$Cl$_2$ (4×20 mL), the clear dark grey/black filtrate was concentrated, diluted with CH$_2$Cl$_2$ (10 mL), suction filtered over silica gel, washed with CH$_2$Cl$_2$ (4×20 mL), and concentrated to afford the boropinacolate thiophene as a black amorphous oil (0.313 g, 1.101 mmol, 61%). NMR indicated product with residual B$_2$Pin$_2$.

$^1$H NMR (400 MHz, Chloroform-d) δ 7.71 (d, J=3.2 Hz, 1H), 6.55 (d, J=3.2 Hz, 1H), 5.17 (s, 2H), 3.74 (q, J=7.1 Hz, 3H), 1.30 (s, 12H), 1.21 (t, J=7.1 Hz, 3H). $^{13}$C NMR (126 MHz, Chloroform-d) δ 159.17, 135.96, 102.29, 94.95, 83.34, 64.16, 24.77, 15.14.

Example 36: Synthesis of the Precursor to Ligands 13 and 14—Step 2 in FIG. 4

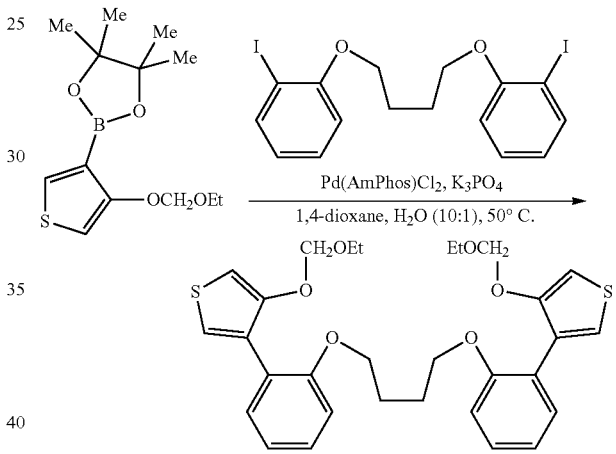

The procedure was similar to Example 10. The reaction provided a 90% yield of a pale-gold yellow foam.

$^1$H NMR (500 MHz, Chloroform-d) δ 7.42 (dd, J=7.5, 1.8 Hz, 2H), 7.27-7.25 (m, 4H), 6.98 (td, J=7.5, 1.1 Hz, 2H), 6.90 (dd, J=8.3, 1.1 Hz, 2H), 6.66 (d, J=3.5 Hz, 2H), 5.11 (s, 4H), 3.96-3.91 (m, 4H), 3.67 (q, J=7.1 Hz, 4H), 1.82-1.77 (m, 4H), 1.20 (t, J=7.1 Hz, 6H). $^{13}$C NMR (126 MHz, Chloroform-d) δ 156.34, 153.36, 131.07, 129.85, 128.54, 123.97, 123.12, 120.29, 112.42, 100.80, 94.89, 68.02, 64.11, 26.01, 15.10.

Example 37: Synthesis of the Precursor to Ligands 13 and 14—Step 3 in FIG. 4

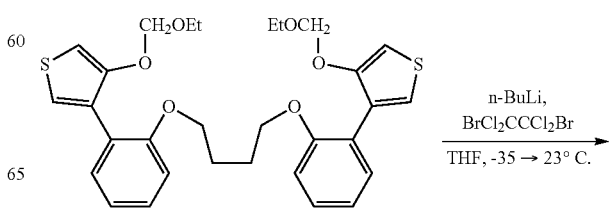

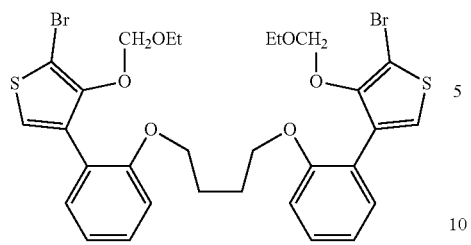
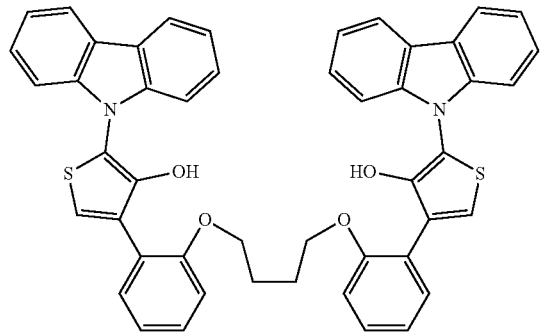

The bisthiophene was azeotropically dried using PhMe (4×10 mL) prior to use. A clear colorless solution of the thiophene (475.0 mg, 0.8563 mmol, 1.00 eq) in deoxygenated anhydrous THF (15 mL) in a nitrogen filled glovebox was placed in a freezer cooled to −35° C. for 12 hrs upon which a precooled solution of n-BuLi (1.00 mL, 2.569 mmol, 3.00 eq, titrated 2.50 M in hexanes) was added via syringe in a dropwise manner. The now golden yellow-orange mixture was allowed to sit in the freezer for 4 hrs upon which it was removed and while stirring (500 rpm) solid 1,2-dibromotetrachloroethane (837.0 mg, 2.569 mmol, 3.00 eq) was added in a quick dropwise manner. After stirring for 2 hrs at 23° C. the now pale yellow heterogeneous mixture was removed from the glovebox, neutralized with aqueous phosphate buffer (50 mL, pH=8, 0.05 M), diluted with $CH_2Cl_2$ (30 mL) and brine (20 mL), poured into a separatory funnel, partitioned, organics were washed with a saturated aqueous mixture of phosphate buffer (pH=8, 0.05 M) and brine (2×40 mL, 1:1), residual organics were extracted from the aqueous layer using $CH_2Cl_2$ (2×20 mL), combined, dried over solid $Na_2SO_4$, decanted, concentrated onto celite, and purified via silica gel chromatography; 25%-75% $CH_2Cl_2$ in hexanes to afford the dibromothiophene as a pale golden yellow amorphous oil (544.0 mg, 0.7635 mmol, 89%). NMR indicated pure product.

$^1$H NMR (500 MHz, Chloroform-d) δ 7.37 (dd, J=7.5, 1.7 Hz, 2H), 7.28 (ddd, J=8.3, 7.4, 1.8 Hz, 2H), 7.22 (s, 2H), 6.97 (td, J=7.5, 1.1 Hz, 2H), 6.90 (dd, J=8.3, 1.1 Hz, 2H), 4.82 (s, 4H), 3.97-3.93 (m, 4H), 3.48 (q, J=7.1 Hz, 4H), 1.84-1.80 (m, 4H), 1.00 (t, J=7.1 Hz, 6H). $^{13}$C NMR (126 MHz, Chloroform-d) δ 156.31, 151.30, 132.47, 130.83, 129.15, 123.67, 122.86, 120.45, 112.30, 98.73, 97.05, 67.98, 65.09, 25.84, 14.81.

Example 38: Synthesis of Ligand 13—Steps 4 and 5 in FIG. 4

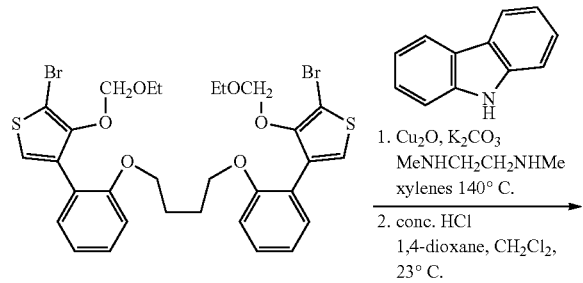

The dibromide was azeotropically dried using PhMe (4×10 mL) prior to use. A solid mixture of the dibromide (0.697 g, 0.7826 mmol, 1.00 eq), carbazole (0.654 g, 3.913 mmol, 5.00 eq), $Cu_2O$ (0.560 g, 3.913 mmol, 5.00 eq), and $K_2CO_3$ (2.163 g, 15.652 mmol, 20.0 eq) in an oven-dried vial equipped with a stirbar was evacuated, then back-filled with nitrogen, this process was repeated 4× more, upon which deoxygenated anhydrous xylenes (10.0 mL) was added followed by neat N,N'-dimethylethylenediamine (0.84 mL, 7.826 mmol, 10.00 eq) added via syringe. The vial was sealed with a PTFE cap under a purging flow of nitrogen and placed in a mantle heated to 140° C. After stirring vigorously (1000 rpm) for 72 hrs, the dark red mixture was removed from the mantle, allowed to cool gradually to 23° C., diluted with $CH_2Cl_2$ (20 mL), suction filtered over silica gel using $CH_2Cl_2$ as the eluent, the golden orange filtrate was concentrated onto celite, and purified via silica gel chromatography; 25%-100% $CH_2Cl_2$ in hexanes and then purified two more times using 25%-65% $CH_2Cl_2$ in hexanes to afford the biscarbazoyl-thiophene as an off white solid (0.148 g, 0.1672 mmol, 21%). NMR indicated product which contained trace impurities. The product was used in the subsequent reaction without further purification.

To a solution of the protected hydroxythiophene (0.148 g, 0.1672 mmol, 1.00 eq) in $CH_2Cl_2$ (5 mL) and 1,4-dioxane (5 mL) was added concentrated HCl (5 mL) under nitrogen at 23° C. After stirring vigorously (1000 rpm) for 20 hrs the pale golden brown solution was diluted with aqueous HCl (20 mL, 1 N) and $CH_2Cl_2$ (20 mL), poured into a separatory funnel, partitioned, organics were washed with aqueous HCl (2×20 mL), residual organics were extracted from the aqueous layer using $CH_2Cl_2$ (2×20 mL), combined, dried over solid $Na_2SO_4$, decanted, concentrated onto celite, and purified via silica gel chromatography; 25%-75% $CH_2Cl_2$ in hexanes to afford the hydroxythiophene Ligand 13 as a white solid (88.1 mg, 0.1146 mmol, 69%, 14% two steps). NMR indicated pure product.

$^1$H NMR (500 MHz, Chloroform-d) δ 8.10 (dt, J=7.6, 1.0 Hz, 4H), 7.53 (dd, J=7.6, 1.7 Hz, 2H), 7.37-7.30 (m, 10H), 7.28-7.22 (m, 4H), 7.20 (s, 2H), 7.15 (td, J=7.5, 1.1 Hz, 2H), 6.89 (dd, J=8.2, 1.0 Hz, 2H), 6.78 (s, 2H), 4.01 (d, J=4.8 Hz, 4H), 1.88 (p, J=2.5 Hz, 4H). $^{13}$C NMR (126 MHz, Chloroform-d) δ 154.19, 148.02, 141.96, 131.33, 130.74, 129.59, 125.98, 124.39, 123.56, 122.78, 120.30, 120.22, 119.54, 114.97, 113.55, 110.29, 69.41, 25.92.

Characterization of the Protected Coupled Product:

$^{1}$H NMR (500 MHz, Chloroform-d) δ 8.11 (dd, J=7.7, 2.6 Hz, 4H), 7.61-7.26 (m, 18H), 7.10-6.98 (m, 4H), 4.49 (d, J=3.3 Hz, 4H), 4.14 (s, 4H), 2.85-2.74 (m, 4H), 2.17-2.04 (m, 4H), 0.52 (td, J=7.1, 3.1 Hz, 6H). $^{13}$C NMR (126 MHz, Chloroform-d) δ 156.56, 149.17, 141.91, 132.25, 131.00, 129.19, 126.20, 124.19, 123.52, 121.71, 120.60, 120.56, 120.51, 120.13, 112.21, 110.67, 96.67, 68.07, 64.40, 26.25, 14.15.

Example 39: Synthesis of Procatalyst 28

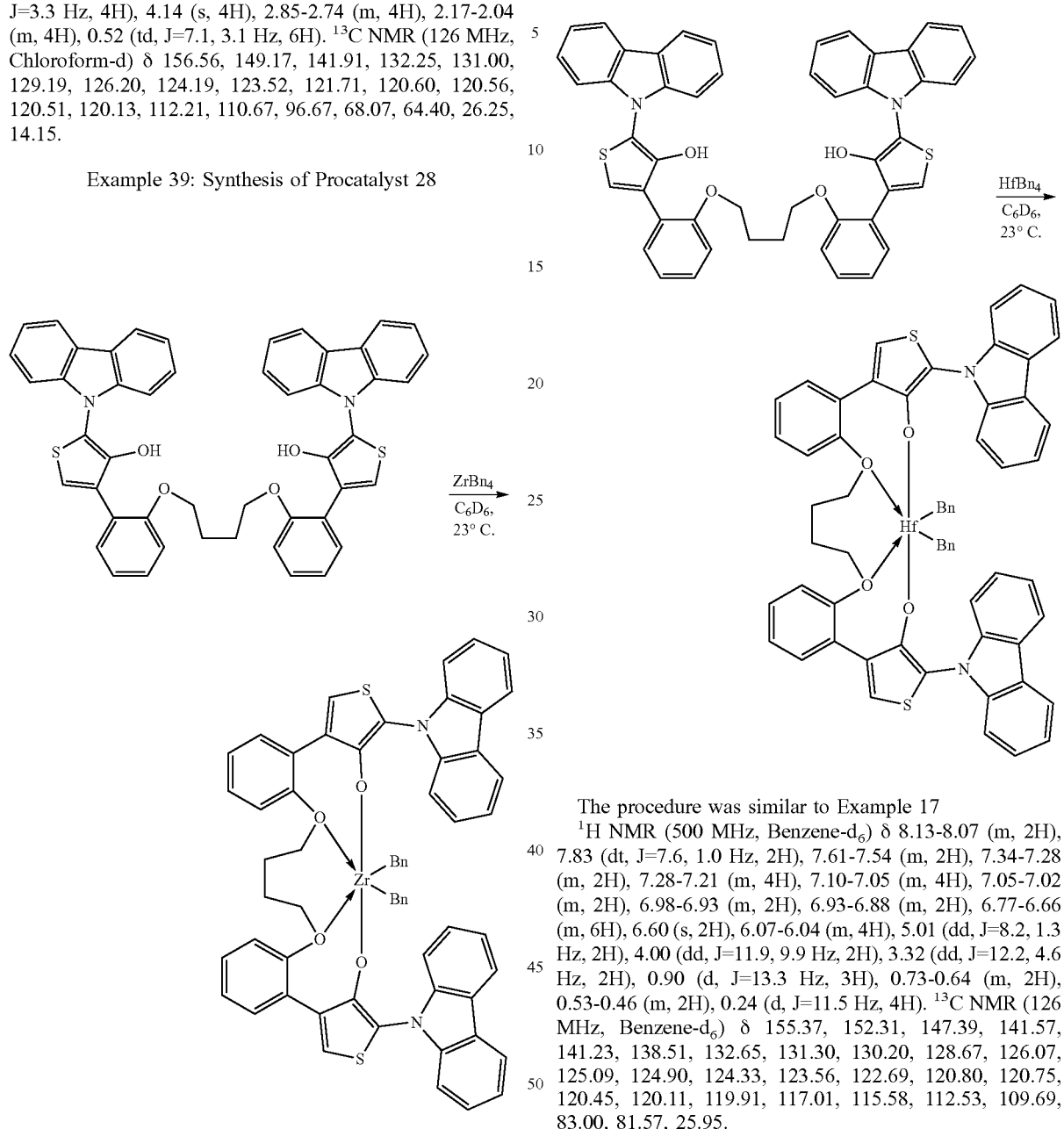

The procedure was similar to Example 16

$^{1}$H NMR (500 MHz, Benzene-d$_6$) δ 8.11-8.03 (m, 2H), 7.82 (dt, J=7.8, 1.0 Hz, 2H), 7.63-7.57 (m, 2H), 7.33-7.30 (m, 4H), 7.30-7.23 (m, 6H), 7.10-7.06 (m, 4H), 7.04 (ddd, J=7.9, 5.2, 2.8 Hz, 2H), 6.91-6.87 (m, 4H), 6.76-6.66 (m, 6H), 6.61 (s, 2H), 6.02-5.96 (m, 4H), 5.05 (dd, J=8.2, 1.3 Hz, 2H), 4.04-3.95 (m, 2H), 3.29 (dd, J=12.2, 4.5 Hz, 2H), 0.97 (d, J=12.0 Hz, 2H), 0.74 (dd, J=17.9, 8.8 Hz, 2H), 0.65-0.56 (m, 2H), 0.51 (d, J=12.1 Hz, 2H). $^{13}$C NMR (126 MHz, Benzene-d$_6$) δ 155.56, 152.34, 146.27, 141.69, 141.30, 133.02, 131.26, 130.55, 130.13, 128.57, 128.32, 127.12, 126.66, 125.78, 125.18, 124.83, 123.10, 122.79, 120.90, 120.71, 120.51, 120.10, 119.99, 117.18, 115.08, 112.42, 109.69, 80.40, 73.80, 25.72.

Example 40: Synthesis of Procatalyst 29

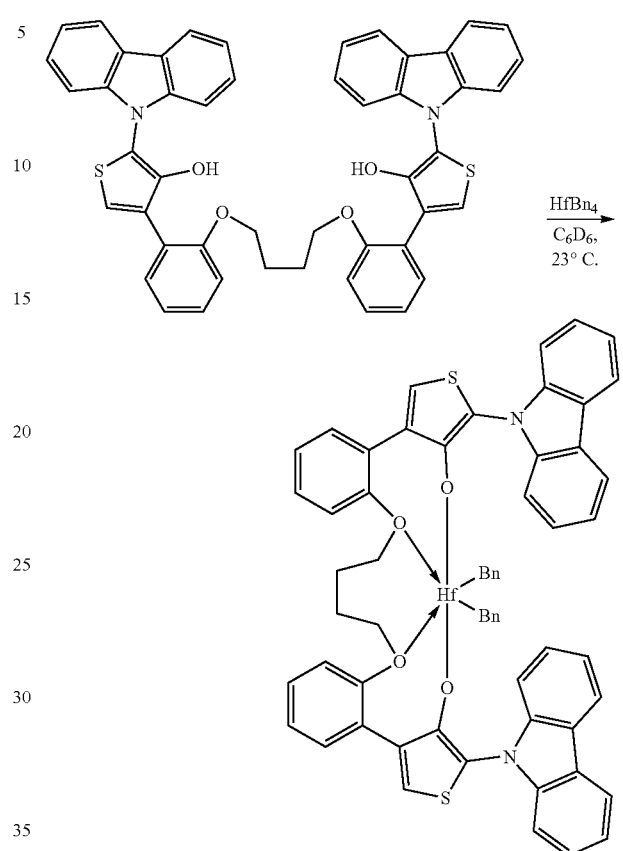

The procedure was similar to Example 17

$^{1}$H NMR (500 MHz, Benzene-d$_6$) δ 8.13-8.07 (m, 2H), 7.83 (dt, J=7.6, 1.0 Hz, 2H), 7.61-7.54 (m, 2H), 7.34-7.28 (m, 2H), 7.28-7.21 (m, 4H), 7.10-7.05 (m, 4H), 7.05-7.02 (m, 2H), 6.98-6.93 (m, 2H), 6.93-6.88 (m, 2H), 6.77-6.66 (m, 6H), 6.60 (s, 2H), 6.07-6.04 (m, 4H), 5.01 (dd, J=8.2, 1.3 Hz, 2H), 4.00 (dd, J=11.9, 9.9 Hz, 2H), 3.32 (dd, J=12.2, 4.6 Hz, 2H), 0.90 (d, J=13.3 Hz, 3H), 0.73-0.64 (m, 2H), 0.53-0.46 (m, 2H), 0.24 (d, J=11.5 Hz, 4H). $^{13}$C NMR (126 MHz, Benzene-d$_6$) δ 155.37, 152.31, 147.39, 141.57, 141.23, 138.51, 132.65, 131.30, 130.20, 128.67, 126.07, 125.09, 124.90, 124.33, 123.56, 122.69, 120.80, 120.75, 120.45, 120.11, 119.91, 117.01, 115.58, 112.53, 109.69, 83.00, 81.57, 25.95.

Example 41: Synthesis of Procatalyst 30

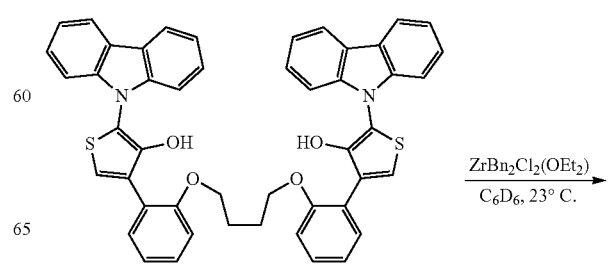

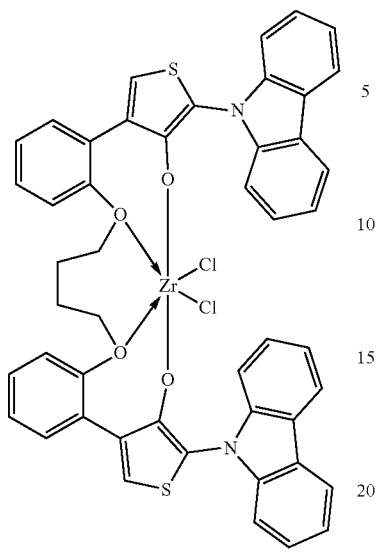

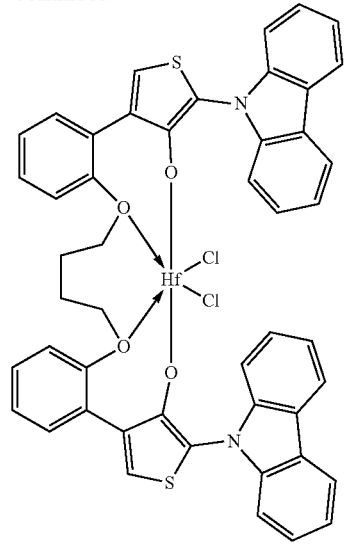

The thiophene ligand was azeotropically dried using PhMe (4×10 mL) prior to use. To a white suspension of the thiophene, L-13, (4.7 mg, 0.00611 mmol, 1.00 eq) in C$_6$D6 (1.10 mL) in a nitrogen filled glovebox at 23° C. was added a solution of ZrBn$_2$Cl$_2$(OEt$_2$) (2.6 mg, 0.00822 mmol, 1.00 eq) in C$_6$D$_6$(0.11 mL) in a dropwise manner. After stirring (500 rpm) for 1 hr the golden yellow solution was filtered using a 0.20 m PTFE submicron filter to afford the zirconium complex as a 0.005 M solution in C$_6$D6. NMR indicated product of ~95% purity which contains Et$_2$O (1.00 eq). The same procedure can be used with PhMe to prepare the procatalyst solution which is used directly after filtration for the polymerization experiments.

$^1$H NMR (500 MHz, Benzene-d$_6$) δ 8.15-8.08 (m, 2H), 8.00 (ddd, J=7.6, 1.3, 0.7 Hz, 2H), 7.49-7.43 (m, 2H), 7.28 (dt, J=8.2, 1.0 Hz, 2H), 7.23-7.20 (m, 4H), 7.20-7.17 (m, 2H), 7.14 (dd, J=7.6, 1.1 Hz, 2H), 6.95-6.91 (m, 2H), 6.69-6.60 (m, 4H), 6.58 (s, 2H), 5.34 (dd, J=7.9, 1.6 Hz, 2H), 4.26 (q, J=11.5, 11.0 Hz, 2H), 3.28-3.24 (m, 2H), 0.78-0.69 (m, 2H), 0.63-0.55 (m, 2H). $^{13}$C NMR (126 MHz, Benzene-d$_6$) δ 156.58, 151.50, 141.52, 141.42, 132.52, 130.50, 130.19, 126.64, 125.04, 124.92, 123.97, 122.48, 121.04, 120.34, 120.33, 119.55, 117.21, 116.18, 112.36, 109.58, 83.54, 26.76.

The thiophene ligand, L-13, was azeotropically dried using PhMe (4×10 mL) prior to use. To a white suspension of the thiophene (5.2 mg, 0.00676 mmol, 1.00 eq) in C$_6$D$_6$ (1.23 mL) in a nitrogen filled glovebox at 23° C. was added a solution of HfBn$_2$Cl$_2$(OEt$_2$) (3.4 mg, 0.00676 mmol, 1.00 eq) in C$_6$D$_6$(0.12 mL) in a dropwise manner. After stirring (500 rpm) for 1 hr the pale golden yellow solution was filtered using a 0.20 m PTFE submicron filter to afford the hafnium complex as a 0.005 M solution in C$_6$D6. NMR indicated product of ~93% purity which contains Et$_2$O (1.00 eq). The same procedure can be used with PhMe to prepare the procatalyst solution which is used directly after filtration for the polymerization experiments.

$^1$H NMR (400 MHz, Benzene-d$_6$) δ 8.13-8.05 (m, 2H), 7.98 (ddd, J=7.4, 1.5, 0.7 Hz, 2H), 7.46-7.41 (m, 2H), 7.26 (dt, J=8.3, 0.9 Hz, 2H), 7.23-7.17 (m, 4H), 7.17-7.11 (m, 4H), 6.93-6.89 (m, 2H), 6.67-6.59 (m, 4H), 6.58 (s, 2H), 5.36-5.30 (m, 2H), 4.36 (t, J=10.9 Hz, 2H), 3.30 (d, J=12.7 Hz, 2H), 0.72 (t, J=9.7 Hz, 2H), 0.52 (d, J=12.2 Hz, 2H). $^{13}$C NMR (101 MHz, Benzene-d$_6$) δ 156.46, 151.77, 142.29, 141.54, 141.46, 132.30, 130.50, 130.09, 126.68, 126.00, 124.99, 124.88, 124.07, 122.45, 120.98, 120.35, 120.31, 120.27, 120.24, 119.51, 117.14, 116.57, 112.41, 110.46, 109.56, 84.24, 26.86.

Example 43: Synthesis of Precursor to Ligand 14

Example 42: Synthesis of Procatalyst 31

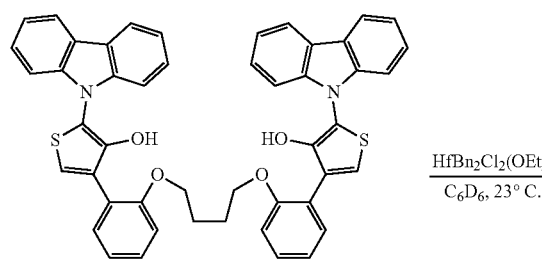

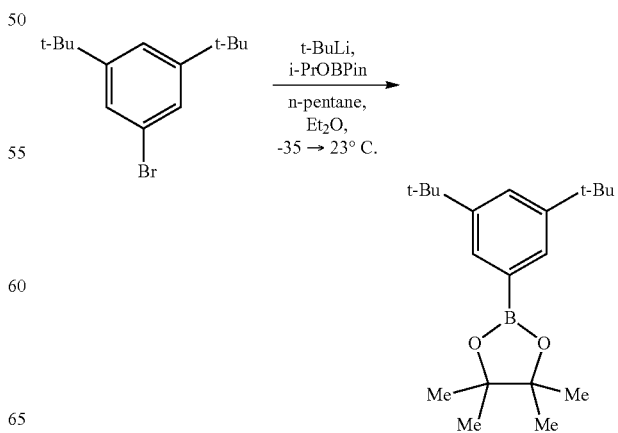

A clear colorless solution of t-BuLi (6.60 mL, 11.143 mmol, 3.00 eq, non-titrated 1.70 M in pentane) in anhydrous pentane (30 mL) in a nitrogen filled glovebox was placed in the freezer (−35° C.) for 14 hrs upon which the solid 3,5-di-tert-butylphenyl bromide (1.000 g, 3.714 mmol, 1.00 eq) was added followed by the dropwise addition of pre-cooled anhydrous deoxygenated Et$_2$O (5 mL). The now clear pale yellow heterogeneous mixture was allowed to sit in the freezer for 3 hrs upon which the mixture was removed from the freezer and neat i-PrOBPin (1.50 mL, 7.428 mmol, 2.00 eq) was added via syringe in a quick dropwise manner. The pale yellow mixture was stirred (500 rpm) at 23° C. for 2 hrs, removed from the glovebox, neutralized with an aqueous phosphate buffer (50 mL, pH=8, 0.05 M), the white heterogeneous mixture was suction filtered over a pad of celite, rinsed with CH$_2$Cl$_2$ (4×20 mL), the pale yellow biphasic mixture was poured into a separatory funnel, partitioned, organics were washed with an aqueous phosphate buffer (2×25 mL, pH=8, 0.05 M), residual organics were extracted from the aqueous layer using CH$_2$Cl$_2$ (2×25 mL), combined, dried over solid Na$_2$SO$_4$, decanted, concentrated to afford a pale yellow amorphous viscous oil which was dissolved in CH$_2$Cl$_2$ (10 mL), suction filtered over a pad of silica gel, rinsed with CH$_2$Cl$_2$ (4×20 mL), and the pale yellow filtrate solution was concentrated to afford the 3,5-di-tert-butylphenyl boropinacolate ester as a white foam (1.021 g, 3.229 mmol, 87%). NMR indicated product with trace impurities.

$^1$H NMR (500 MHz, Chloroform-d) δ 7.71 (d, J=2.0 Hz, 2H), 7.58 (t, J=2.0 Hz, 1H), 1.38 (s, 18H), 1.38 (s, 12H). $^{13}$C NMR (126 MHz, Chloroform-d) δ 149.81, 128.79, 125.55, 83.53, 34.82, 31.53, 24.89.

Example 44: Synthesis of Ligand 14—Fourth and Fifth Steps in FIG. 3

To vial equipped with a stirbar was added the dibromide (0.200 g, 0.2807 mmol, 1.00 eq), K$_3$PO$_4$ (0.715 g, 3.369 mmol, 12.0 eq), Pd(AmPhos)Cl$_2$ (40.0 mg, 0.0561 mmol, 0.20 eq), and the 3,5-di-tert-butylphenylboropinacolate (0.355 g, 1.123 mmol, 4.00 eq). The mixture was evacuated, then back-filled with nitrogen, this process was repeated 3× more, then deoxygenated 1,4-dioxane (6.0 mL) and water (0.6 mL) were added sequentially via syringe. The vial was sealed with a PTFE cap under a purging flow of nitrogen, and then placed in a mantle heated to 50° C. After stirring (1000 rpm) for 36 hrs the purple-black mixture was removed from the mantle, allowed to cool gradually to 23° C., suction filtered over a pad of silica gel, washed with CH$_2$Cl$_2$ (4×20 mL), the clear purple filtrate was concentrated onto celite, and purified via silica gel chromatography using an ISCO chromatography purification system; 25%-100% CH$_2$Cl$_2$ in hexanes to afford the bisprotected coupled 3,5-di-tert-butylphenylthiophene as a white foam (0.223 g, 0.2394 mmol, 85%). NMR indicated pure product.

To a solution of the protected bisthiophene in CH$_2$Cl$_2$ (5 mL) and 1,4-dioxane (5 mL) was added conc. HCl (5 mL). The dark golden brown solution was vigorously stirred (1000 rpm) at 23° C. for 24 hrs under nitrogen, then diluted with aqueous HCl (25 mL, 1 N) and CH$_2$Cl$_2$ (20 mL), the biphasic mixture was poured into a separatory funnel, partitioned, organics were washed with aqueous HCl (2×20 mL, 1 N), the residual organics were extracted from the aqueous layer using CH$_2$Cl$_2$ (2×10 mL), combined, dried over solid Na$_2$SO$_4$, decanted, concentrated onto celite, and purified via silica gel chromatography using an ISCO chromatography purification system; 25%-100% CH$_2$Cl$_2$ in hexanes to afford the bishydroxythiophene ligand as a white amorphous foam (98.5 mg, 0.1208 mmol, 51%, 43% two steps). NMR indicated pure product.

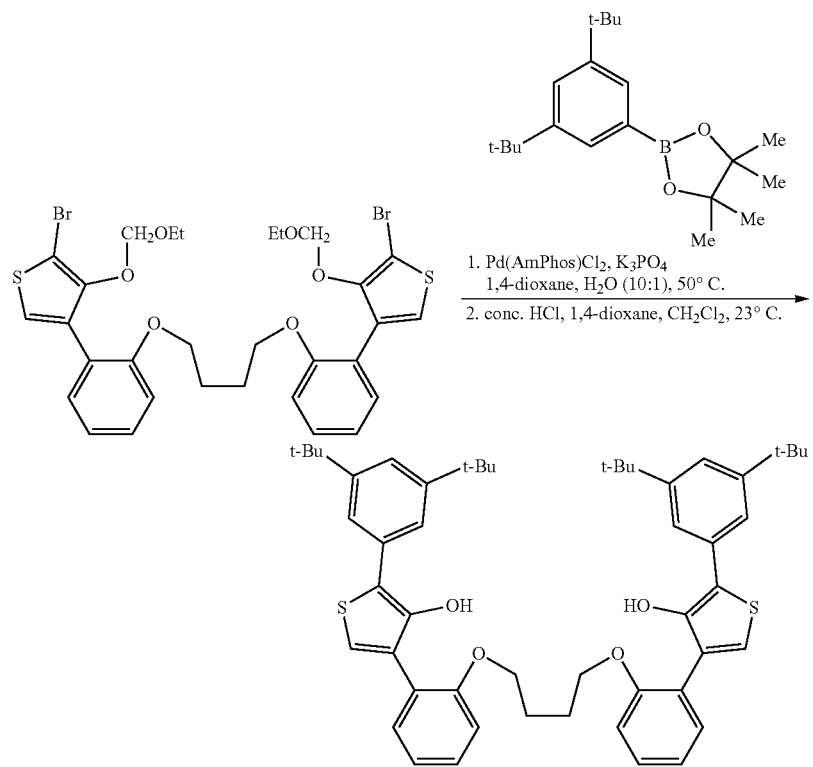

¹H NMR (500 MHz, Chloroform-d) δ 7.68 (d, J=1.7 Hz, 4H), 7.43 (dd, J=7.6, 1.7 Hz, 2H), 7.34 (t, J=1.8 Hz, 2H), 7.28 (ddd, J=8.2, 7.4, 1.7 Hz, 2H), 7.10-7.06 (m, 2H), 7.06 (s, 2H), 6.96 (s, 2H), 6.89 (dd, J=8.3, 1.2 Hz, 2H), 4.07-4.03 (m, 4H), 1.93-1.87 (m, 4H), 1.37 (s, 36H). ¹³C NMR (126 MHz, Chloroform-d) δ 154.10, 150.76, 147.57, 132.94, 132.75, 131.67, 129.30, 125.03, 122.75, 121.50, 120.75, 120.66, 119.41, 114.00, 69.64, 34.92, 31.48, 25.75.

Characterization of the Protected Ligand:

¹H NMR (500 MHz, Chloroform-d) δ 7.61 (d, J=1.8 Hz, 4H), 7.53 (dd, J=7.5, 1.8 Hz, 2H), 7.38 (t, J=1.8 Hz, 2H), 7.30-7.24 (m, 2H), 7.22 (s, 2H), 7.01 (td, J=7.4, 1.1 Hz, 2H), 6.94 (dd, J=8.3, 1.1 Hz, 2H), 4.66 (s, 4H), 4.05 (d, J=5.2 Hz, 4H), 3.16 (q, J=7.0 Hz, 4H), 1.99 (q, J=2.9 Hz, 4H), 1.39 (s, 36H), 0.72 (t, J=7.1 Hz, 6H). ¹³C NMR (126 MHz, Chloroform-d) δ 156.47, 150.82, 148.54, 133.49, 132.53, 131.07, 128.90, 128.73, 124.67, 122.47, 121.15, 120.86, 120.46, 112.51, 109.65, 97.06, 67.90, 64.69, 34.93, 31.50, 25.88, 14.55.

Example 45: Synthesis of Procatalyst 32

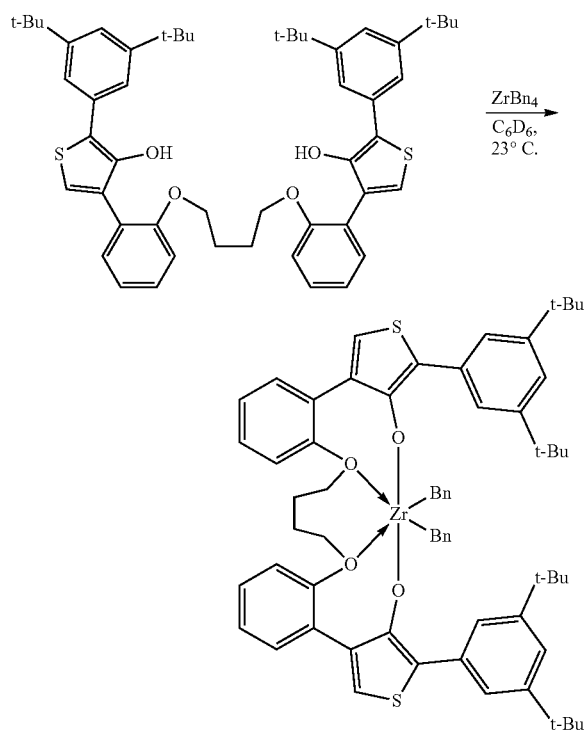

The procedure was similar to Example 16

¹H NMR (500 MHz, Benzene-d₆) δ 7.78 (d, J=1.8 Hz, 4H), 7.56 (t, J=1.8 Hz, 2H), 7.20-7.17 (m, 2H), 7.12-7.11 (m, 2H), 6.99-6.95 (m, 2H), 6.90-6.82 (m, 4H), 6.76 (tt, J=7.4, 1.2 Hz, 2H), 6.69 (s, 2H), 6.63-6.58 (m, 4H), 5.92-5.87 (m, 2H), 4.17 (dd, J=11.9, 10.1 Hz, 2H), 3.51 (dd, J=11.8, 4.8 Hz, 2H), 1.33 (s, 36H), 1.32 (s, 4H), 0.77 (t, J=9.4 Hz, 2H), 0.46 (d, J=12.1 Hz, 2H). ¹³C NMR (126 MHz, Benzene-d₆) δ 155.93, 153.46, 151.24, 147.65, 134.39, 133.79, 131.53, 130.07, 128.15, 126.24, 123.51, 123.41, 121.75, 121.03, 120.83, 119.16, 80.99, 76.61, 34.72, 31.31, 26.86.

Example 46: Synthesis of Procatalyst 33

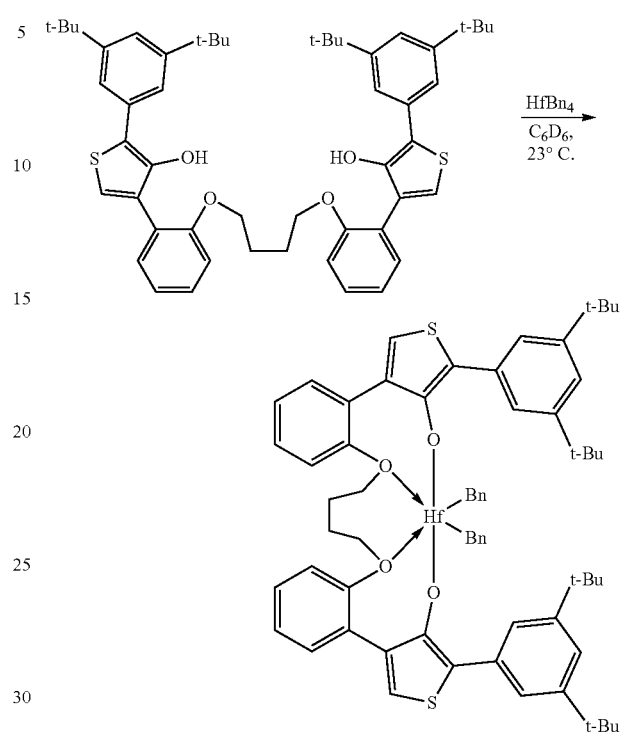

The procedure was similar to Example 17

¹H NMR (500 MHz, Benzene-d₆) δ 7.75 (d, J=1.9 Hz, 4H), 7.56 (t, J=1.8 Hz, 2H), 7.20-7.15 (m, 2H), 7.12 (td, J=1.7, 1.3, 0.7 Hz, 4H), 6.92-6.83 (m, 4H), 6.74 (tt, J=7.3, 1.3 Hz, 2H), 6.69 (s, 2H), 6.62-6.57 (m, 4H), 5.92 (dd, J=8.0, 1.4 Hz, 2H), 4.30-4.23 (m, 2H), 3.58 (dd, J=12.5, 4.9 Hz, 2H), 2.42 (d, J=12.7 Hz, 2H), 1.45 (d, J=12.8 Hz, 3H), 1.33 (s, 40H), 0.78 (t, J=9.6 Hz, 2H), 0.41 (d, J=11.4 Hz, 2H). ¹³C NMR (126 MHz, Benzene-d₆) δ 155.90, 153.51, 151.23, 147.91, 134.12, 133.72, 131.54, 130.05, 128.91, 126.83, 126.35, 123.60, 123.55, 121.72, 121.25, 121.21, 119.10, 81.77, 80.32, 34.71, 31.32, 27.04.

Example 47: Synthesis of a Precursor to a Reactant in Step 2 of FIG. 2

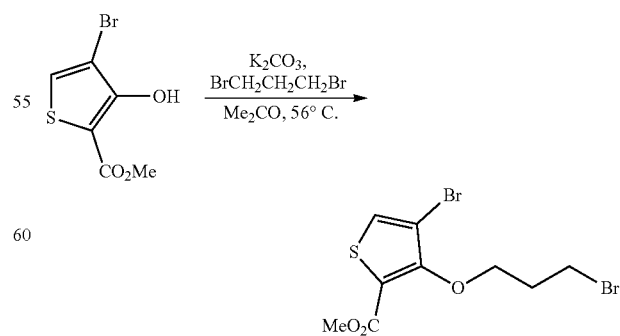

A pale purple heterogeneous mixture of the hydroxyl-thiophene (1.000 g, 4.218 mmol, 2.00 eq), K₂CO₃ (1.749 g, 12.654 mmol, 6.00 eq), and 1,3-dibromopropane (0.37 mL, 2.109 mmol, 1.00 eq) in acetone (40 mL) equipped with a reflux condenser under nitrogen was placed in a mantle heated to 60° C. After stirring (500 rpm) for 16 hrs TLC of the mixture indicated full consumption of the starting hydroxylthiophene, the heterogeneous mixture was removed from the heating mantle, allowed to cool gradually to 23° C., diluted with $CH_2Cl_2$ (50 mL), stirred vigorously (1000 rpm) for 2 mins, suction filtered through a pad of celite, the golden yellow filtrate was concentrated onto celite, and purified via silica gel chromatography using an ISCO chromatography purification system; 25-75% $CH_2Cl_2$ in hexanes to afford the monoalkylated ether mono bromide as a pale yellow amorphous foam (0.410 g, 1.142 mmol, 54%). NMR indicated pure product.

$^1$H NMR (500 MHz, Chloroform-d) δ 7.39 (s, 1H), 4.31 (t, J=5.7 Hz, 2H), 3.88 (s, 3H), 3.71 (t, J=6.6 Hz, 2H), 2.36 (p, J=6.2 Hz, 2H). $^{13}$C NMR (126 MHz, Chloroform-d) δ 160.67, 157.38, 127.15, 117.04, 108.56, 72.85, 52.20, 33.34, 30.02.

Example 48: Synthesis of the Reactant in Step 2 of FIG. 2—Precursor for Ligand 8

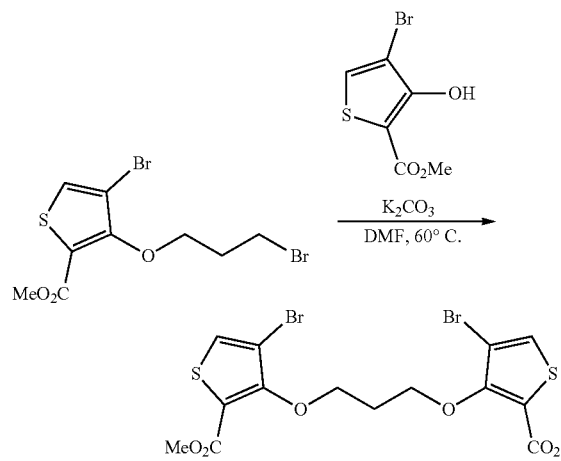

A heterogeneous mixture of the monoalkylated ether mono bromide (0.410 g, 1.142 mmol, 1.00 eq, product of Example 61), $K_2CO_3$ (0.474 g, 3.426 mmol, 3.00 eq), and the hydroxy-thiophene (0.271 g, 1.142 mmol, 1.00 eq) in N,N-dimethylformamide (10 mL) was placed in mantle heated to 60° C., stirred vigorously (1000 rpm) for 48 hrs, removed from the mantle, allowed to cool gradually to 23° C., diluted with water (25 mL) and then hexanes/EtOAc (20 mL, 1:1), poured into a separatory funnel, partitioned, organics were washed with water (5×20 mL), residual organics were extracted from the aqueous using hexanes/EtOAc (2×25 mL, 1:1), combined, dried over solid $Na_2SO_4$, decanted, and concentrated to afford the bisthiophene as a pale orange oil (0.562 g, 1.093 mmol, 96%). NMR indicated pure product.

$^1$H NMR (400 MHz, Chloroform-d) δ 7.35 (s, 2H), 4.45 (t, J=6.2 Hz, 4H), 3.84 (s, 6H), 2.31 (p, J=6.2 Hz, 2H). $^{13}$C NMR (101 MHz, Chloroform-d) δ 160.70, 157.75, 127.01, 116.59, 108.63, 72.48, 52.12, 30.90. HRMS (ESI): calc'd [M+Na]$^+$ as 534.8491; found 534.8456.

Example 49: Synthesis of the Reactant in Step 2 of FIG. 2—Precursor for Ligand 8

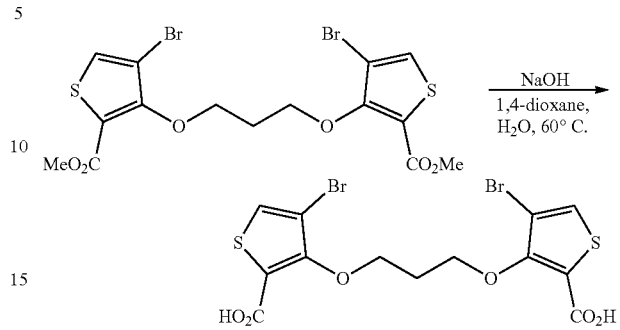

A mixture of the bisester (0.562 g, 1.093 mmol, 1.00 eq, product of Example 62) and NaOH (0.874 g, 21.859 mmol, 20.0 eq) in 1,4-dioxane and water (20 mL, 1:1) under nitrogen was placed in a mantle heated to 60° C. After stirring (500 rpm) for 12 hrs TLC indicated complete consumption of the starting ester. The pale yellow heterogeneous mixture was removed from the mantle, allowed to cool to 23° C., neutralized slowly with aqueous HCl (1 N) to pH=1, the white heterogeneous mixture was diluted with EtOAc (25 mL), the biphasic mixture was poured into a separatory funnel, partitioned, organics were washed with aqueous HCl (2×25 mL, 1 N), residual organics were extracted with EtOAc (2×20 mL), combined, dried over solid $Na_2SO_4$, decanted, and concentrated to afford the bisacid as an off-white solid (0.496 g, 1.020 mmol, 93%). NMR indicated product with minor impurities which was used in the subsequent reaction without further purification.

$^1$H NMR (500 MHz, Acetone-d$_6$) δ 10.98 (br s, 2H), 7.81 (s, 2H), 4.50 (t, J=6.3 Hz, 4H), 2.30 (p, J=6.2 Hz, 2H). $^{13}$C NMR (126 MHz, Acetone-d$_6$) δ 160.43, 157.46, 127.74, 117.10, 108.01, 72.44, 30.80.

Example 50: Synthesis of the Reactant in Step 2 of FIG. 2—Precursor for Ligand 8

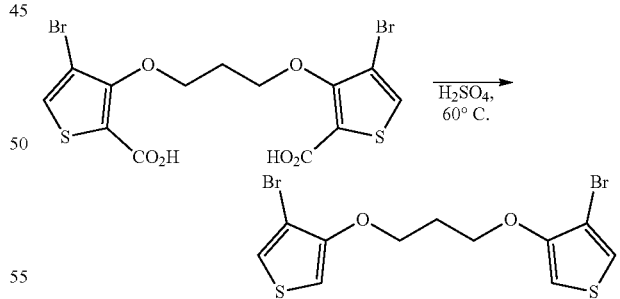

To the solid crude bis-thiophene carboxylic acid (0.496 g, 1.020 mmol, 1.00 eq, product of Example 49) was added concentrated $H_2SO_4$ (10 mL). The black solution was placed in a mantle heated to 60° C. and stirred (500 rpm) under nitrogen for 4 hrs, removed from the mantle, allowed to cool to 23° C., placed in an ice water bath for 30 mins, carefully neutralized with an ice cold aqueous phosphate buffer (pH=8, 100 mL, 0.05 M), diluted with $CH_2Cl_2$ (20 mL), the biphasic mixture was suction filtered over a pad celite, rinsed with $CH_2Cl_2$ (4×20 mL), the black biphasic filtrate solution was poured into a separatory funnel, partitioned, organics were washed with an aqueous phosphate buffer (2×50 mL, pH=8, 0.05 M), residual organics were extracted from the aqueous mixture using CH$_2$Cl$_2$ (2×20 mL), combined, dried over solid Na$_2$SO$_4$, decanted, concentrated onto celite, and purified via silica gel chromatography using an ISCO chromatography purification system; 10% CH$_2$Cl$_2$—50% CH$_2$Cl$_2$ in hexanes to afford the bisthiophene bromide as a pale brown oil (0.126 g, 0.3165 mmol, 31%). NMR indicated product with minor impurities.

$^1$H NMR (400 MHz, Chloroform-d) δ 7.17 (dd, J=3.5, 0.4 Hz, 2H), 6.28 (d, J=3.5 Hz, 2H), 4.20 (t, J=6.0 Hz, 5H), 2.32 (p, J=6.0 Hz, 2H).

Example 51: Synthesis of Ligand 8—Steps 2 and 3 in FIG. 3

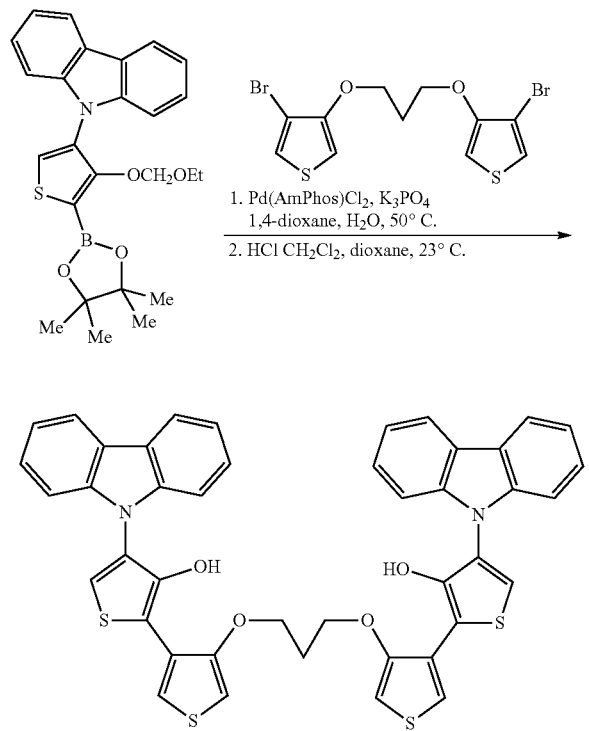

The procedure was similar to the procedure in Example 10. The two-step reaction provided a 24% yield of a white foam.

$^1$H NMR (500 MHz, Chloroform-d) δ 8.16-8.09 (m, 4H), 7.47-7.43 (m, 2H), 7.43-7.36 (m, 6H), 7.36-7.26 (m, 8H), 7.00 (s, 2H), 6.33 (d, J=3.4 Hz, 2H), 4.31 (t, J=6.0 Hz, 4H), 2.34 (p, J=5.9 Hz, 2H).

Characterization of the Protected Ligand:

$^1$H NMR (500 MHz, Chloroform-d) δ 8.13 (dt, J=7.9, 1.0 Hz, 4H), 7.89 (d, J=3.4 Hz, 2H), 7.47-7.39 (m, 8H), 7.34 (s, 2H), 7.30 (ddd, J=8.0, 6.5, 1.7 Hz, 4H), 6.31 (d, J=3.4 Hz, 2H), 4.46 (t, J=5.8 Hz, 4H), 4.43 (s, 4H), 2.80 (q, J=7.1 Hz, 4H), 2.53 (p, J=5.5 Hz, 2H), 0.54 (t, J=7.1 Hz, 6H). $^{13}$C NMR (126 MHz, Chloroform-d) δ 154.36, 147.06, 140.90, 129.07, 126.03, 123.59, 123.17, 122.23, 121.48, 120.12, 120.05, 118.58, 110.40, 97.21, 96.79, 67.09, 65.03, 29.36, 14.21.

Example 52: Synthesis of the Reactant in Step 2 of FIG. 2—Precursor for Ligand

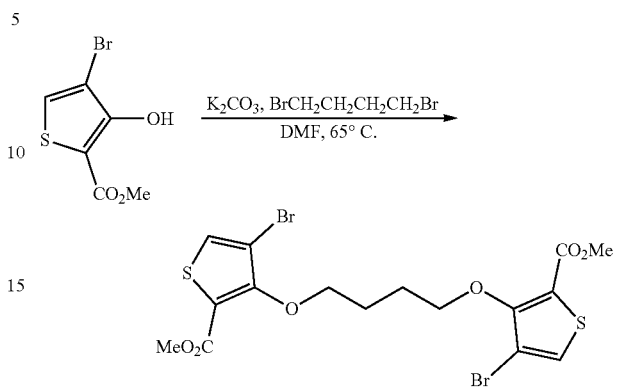

A heterogeneous mixture of the 1,4-dibromobutane (0.51 mL, 4.218 mmol, 1.00 eq), K$_2$CO$_3$ (3.498 g, 25.309 mmol, 6.00 eq), and the hydroxy-thiophene (2.000 g, 8.436 mmol, 2.00 eq) in N,N-dimethylformamide (40 mL) was placed in mantle heated to 65° C., stirred vigorously (1000 rpm) for 48 hrs, removed from the mantle, allowed to cool gradually to 23° C., diluted with water (25 mL) and then hexanes/EtOAc (20 mL, 1:1), poured into a separatory funnel, partitioned, organics were washed with water (5×20 mL), residual organics were extracted from the aqueous using hexanes/EtOAc (2×25 mL, 1:1), combined, dried over solid Na$_2$SO$_4$, decanted, concentrated onto celite, and purified via silica gel chromatography using an ISCO chromatography purification system; 25-100% CH$_2$Cl$_2$ in hexanes to afford the bisthiophene as a white solid (1.609 g, 3.046 mmol, 72%). NMR indicated pure product.

$^1$H NMR (400 MHz, Chloroform-d) δ 7.35 (s, 2H), 4.31-4.15 (m, 4H), 3.83 (s, 6H), 2.07 (h, J=3.0 Hz, 4H). $^{13}$C NMR (101 MHz, Chloroform-d) δ 160.71, 157.87, 127.03, 116.87, 108.79, 75.18, 52.10, 26.62.

Example 53: Synthesis of the Reactant in Step 2 of FIG. 2—Precursor for Ligand 9

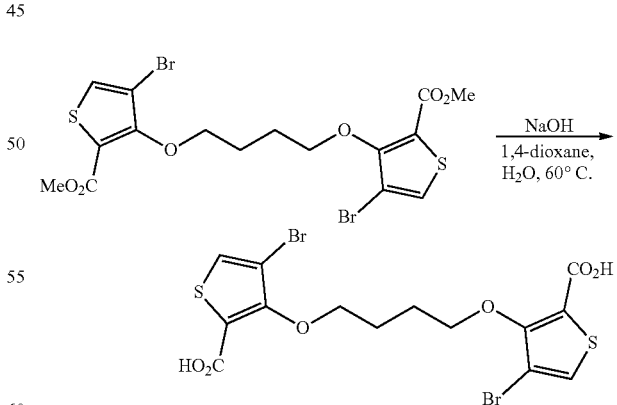

To a mixture of the ester (1.607 g, 3.042 mmol, 1.00 eq) in 1,4-dioxane/H$_2$O (30 mL, 1:1) was added solid NaOH (2.432 g, 60.845 mmol, 20.00 eq). The heterogeneous mixture was equipped with a reflux condenser under nitrogen, placed in a mantle heated to 60° C., stirred (500 rpm) for 4 hrs upon which TLC indicated complete consumption of starting material, the resultant pale yellow solution was removed from the heating mantle, allowed to cool gradually to 23° C., placed in an ice water bath for 20 mins, acidified to pH=1 using aqueous HCl (1 N), the resultant white heterogeneous mixture was diluted with Et₂O (100 mL), stirred for 2 mins, the now biphasic mixture was poured into a separatory funnel, partitioned, organics were washed with aqueous HCl (2×25 mL, 1 N), residual organics were extracted from the aqueous layer using Et₂O (2×25 mL), combined, dried over solid Na₂SO₄, decanted, and concentrated to afford the bisacid as a white solid (1.511 g, 3.020 mmol, 99%). NMR indicated pure product.

$^1$H NMR (500 MHz, Acetone-$d_6$) δ 11.21 (br s, 1H), 7.81 (d, J=1.7 Hz, 2H), 4.32 (dt, J=5.5, 3.3 Hz, 4H), 2.06 (ddt, J=8.7, 4.4, 2.5 Hz, 4H). $^{13}$C NMR (126 MHz, Acetone-$d_6$) δ 160.46, 157.57, 127.70, 117.38, 108.17, 74.90, 26.47.

Example 54: Synthesis of the Reactant in Step 2 of FIG. 2—Precursor for Ligand

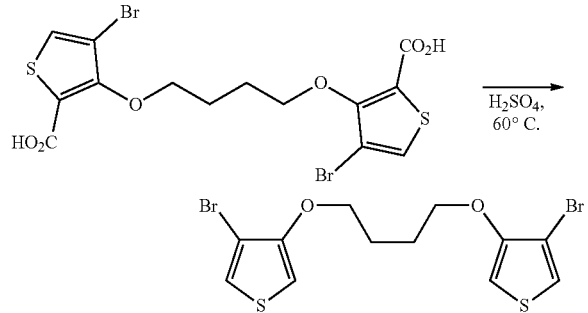

The procedure was similar to the procedure in Example 50. The reaction provided a 19% yield of a white solid.

$^1$H NMR (500 MHz, Chloroform-d) δ 7.18 (d, J=3.5 Hz, 2H), 6.24 (d, J=3.5 Hz, 2H), 4.11-4.07 (m, 4H), 2.05 (td, J=5.2, 4.5, 2.3 Hz, 4H). $^{13}$C NMR (126 MHz, Chloroform-d) δ 153.60, 121.97, 103.31, 97.34, 70.36, 25.79.

Example 55: Synthesis of Ligand 9—Steps 2 and 3 of FIG. 2

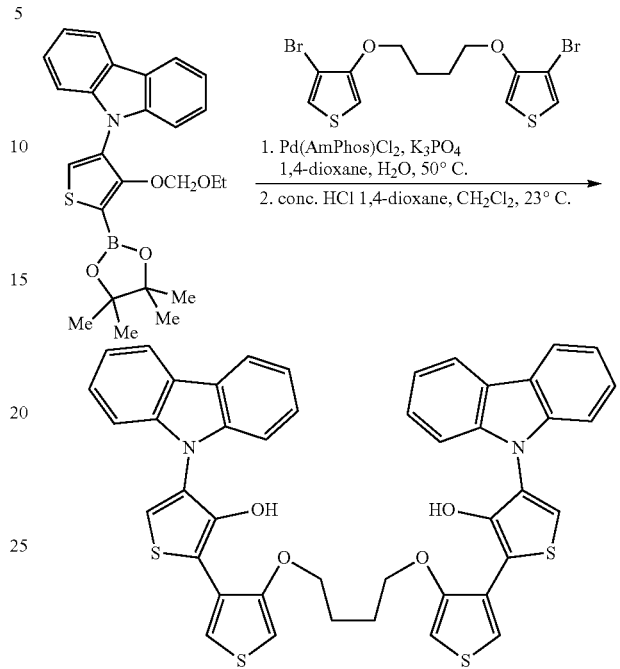

The procedure was similar to the procedure in Example 10. The two-step reaction provided a 6% yield of a white foam.

$^1$H NMR (500 MHz, Chloroform-d) δ 8.09 (ddd, J=7.7, 1.2, 0.7 Hz, 4H), 7.41 (d, J=3.3 Hz, 2H), 7.38 (ddd, J=8.2, 7.0, 1.2 Hz, 4H), 7.32 (dt, J=8.1, 0.9 Hz, 4H), 7.28 (s, 2H), 7.25-7.23 (m, 4H), 7.20 (s, 2H), 6.31 (d, J=3.4 Hz, 2H), 4.17-4.08 (m, 4H), 2.00 (q, J=5.4, 3.9 Hz, 4H). $^{13}$C NMR (126 MHz, Chloroform-d) δ 152.60, 145.45, 141.00, 126.58, 125.92, 125.15, 123.27, 120.46, 120.23, 120.01, 119.27, 111.74, 110.22, 99.36, 70.90, 25.78.

Example 56: Synthesis of Ligand 15

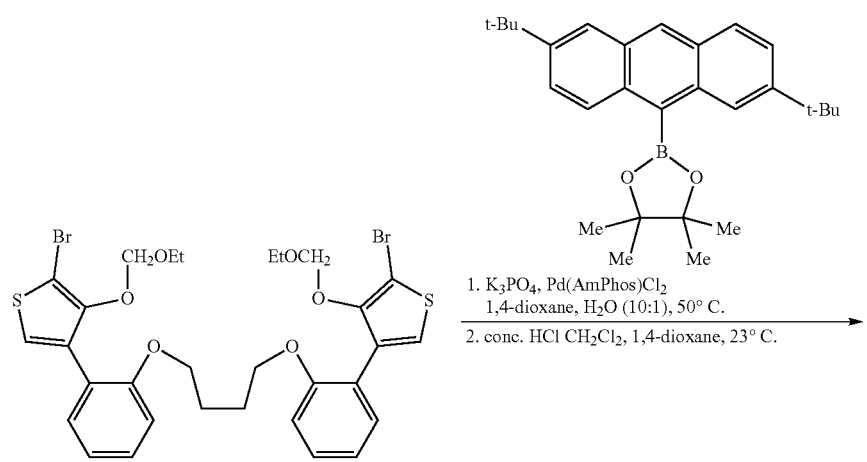

-continued

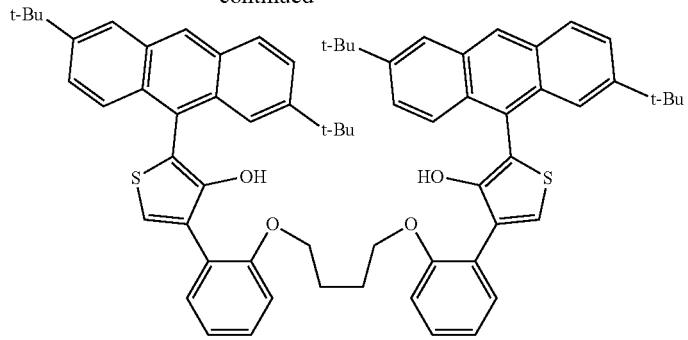

The procedure was similar to Example 44. The two-step reaction provided a 32% yield of a white foam.

$^1$H NMR (500 MHz, Chloroform-d) δ 8.45 (s, 2H), 7.98 (d, J=8.9 Hz, 2H), 7.95-7.90 (m, 4H), 7.90-7.87 (m, 2H), 7.65-7.53 (m, 4H), 7.49 (ddd, J=9.2, 7.1, 2.0 Hz, 2H), 7.44 (d, J=3.6 Hz, 2H), 7.30-7.23 (m, 2H), 7.12 (t, J=7.5 Hz, 2H), 6.76 (d, J=8.2 Hz, 2H), 6.47 (d, J=6.4 Hz, 2H), 3.97-3.86 (m, 4H), 1.90-1.80 (m, 4H), 1.42 (s, 9H), 1.41 (s, 9H), 1.33 (s, 18H). $^{13}$C NMR (126 MHz, Chloroform-d) δ 154.35, 149.39, 147.73, 147.04, 131.88, 131.50, 131.35, 130.92, 130.67, 130.33, 129.08, 128.05, 127.32, 126.21, 125.47, 125.29, 124.90, 124.56, 122.81, 122.42, 122.41, 122.39, 120.76, 114.67, 114.65, 113.57, 113.53, 69.12, 69.08, 35.06, 30.97, 30.95, 30.91, 25.87, 25.83.

Characterization of the Protected Coupled Product:

$^1$H NMR (500 MHz, Chloroform-d) δ 8.44 (s, 2H), 8.04-7.96 (m, 4H), 7.97-7.88 (m, 4H), 7.64 (dd, J=7.6, 1.8 Hz, 2H), 7.59 (s, 2H), 7.57 (ddd, J=8.9, 6.4, 2.1 Hz, 4H), 7.30 (td, J=7.8, 1.8 Hz, 2H), 7.04 (td, J=7.4, 1.0 Hz, 2H), 7.01 (d, J=8.3 Hz, 2H), 4.42 (q, J=5.9 Hz, 4H), 4.14 (d, J=5.1 Hz, 4H), 2.64 (q, J=7.1 Hz, 4H), 2.13-2.05 (m, 4H), 1.44 (s, 18H), 1.39 (s, 18H), 0.42 (t, J=7.0 Hz, 6H). $^{13}$C NMR (126 MHz, Chloroform-d) δ 156.55, 151.02, 147.67, 147.12, 132.01, 132.00, 131.66, 131.28, 131.17, 130.66, 130.09, 128.68, 127.83, 127.19, 126.45, 125.91, 125.48, 124.74, 124.74, 124.55, 123.58, 122.52, 121.78, 121.21, 120.49, 112.51, 96.57, 68.04, 64.08, 35.10, 34.81, 30.97, 30.93, 29.72, 26.18, 14.17.

Example 57: Synthesis of Procatalyst 36

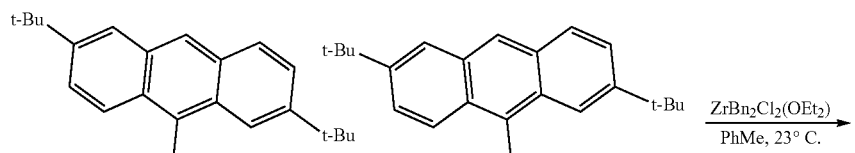

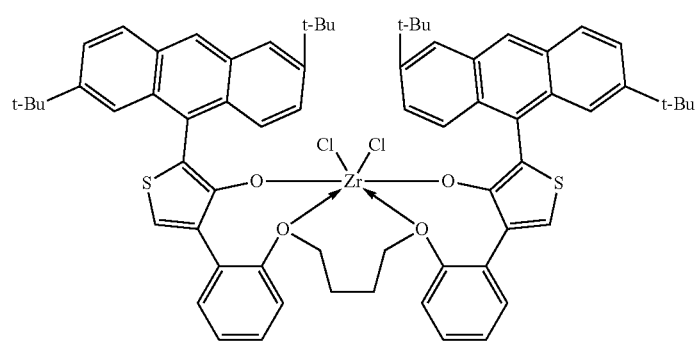

The procedure was similar to the procedure in Example 18.
Example 58: Synthesis of Procatalyst 37
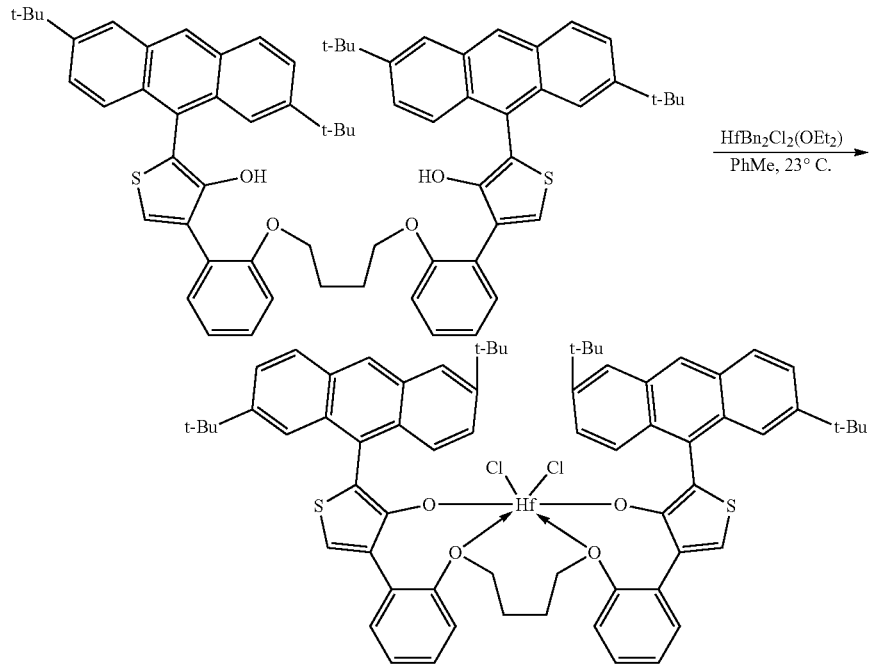
The procedure was similar to the procedure in Example 19.
Example 59: Synthesis of Procatalyst 38
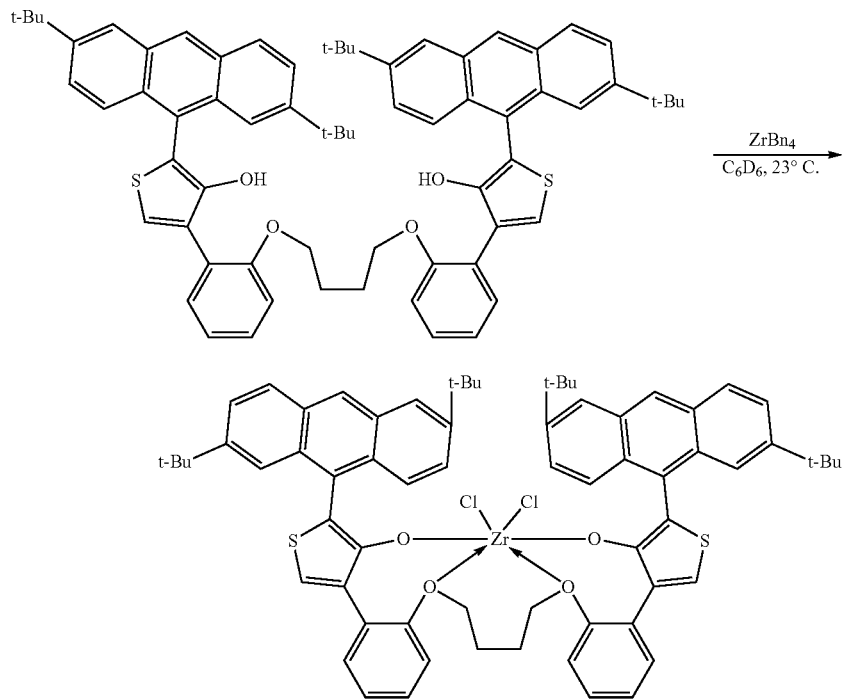

The procedure was similar to the procedure in Example 17.

Example 60: Synthesis of Ligand 16

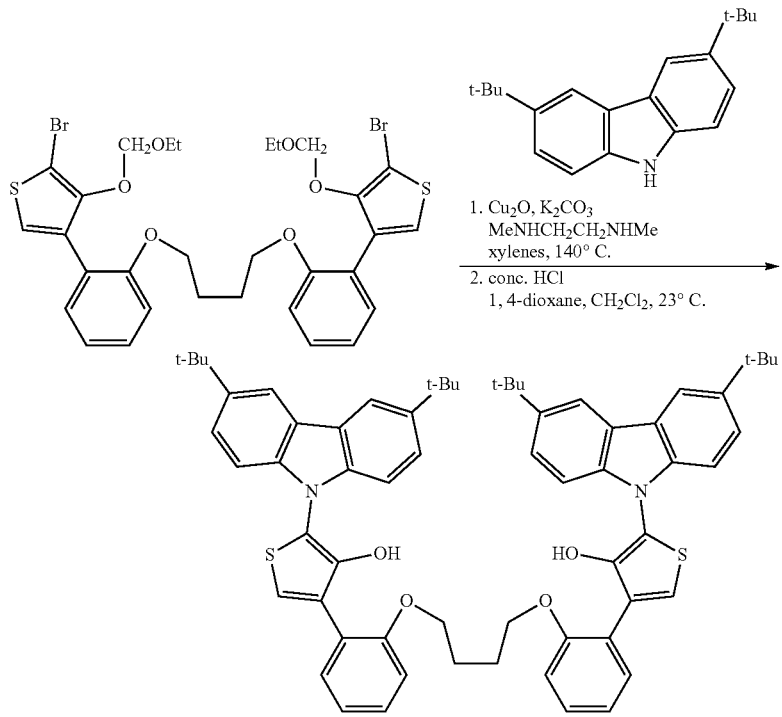

The procedure was similar to Example 38. The two-step reaction provided a 21% yield of a pale golden yellow foam.

$^1$H NMR (500 MHz, Chloroform-d) δ 8.10 (d, J=1.8 Hz, 4H), 7.53 (dd, J=7.6, 1.7 Hz, 2H), 7.39 (dd, J=8.6, 1.9 Hz, 4H), 7.32 (td, J=7.8, 1.7 Hz, 2H), 7.23 (d, J=8.5 Hz, 4H), 7.18 (s, 2H), 7.12 (td, J=7.5, 1.1 Hz, 2H), 6.91 (dd, J=8.3, 1.1 Hz, 2H), 6.66 (s, 2H), 4.07-4.03 (m, 4H), 1.91-1.87 (m, 4H), 1.43 (s, 36H). $^{13}$C NMR (126 MHz, Chloroform-d) δ 154.34, 147.72, 143.16, 140.41, 131.33, 130.56, 129.51, 124.52, 123.60, 123.51, 122.66, 119.31, 116.25, 115.50, 113.48, 109.66, 69.47, 34.70, 32.01, 26.03.

Characterization of the Protected Ligand:
$^1$H NMR (500 MHz, Chloroform-d) δ 8.10 (d, J=2.0 Hz, 4H), 7.55 (dd, J=7.5, 1.8 Hz, 2H), 7.45 (dd, J=8.6, 1.9 Hz, 4H), 7.36 (d, J=8.6 Hz, 4H), 7.34-7.30 (m, 2H), 7.29 (s, 2H), 7.07-6.98 (m, 4H), 4.50 (s, 4H), 4.18-4.11 (m, 4H), 2.83 (q, J=7.0 Hz, 4H), 2.13-2.03 (m, 4H), 1.45 (s, 36H), 0.55 (t, J=7.0 Hz, 6H). $^{13}$C NMR (126 MHz, Chloroform-d) δ 156.62, 148.96, 143.32, 140.40, 132.13, 131.05, 129.11, 124.38, 123.83, 123.44, 122.05, 120.51, 120.38, 116.06, 112.16, 110.00, 96.74, 68.17, 64.44, 34.73, 32.01, 26.37, 14.19.

Example 61: Synthesis of Procatalyst 40

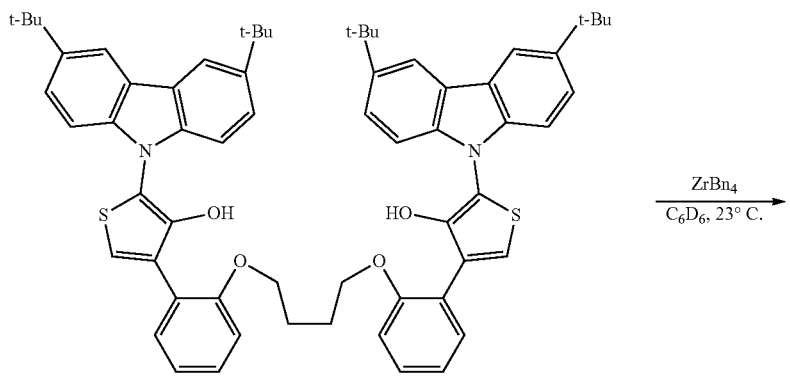

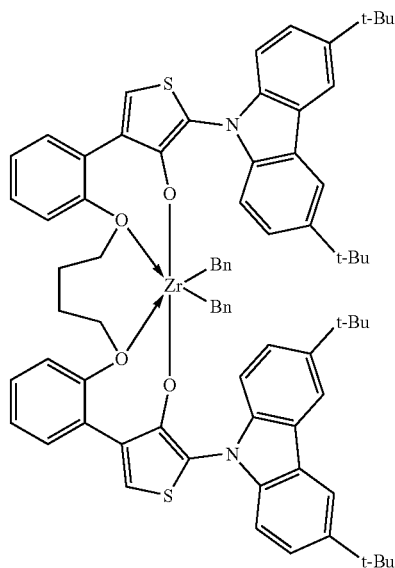
The procedure was similar to the procedure in Example 16.
$^1$H NMR (400 MHz, Benzene-$d_6$) δ 8.42 (d, J=1.8 Hz, 2H), 8.19 (d, J=1.9 Hz, 2H), 7.64 (d, J=8.5 Hz, 2H), 7.46 (ddd, J=8.7, 5.8, 1.9 Hz, 4H), 7.28 (d, J=8.7 Hz, 2H), 7.10-7.00 (m, 2H), 6.97-6.93 (m, 2H), 6.80-6.67 (m, 6H), 6.62 (s, 2H), 6.35-6.29 (m, 2H), 6.14-6.06 (m, 4H), 5.18 (dd, J=7.9, 1.4 Hz, 2H), 4.04 (t, J=10.5 Hz, 2H), 3.35 (dd, J=11.8, 4.5 Hz, 2H), 1.45 (s, 18H), 1.26 (s, 18H), 0.99 (d, J=12.1 Hz, 2H), 0.76 (t, J=9.1 Hz, 2H), 0.61 (t, J=12.8 Hz, 2H), 0.46 (d, J=12.2 Hz, 2H). $^{13}$C NMR (101 MHz, Benzene-$d_6$) δ 155.80, 151.78, 146.61, 143.34, 143.08, 139.98, 139.59, 133.04, 131.33, 130.53, 130.21, 128.88, 128.30, 126.71, 125.79, 125.26, 124.87, 123.21, 122.80, 122.74, 120.78, 116.56, 116.38, 115.83, 115.71, 112.39, 109.35, 80.63, 74.21, 34.55, 34.39, 31.94, 31.68, 25.88.
Example 62: Synthesis of Procatalyst 41
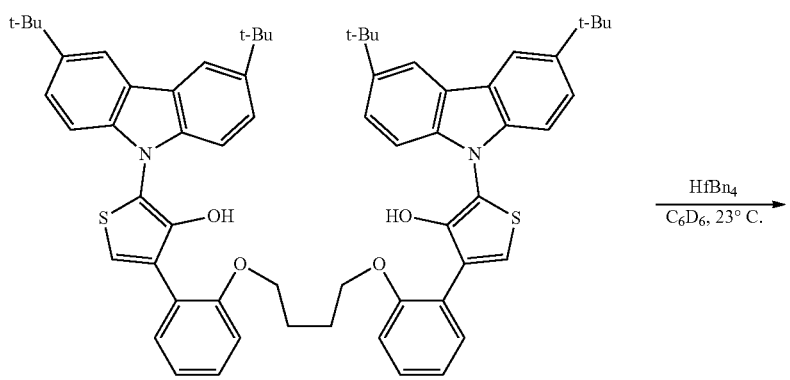

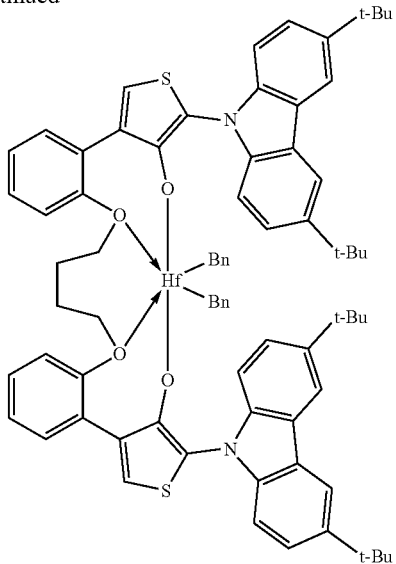

The procedure was similar to Example 17.

$^{1}$H NMR (400 MHz, Benzene-$d_6$) δ 8.44 (d, J=1.8 Hz, 2H), 8.19 (d, J=1.8 Hz, 2H), 7.65-7.60 (m, 2H), 7.45 (ddd, J=10.7, 8.6, 1.9 Hz, 4H), 7.19 (dd, J=8.6, 0.6 Hz, 2H), 7.10-7.03 (m, 2H), 6.95 (ddq, J=7.3, 1.4, 0.7 Hz, 2H), 6.78-6.73 (m, 4H), 6.74-6.68 (m, 4H), 6.61 (s, 2H), 6.16-6.10 (m, 4H), 5.18 (dd, J=8.1, 1.3 Hz, 2H), 4.07 (t, J=10.8 Hz, 2H), 3.43-3.34 (m, 2H), 1.46 (s, 18H), 1.26 (s, 18H), 0.87 (d, J=13.2 Hz, 2H), 0.79-0.68 (m, 2H), 0.57-0.47 (m, 2H), 0.19 (d, J=13.2 Hz, 2H). $^{13}$C NMR (126 MHz, Benzene-$d_6$) δ 155.63, 151.81, 147.60, 143.41, 143.11, 139.92, 139.58, 132.72, 131.40, 130.30, 128.96, 128.15, 127.99, 127.28, 126.99, 126.91, 126.04, 125.29, 124.96, 123.58, 122.73, 122.67, 120.76, 116.45, 116.38, 116.29, 115.64, 112.53, 109.37, 81.66, 78.32, 34.57, 34.41, 31.97, 31.70, 26.09.

Example 63: Synthesis of Ligand 17

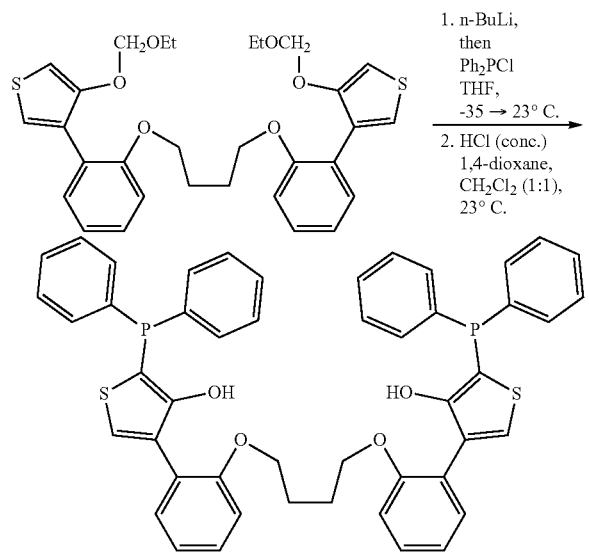

The bisthiophene was azeotropically dried using PhMe (4×10 mL) prior to use. A clear colorless solution of the thiophene (300.0 mg, 0.5408 mmol, 1.00 eq) in deoxygenated anhydrous THF (10 mL) in a nitrogen filled glovebox was placed in a freezer cooled to −35° C. for 16 hrs upon which a precooled solution of n-BuLi (0.65 mL, 1.622 mmol, 3.00 eq, titrated 2.50 M in hexanes) was added via syringe in a dropwise manner. The now golden yellow-orange mixture was allowed to sit in the freezer for 4 hrs upon which it was removed, and while stirring (500 rpm) neat Ph$_2$PCl (0.38 mL, 2.082 mmol, 3.85 eq) was added in a quick dropwise manner. After stirring for 3 hrs at 23° C. the now pale yellow heterogeneous mixture was removed from the glovebox, neutralized with aqueous phosphate buffer (50 mL, pH=8, 0.05 M), diluted with CH$_2$Cl$_2$ (30 mL) and brine (20 mL), poured into a separatory funnel, partitioned, organics were washed with a saturated aqueous mixture of phosphate buffer (pH=8, 0.05 M) and brine (2×40 mL, 1:1), residual organics were extracted from the aqueous layer using CH$_2$Cl$_2$ (2×20 mL), combined, dried over solid Na$_2$SO$_4$, decanted, concentrated onto celite, and purified via silica gel chromatography; 25%-75% CH$_2$Cl$_2$ in hexanes, and then purified again via silica gel chromatography; hexanes—5% acetone in hexanes to afford the bis-(diphenylphosphine)thiophene as a white foam (140.0 mg, 0.1517 mmol, 28%). NMR indicated pure product.

To a solution of the bis-(diphenylphosphine)thiophene (140.0 mg, 0.1517 mmol, 1.00 eq) in CH$_2$Cl$_2$ (5 mL) and 1,4-dioxane (5 mL) under nitrogen at 23° C. was added concentrated HCl (3 mL). After stirring (500 rpm) for 20 hrs the golden yellow solution was diluted with an aqueous phosphate buffer (50 mL, 0.05 M, pH=7), the remaining acidic biphasic mixture was then further neutralized to a pH=7 using a saturated aqueous mixture of NaHCO$_3$ added in a dropwise manner. The resultant mixture was diluted with CH$_2$Cl$_2$ (20 mL), poured into a separatory funnel, partitioned, organics were washed with an aqueous phosphate buffer (2×20 mL, 0.05 M, pH=7), residual organics were extracted from the aqueous layer using CH$_2$Cl$_2$ (2×20 mL), combined, dried over solid Na$_2$SO$_4$, decanted, concentrated onto celite, and purified via silica gel chromatography; 25%-70% CH$_2$Cl$_2$ in hexanes to afford the bis- (diphenylphosphine)hydroxythiophene as a white solid (86.7 mg, 0.1075 mmol, 71%). NMR indicated pure product.

$^1$H NMR (500 MHz, Chloroform-d) δ 7.49-7.40 (m, 10H), 7.39 (s, 2H), 7.31 (tt, J=5.8, 2.9 Hz, 14H), 7.07 (td, J=7.5, 1.1 Hz, 2H), 6.87-6.83 (m, 2H), 3.92-3.82 (m, 4H), 1.75 (h, J=2.7 Hz, 4H). $^{31}$P NMR (202 MHz, Chloroform-d) δ −29.46. $^{13}$C NMR (126 MHz, Chloroform-d) δ 157.14 (d, J=18.7 Hz), 154.19, 137.33 (d, J=7.7 Hz), 133.15 (d, J=19.6 Hz), 131.77 (d, J=2.4 Hz), 131.42, 129.31, 128.68, 128.44, 128.33 (d, J=7.1 Hz), 124.24, 122.45, 113.62, 111.69 (d, J=25.3 Hz), 69.24, 25.79.

Characterization of the Protected Bis-(diphenylphosphine)thiophene:

$^1$H NMR (500 MHz, Chloroform-d) δ 7.40 (ddt, J=9.4, 6.0, 1.8 Hz, 10H), 7.31 (dh, J=5.0, 1.7 Hz, 12H), 7.27-7.23 (m, 4H), 6.95 (td, J=7.5, 1.0 Hz, 2H), 6.84 (dd, J=8.3, 1.0 Hz, 2H), 4.85 (s, 4H), 3.85 (d, J=5.4 Hz, 4H), 3.42 (q, J=7.0 Hz, 4H), 1.76 (q, J=2.9 Hz, 4H), 0.88 (t, J=7.1 Hz, 6H). $^{31}$P NMR (202 MHz, Chloroform-d) δ−28.37. $^{13}$C NMR (126 MHz, Chloroform-d) δ 158.84 (d, J=20.5 Hz), 156.31, 137.69 (d, J=9.0 Hz), 133.20 (d, J=20.0 Hz), 130.82, 129.51, 128.85, 128.70, 128.32 (d, J=7.1 Hz), 124.18, 120.88 (d, J=30.0 Hz), 120.37, 112.15, 97.65 (d, J=5.6 Hz), 67.65, 65.02 (d, J=4.8 Hz), 25.76, 14.67.

Example 64: Synthesis of Ligand 18

The procedure was similar to Example 44. The two-step reaction provided a 47% yield of a white solid.

$^1$H NMR (500 MHz, Chloroform-d) δ 8.15 (d, J=1.7 Hz, 4H), 7.79 (d, J=1.4 Hz, 4H), 7.77 (q, J=1.3 Hz, 6H), 7.57-7.50 (m, 8H), 7.47-7.42 (m, 6H), 7.31-7.25 (m, 2H), 7.12 (s, 2H), 7.10 (td, J=7.5, 1.1 Hz, 2H), 6.88 (dd, J=8.3, 1.0 Hz, 2H), 4.11-3.99 (m, 4H), 1.98-1.88 (m, 4H). $^{13}$C NMR (126 MHz, Chloroform-d) δ 154.04, 148.57, 142.10, 141.35, 135.00, 133.04, 131.71, 129.55, 128.90, 127.55, 127.42, 124.75, 124.74, 124.24, 122.93, 120.27, 119.49, 114.03, 69.85, 25.93.

Characterization of the Protected Ligand:

$^1$H NMR (500 MHz, Chloroform-d) δ 7.98 (d, J=1.6 Hz, 4H), 7.74 (d, J=1.9 Hz, 2H), 7.70 (d, J=7.4 Hz, 8H), 7.54-7.43 (m, 10H), 7.43-7.35 (m, 4H), 7.29-7.21 (m, 4H), 6.99 (t, J=7.4 Hz, 2H), 6.87 (d, J=8.2 Hz, 2H), 4.71 (s, 4H), 4.00 (d, J=5.3 Hz, 4H), 3.19 (q, J=7.0 Hz, 4H), 2.04-1.89 (m, 4H), 0.73 (t, J=7.0 Hz, 6H). $^{13}$C NMR (126 MHz, Chloroform-d) δ 156.42, 149.33, 142.07, 140.99, 134.37, 133.67, 130.96, 128.89, 128.83, 127.54, 127.52, 127.26, 125.64, 124.80, 124.42, 121.59, 120.50, 112.52, 97.35, 68.03, 64.97, 26.05, 14.57.

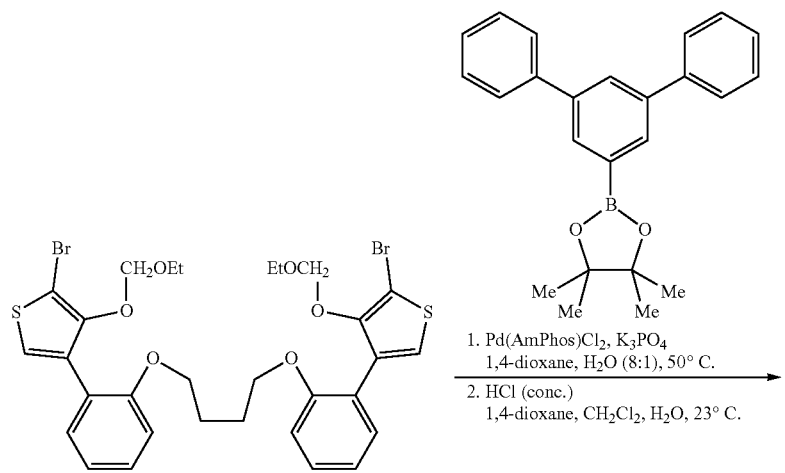

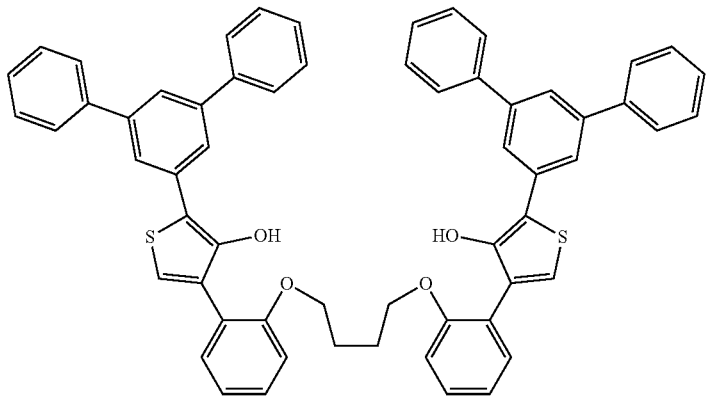

Example 65: Synthesis of Procatalyst 44
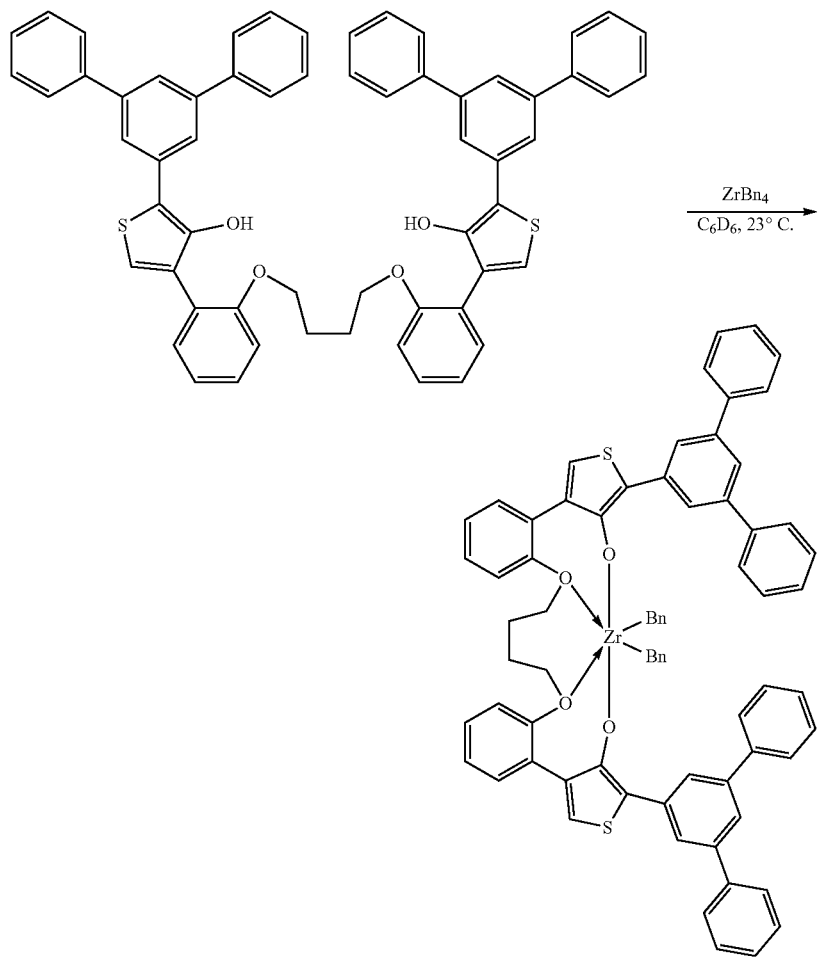
The procedure was similar to Example 16.
$^1$H NMR (400 MHz, Benzene-$d_6$) δ 8.38 (d, J=1.7 Hz, 4H), 7.73 (t, J=1.7 Hz, 2H), 7.61-7.55 (m, 8H), 7.17-7.12 (m, 8H), 7.11-6.92 (m, 12H), 6.77 (td, J=7.4, 1.3 Hz, 2H), 6.71 (ddt, J=9.2, 7.5, 1.6 Hz, 4H), 6.67 (s, 2H), 6.35-6.30 (m, 4H), 6.19 (dd, J=8.1, 1.3 Hz, 2H), 4.14 (dd, J=11.9, 9.9 Hz, 2H), 3.47 (dd, J=12.0, 4.6 Hz, 2H), 2.28 (d, J=12.1 Hz, 2H), 1.53 (d, J=12.0 Hz, 2H), 0.84-0.73 (m, 2H), 0.47 (d, J=12.0 Hz, 2H). $^{13}$C NMR (101 MHz, Benzene-$d_6$) δ 155.21, 154.56, 147.21, 142.96, 141.03, 135.65, 135.24, 131.66, 130.03, 129.45, 128.73, 128.15, 126.62, 126.12, 125.38, 124.70, 123.11, 121.04, 119.70, 119.02, 80.45, 76.42, 26.58.
Example 66: Synthesis of Procatalyst 45
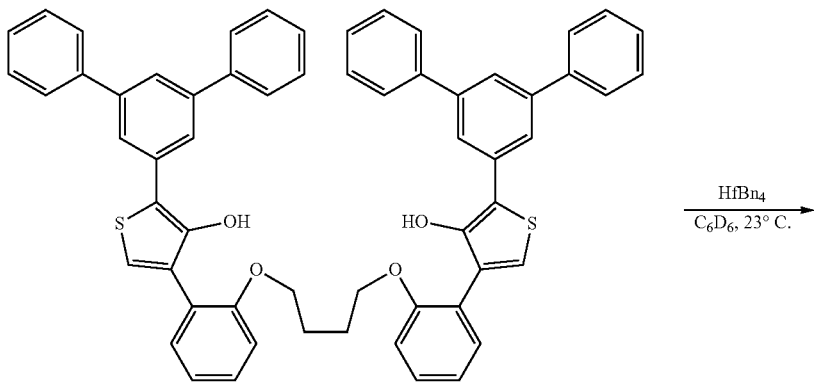

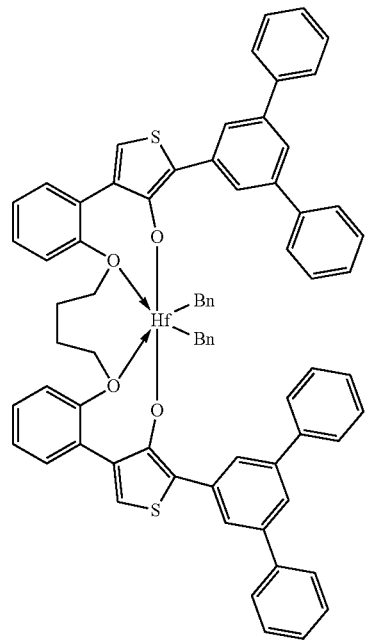
The procedure was similar to Example 17.
$^1$H NMR (400 MHz, Benzene-d$_6$) δ 8.36 (d, J=1.7 Hz, 4H), 7.74 (t, J=1.7 Hz, 2H), 7.62-7.56 (m, 8H), 7.19-7.12 (m, 8H), 7.12-6.93 (m, 10H), 6.81-6.67 (m, 6H), 6.66 (s, 2H), 6.37-6.32 (m, 4H), 6.21 (dd, J=8.0, 1.4 Hz, 2H), 4.28-4.17 (m, 2H), 3.52 (dd, J=12.2, 4.7 Hz, 2H), 2.11 (d, J=13.0 Hz, 2H), 1.33 (d, J=13.0 Hz, 2H), 0.80 (dd, J=14.1, 6.2 Hz, 2H), 0.47-0.35 (m, 2H). $^{13}$C NMR (101 MHz, Benzene-d$_6$) δ 155.13, 154.62, 147.58, 142.94, 141.03, 137.46, 135.60, 134.98, 131.65, 130.05, 129.42, 128.73, 128.15, 127.19, 127.17, 126.28, 125.28, 124.65, 123.28, 121.18, 119.65, 119.48, 81.28, 80.66, 26.74.
Example 67: Synthesis of Ligand 19
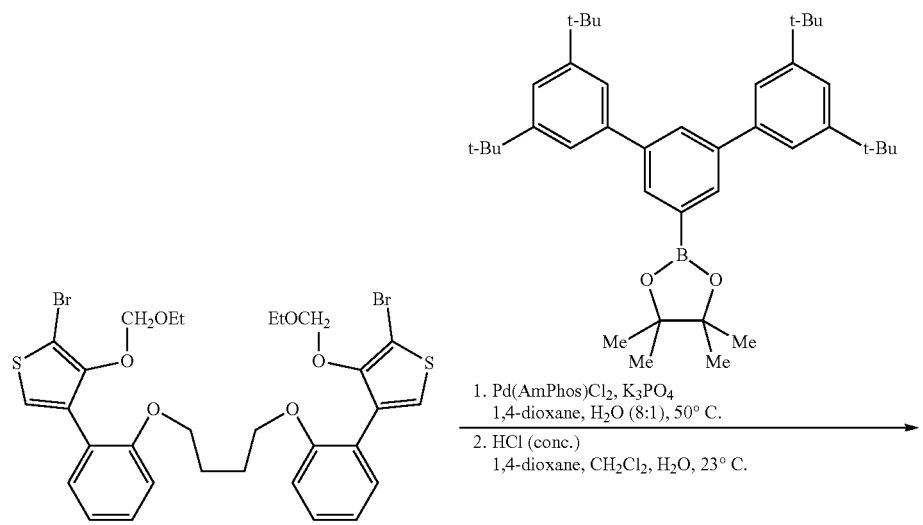

-continued

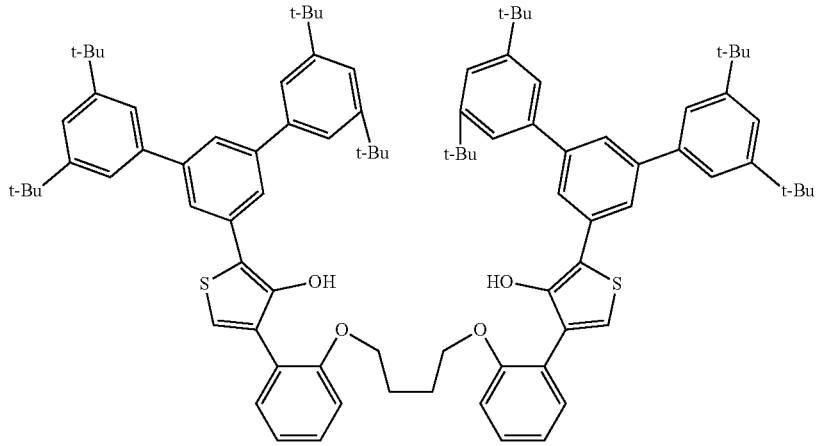

The procedure was similar to Example 37. The two-step reaction provided a 49% yield of a white foam.

$^1$H NMR (400 MHz, Chloroform-d) δ 8.02 (d, J=1.6 Hz, 4H), 7.65 (t, J=1.7 Hz, 2H), 7.52 (s, 4H), 7.51 (s, 4H), 7.48 (t, J=1.8 Hz, 4H), 7.41 (dd, J=7.6, 1.7 Hz, 2H), 7.24 (td, J=7.7, 1.7 Hz, 2H), 7.08 (d, J=4.9 Hz, 4H), 7.05 (td, J=7.5, 1.0 Hz, 2H), 6.85 (dd, J=8.3, 1.1 Hz, 2H), 4.10-4.01 (m, 4H), 1.95-1.85 (m, 4H), 1.39 (s, 72H). $^{13}$C NMR (101 MHz, Chloroform-d) δ 153.95, 151.14, 148.35, 143.27, 141.04, 134.49, 132.94, 131.67, 129.45, 125.13, 124.87, 124.72, 122.79, 122.01, 121.52, 120.04, 119.60, 113.86, 69.68, 35.01, 31.55, 25.79.

Characterization of the Protected Coupled Product:

$^1$H NMR (400 MHz, Chloroform-d) δ 7.94 (d, J=1.6 Hz, 4H), 7.70 (d, J=1.8 Hz, 2H), 7.52-7.49 (m, 14H), 7.28-7.18 (m, 4H), 6.97 (t, J=7.4 Hz, 2H), 6.85 (d, J=8.3 Hz, 2H), 4.71 (s, 4H), 3.99 (d, J=5.4 Hz, 4H), 3.19 (q, J=7.0 Hz, 4H), 1.96 (q, J=3.4, 2.9 Hz, 4H), 1.41 (s, 72H), 0.72 (t, J=7.0 Hz, 6H). $^{13}$C NMR (101 MHz, Chloroform-d) δ 156.35, 151.21, 149.18, 143.32, 140.80, 133.99, 133.52, 130.97, 128.81, 127.74, 125.82, 125.79, 124.30, 121.92, 121.64, 121.53, 120.39, 112.33, 97.24, 67.89, 64.98, 35.02, 31.56, 25.99, 14.57.

Example 68: Synthesis of Procatalyst 46

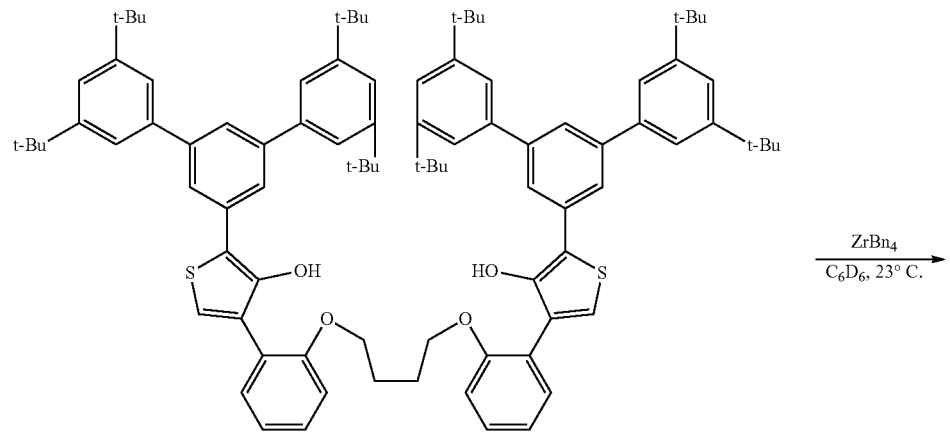

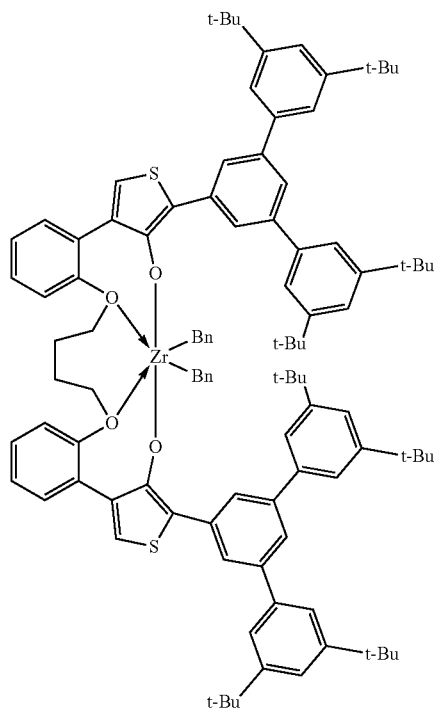
The procedure was similar to Example 16.
$^1$H NMR (400 MHz, Benzene-$d_6$) δ 8.44 (d, J=1.6 Hz, 4H), 8.04 (t, J=1.7 Hz, 2H), 7.68 (d, J=1.8 Hz, 8H), 7.45 (t, J=1.8 Hz, 4H), 7.12-7.00 (m, 2H), 6.99-6.93 (m, 2H), 6.91-6.83 (m, 6H), 6.70-6.64 (m, 2H), 6.61 (s, 2H), 6.21 (dd, J=8.3, 1.1 Hz, 2H), 6.15-6.10 (m, 4H), 4.15 (t, J=10.7 Hz, 2H), 3.50 (dd, J=12.0, 3.5 Hz, 2H), 2.15 (d, J=12.3 Hz, 2H), 1.55 (d, J=12.3 Hz, 2H), 1.23 (s, 72H), 0.75-0.65 (t, J=9.3 Hz, 2H), 0.43-0.30 (m, 2H). $^{13}$C NMR (101 MHz, Benzene-$d_6$) δ 155.73, 154.60, 151.09, 147.57, 144.73, 141.38, 135.46, 134.94, 131.48, 130.10, 129.57, 128.15, 127.17, 126.18, 126.02, 125.88, 125.55, 123.19, 122.10, 121.60, 120.67, 119.56, 119.22, 80.64, 77.44, 34.62, 31.24, 26.57.
Example 69: Synthesis of Procatalyst 47
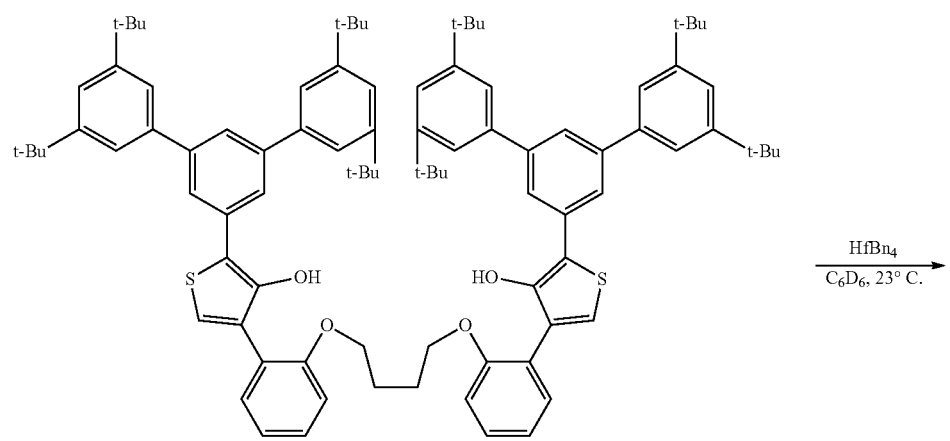

-continued
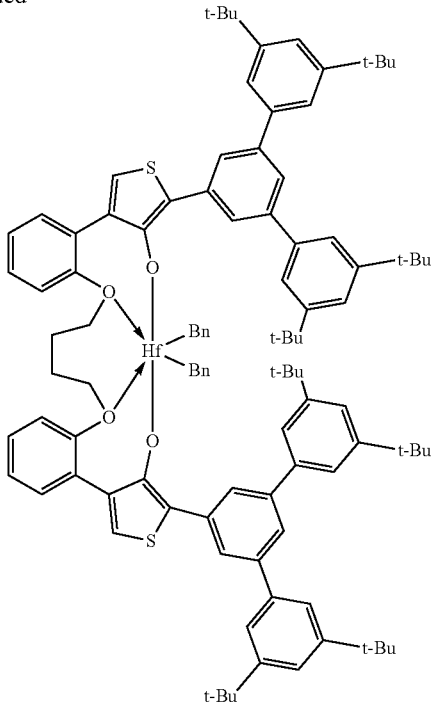
The procedure was similar to Example 17.
¹H NMR (400 MHz, Benzene-d₆) δ 8.42 (d, J=1.6 Hz, 4H), 8.05 (t, J=1.7 Hz, 2H), 7.70 (d, J=1.8 Hz, 8H), 7.45 (t, J=1.8 Hz, 4H), 7.12-7.05 (m, 4H), 7.01-6.83 (m, 6H), 6.69-6.63 (m, 2H), 6.60 (s, 2H), 6.25 (dd, J=8.7, 1.1 Hz, 2H), 6.17-6.11 (m, 4H), 4.24 (t, J=10.9 Hz, 2H), 3.56 (d, J=11.9 Hz, 2H), 1.97 (d, J=13.2 Hz, 2H), 1.33 (d, J=13.3 Hz, 2H), 1.24 (s, 72H), 0.69 (t, J=9.7 Hz, 2H), 0.34-0.24 (m, 2H). ¹³C NMR (126 MHz, Benzene-d₆) δ 155.67, 154.67, 151.12, 147.89, 144.71, 141.38, 135.43, 134.72, 131.49, 130.16, 129.55, 128.17, 128.13, 127.99, 127.29, 126.94, 126.86, 126.03, 125.92, 125.49, 123.40, 122.11, 121.64, 120.88, 119.67, 119.53, 81.49, 81.31, 34.65, 31.26, 26.78.
Example 70: Synthesis of Ligand 20
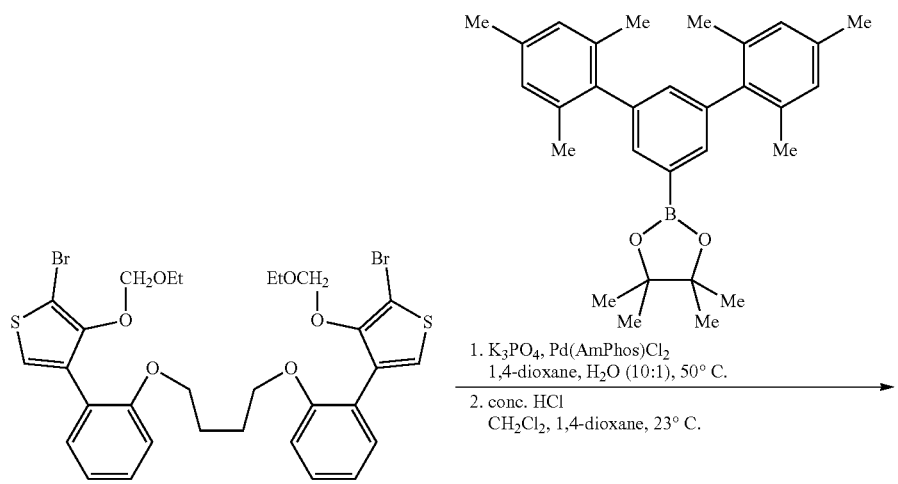

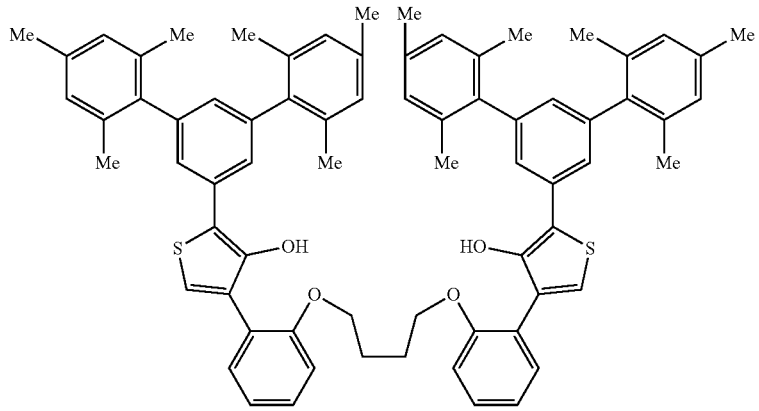

The procedure was similar to Example 44. The reaction provided a 56% yield of a white foam.

$^1$H NMR (500 MHz, Chloroform-d) δ 7.65 (d, J=1.5 Hz, 4H), 7.38 (dd, J=7.6, 1.7 Hz, 2H), 7.29 (ddd, J=8.2, 7.4, 1.7 Hz, 2H), 7.07 (td, J=7.5, 1.1 Hz, 2H), 7.03 (s, 4H), 6.97-6.93 (m, 8H), 6.87 (dd, J=8.4, 1.1 Hz, 2H), 6.79 (t, J=1.5 Hz, 2H), 4.05-3.97 (m, 4H), 2.33 (s, 12H), 2.10 (s, 24H), 1.92-1.84 (m, 4H). $^{13}$C NMR (126 MHz, Chloroform-d) δ 153.96, 148.35, 141.20, 139.03, 136.44, 135.95, 134.06, 133.00, 131.64, 129.39, 128.20, 128.05, 125.48, 124.72, 122.78, 119.86, 119.56, 113.87, 69.54, 25.82, 21.04, 20.85.

Characterization of the Protected Ligand:

$^1$H NMR (400 MHz, Chloroform-d) δ 7.51 (d, J=1.6 Hz, 4H), 7.41 (dd, J=7.6, 1.8 Hz, 2H), 7.24-7.18 (m, 2H), 7.16 (s, 2H), 6.97-6.90 (m, 10H), 6.84 (t, J=1.6 Hz, 2H), 6.79 (dd, J=8.3, 1.1 Hz, 2H), 4.65 (s, 4H), 3.87 (m, 4H), 3.11 (q, J=7.0 Hz, 4H), 2.31 (s, 12H), 2.08 (s, 24H), 1.86 (q, J=3.2, 2.7 Hz, 4H), 0.76 (t, J=7.0 Hz, 6H). $^{13}$C NMR (101 MHz, Chloroform-d) δ 156.30, 148.94, 141.53, 138.68, 136.52, 135.74, 133.80, 133.60, 130.90, 129.03, 128.76, 128.06, 127.40, 126.74, 124.47, 121.26, 120.38, 112.31, 96.92, 67.82, 64.79, 25.95, 21.02, 20.78, 14.63.

Example 71: Synthesis of Procatalyst 48

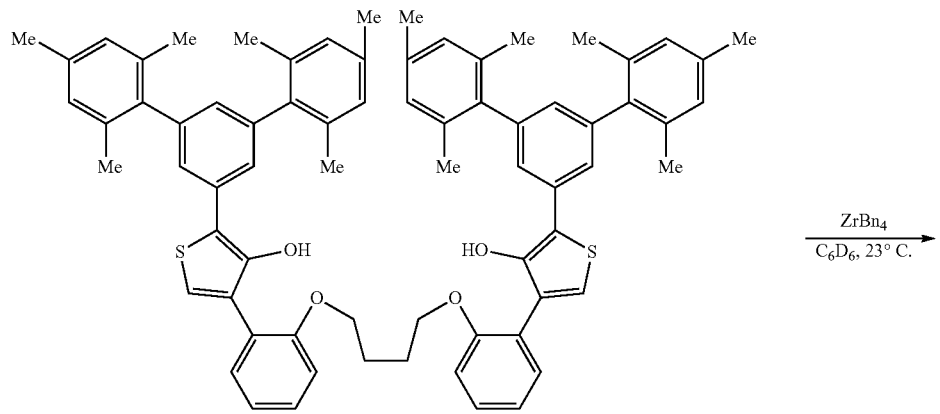

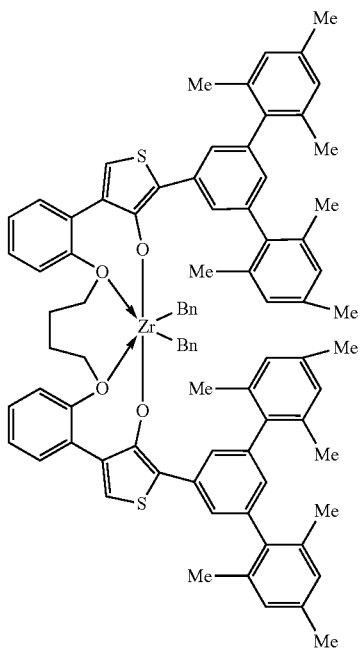
The procedure was similar to Example 16.
¹H NMR (400 MHz, Benzene-d₆) δ 8.17 (d, J=1.5 Hz, 4H), 7.01-6.93 (m, 2H), 6.90 (td, J=7.4, 7.0, 1.1 Hz, 2H), 6.87-6.80 (m, 6H), 6.79-6.75 (m, 8H), 6.74 (t, J=1.5 Hz, 2H), 6.70-6.64 (m, 4H), 6.60 (s, 2H), 6.18-6.12 (m, 4H), 4.38-4.26 (m, 2H), 3.68 (d, J=11.5 Hz, 2H), 2.20 (s, 12H), 2.14 (s, 12H), 2.12 (s, 12H), 1.99 (d, J=12.0 Hz, 2H), 1.41 (d, J=12.0 Hz, 2H), 0.94-0.81 (m, 2H), 0.47-0.32 (m, 2H).
¹³C NMR (101 MHz, Benzene-d₆) δ 155.62, 154.42, 147.07, 142.28, 138.70, 136.20, 135.63, 135.47, 135.17, 134.89, 132.27, 130.01, 129.73, 128.89, 128.32, 128.29, 128.13, 127.24, 126.61, 125.44, 125.25, 123.16, 120.79, 119.58, 119.05, 81.18, 74.98, 26.65, 20.98, 20.84, 20.70.
Example 72: Synthesis of Procatalyst 49
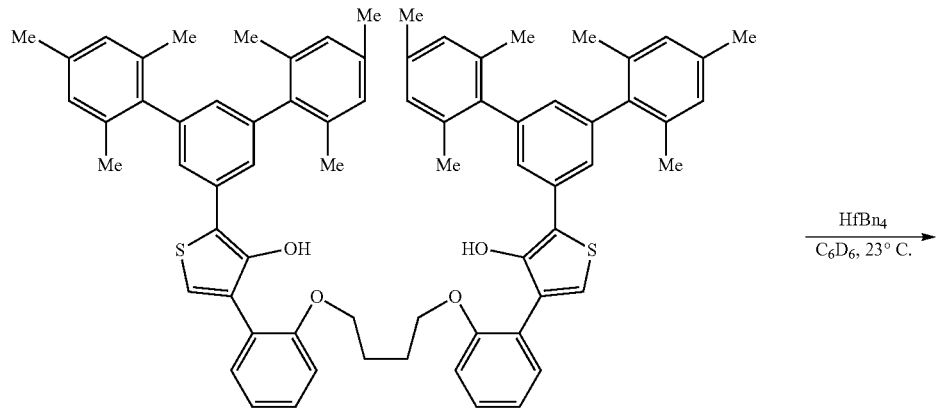

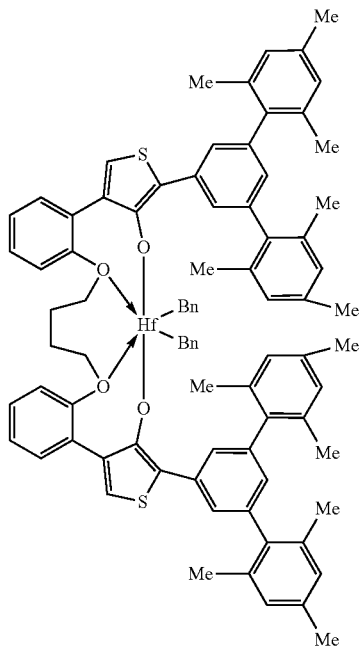
The procedure was similar to Example 17.
¹H NMR (400 MHz, Benzene-d₆) δ 8.14 (d, J=1.5 Hz, 4H), 7.12-7.03 (m, 2H), 6.97-6.93 (m, 2H), 6.93-6.83 (m, 6H), 6.77 (dd, J=8.6, 1.6 Hz, 8H), 6.74 (t, J=1.5 Hz, 2H), 6.72-6.68 (m, 2H), 6.67-6.62 (m, 2H), 6.60 (s, 2H), 6.19-6.13 (m, 4H), 4.43-4.33 (m, 2H), 3.73 (dd, J=12.7, 4.5 Hz, 2H), 2.19 (s, 12H), 2.14 (s, 13H), 2.12 (s, 14H), 1.82 (d, J=12.9 Hz, 2H), 1.19 (d, J=12.9 Hz, 2H), 0.89 (t, J=10.2 Hz, 2H), 0.36 (d, J=11.3 Hz, 2H). ¹³C NMR (101 MHz, Benzene-d₆) δ 155.44, 154.44, 147.58, 142.26, 138.70, 136.20, 135.48, 135.31, 135.15, 134.78, 132.30, 130.04, 129.75, 128.80, 128.34, 128.28, 128.15, 127.05, 126.95, 126.15, 125.39, 123.35, 120.84, 119.52, 119.50, 81.95, 79.19, 26.70, 20.98, 20.86, 20.70.
Example 73: Synthesis of Ligand 21
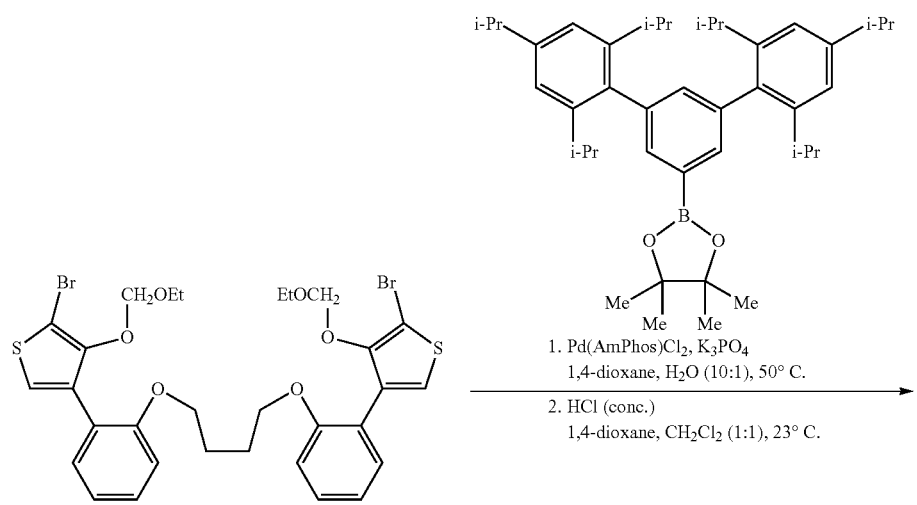

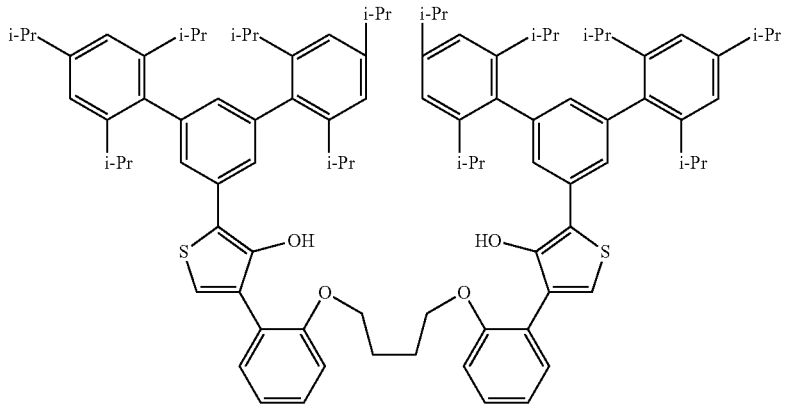

The procedure was similar to Example 44. The two-step reaction provided a 80% yield of a white solid.

¹H NMR (400 MHz, Chloroform-d) δ 7.76 (t, J=1.5 Hz, 4H), 7.37 (dt, J=7.6, 1.5 Hz, 2H), 7.28-7.22 (m, 2H), 7.08-7.01 (m, 14H), 6.86 (dd, J=4.9, 3.3 Hz, 4H), 4.00 (d, J=5.8 Hz, 4H), 2.94 (hept, J=6.9 Hz, 4H), 2.88-2.76 (m, 8H), 1.88 (d, J=5.3 Hz, 4H), 1.31 (d, J=6.9 Hz, 24H), 1.15 (d, J=6.9 Hz, 24H), 1.06 (d, J=6.9 Hz, 24H). ¹³C NMR (101 MHz, Chloroform-d) δ 153.91, 148.57, 147.69, 146.53, 140.55, 137.04, 133.17, 133.14, 131.69, 129.42, 129.30, 125.49, 124.52, 122.69, 120.44, 119.85, 119.57, 113.59, 69.39, 34.25, 30.41, 25.73, 24.26, 24.24, 24.08.

Characterization of the Protected Ligand:

¹H NMR (400 MHz, Chloroform-d) δ 7.61 (d, J=1.5 Hz, 4H), 7.42 (dd, J=7.6, 1.8 Hz, 2H), 7.22-7.17 (m, 2H), 7.18 (s, 2H), 7.06 (s, 8H), 6.93 (dd, J=15.0, 1.0 Hz, 2H), 6.93 (d, J=1.3 Hz, 2H), 6.81 (dd, J=8.3, 1.0 Hz, 2H), 4.68 (s, 4H), 3.91 (d, J=5.4 Hz, 4H), 3.12 (q, J=7.0 Hz, 4H), 2.94 (p, J=6.9 Hz, 5H), 2.81 (p, J=6.8 Hz, 9H), 1.85 (q, J=3.1 Hz, 4H), 1.30 (d, J=7.0 Hz, 28H), 1.16 (d, J=6.8 Hz, 25H), 1.07 (d, J=6.8 Hz, 27H), 0.75 (t, J=7.0 Hz, 6H). ¹³C NMR (101 MHz, Chloroform-d) δ 156.28, 148.90, 147.86, 146.43, 140.87, 136.63, 133.81, 132.81, 130.94, 130.18, 128.72, 127.69, 126.85, 124.42, 121.39, 120.46, 120.36, 112.34, 96.83, 67.85, 64.73, 34.27, 30.41, 25.84, 24.42, 24.11, 24.07, 14.55.

Example 74: Synthesis of Procatalyst 50

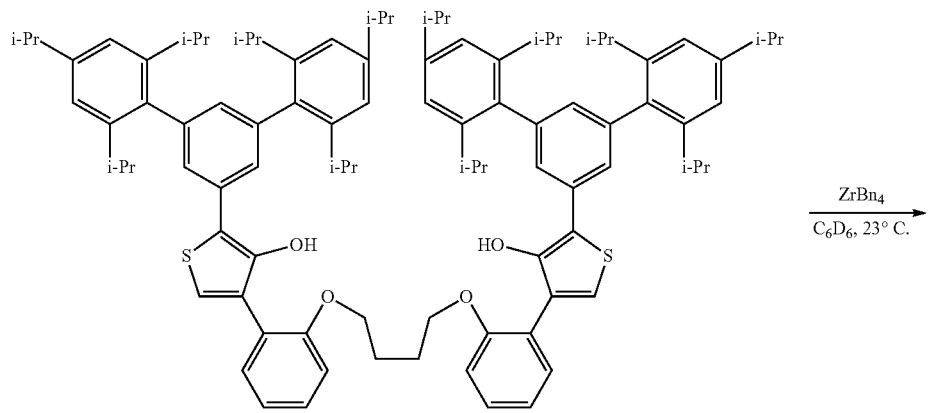

-continued
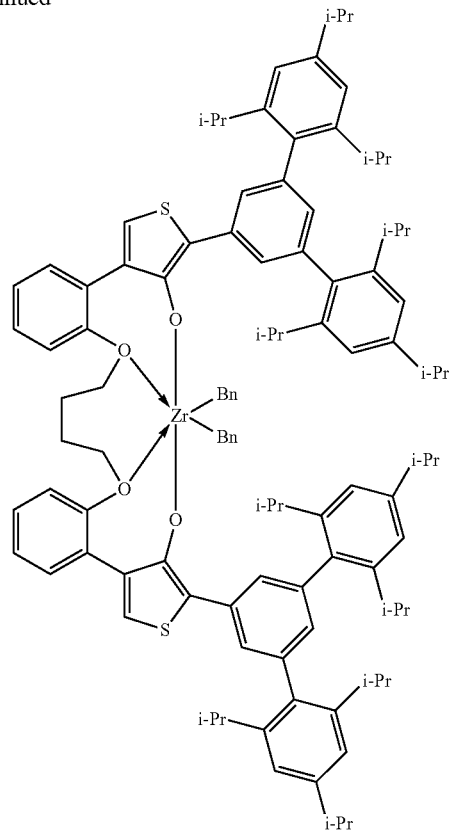
The procedure was similar to Example 16.
$^1$H NMR (400 MHz, Benzene-d$_6$) δ 8.28 (d, J=1.5 Hz, 4H), 7.91 (d, J=1.5 Hz, 2H), 7.21-7.11 (m, 6H), 6.99-6.93 (m, 4H), 6.90 (td, J=7.5, 1.2 Hz, 2H), 6.81-6.67 (m, 6H), 6.63-6.57 (m, 2H), 6.60 (s, 2H), 6.53 (t, J=7.0 Hz, 2H), 6.08-6.02 (m, 4H), 4.34 (t, J=10.9 Hz, 2H), 3.80-3.71 (m, 2H), 3.21 (p, J=6.8 Hz, 4H), 3.10 (hept, J=6.9 Hz, 4H), 2.98 (p, J=6.8 Hz, 2H), 2.92-2.76 (m, 6H), 1.96 (d, J=11.7 Hz, 2H), 1.61 (d, J=11.8 Hz, 2H), 1.28 (d, J=6.9 Hz, 6H), 1.24 (dd, J=6.9, 1.7 Hz, 24H), 1.19 (ddd, J=9.6, 6.7, 3.5 Hz, 24H), 1.15 (d, J=7.1 Hz, 12H), 1.09 (d, J=6.8 Hz, 6H), 0.79 (t, J=10.1 Hz, 2H), 0.30-0.22 (m, 2H). $^{13}$C NMR (101 MHz, Benzene-d$_6$) δ 155.34, 154.46, 148.27, 148.07, 146.75, 146.59, 146.30, 141.51, 141.39, 137.09, 136.96, 135.89, 134.42, 132.14, 130.57, 130.10, 129.77, 129.25, 128.82, 128.15, 126.78, 126.01, 125.95, 123.22, 122.88, 120.81, 120.69, 120.63, 120.60, 120.33, 119.32, 81.43, 74.81, 34.54, 34.46, 34.43, 30.65, 30.60, 30.51, 26.80, 25.47, 24.37, 24.16, 24.11, 24.02, 23.97, 23.81.
Example 75: Synthesis of Procatalyst 51
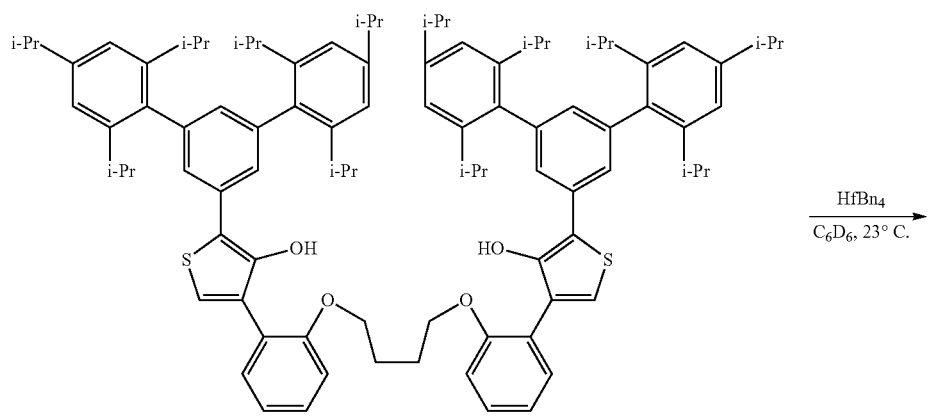

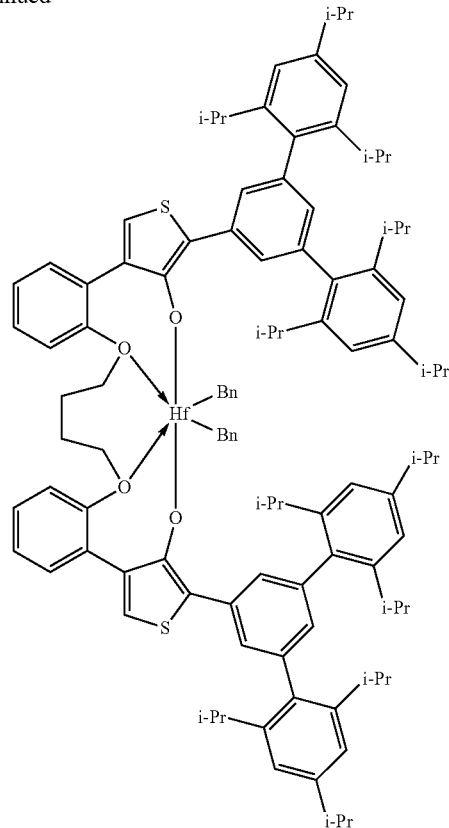
The procedure was similar to Example 17.
Chemical Shifts of the Major Isomer Listed Below:
$^1$H NMR (400 MHz, Benzene-$d_6$) δ 8.25 (d, J=1.5 Hz, 4H), 8.08 (d, J=1.5 Hz, 2H), 7.23-7.11 (m, 6H), 7.08-7.04 (m, 2H), 7.04-6.70 (m, 10H), 6.60 (s, 2H), 6.60-6.52 (m, 2H), 6.51-6.41 (m, 2H), 6.11-6.05 (m, 2H), 5.89 (d, J=7.6 Hz, 2H), 4.47-4.34 (m, 2H), 3.80 (d, J=12.7 Hz, 2H), 3.20 (p, J=6.9 Hz, 2H), 3.16-2.92 (m, 6H), 2.82 (dtt, J=13.7, 10.0, 6.9 Hz, 4H), 1.78 (t, J=12.2 Hz, 2H), 1.35 (d, J=12.7 Hz, 2H), 1.32-1.12 (m, 54H), 1.10 (d, J=6.8 Hz, 6H), 0.99 (d, J=6.8 Hz, 6H), 0.89 (d, J=6.8 Hz, 6H), 0.78 (t, J=10.2 Hz, 2H), 0.22 (q, J=11.7 Hz, 2H). $^{13}$C NMR (101 MHz, Benzene-$d_6$) δ 155.12, 154.44, 153.79, 152.36, 148.13, 148.06, 146.87, 146.71, 146.60, 146.38, 146.28, 146.07, 145.10, 141.51, 136.97, 136.57, 135.56, 134.62, 134.32, 133.63, 132.16, 130.18, 129.79, 128.93, 128.59, 128.15, 126.98, 126.41, 126.20, 125.91, 123.40, 120.92, 120.83, 120.69, 120.64, 120.25, 120.12, 119.82, 82.23, 79.41, 34.47, 34.43, 30.82, 30.66, 30.60, 30.54, 25.70, 25.47, 24.54, 24.36, 24.15, 24.03, 23.97, 23.95, 23.83, 23.64.
Example 76: Synthesis of Ligand 22
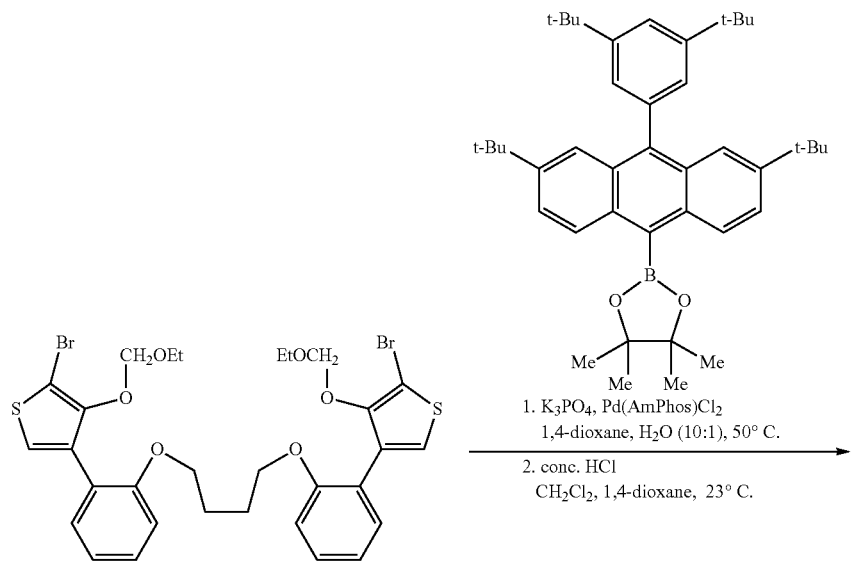

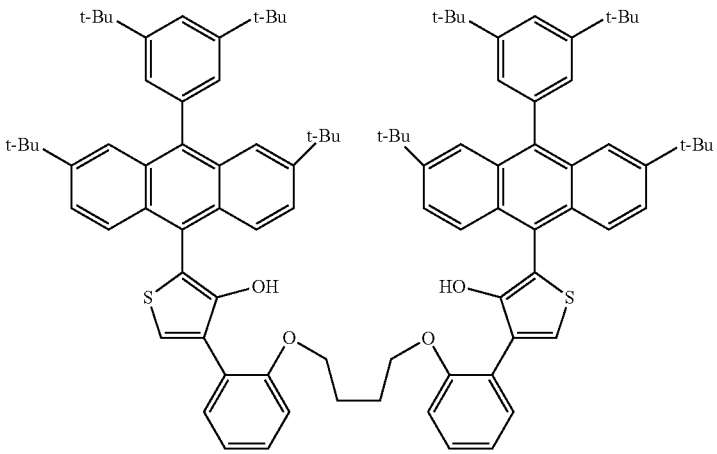

The procedure was similar to Example 44. The two-step reaction provided a 47% yield of a golden yellow amorphous foam.

$^1$H NMR (500 MHz, Chloroform-d) δ 8.02 (d, J=9.2 Hz, 4H), 7.78 (d, J=2.0 Hz, 4H), 7.65 (dd, J=7.6, 1.7 Hz, 2H), 7.60 (t, J=1.9 Hz, 2H), 7.52 (dd, J=9.2, 2.0 Hz, 4H), 7.48 (s, 2H), 7.40 (dt, J=8.1, 1.7 Hz, 4H), 7.29 (td, J=7.8, 1.8 Hz, 2H), 7.15 (td, J=7.5, 1.1 Hz, 2H), 6.85-6.78 (m, 2H), 6.64 (s, 2H), 4.01 (d, J=4.7 Hz, 4H), 1.95 (q, J=2.9, 2.2 Hz, 4H), 1.47 (s, 18H), 1.46 (s, 18H), 1.29 (s, 36H). $^{13}$C NMR (126 MHz, Chloroform-d) δ 154.37, 150.32, 150.29, 149.60, 146.76, 139.56, 137.84, 131.58, 131.22, 130.21, 129.20, 126.28, 125.97, 124.96, 124.93, 124.61, 122.54, 122.23, 121.97, 120.49, 115.31, 113.56, 69.40, 35.07, 34.92, 31.71, 31.69, 30.92, 26.06.

Characterization of the Protected Ligand:
$^1$H NMR (400 MHz, Chloroform-d) δ 8.02 (d, J=9.3 Hz, 4H), 7.67 (d, J=1.9 Hz, 4H), 7.60 (dd, J=7.5, 1.8 Hz, 2H), 7.52 (t, J=1.8 Hz, 2H), 7.51 (d, J=0.9 Hz, 3H), 7.48 (d, J=2.0 Hz, 2H), 7.29 (dt, J=11.3, 1.6 Hz, 4H), 7.26-7.23 (m, 2H), 7.00 (td, J=7.5, 1.0 Hz, 2H), 6.97 (dd, J=8.3, 1.0 Hz, 2H), 4.45 (s, 4H), 4.14 (m, 4H), 2.68 (q, J=7.0 Hz, 4H), 2.10 (m, 4H), 1.39 (s, 18H), 1.38 (s, 18H), 1.24 (s, 36H), 0.44 (t, J=7.0 Hz, 6H). $^{13}$C NMR (101 MHz, Chloroform-d) δ 156.67, 151.30, 150.27, 150.18, 146.73, 139.47, 137.70, 132.60, 131.26, 130.00, 129.93, 128.73, 126.44, 125.94, 125.78, 125.16, 124.84, 124.71, 123.17, 122.24, 121.62, 120.48, 120.37, 112.28, 96.86, 68.12, 64.20, 34.98, 34.96, 34.87, 31.61, 31.59, 30.83, 26.25, 14.17.

Example 77: Synthesis of Procatalyst 52

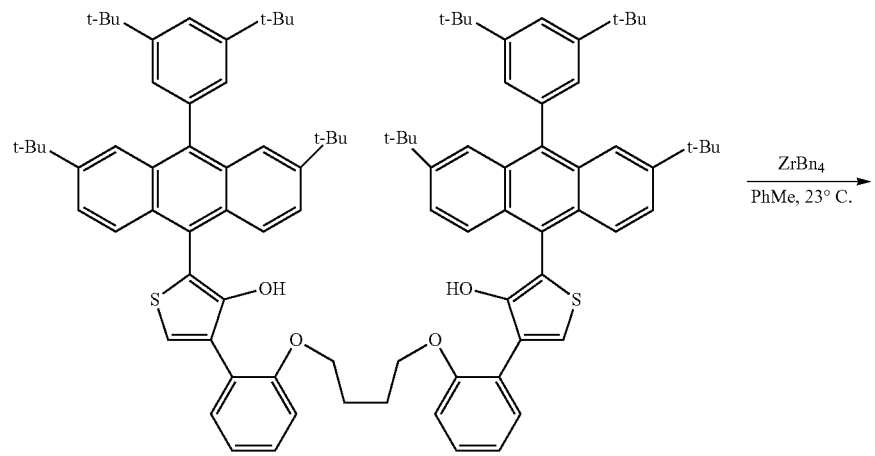

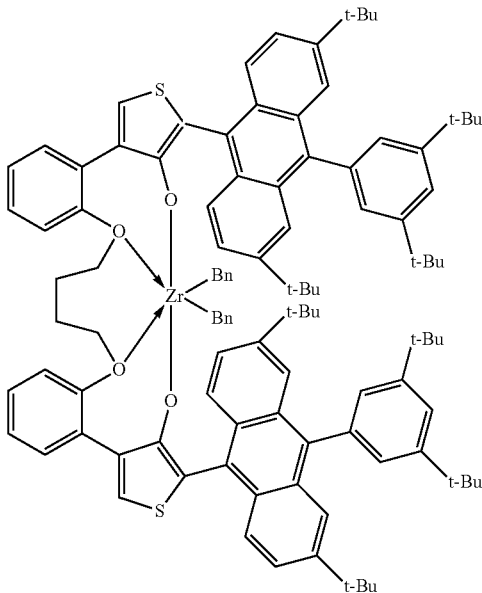
The procedure was similar to Example 16.
Only Peaks of the Major Isomer are Listed:
$^1$H NMR (400 MHz, Benzene-$d_6$) δ 8.72-8.67 (m, 2H), 8.24 (dt, J=2.4, 1.2 Hz, 2H), 8.11-8.04 (m, 2H), 7.81 (dd, J=2.0, 0.6 Hz, 2H), 7.66 (t, J=1.9 Hz, 2H), 7.60 (t, J=1.6 Hz, 2H), 7.45-7.24 (m, 8H), 7.05 (s, 2H), 7.04-6.79 (m, 10H), 6.74 (td, J=7.2, 1.3 Hz, 2H), 5.85-5.81 (m, 4H), 5.00 (dd, J=8.0, 1.4 Hz, 2H), 4.19-4.10 (m, 2H), 3.34 (d, J=11.8 Hz, 2H), 1.36 (s, 18H), 1.25 (s, 18H), 1.24 (s, 18H), 1.24-1.15 (m, 2H), 1.10 (s, 18H), 0.95-0.91 (m, 2H), 0.61 (d, J=11.9 Hz, 2H), 0.20 (d, J=11.9 Hz, 2H). $^{13}$C NMR (126 MHz, Benzene-$d_6$) δ 156.02, 155.85, 150.85, 150.68, 150.40, 147.60, 146.78, 146.28, 139.19, 138.76, 133.45, 131.64, 131.30, 130.64, 130.55, 130.20, 129.62, 129.31, 128.17, 126.10, 125.82, 125.41, 123.61, 123.17, 121.99, 121.58, 120.34, 120.29, 114.84, 109.99, 72.76, 72.01, 34.81, 34.74, 34.67, 34.63, 31.42, 31.29, 30.75, 30.60, 25.72.
Example 78: Synthesis of Procatalyst 53
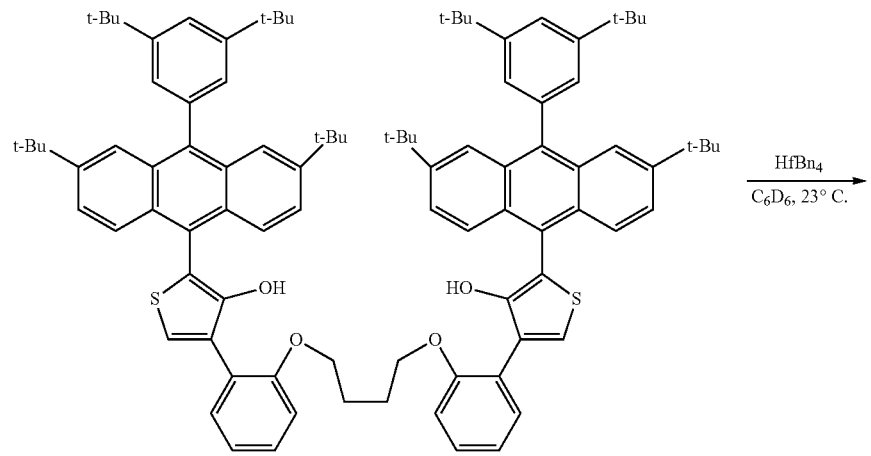

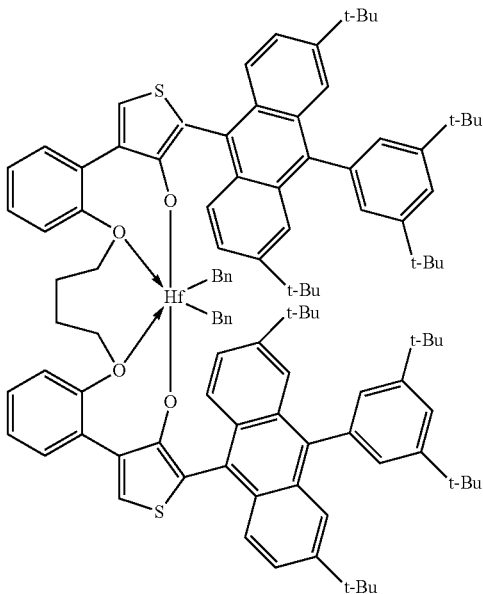
The procedure was similar to Example 17.
¹H NMR (400 MHz, Benzene-d₆) δ 8.68 (d, J=9.2 Hz, 2H), 8.25 (d, J=2.0 Hz, 2H), 8.01 (d, J=9.4 Hz, 2H), 7.81 (d, J=1.9 Hz, 2H), 7.67 (t, J=1.8 Hz, 2H), 7.61 (t, J=1.6 Hz, 2H), 7.39-7.35 (m, 4H), 7.31-7.26 (m, 4H), 7.05 (s, 2H), 7.09-6.85 (m, 10H), 6.76-6.70 (m, 2H), 5.93-5.86 (m, 4H), 4.95 (dd, J=7.9, 1.5 Hz, 2H), 4.14 (d, J=11.5 Hz, 2H), 3.33 (d, J=11.7 Hz, 2H), 1.36 (s, 18H), 1.34-1.31 (m, 2H), 1.25 (s, 18H), 1.24 (s, 18H), 1.11 (s, 18H), 0.91-0.84 (m, 2H), 0.50 (d, J=13.1 Hz, 2H), −0.09 (d, J=13.1 Hz, 2H). ¹³C NMR (101 MHz, Benzene-d₆) δ 156.08, 155.66, 150.85, 150.41, 147.82, 147.64, 146.26, 139.12, 138.79, 133.13, 131.61, 131.32, 130.62, 130.13, 129.42, 129.39, 128.89, 128.13, 127.97, 127.03, 127.00, 126.91, 126.79, 126.31, 126.25, 125.81, 125.66, 125.59, 125.26, 115.09, 80.70, 77.66, 34.79, 34.73, 34.64, 34.62, 31.40, 31.29, 30.73, 30.59, 25.84.
Example 79: Synthesis of Ligand 23
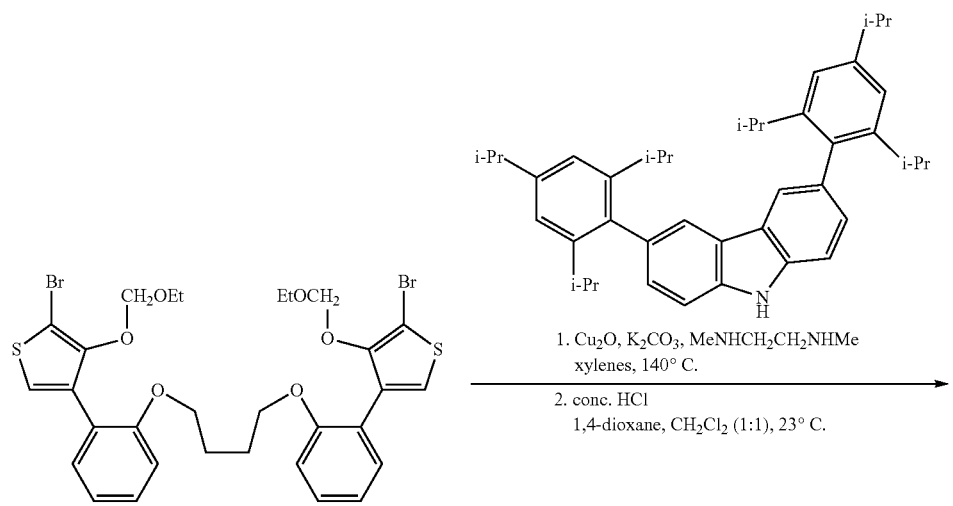

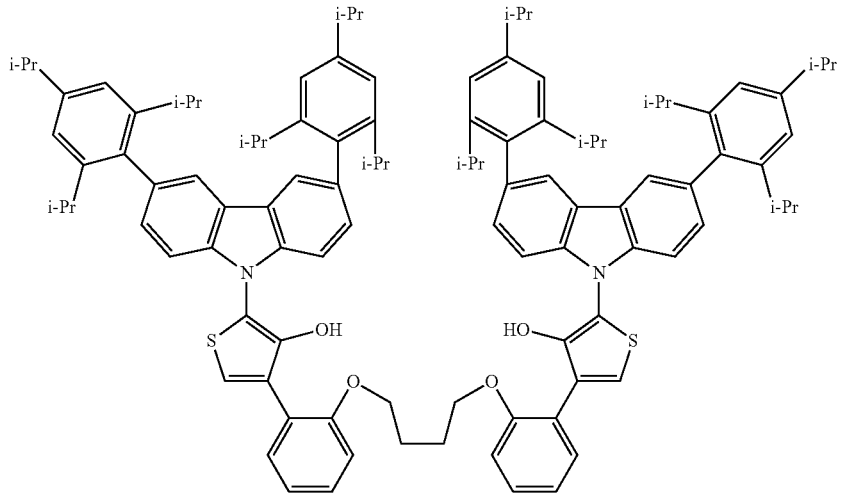

The procedure was similar to Example 38. The two-step reaction provided a 16% yield of a pale yellow foam.

¹H NMR (400 MHz, Chloroform-d) δ 7.91 (d, J=1.5 Hz, 4H), 7.55 (dd, J=7.6, 1.8 Hz, 2H), 7.46 (d, J=8.3 Hz, 4H), 7.28-7.21 (m, 8H), 7.16-7.09 (m, 10H), 7.00 (s, 2H), 6.95 (dd, J=8.3, 1.1 Hz, 2H), 4.15 (d, J=5.1 Hz, 4H), 3.01 (hept, J=6.9 Hz, 4H), 2.79 (hept, J=7.0 Hz, 8H), 2.03 (h, J=2.7 Hz, 4H), 1.38 (d, J=6.9 Hz, 24H), 1.13 (d, J=5.9 Hz, 36H), 1.06 (d, J=6.8 Hz, 12H). ¹³C NMR (101 MHz, Chloroform-d) δ 154.20, 148.01, 147.75, 147.15, 141.02, 137.48, 132.93, 131.44, 130.77, 129.69, 128.24, 124.53, 123.29, 122.98, 121.15, 120.56, 119.59, 115.23, 113.97, 109.84, 69.79, 34.35, 30.27, 26.03, 24.36, 24.18.

Characterization of the Protected Ligand:

¹H NMR (400 MHz, Chloroform-d) δ 7.84 (s, 4H), 7.55 (t, J=6.8 Hz, 6H), 7.37 (s, 2H), 7.28 (dd, J=8.3, 1.5 Hz, 4H), 7.26-7.20 (m, 2H), 7.10 (d, J=3.3 Hz, 8H), 7.00 (t, J=7.5 Hz, 2H), 6.95 (d, J=8.3 Hz, 2H), 4.62 (s, 4H), 4.12 (d, J=5.2 Hz, 4H), 2.97 (hept, J=6.9 Hz, 4H), 2.84 (q, J=7.0 Hz, 4H), 2.74 (h, J=6.9 Hz, 8H), 2.07 (d, J=5.0 Hz, 4H), 1.34 (d, J=6.9 Hz, 24H), 1.09 (d, J=6.9 Hz, 48H), 0.54 (t, J=7.0 Hz, 6H). ¹³C NMR (101 MHz, Chloroform-d) δ 156.44, 148.84, 147.72, 147.15, 146.97, 140.95, 137.42, 132.92, 132.03, 130.91, 129.16, 128.30, 123.98, 123.21, 122.69, 120.92, 120.58, 120.57, 120.51, 112.36, 110.12, 97.06, 34.29, 30.24, 26.17, 24.38, 24.31, 24.29, 24.12, 14.11.

Example 80: Synthesis of Procatalyst 54

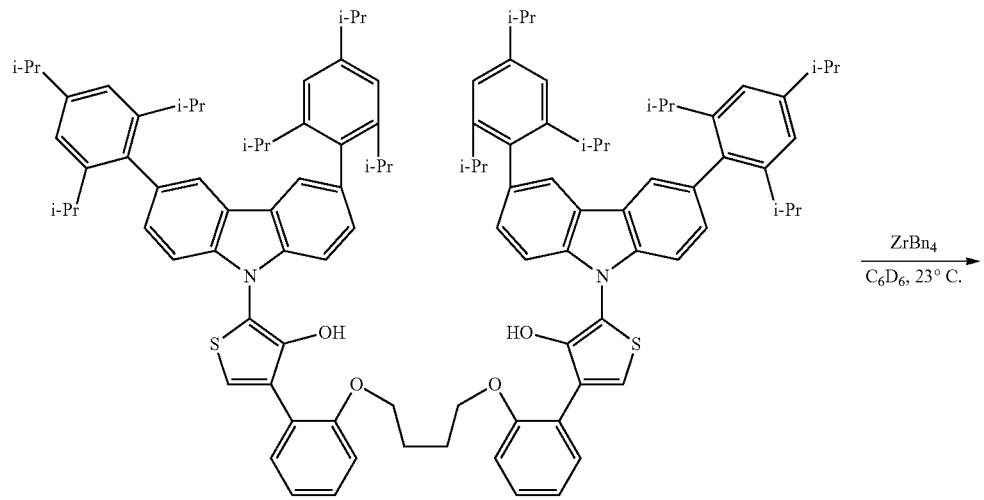

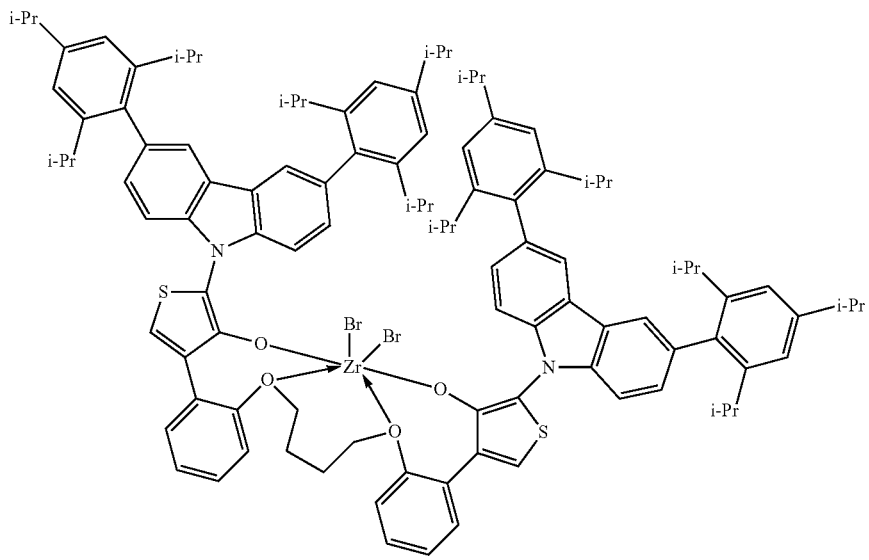
The procedure was similar to Example 16.
Chemical Shifts of the Major Isomer are Listed Below:
$^1$H NMR (400 MHz, Benzene-$d_6$) δ 8.09 (d, J=1.5 Hz, 2H), 7.97 (d, J=1.2 Hz, 2H), 7.75 (d, J=8.3 Hz, 2H), 7.41-7.35 (m, 4H), 7.25-7.12 (m, 10H), 6.97-6.94 (m, 4H), 6.85-6.75 (m, 6H), 6.62 (s, 2H), 6.61-6.55 (m, 2H), 6.12-6.05 (m, 4H), 5.89 (dd, J=8.0, 1.4 Hz, 2H), 4.13 (t, J=10.2 Hz, 2H), 3.42 (d, J=11.5 Hz, 2H), 3.09-2.69 (m, 12H), 1.86 (d, J=11.8 Hz, 2H), 1.38-0.97 (m, 62H), 0.97-0.88 (m, 6H), 0.85 (d, J=6.8 Hz, 6H), 0.89-0.80 (m, 2H), 0.76-0.65 (m, 2H). $^{13}$C NMR (101 MHz, Benzene-$d_6$) δ 155.12, 152.04, 148.20, 148.08, 147.83, 147.70, 147.66, 147.09, 146.69, 146.51, 140.61, 140.33, 137.84, 137.67, 133.67, 133.26, 133.00, 128.84, 128.15, 126.38, 124.55, 122.75, 122.54, 121.41, 121.13, 120.79, 120.75, 120.50, 120.44, 120.35, 120.10, 117.19, 115.44, 112.27, 108.98, 79.88, 75.02, 34.57, 34.48, 30.54, 30.49, 30.43, 30.34, 25.91, 24.78, 24.29, 24.27, 24.24, 24.11, 24.08, 24.04, 24.02.
Example 81: Synthesis of Procatalyst 55
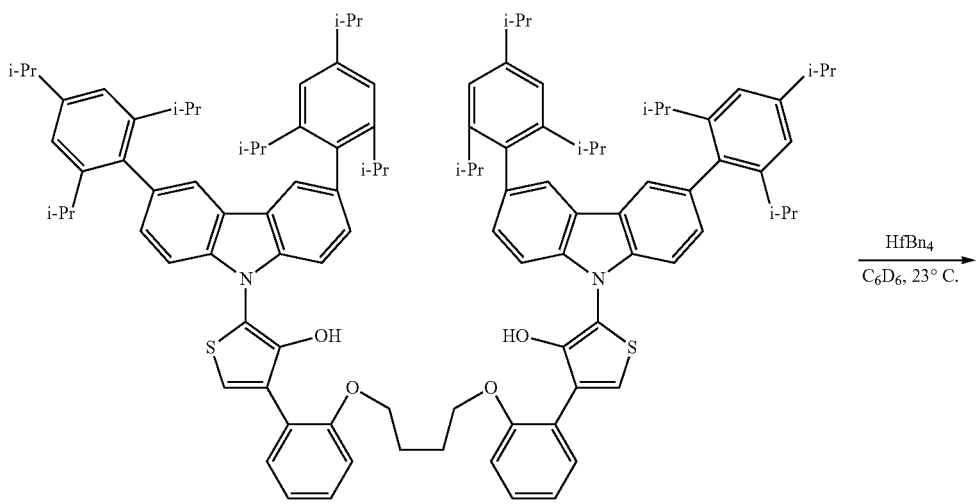

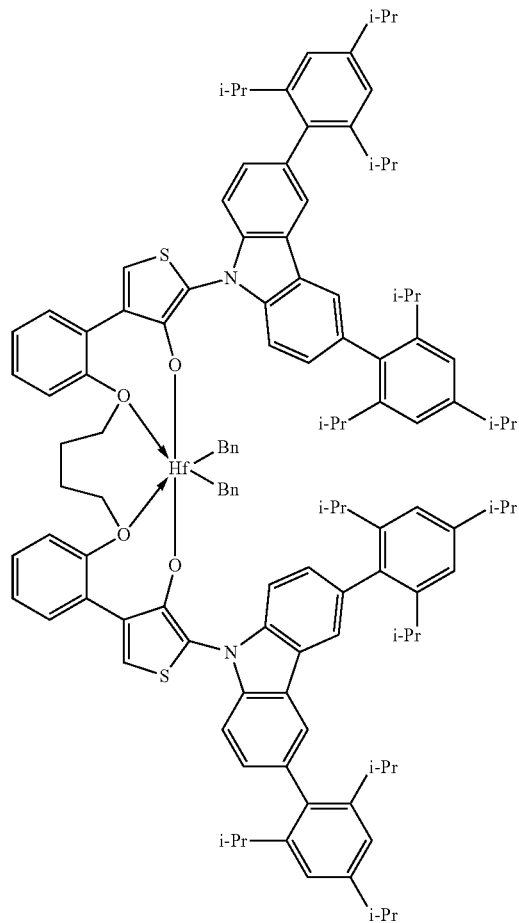
The procedure was similar to Example 17.
Chemical Shifts of the Major Isomer are Listed Below:
$^1$H NMR (400 MHz, Benzene-d$_6$) δ 8.11 (dd, J=1.7, 0.6 Hz, 2H), 8.01-7.98 (m, 2H), 7.75-7.71 (m, 2H), 7.42-7.32 (m, 6H), 7.26 (s, 4H), 7.16 (dd, J=7.4, 2.0 Hz, 4H), 7.11 (dd, J=5.3, 2.4 Hz, 2H), 6.98-6.93 (m, 2H), 6.91-6.74 (m, 6H), 6.61 (s, 2H), 6.59-6.54 (m, 2H), 6.18-6.12 (m, 4H), 5.82 (dd, J=7.9, 1.6 Hz, 2H), 4.23 (t, J=10.7 Hz, 2H), 3.44 (d, J=11.2 Hz, 2H), 3.09-2.68 (m, 12H), 1.78 (d, J=13.0 Hz, 2H), 1.29 (dt, J=6.8, 1.9 Hz, 18H), 1.19 (ddd, J=7.1, 3.6, 2.0 Hz, 18H), 1.17-1.14 (m, 6H), 1.14-1.11 (m, 6H), 1.09 (dd, J=7.0, 1.9 Hz, 6H), 1.06 (d, J=6.8 Hz, 6H), 0.94 (d, J=6.8 Hz, 6H), 0.86 (d, J=6.9 Hz, 6H), 0.78 (d, J=8.5 Hz, 2H), 0.72 (d, J=13.1 Hz, 2H), 0.61 (d, J=13.2 Hz, 2H). $^{13}$C NMR (101 MHz, Benzene-d$_6$) δ 155.15, 151.90, 148.22, 147.82, 147.72, 147.60, 147.09, 146.58, 140.43, 140.12, 137.87, 137.66, 133.67, 133.24, 132.70, 131.67, 130.15, 129.85, 129.35, 129.02, 128.54, 128.15, 127.14, 126.61, 126.55, 126.18, 124.54, 124.32, 123.30, 122.60, 121.36, 121.06, 120.79, 120.75, 120.52, 120.33, 120.08, 116.92, 116.04, 112.43, 108.83, 81.55, 79.59, 34.57, 34.48, 30.54, 30.42, 30.33, 26.26, 24.79, 24.42, 24.36, 24.32, 24.29, 24.26, 24.10, 24.08, 24.04, 23.97, 23.91.

Example 82: Synthesis of Ligand 24

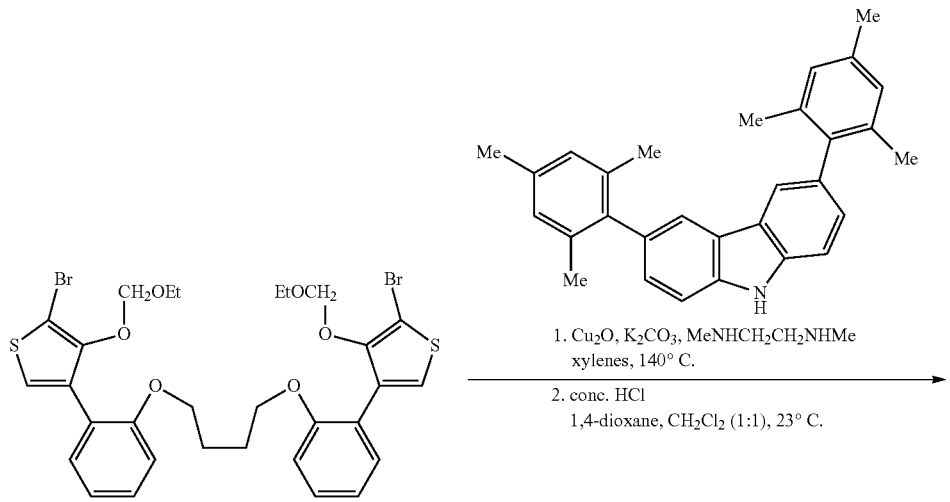

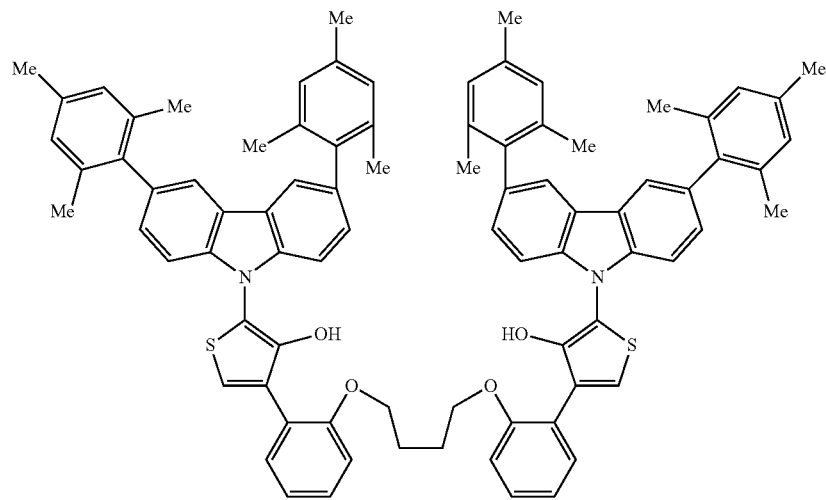

The procedure was similar to Example 38. The two-step reaction provided a 9% yield of a pale yellow foam.

$^1$H NMR (400 MHz, Chloroform-d) δ 7.79 (s, 4H), 7.44 (dd, J=8.0, 4.6 Hz, 6H), 7.30 (td, J=7.9, 1.8 Hz, 2H), 7.15 (td, J=7.5, 1.0 Hz, 2H), 7.10 (s, 2H), 7.05 (dd, J=8.3, 1.6 Hz, 4H), 7.00 (s, 4H), 6.96-6.92 (m, 2H), 6.91 (s, 4H), 6.76 (s, 2H), 4.10-4.04 (m, 4H), 2.38 (s, 12H), 2.06 (s, 12H), 2.00 (t, J=3.4 Hz, 4H), 1.91 (s, 12H). $^{13}$C NMR (101 MHz, Chloroform-d) δ 154.07, 148.15, 141.09, 139.57, 136.65, 136.28, 133.18, 131.44, 130.59, 129.55, 128.01, 128.00-127.92 (m), 127.43, 124.49, 123.68, 123.02, 120.70, 119.97, 115.04, 113.89, 110.25, 70.12, 26.36, 21.07, 20.93.

Characterization of the Protected Ligand:

$^1$H NMR (400 MHz, Chloroform-d) δ 7.81 (s, 4H), 7.55 (dd, J=8.4, 4.0 Hz, 6H), 7.31 (s, 2H), 7.24 (dt, J=13.7, 8.0 Hz, 6H), 7.05-6.92 (m, 12H), 4.58 (s, 4H), 4.13 (d, J=4.8 Hz, 4H), 2.84 (q, J=7.0 Hz, 4H), 2.37 (s, 12H), 2.10-2.05 (m, 4H), 2.07 (s, 12H), 2.05 (s, 12H), 0.55 (t, J=7.0 Hz, 6H).

Example 83: Synthesis of Procatalyst 56
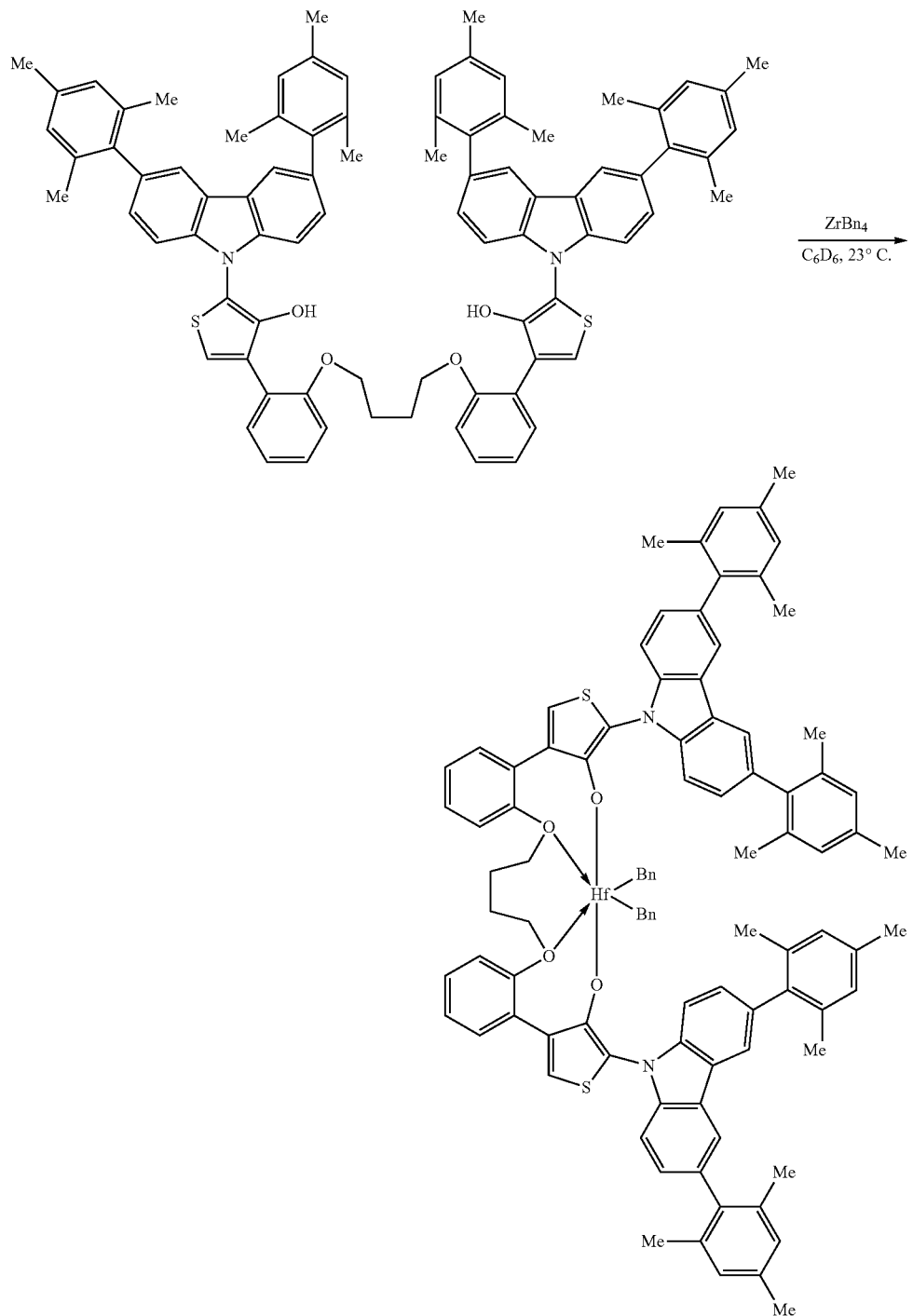
The procedure was similar to Example 16.
Identifiable Chemical Shifts of the Major Isomer are Listed Below:
$^1$H NMR (400 MHz, Benzene-d$_6$) δ 7.93 (dd, J=1.6, 0.7 Hz, 2H), 7.79-7.74 (m, 4H), 7.50-7.45 (m, 2H), 7.41 (dd, J=8.4, 0.7 Hz, 2H), 7.33-7.22 (m, 4H), 6.95 (dddt, J=5.9, 2.1, 1.4, 0.7 Hz, 6H), 6.93-6.87 (m, 2H), 6.87-6.83 (m, 6H), 6.81-6.76 (m, 2H), 6.70-6.63 (m, 2H), 6.62 (s, 2H), 6.12 (dd, J=8.3, 1.3 Hz, 4H), 5.75 (dd, J=8.3, 1.2 Hz, 2H), 4.20 (t, J=10.6 Hz, 2H), 3.45 (d, J=12.5 Hz, 2H), 2.23 (s, 6H), 2.21 (s, 6H), 2.14 (s, 6H), 2.11 (s, 6H), 2.10 (s, 6H), 1.88 (s, 6H), 1.72 (d, J=12.2 Hz, 2H), 0.90 (d, J=12.2 Hz, 2H), 0.87-0.74 (m, 2H), 0.64 (d, J=13.0 Hz, 2H). $^{13}$C NMR (101 MHz, Benzene-d$_6$) δ 155.52, 151.75, 146.75, 140.31, 139.99, 139.56, 139.44, 136.69, 136.55, 136.26, 135.84, 135.80, 135.58, 134.03, 133.62, 133.10, 130.53, 130.35, 128.94, 128.44, 128.25, 126.26, 124.92, 123.10, 121.39, 120.94, 120.54, 116.94, 115.57, 112.75, 109.22, 80.80, 76.08, 26.15, 21.37, 21.02, 21.00, 20.91, 20.81, 20.72.
Example 84: Synthesis of Procatalyst 57
2H), 6.96 (tdd, J=3.6, 1.4, 0.7 Hz, 6H), 6.90 (tt, J=7.5, 2.3 Hz, 4H), 6.87-6.83 (m, 2H), 6.79 (td, J=7.6, 1.2 Hz, 2H), 6.70-6.64 (m, 2H), 6.62 (s, 2H), 6.63-6.58 (m, 4H), 6.13 (dd, J=8.2, 1.3 Hz, 4H), 5.75 (dd, J=8.3, 1.2 Hz, 2H), 4.27 (t, J=10.7 Hz, 2H), 3.57-3.44 (m, 3H), 2.23 (s, 6H), 2.21 (s, 7H), 2.14 (s, 7H), 2.11 (s, 6H), 2.10 (s, 8H), 1.89 (s, 6H),
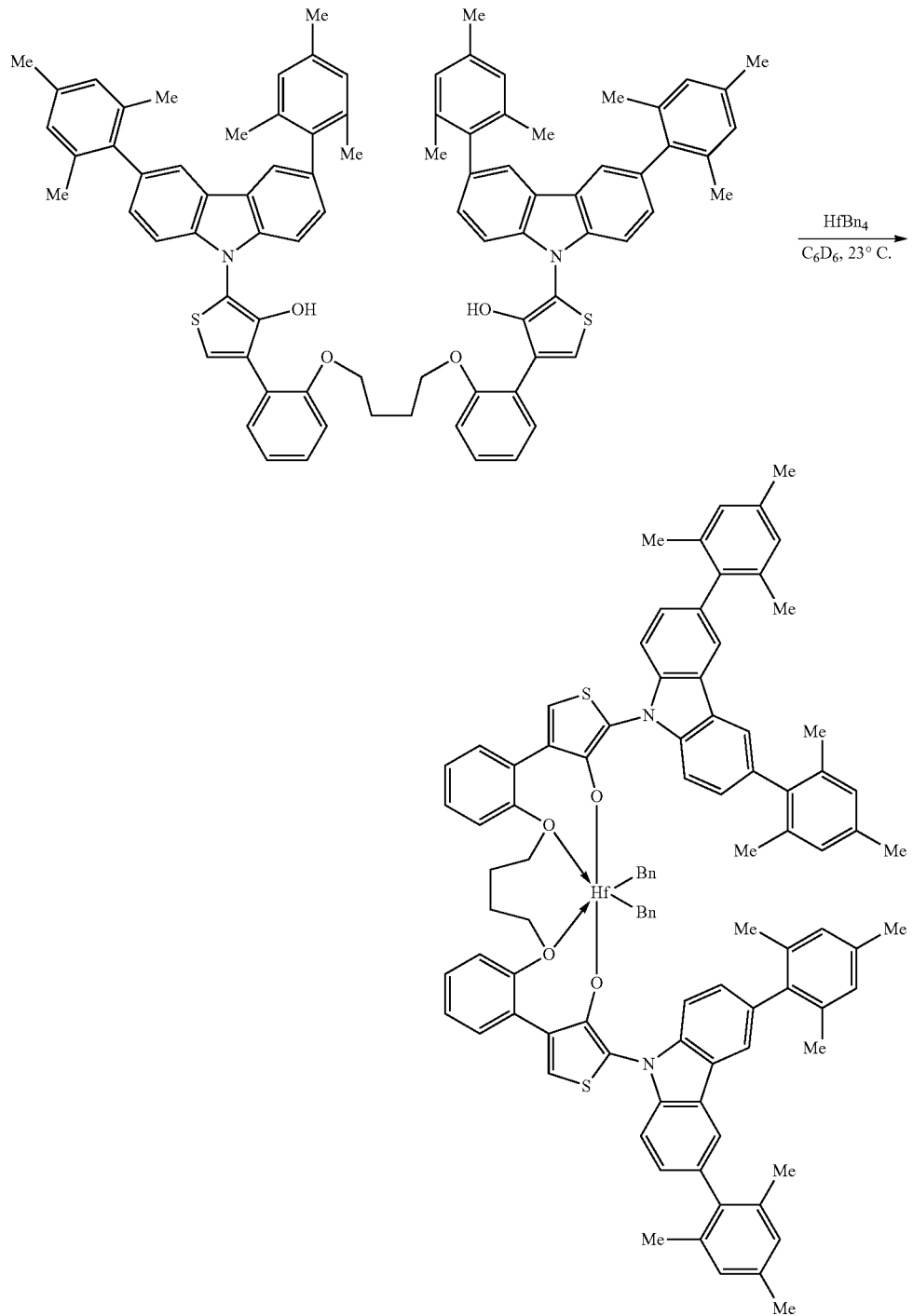
The procedure was similar to Example 17.
¹H NMR (400 MHz, Benzene-d₆) δ 7.94 (dd, J=1.6, 0.6 Hz, 2H), 7.79 (t, J=1.1 Hz, 2H), 7.75 (dd, J=8.2, 0.7 Hz, 2H), 7.32 (d, J=0.8 Hz, 2H), 7.31 (d, J=1.5 Hz, 2H), 7.26-7.23 (m, 1.55 (d, J=13.2 Hz, 2H), 0.79 (q, J=9.4, 8.8 Hz, 3H), 0.64 (d, J=13.2 Hz, 2H), 0.60-0.50 (m, 2H). ¹³C NMR (101 MHz, Benzene-d₆) δ 155.43, 151.81, 147.43, 140.20, 139.91, 139.58, 139.44, 137.46, 136.74, 136.57, 136.27, 135.55, 134.04, 133.61, 132.77, 131.69, 130.41, 129.85, 129.00, 128.54, 128.45, 128.27, 128.07, 127.06, 126.80, 126.58, 126.22, 125.26, 124.92, 123.34, 123.02, 121.38, 120.96, 120.47, 116.82, 116.02, 112.81, 109.15, 81.81, 79.70, 26.36, 21.39, 21.05, 21.00, 20.90, 20.81, 20.72.

Example 85: Synthesis of Ligand 25

Chloroform-d) δ 154.06, 151.03, 148.00, 141.74, 141.55, 135.48, 131.26, 130.87, 129.70, 126.14, 124.23, 124.10, 122.73, 122.07, 120.80, 119.45, 119.24, 115.02, 113.51, 110.45, 69.56, 34.99, 31.59, 25.98.

Characterization of the Protected Ligand:
¹H NMR (400 MHz, Chloroform-d) δ 8.40 (s, 4H), 7.79-7.71 (m, 4H), 7.65-7.41 (m, 20H), 7.28 (t, J=7.8 Hz,

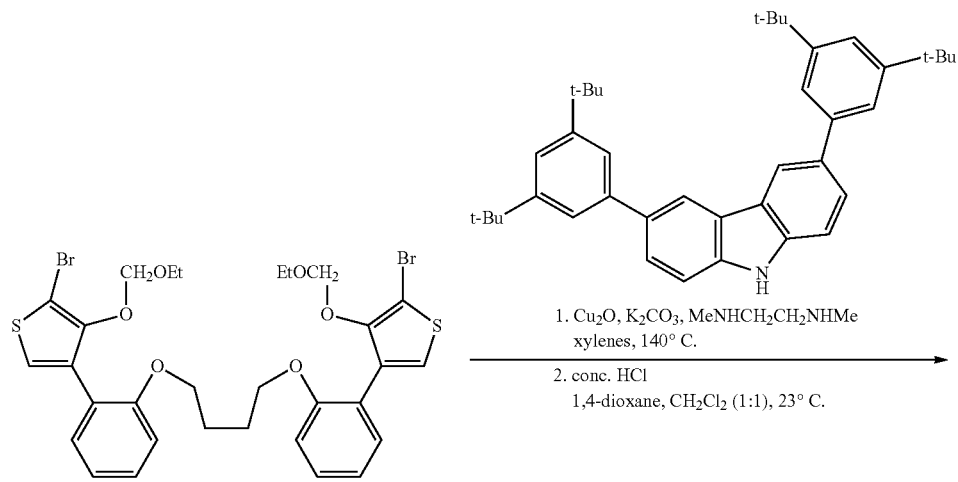

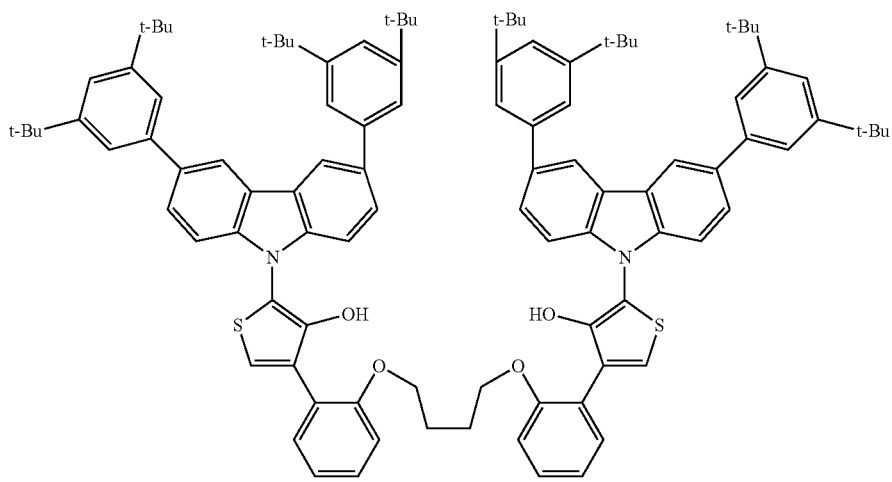

The procedure was similar to Example 38. The two-step reaction provided a 25% yield of a pale yellow foam.
¹H NMR (400 MHz, Chloroform-d) δ 8.32 (d, J=1.6 Hz, 4H), 7.61 (dd, J=8.5, 1.7 Hz, 4H), 7.53-7.47 (m, 10H), 7.44 (t, J=1.8 Hz, 4H), 7.41 (d, J=8.4 Hz, 4H), 7.18 (s, 2H), 7.10 (td, J=7.8, 1.9 Hz, 2H), 7.04 (td, J=7.5, 1.2 Hz, 2H), 6.90 (s, 2H), 6.79 (dd, J=8.1, 1.2 Hz, 2H), 4.03 (d, J=4.9 Hz, 4H), 1.94-1.84 (m, 4H), 1.41 (s, 72H). ¹³C NMR (101 MHz, 2H), 7.05 (q, J=8.3, 7.9 Hz, 4H), 4.62 (s, 4H), 4.21 (d, J=5.2 Hz, 4H), 2.92 (q, J=7.0 Hz, 4H), 2.21-2.11 (m, 4H), 1.49 (s, 72H), 0.62 (t, J=7.0 Hz, 6H). ¹³C NMR (101 MHz, Chloroform-d) δ 156.55, 151.12, 149.20, 141.73, 141.55, 135.72, 132.2 3, 131.04, 129.27, 126.40, 124.12, 122.11, 121.74, 120.93, 120.77, 120.59, 119.17, 112.34, 110.87, 96.83, 68.21, 64.56, 35.07, 31.68, 26.33, 14.29.

Example 86: Synthesis of Procatalyst 58
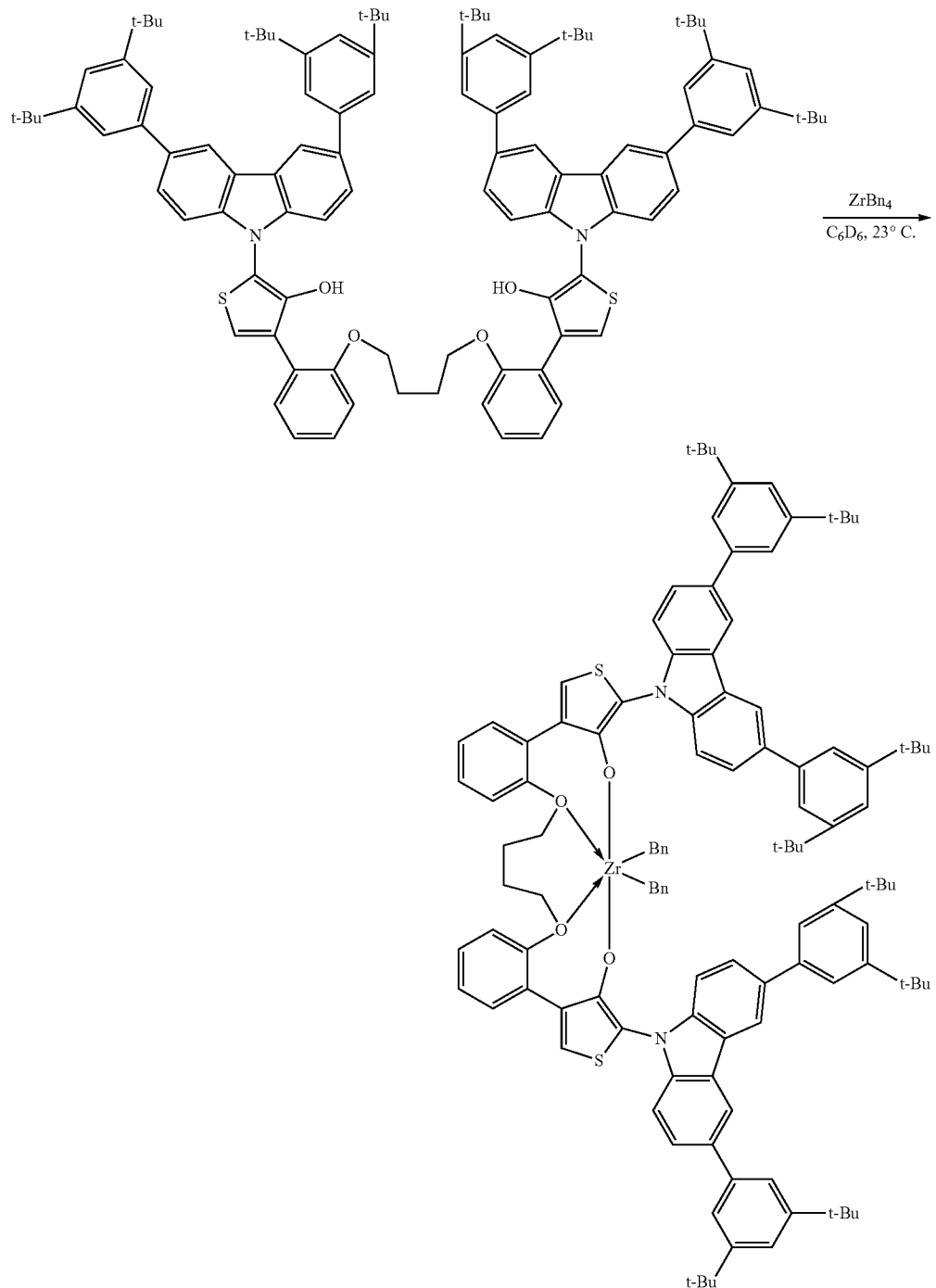
The procedure was similar to Example 16.
$^1$H NMR (400 MHz, Benzene-d$_6$) δ 8.56 (dd, J=1.7, 0.7 Hz, 2H), 8.10 (dd, J=1.8, 0.6 Hz, 2H), 7.78 (d, J=1.8 Hz, 4H), 7.77-7.70 (m, 4H), 7.65 (dd, J=8.5, 1.7 Hz, 2H), 7.60 (t, J=1.8 Hz, 2H), 7.53 (d, J=1.8 Hz, 4H), 7.47 (t, J=1.8 Hz, 2H), 7.34 (dd, J=8.4, 0.6 Hz, 2H), 7.13 (dd, J=7.7, 1.8 Hz, 2H), 7.01-6.96 (m, 4H), 6.94-6.89 (m, 2H), 6.73 (dddd, J=7.4, 6.1, 5.1, 1.2 Hz, 4H), 6.67 (s, 2H), 6.17-6.09 (m, 4H), 5.19 (dd, J=8.3, 1.1 Hz, 2H), 4.09 (t, J=10.5 Hz, 2H), 3.50-3.37 (m, 2H), 1.38 (s, 36H), 1.33 (s, 36H), 1.02 (d, J=12.1 Hz, 2H), 0.89-0.76 (m, 2H), 0.73-0.60 (m, 2H), 0.54 (d, J=12.1 Hz, 2H). $^{13}$C NMR (101 MHz, Benzene-d$_6$) δ 155.92, 152.28, 151.21, 150.56, 146.08, 142.48, 142.00, 141.42, 141.01, 136.51, 135.85, 133.02, 131.32, 130.44, 128.74, 128.15, 126.92, 125.90, 125.55, 125.26, 123.49, 123.30, 122.67, 122.36, 120.98, 120.58, 120.08, 119.62, 119.34, 117.07, 115.30, 112.77, 110.05, 80.79, 74.27, 34.79, 34.66, 31.43, 31.40, 31.37, 25.86.
Example 87: Synthesis of Procatalyst 59
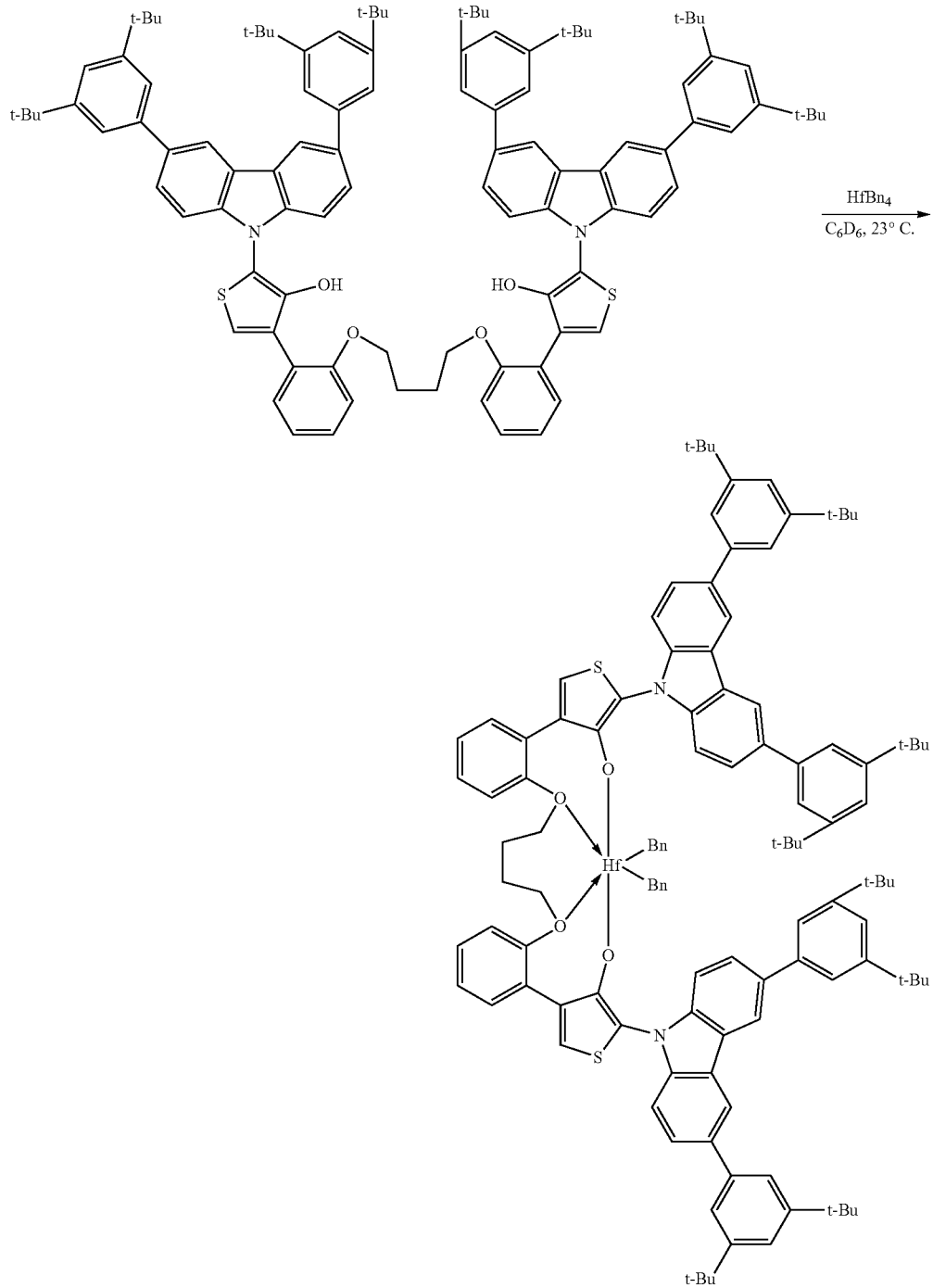
The procedure was similar to Example 17.
$^1$H NMR (400 MHz, Benzene-$d_6$) δ 8.61-8.55 (m, 2H), 8.10 (d, J=1.6 Hz, 2H), 7.78 (d, J=1.8 Hz, 4H), 7.76-7.67 (m, 4H), 7.65-7.58 (m, 4H), 7.53 (d, J=1.8 Hz, 4H), 7.47 (t, J=1.8 Hz, 2H), 7.26 (d, J=8.6 Hz, 2H), 7.13 (dd, J=7.7, 1.8 Hz, 2H), 7.05-6.99 (m, 2H), 6.98-6.90 (m, 4H), 6.74 (td, J=7.5, 1.1 Hz, 2H), 6.72-6.68 (m, 2H), 6.67 (s, 2H), 6.20-6.12 (m, 4H), 5.21-5.15 (m, 2H), 4.11 (t, J=10.8 Hz, 2H), 3.48 (d, J=9.3 Hz, 2H), 1.38 (s, 36H), 1.34 (s, 36H), 0.91 (d, J=13.2 Hz, 2H), 0.87-0.73 (m, 2H), 0.57 (d, J=13.0 Hz, 2H), 0.28 (d, J=13.2 Hz, 2H). $^{13}$C NMR (101 MHz, Benzene-$d_6$) δ 155.72, 152.33, 151.21, 150.55, 147.05, 142.51, 142.00, 141.35, 140.99, 136.54, 135.86, 132.67, 131.36, 130.50, 128.81, 128.15, 127.13, 127.08, 126.15, 125.62, 125.33, 125.26, 123.83, 123.23, 122.69, 122.35, 120.92, 120.58, 120.05, 119.58, 119.29, 116.96, 115.76, 112.85, 110.06, 81.80, 78.41, 34.79, 34.66, 31.45, 31.40, 26.05.

Example 88: Synthesis of Ligand 26

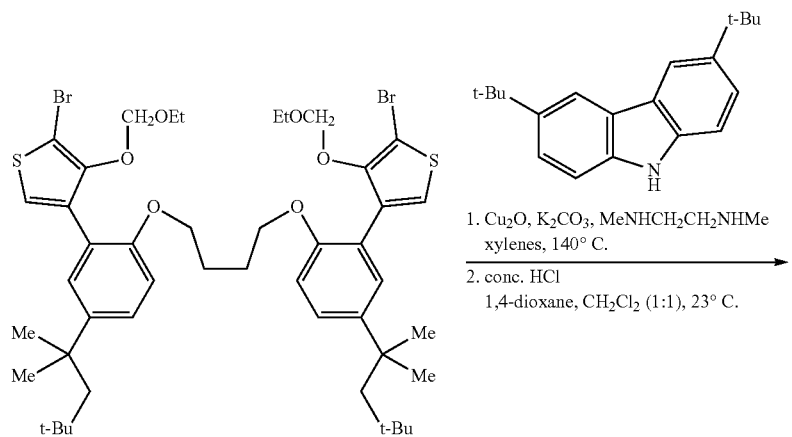

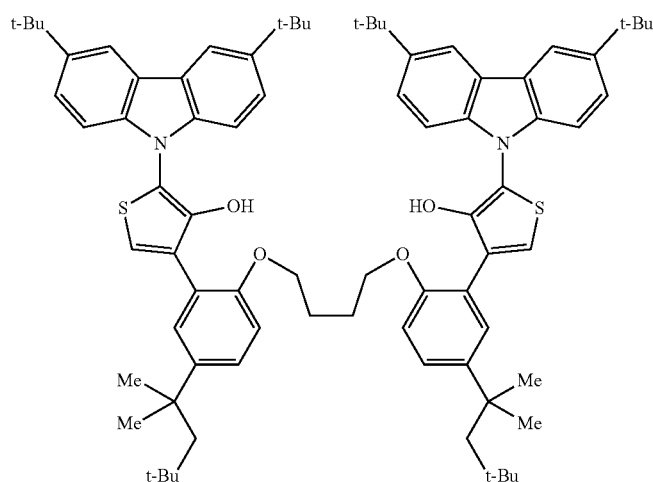

The procedure was similar to Example 38. The two-step reaction provided a 22% yield of a white foam.

$^1$H NMR (500 MHz, Chloroform-d) δ 8.16 (dd, J=1.9, 0.6 Hz, 4H), 7.56 (d, J=2.5 Hz, 2H), 7.48 (dd, J=8.6, 1.9 Hz, 4H), 7.35-7.30 (m, 6H), 7.24 (s, 2H), 6.97 (s, 2H), 6.83 (d, J=8.6 Hz, 2H), 4.06 (d, J=4.2 Hz, 4H), 1.92 (q, J=2.7, 1.9 Hz, 4H), 1.81 (s, 4H), 1.49 (s, 36H), 1.45 (s, 12H), 0.82 (s, 18H). $^{13}$C NMR (126 MHz, Chloroform-d) δ 151.86, 147.93, 144.50, 143.11, 140.51, 131.44, 129.16, 127.22, 123.64, 123.53, 123.47, 119.02, 116.32, 115.57, 112.79, 109.73, 69.54, 56.98, 38.22, 34.78, 32.48, 32.11, 31.98, 31.71, 26.15.

Characterization of the Protected Ligand:

$^1$H NMR (400 MHz, Chloroform-d) δ 8.11 (d, J=1.9 Hz, 4H), 7.53-7.46 (m, 6H), 7.39 (d, J=8.6 Hz, 4H), 7.33-7.26 (m, 4H), 6.91 (d, J=8.6 Hz, 2H), 4.51 (s, 4H), 4.12 (d, J=4.7 Hz, 4H), 2.80 (q, J=7.0 Hz, 4H), 2.07 (s, 4H), 1.77 (s, 4H), 1.47 (s, 36H), 1.41 (s, 12H), 0.79 (s, 18H), 0.50 (t, J=7.0 Hz, 6H). $^{13}$C NMR (101 MHz, Chloroform-d) δ 154.30, 148.90, 143.23, 142.07, 140.55, 132.68, 128.72, 126.67, 123.79, 123.47, 123.42, 121.90, 120.33, 116.05, 111.56, 110.08, 96.36, 68.23, 64.38, 56.98, 38.06, 34.74, 32.41, 32.06, 31.90, 31.71, 26.45, 14.13.

Example 89: Synthesis of Procatalyst 60
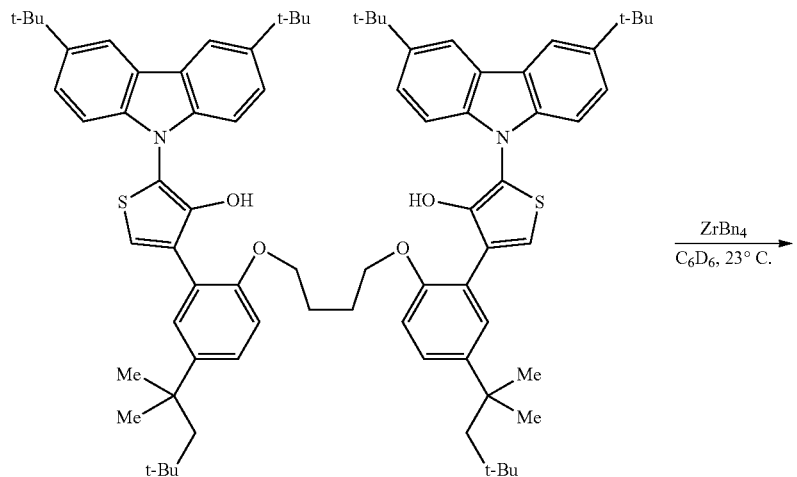
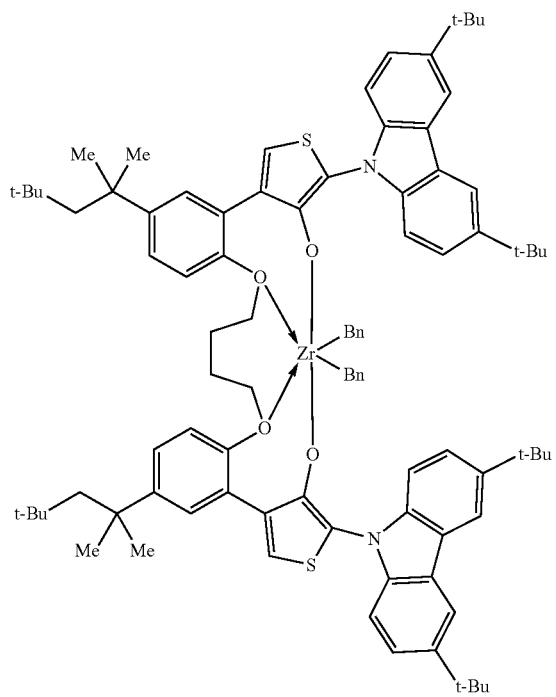
The procedure was similar to Example 16.
$^1$H NMR (500 MHz, Benzene-$d_6$) δ 8.52 (dd, J=2.0, 0.6 Hz, 2H), 8.12 (dd, J=2.0, 0.6 Hz, 2H), 7.74 (dd, J=8.5, 0.6 Hz, 2H), 7.53 (dd, J=8.5, 1.9 Hz, 2H), 7.46-7.40 (m, 4H), 7.25 (dd, J=8.7, 0.6 Hz, 2H), 7.12-7.00 (m, 2H), 6.99-6.95 (m, 4H), 6.84 (tt, J=7.2, 1.3 Hz, 2H), 6.75 (s, 2H), 6.13-6.09 (m, 4H), 5.22 (d, J=8.7 Hz, 2H), 4.13 (t, J=10.8 Hz, 2H), 3.47 (dd, J=12.2, 4.6 Hz, 2H), 1.66 (d, J=14.6 Hz, 2H), 1.57 (s, 18H), 1.51 (d, J=14.6 Hz, 3H), 1.23 (s, 18H), 1.20 (s, 6H), 1.14 (s, 6H), 1.01 (d, J=12.1 Hz, 2H), 0.92 (t, J=9.2 Hz, 3H), 0.72 (s, 18H), 0.67 (d, J=5.4 Hz, 3H), 0.50 (d, J=12.4 Hz, 2H). $^{13}$C NMR (126 MHz, Benzene-$d_6$) δ 153.70, 151.82, 148.69, 146.79, 143.19, 142.99, 139.97, 139.55, 133.73, 128.21, 127.28, 126.81, 125.32, 124.96, 122.86, 122.68, 122.63, 120.61, 116.40, 116.35, 115.96, 115.88, 112.43, 109.47, 80.91, 74.39, 56.60, 38.21, 34.68, 34.37, 32.17, 32.08, 31.68, 31.65, 30.10, 25.85.

Example 90: Synthesis of Procatalyst 61
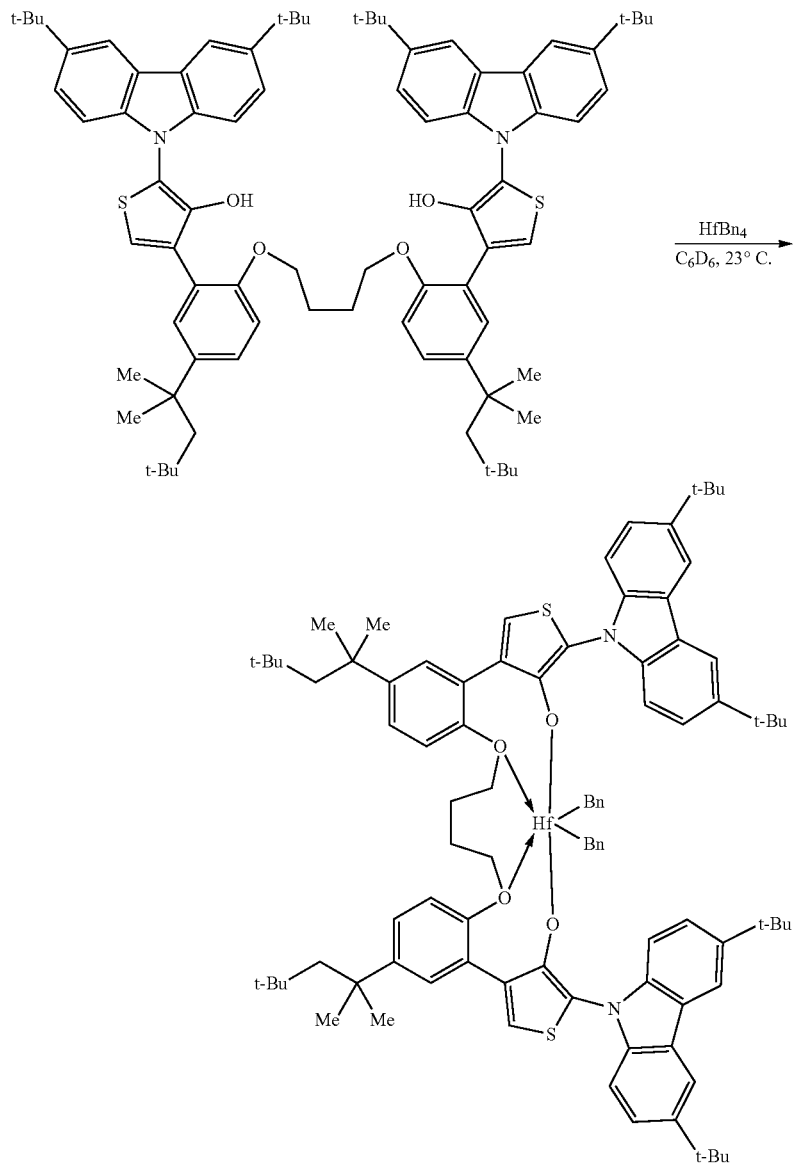
The procedure was similar to Example 17.
$^1$H NMR (500 MHz, Benzene-$d_6$) δ 8.54 (dd, J=2.0, 0.6 Hz, 2H), 8.13 (dd, J=2.0, 0.6 Hz, 2H), 7.72 (dd, J=8.5, 0.6 Hz, 2H), 7.53 (dd, J=8.5, 1.9 Hz, 2H), 7.43-7.40 (m, 4H), 7.15 (dd, J=8.8, 0.6 Hz, 2H), 7.07-7.05 (m, 2H), 7.01-6.95 (m, 4H), 6.81 (tt, J=7.3, 1.3 Hz, 2H), 6.75 (s, 2H), 6.14-6.10 (m, 4H), 5.24 (d, J=8.7 Hz, 2H), 4.24-4.13 (m, 2H), 3.58-3.49 (m, 2H), 1.66 (d, J=14.6 Hz, 2H), 1.57 (s, 18H), 1.51 (d, J=14.6 Hz, 2H), 1.24 (s, 18H), 1.20 (s, 6H), 1.14 (s, 6H), 0.90 (t, J=9.6 Hz, 2H), 0.87-0.81 (m, 2H), 0.72 (s, 18H), 0.61 (d, J=11.0 Hz, 2H), 0.27-0.21 (m, 2H). $^{13}$C NMR (126 MHz, Benzene-$d_6$) δ 153.50, 151.90, 149.03, 147.62, 143.23, 142.99, 139.92, 139.53, 137.49, 133.42, 129.03, 128.26, 128.17, 127.07, 126.99, 125.40, 125.29, 125.01, 122.95, 122.79, 122.56, 120.60, 116.40, 116.37, 116.25, 115.82, 112.50, 109.47, 81.81, 77.97, 56.59, 38.25, 34.69, 34.37, 32.18, 32.08, 31.70, 31.66, 31.59, 30.07, 26.00.
Example 91: Synthesis of Intermediate of Ligand 26
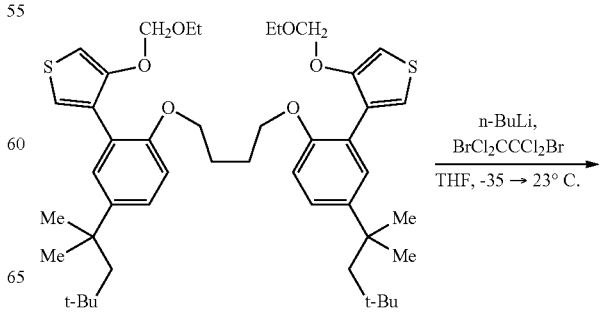

-continued

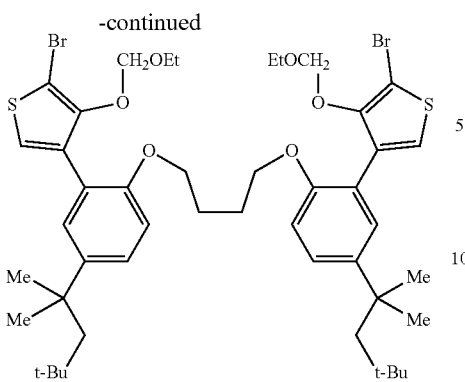

The procedure was similar to Example 37. The reaction provided a 87% yield of a golden yellow amorphous foam.

¹H NMR (400 MHz, Chloroform-d) δ 7.34 (d, J=2.5 Hz, 2H), 7.27-7.22 (m, 2H), 7.21 (s, 2H), 6.79 (d, J=8.6 Hz, 2H), 4.76 (s, 4H), 3.95-3.87 (m, 4H), 3.56 (q, J=7.1 Hz, 4H), 1.78 (q, J=3.0 Hz, 4H), 1.69 (s, 4H), 1.33 (s, 12H), 1.03 (t, J=7.1 Hz, 6H), 0.73 (s, 18H). ¹³C NMR (101 MHz, Chloroform-d) δ 153.87, 151.11, 142.13, 132.55, 128.60, 126.64, 122.97, 122.58, 111.68, 98.66, 96.83, 68.02, 65.15, 56.81, 38.00, 32.33, 31.81, 31.62, 25.94, 14.87.

Example 92: Synthesis of Intermediate of Ligand 26

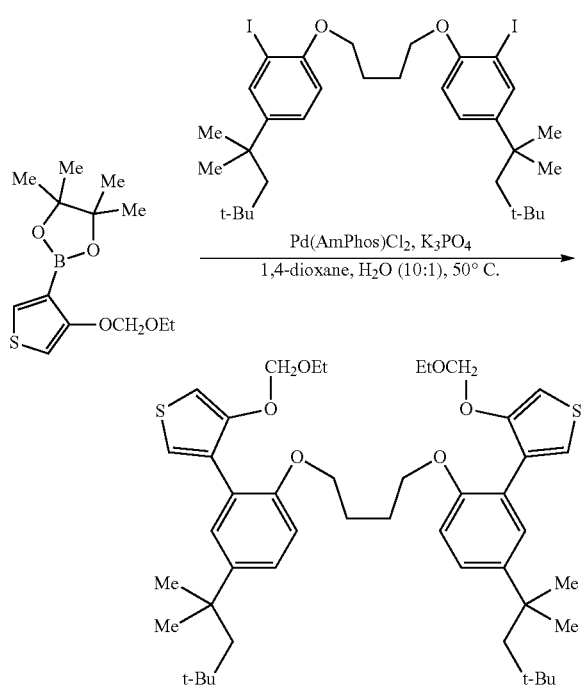

The procedure was similar to Example 10. The two-step reaction provided a 95% yield of a dark purple viscous oil.

¹H NMR (400 MHz, Chloroform-d) δ 7.44 (d, J=2.5 Hz, 2H), 7.27 (d, J=3.5 Hz, 2H), 7.21 (dd, J=8.6, 2.5 Hz, 2H), 6.79 (d, J=8.6 Hz, 2H), 6.62 (d, J=3.4 Hz, 2H), 5.09 (s, 4H), 3.96-3.84 (m, 4H), 3.66 (q, J=7.1 Hz, 4H), 1.78 (q, J=3.0 Hz, 4H), 1.70 (s, 4H), 1.34 (s, 12H), 1.19 (t, J=7.0 Hz, 6H), 0.73 (s, 18H). ¹³C NMR (101 MHz, Chloroform-d) δ 153.93, 153.34, 141.43, 130.15, 129.32, 125.80, 123.11, 122.72, 111.54, 100.39, 94.67, 67.99, 64.08, 57.02, 37.94, 32.33, 31.75, 31.57, 26.08, 15.06.

Example 93: Synthesis of Intermediate to Ligand 26

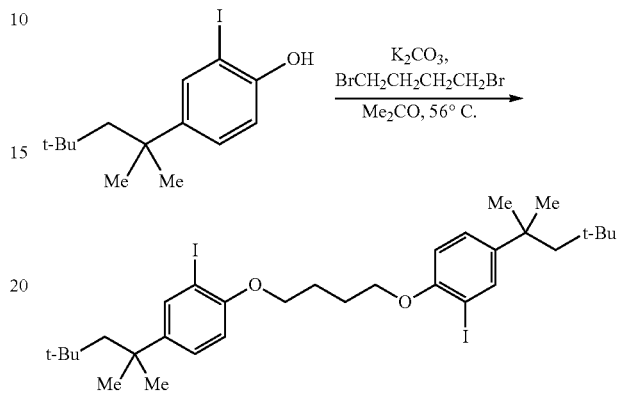

A white heterogeneous mixture of the iodophenol (3.240 g, 9.304 mmol, 2.00 eq), K₂CO₃ (3.858 g, 27.912 mmol, 6.00 eq), and 1,4-dibromobutane (0.56 mL, 4.652 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH₂Cl₂ (50 mL), stirred for 2 mins, suction filtered over a pad of celite, rinsed with CH₂Cl₂ (4×20 mL), the resultant pale yellow filtrate was concentrated onto celite, and purified via silica gel chromatography using an ISCO chromatography purification system; hexanes—50% CH₂Cl₂ in hexanes to afford the iodophenyl ether as a white solid (3.180 g, 4.426 mmol, 95%). NMR indicated pure product.

¹H NMR (500 MHz, Chloroform-d) δ 7.73 (d, J=2.4 Hz, 2H), 7.28-7.24 (m, 2H), 6.73 (d, J=8.6 Hz, 2H), 4.14-4.06 (m, 4H), 2.14-2.06 (m, 4H), 1.68 (s, 4H), 1.32 (s, 12H), 0.73 (s, 18H). ¹³C NMR (126 MHz, Chloroform-d) δ 155.12, 144.49, 137.18, 127.03, 111.29, 86.27, 68.68, 56.87, 37.89, 32.35, 31.83, 31.57, 26.11.

Example 93: Synthesis of Intermediate to Ligand 26

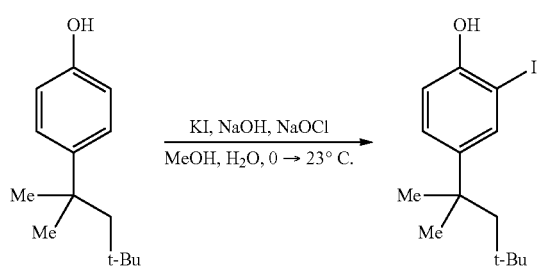 [SMILES: CC(C)(C)CC(C)(C)c1ccc(O)cc1 ; CC(C)(C)CC(C)(C)c1ccc(O)c(I)c1]

A clear colorless solution of the starting phenol (3.324 g, 16.110 mmol, 1.00 eq), KI (3.477 g, 20.943 mmol, 1.30 eq), and aqueous NaOH (21 mL, 20.943 mmol, 1.30 eq, 1 N) in methanol (100 mL) and water (50 mL) under nitrogen was placed in an ice bath and stirred vigorously for 1 hr, upon which precooled commercial aqueous bleach (26 mL, 20.943 mmol, 1.30 eq, 5.2% w/w) was added in a dropwise manner over 10 mins. The now pale opaque yellow mixture was stirred for 2 hrs at 0° C., the mixture was removed from the ice water bath, stirred at 23° C. for 3 hrs, solid $NaH_2PO_4$ (20 g) was added followed by a saturated aqueous mixture $Na_2S_2O_3$ (100 mL) to reduce residual iodine and water (100 mL), the mixture was stirred vigorously for 10 mins, diluted with $CH_2Cl_2$ (50 mL), the biphasic yellow mixture was poured into a separatory funnel, partitioned, organics were washed with aqueous $Na_2S_2O_3$ (2×50 mL), residual organics were extracted from the aqueous layer using $CH_2Cl_2$ (2×50 mL), combined, dried over solid $Na_2SO_4$, decanted, and concentrated onto celite, and purified via silica gel chromatography; hexanes—25% $CH_2Cl_2$ to afford the o-iodophenol as a clear colorless amorphous foam (3.240 g, 9.340 mmol, 58%). NMR indicated pure product.

$^1$H NMR (500 MHz, Chloroform-d) δ 7.60 (d, J=2.3 Hz, 1H), 7.24 (dd, J=8.5, 2.3 Hz, 1H), 6.90 (dd, J=8.6, 0.5 Hz, 1H), 5.11 (s, 1H), 1.68 (s, 2H), 1.32 (s, 6H), 0.73 (s, 9H). $^{13}$C NMR (126 MHz, Chloroform-d) δ 152.34, 144.65, 135.66, 128.14, 114.23, 85.38, 56.87, 37.93, 32.35, 31.81, 31.55.

Example 94: Synthesis of Ligand 27

The procedure was similar to Example 38. The two-step reaction provided a 12% yield of a pale yellow foam.

$^1$H NMR (500 MHz, Chloroform-d) δ 8.17 (dd, J=2.0, 0.6 Hz, 4H), 7.46 (dd, J=8.6, 1.9 Hz, 4H), 7.31 (d, J=0.6 Hz, 4H), 7.13 (dd, J=2.1, 1.3 Hz, 2H), 7.12 (s, 2H), 6.89-6.86 (m, 4H), 4.00 (t, J=3.9 Hz, 4H), 3.87 (s, 6H), 1.87 (q, J=3.4, 2.8 Hz, 4H), 1.49 (s, 36H). $^{13}$C NMR (126 MHz, Chloroform-d) δ 155.16, 148.33, 147.80, 143.18, 140.45, 130.73, 125.84, 123.68, 123.55, 119.35, 116.42, 116.32, 115.91, 115.78, 114.47, 109.74, 70.89, 55.80 (d, J=1.9 Hz), 34.78, 32.10, 26.07.

Characterization of the Protected Ligand:

$^1$H NMR (400 MHz, Chloroform-d) δ 8.06 (dd, J=1.9, 0.6 Hz, 4H), 7.42 (dd, J=8.6, 1.9 Hz, 4H), 7.32 (dd, J=8.5, 0.6 Hz, 4H), 7.29 (s, 2H), 7.13 (d, J=3.1 Hz, 2H), 6.91 (d, J=9.0 Hz, 2H), 6.83 (dd, J=8.9, 3.1 Hz, 2H), 4.49 (s, 4H), 4.03 (q, J=3.5, 2.7 Hz, 4H), 3.79 (s, 6H), 2.82 (q, J=7.0 Hz, 4H), 1.98 (q, J=3.3, 2.8 Hz, 4H), 1.42 (s, 36H), 0.52 (t, J=7.0 Hz, 6H). $^{13}$C NMR (101 MHz, Chloroform-d) δ 153.51, 150.88, 148.81, 143.30, 140.35, 131.83, 125.32, 123.81, 123.41, 120.59, 116.48, 116.02, 113.97, 113.83, 109.98, 96.71, 69.15, 64.48, 55.81, 34.70, 31.97, 26.44, 14.16.

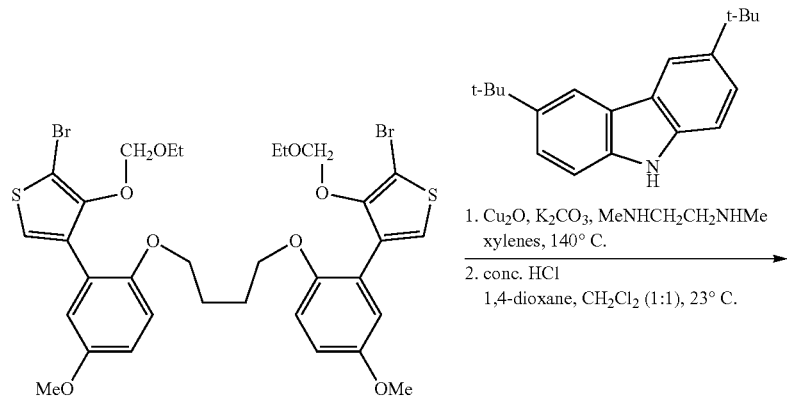

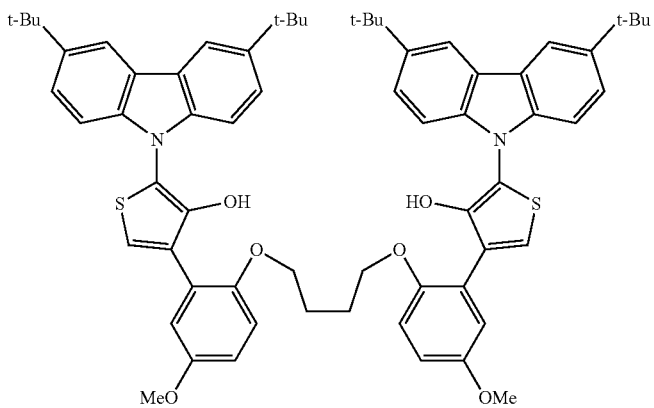

Example 95: Synthesis of Procatalyst 62
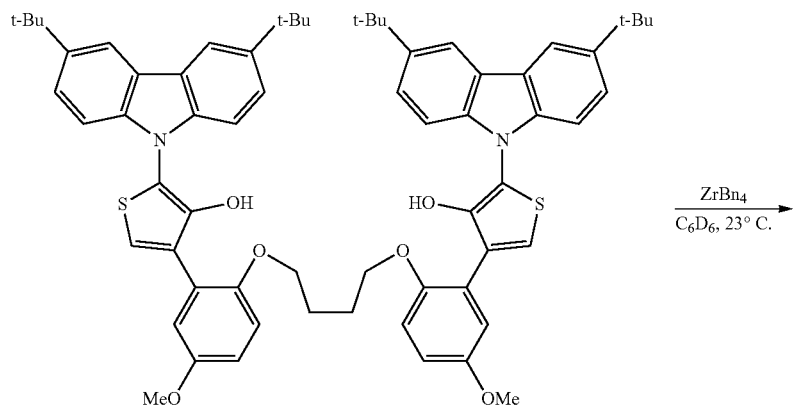
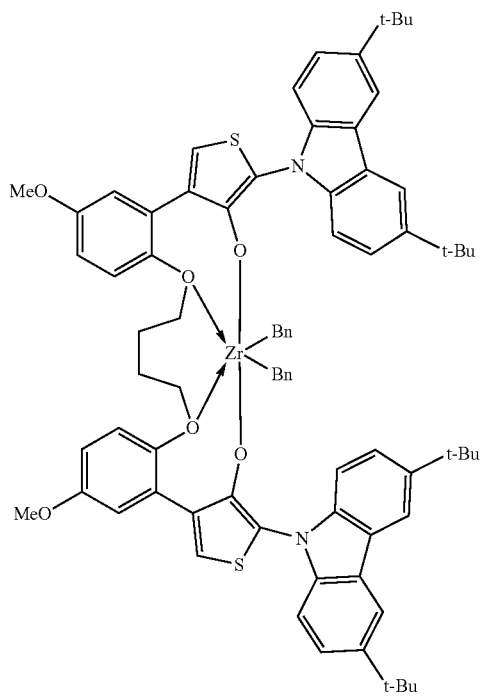
The procedure was similar to Example 16.
$^1$H NMR (500 MHz, Benzene-$d_6$) δ 8.46 (dd, J=2.0, 0.6 Hz, 2H), 8.24 (dd, J=1.9, 0.6 Hz, 2H), 7.68 (dd, J=8.5, 0.6 Hz, 2H), 7.50 (ddd, J=8.5, 5.5, 1.9 Hz, 4H), 7.36 (dd, J=8.7, 0.6 Hz, 2H), 7.05-7.01 (m, 2H), 6.99-6.96 (m, 2H), 6.80-6.75 (m, 4H), 6.60 (s, 2H), 6.41 (dd, J=9.0, 3.2 Hz, 2H), 6.22 (dd, J=8.3, 1.3 Hz, 4H), 5.11 (d, J=9.0 Hz, 2H), 4.03 (t, J=10.8 Hz, 2H), 3.34 (dt, J=11.3, 5.9 Hz, 2H), 3.19 (s, 6H), 1.46 (s, 18H), 1.28 (s, 18H), 1.07 (d, J=12.1 Hz, 2H), 0.90-0.78 (m, 2H), 0.68-0.61 (m, 2H), 0.58 (d, J=12.1 Hz, 2H). $^{13}$C NMR (126 MHz, Benzene-$d_6$) δ 157.29, 151.84, 149.26, 147.05, 143.40, 143.05, 140.02, 139.70, 133.10, 130.56, 129.63, 128.33, 128.03, 127.30, 126.71, 125.24, 124.90, 124.12, 122.82, 122.74, 120.67, 116.69, 116.41, 115.92, 115.73, 112.46, 109.47, 74.26, 71.94, 54.77, 34.57, 34.43, 31.96, 31.71, 25.80.

Example 96: Synthesis of Procatalyst 63
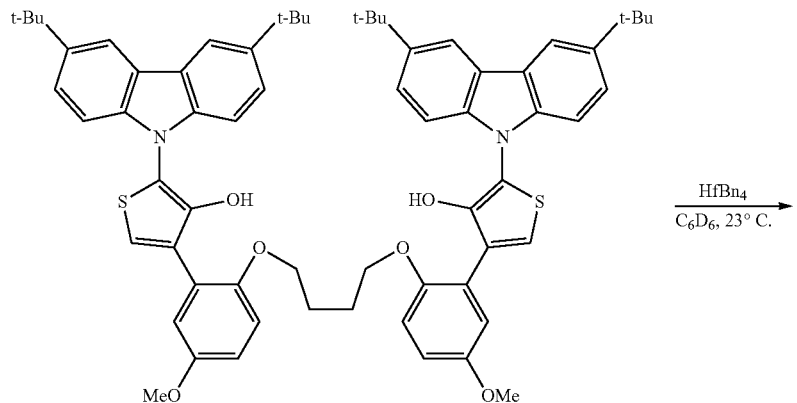
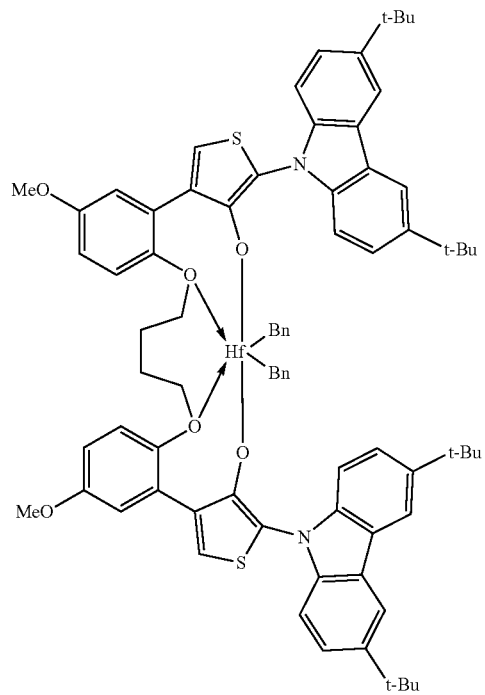
The procedure was similar to Example 17.
$^1$H NMR (500 MHz, Benzene-$d_6$) δ 8.48 (dd, J=1.9, 0.6 Hz, 2H), 8.24 (dd, J=2.0, 0.6 Hz, 2H), 7.66 (dd, J=8.5, 0.6 Hz, 2H), 7.51-7.46 (m, 4H), 7.27 (dd, J=8.7, 0.6 Hz, 2H), 7.09-7.06 (m, 4H), 6.79 (d, J=3.2 Hz, 2H), 6.76 (tt, J=7.4, 1.3 Hz, 2H), 6.60 (s, 2H), 6.43 (dd, J=9.0, 3.2 Hz, 2H), 6.26-6.23 (m, 4H), 5.11 (d, J=9.0 Hz, 2H), 4.12-3.99 (m, 2H), 3.45-3.35 (m, 2H), 3.19 (s, 6H), 1.46 (s, 18H), 1.28 (s, 18H), 0.92 (d, J=13.1 Hz, 2H), 0.81 (t, J=9.6 Hz, 2H), 0.60-0.50 (m, 2H), 0.31 (d, J=13.2 Hz, 2H). $^{13}$C NMR (126 MHz, Benzene-d) δ 157.44, 151.88, 149.10, 147.94, 143.45, 143.05, 139.96, 139.68, 132.76, 129.70, 128.01, 126.98, 126.94, 125.34, 124.97, 124.58, 122.66, 120.67, 116.56, 116.40, 116.17, 115.97, 115.68, 112.58, 109.48, 81.98, 78.16, 54.80, 34.58, 34.44, 31.97, 31.72, 25.99.
Example 97: Synthesis of Intermediate to Ligand 27
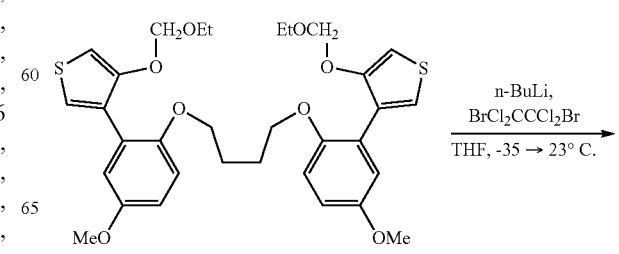

-continued

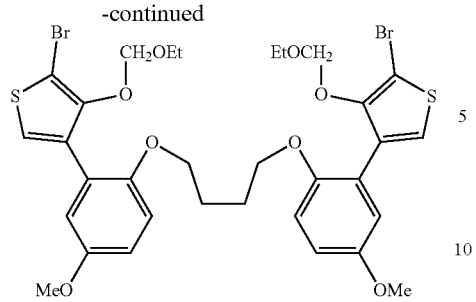

The procedure was similar to Example 38. The reaction provided a 69% yield of a pale yellow amorphous foam.

$^1$H NMR (400 MHz, Chloroform-d) δ 7.23 (s, 2H), 6.95 (dd, J=2.7, 0.8 Hz, 2H), 6.83-6.80 (m, 4H), 4.82 (s, 4H), 3.84 (p, J=3.2 Hz, 4H), 3.75 (s, 6H), 3.50 (q, J=7.1 Hz, 4H), 1.78-1.67 (m, 4H), 1.00 (t, J=7.0 Hz, 6H). $^{13}$C NMR (101 MHz, Chloroform-d) δ 153.46, 151.13, 150.55, 132.14, 124.62, 123.13, 116.00, 114.24, 98.86, 97.08, 69.03, 65.15, 55.76, 25.95, 14.79.

Example 98: Synthesis of Intermediate to Ligand 27

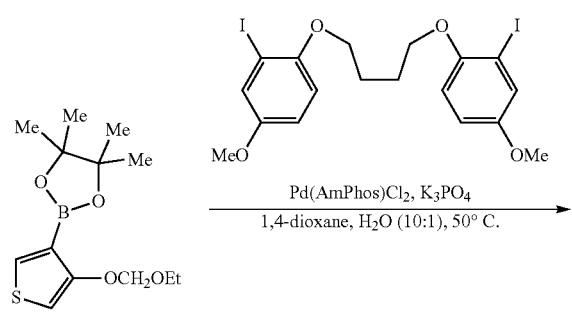

The procedure was similar to Example 10. The reaction provided a 59% yield of a dark purple viscous oil.

$^1$H NMR (400 MHz, Chloroform-d) δ 7.27 (d, J=3.4 Hz, 2H), 7.01 (d, J=2.9 Hz, 2H), 6.83 (d, J=8.9 Hz, 2H), 6.78 (dd, J=8.9, 3.0 Hz, 2H), 6.64 (d, J=3.5 Hz, 2H), 5.10 (s, 4H), 3.86-3.78 (m, 4H), 3.77 (s, 6H), 3.66 (q, J=7.1 Hz, 4H), 1.70 (h, J=2.7 Hz, 4H), 1.18 (t, J=7.1 Hz, 6H). $^{13}$C NMR (101 MHz, Chloroform-d) δ 153.31, 153.23, 150.66, 129.60, 125.10, 123.38, 116.70, 114.26, 113.27, 100.85, 94.87, 69.11, 64.13, 55.67, 26.07, 15.08.

Example 99: Synthesis of Intermediate to Ligand 27

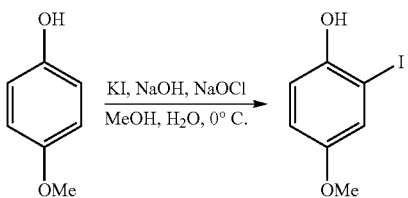 [SMILES: COc1ccc(O)cc1 ; COc1ccc(O)c(I)c1]

A clear colorless solution of the starting phenol (5.000 g, 40.277 mmol, 1.00 eq), KI (7.020 g, 42.291 mmol, 1.05 eq), and aqueous NaOH (201 mL, 201.39 mmol, 5.00 eq, 1 N) in methanol (300 mL) and water (200 mL) under nitrogen was placed in an ice bath and stirred vigorously for 1 hr, upon which precooled commercial aqueous bleach (61 mL, 42.291 mmol, 1.05 eq, 5.2% w/w) was added in a dropwise manner over 30 mins. The now dark orange mixture was stirred for 30 mins at 0° C., the mixture was removed from the ice water bath, solid $NaH_2PO_4$ (30 g) was added followed by aqueous $Na_2S_2O_3$ (200 mL) to reduce residual iodine and water (200 mL), the mixture was stirred vigorously for 10 mins, diluted with $CH_2Cl_2$ (50 mL), the biphasic dark red-orange mixture was poured into a separatory funnel, partitioned, organics were washed with aqueous $Na_2S_2O_3$ (2×50 mL), residual organics were extracted from the aqueous layer using $CH_2Cl_2$ (2×50 mL), combined, dried over solid $Na_2SO_4$, decanted, and concentrated to afford a red-brown viscous oil. NMR indicated starting phenol and observable product, albeit minor, with approx. 70:30 SM:product mixture, and there exists other adducts of decomposition. The crude mixture was dissolved in $CH_2Cl_2$, concentrated onto celite, and purified via silica gel chromatography; 25% $CH_2Cl_2$ in hexanes—100% $CH_2Cl_2$ to afford the o-iodophenol as a pale purple amorphous foam (0.877 g, 3.508 mmol, 9%) and recovered starting phenol (1.277 g, 10.287 mmol, 26%). NMR indicated pure product.

$^1$H NMR (500 MHz, Chloroform-d) δ 7.18 (d, J=2.9 Hz, 1H), 6.90 (d, J=8.9 Hz, 1H), 6.83 (dd, J=8.9, 2.9 Hz, 1H), 5.00 (s, 1H), 3.74 (s, 3H). $^{13}$C NMR (126 MHz, Chloroform-d) δ 153.93, 149.17, 122.66, 116.37, 115.13, 85.07, 55.99.

Example 100: Synthesis of Intermediate to Ligand 27

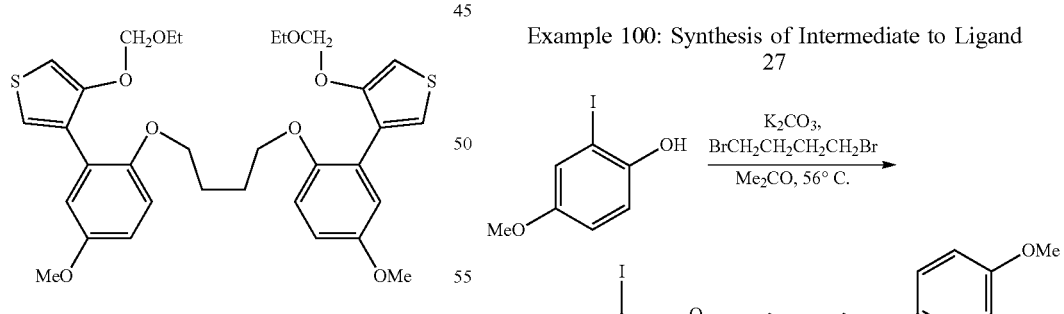

The procedure was similar to Example 6.

$^1$H NMR (500 MHz, Chloroform-d) δ 7.32 (d, J=2.9 Hz, 2H), 6.84 (dd, J=8.9, 3.0 Hz, 2H), 6.76 (d, J=8.9 Hz, 2H), 4.11-3.99 (m, 4H), 3.75 (s, 6H), 2.13-2.01 (m, 4H). $^{13}$C NMR (126 MHz, Chloroform-d) δ 154.26, 152.05, 124.61, 114.78, 113.06, 86.94, 69.58, 55.92, 26.15.

Example 101: Synthesis of Ligand 28
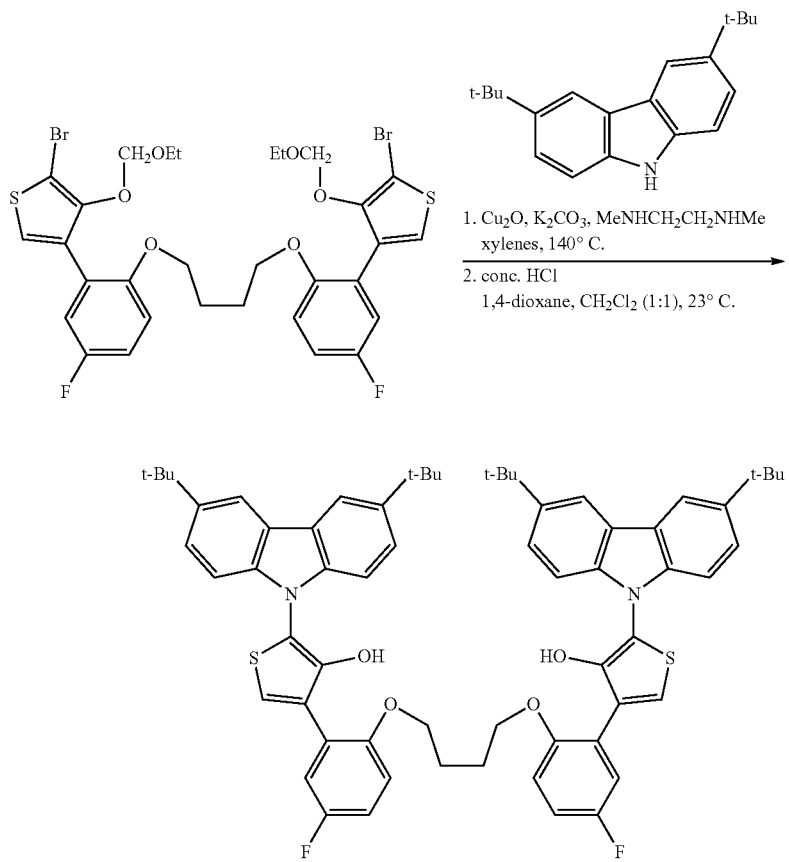
The procedure was similar to the procedure of Example 38. The two-step reaction provided a 4% yield of a off-white solid.
$^1$H NMR (500 MHz, Chloroform-d) δ 8.10 (d, J=1.9 Hz, 4H), 7.39 (dd, J=8.5, 1.9 Hz, 4H), 7.28-7.24 (m, 2H), 7.21 (d, J=8.4 Hz, 6H), 6.98 (ddd, J=9.0, 7.6, 3.2 Hz, 2H), 6.83 (dd, J=9.0, 4.5 Hz, 2H), 6.63 (s, 2H), 4.01-3.94 (m, 4H), 1.88-1.82 (m, 4H), 1.43 (s, 38H). $^{19}$F NMR (470 MHz, Chloroform-d) δ−121.03 (td, J=8.3, 4.6 Hz).
Example 102: Synthesis of Procatalyst 64
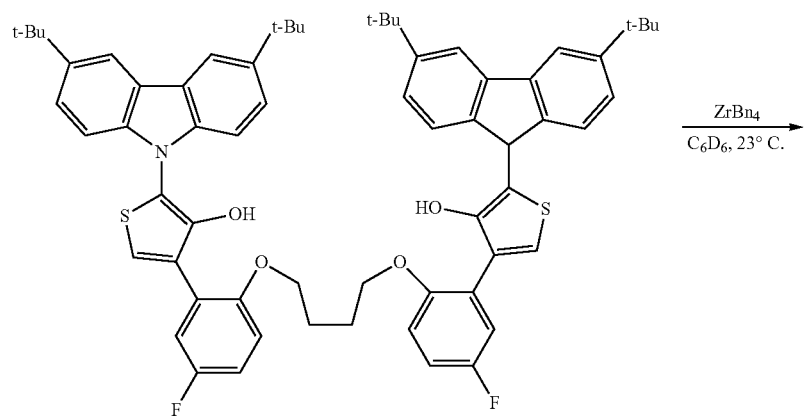

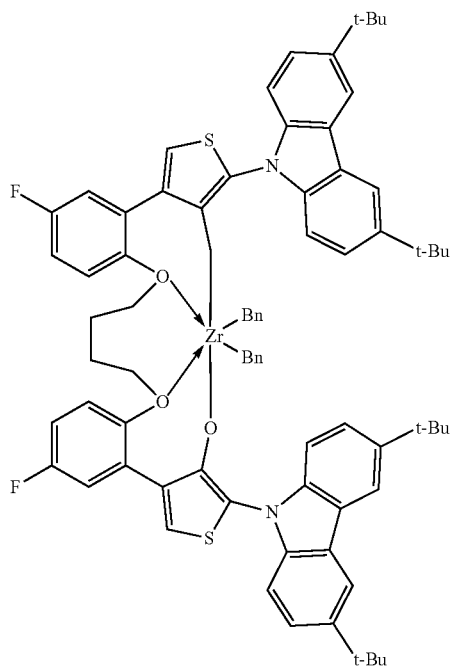
The procedure was similar to the procedure of Example 16.
$^1$H NMR (400 MHz, Benzene-$d_6$) δ 8.37 (d, J=1.8 Hz, 2H), 8.27-8.24 (m, 2H), 7.56 (d, J=8.5 Hz, 2H), 7.46 (ddd, J=24.0, 8.6, 1.9 Hz, 4H), 7.39-7.33 (m, 2H), 6.99-6.94 (m, 4H), 6.80-6.71 (m, 4H), 6.50-6.44 (m, 2H), 6.44 (s, 2H), 6.17-6.11 (m, 4H), 5.06 (dd, J=9.0, 4.8 Hz, 2H), 3.96 (t, J=10.3 Hz, 2H), 3.28-3.18 (m, 2H), 1.39 (s, 18H), 1.28 (s, 18H), 0.93 (d, J=12.0 Hz, 2H), 0.73 (t, J=9.1 Hz, 2H), 0.68-0.57 (m, 2H), 0.51 (d, J=12.0 Hz, 2H). $^{19}$F NMR (376 MHz, Benzene-$d_6$) δ −116.15 (td, J=8.3, 5.0 Hz). $^{13}$C NMR (101 MHz, Benzene-$d_6$) δ 158.52, 151.78, 151.46 (d, J=2.7 Hz), 143.49 (d, J=33.9 Hz), 139.83 (d, J=29.4 Hz), 138.24 (d, J=157.9 Hz), 131.79 (d, J=1.3 Hz), 130.53, 130.26, 130.17, 128.13, 126.91, 125.15, 124.82, 124.55, 124.09, 122.86, 122.82, 121.23, 117.50, 117.17, 116.49, 115.98, 115.83, 112.15, 109.23, 80.63, 71.99, 34.50, 34.43, 31.88, 31.68, 25.53.
Example 103: Synthesis of Procatalyst 65
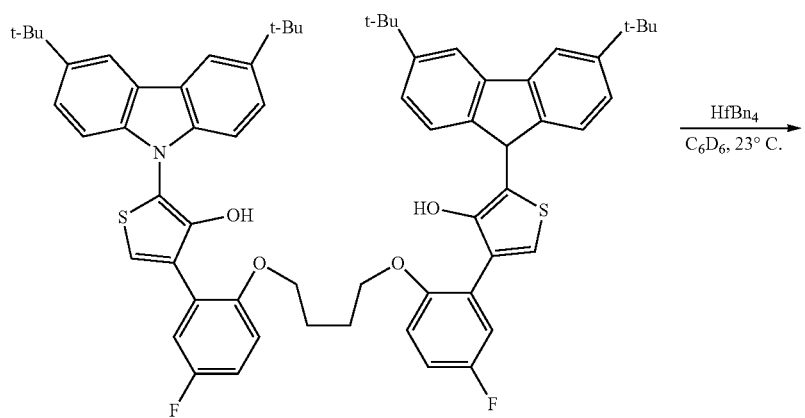

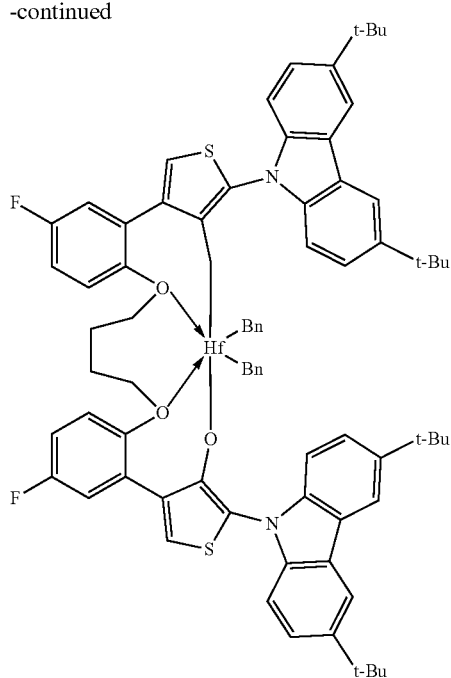

The procedure was similar to the procedure of Example 17.

¹H NMR (400 MHz, Benzene-$d_6$) δ 8.39 (d, J=1.8 Hz, 2H), 8.28-8.24 (m, 2H), 7.54 (d, J=8.4 Hz, 2H), 7.45 (ddd, J=21.1, 8.6, 1.9 Hz, 4H), 7.31-7.25 (m, 2H), 7.08-6.94 (m, 1H), 6.89 (t, J=7.4 Hz, 1H), 6.78 (dd, J=8.8, 3.2 Hz, 2H), 6.73 (tt, J=7.4, 1.2 Hz, 2H), 6.51-6.44 (m, 4H), 6.43 (s, 2H), 6.24-6.18 (m, 4H), 5.03 (dd, J=9.0, 4.8 Hz, 2H), 3.94 (t, J=10.7 Hz, 2H), 3.23 (dd, J=14.0, 9.5 Hz, 2H), 1.39 (s, 18H), 1.28 (s, 18H), 0.90 (d, J=13.3 Hz, 2H), 0.75-0.62 (m, 2H), 0.52 (d, J=13.1 Hz, 2H), 0.24 (d, J=13.2 Hz, 2H). ¹⁹F NMR (376 MHz, Benzene-$d_6$) δ−114.85-116.52 (m). ¹³C NMR (101 MHz, Benzene-$d_6$) δ 159.91 (d, J=246.6 Hz), 151.69, 151.24 (d, J=2.8 Hz), 147.23, 143.54 (d, J=37.1 Hz), 139.73 (d, J=24.0 Hz), 131.42 (d, J=1.2 Hz), 130.36, 130.28, 128.54, 127.08, 126.85, 125.29, 124.91, 122.75, 122.71, 121.08, 117.43, 117.31, 117.20, 116.47 (d, J=5.7 Hz), 115.70, 112.37, 109.24, 81.73, 78.64, 34.50, 34.44, 31.88, 31.69, 25.76.

Example 104: Synthesis of Intermediate to Ligand 28

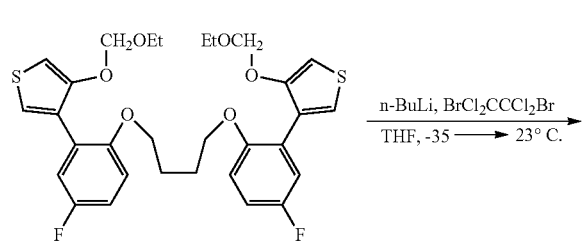

The procedure was similar to the procedure of Example 37. The two-step reaction provided a 97% yield of a golden yellow amorphous foam.

¹H NMR (400 MHz, Chloroform-d) δ 7.26 (s, 2H), 7.14 (dd, J=9.1, 3.2 Hz, 2H), 6.95 (ddd, J=9.0, 7.8, 3.2 Hz, 2H), 6.81 (dd, J=9.1, 4.6 Hz, 2H), 4.85 (s, 4H), 3.91-3.84 (m, 4H), 3.49 (q, J=7.1 Hz, 4H), 1.77 (h, J=2.5 Hz, 4H), 0.99 (t, J=7.1 Hz, 6H). ¹⁹F NMR (376 MHz, Chloroform-d) δ−123.72 (td, J=8.5, 4.7 Hz). ¹³C NMR (101 MHz, Chloroform-d) δ 156.71 (d, J=239.0 Hz), 152.50 (d, J=2.1 Hz), 151.13, 131.21 (d, J=1.9 Hz), 124.87 (d, J=8.2 Hz), 123.50, 117.35 (d, J=23.8 Hz), 114.94 (d, J=22.6 Hz), 113.52 (d, J=8.4 Hz), 99.04, 97.26, 68.85, 65.21, 25.87, 14.74.

Example 105: Synthesis of Intermediate to Ligand 28

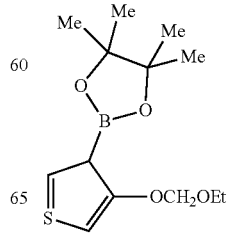

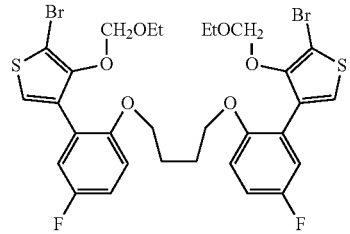

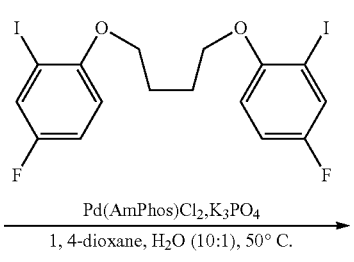

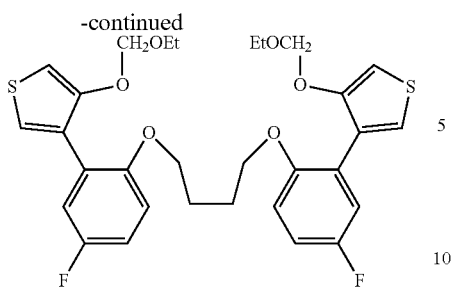

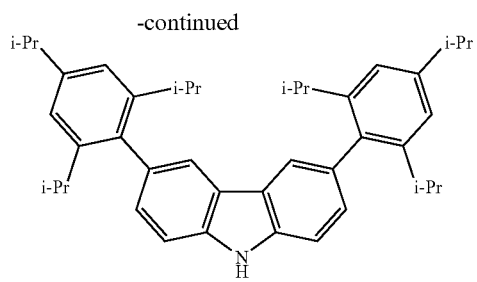

The procedure was similar to the procedure of Example 10. The reaction provided a 71% yield of a dark purple viscous oil.

$^1$H NMR (500 MHz, Chloroform-d) δ 7.37 (d, J=3.5 Hz, 2H), 7.24 (dd, J=9.5, 3.2 Hz, 2H), 6.95 (ddd, J=9.0, 7.8, 3.2 Hz, 2H), 6.83 (dd, J=9.0, 4.7 Hz, 2H), 6.68 (d, J=3.5 Hz, 2H), 5.15 (s, 4H), 3.95-3.86 (m, 4H), 3.70 (q, J=7.1 Hz, 4H), 1.84-1.75 (m, 4H), 1.22 (t, J=7.1 Hz, 6H). $^{19}$F NMR (470 MHz, Chloroform-d) δ −123.94 (td, J=8.9, 4.7 Hz). $^{13}$C NMR (126 MHz, Chloroform-d) δ 156.73 (d, J=238.0 Hz), 153.10, 152.52 (d, J=2.3 Hz), 128.35 (d, J=1.8 Hz), 125.23 (d, J=8.5 Hz), 123.97, 117.51 (d, J=23.8 Hz), 114.26 (d, J=22.7 Hz), 113.59 (d, J=8.5 Hz), 100.89, 94.94, 68.92, 64.31, 26.08, 15.11.

Example 106: Synthesis of Intermediate to Ligand 28

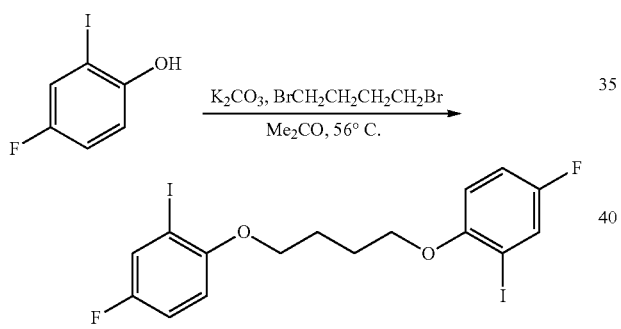

The procedure was similar to the procedure of Example 6. The reaction provided a 96% yield of white solid.

$^1$H NMR (500 MHz, Chloroform-d) δ 7.49 (dd, J=7.6, 3.0 Hz, 2H), 7.01 (ddd, J=9.0, 7.8, 3.0 Hz, 2H), 6.75 (dd, J=9.0, 4.6 Hz, 2H), 4.12-4.03 (m, 4H), 2.14-2.05 (m, 4H). $^{19}$F NMR (470 MHz, Chloroform-d) δ −122.30 (td, J=7.7, 4.6 Hz).

Example 107: Synthesis of Intermediate to Ligand 23

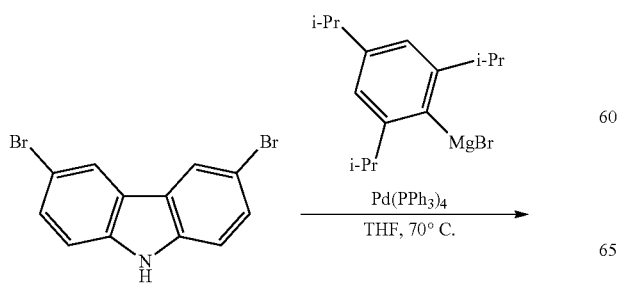

To a solution of 3,6-dibromocarbazole (2.000 g, 6.154 mmol, 1.00 eq) and Pd(PPh$_3$)$_4$ (0.711 g, 0.6155 mmol, 0.10 eq) in anhydrous deoxygenated THF (30 mL) in a nitrogen filled glovebox was added a solution of 2,4,6-triisopropylphenyl magnesium bromide (39.4 mL, 19.693 mmol, 3.30 eq, 0.5 M in THF) in a quick dropwise manner. The now golden yellow solution was placed in a mantle heated to 70° C., stirred (500 rpm) for 48 hrs, the resultant black solution was removed from the mantle, allowed to cool gradually to 23° C., neutralized with i-PrOH (10 mL), stirred for 2 mins, removed from the glovebox, diluted with CH$_2$Cl$_2$ (20 mL), suction filtered through silica gel, rinsed with CH$_2$Cl$_2$ (4×20 mL), the filtrate solution was concentrated onto celite, and purified via silica gel chromatography; hexanes—25% CH$_2$Cl$_2$ in hexanes to afford the disubstituted carbazole as a white solid (2.041 g, 3.569 mmol, 58%). NMR indicated pure product.

$^1$H NMR (500 MHz, Chloroform-d) δ 8.14 (s, 1H), 7.86-7.81 (m, 2H), 7.49 (dd, J=8.2, 0.7 Hz, 2H), 7.29-7.23 (m, 2H), 7.10 (s, 4H), 2.98 (hept, J=6.9 Hz, 2H), 2.75 (hept, J=6.9 Hz, 4H), 1.34 (d, J=7.0 Hz, 12H), 1.10 (d, J=6.9 Hz, 24H). $^{13}$C NMR (126 MHz, Chloroform-d) δ 147.64, 147.14, 138.58, 137.56, 131.93, 128.06, 123.04, 121.14, 120.52, 110.02, 34.28, 30.25, 24.35, 24.26, 24.12.

Example 108: Synthesis of Intermediate to Ligand 24

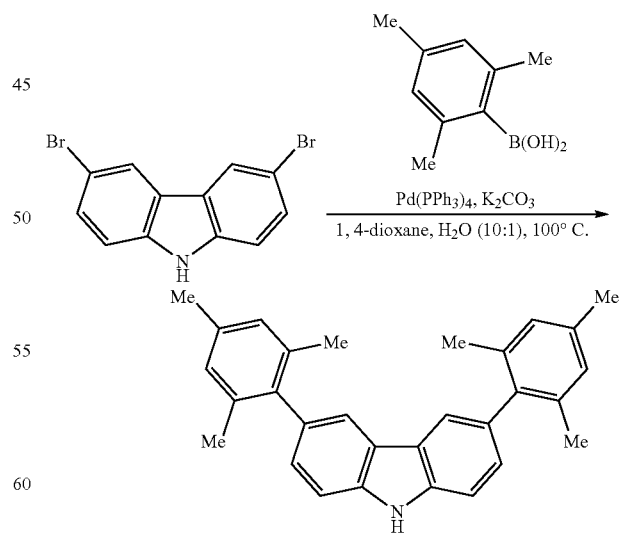

A mixture of the carbazole (2.000 g, 6.154 mmol, 1.00 eq), 2,4,6-trimethylphenyl boronic acid (6.056 g, 36.923 mmol, 6.00 eq), Pd(PPh$_3$)$_4$ (1.422 g, 1.231 mmol, 0.20 eq), and K$_2$CO$_3$ (15.309 g, 110.8 mmol, 18.0 eq) equipped with a reflux condenser was evacuated, then back-filled with nitrogen, this evacuation/re-fill process was repeated 3× more, freshly deoxygenated 1,4-dioxane (70 mL) and H₂O (7.0 mL) were added simultaneously via syringes, the golden yellow mixture was placed in a mantle heated to 100° C., stirred vigorously (1000 rpm) for 48 hrs, removed from the mantle, allowed to cool gradually to 23° C., the golden yellow suspension was suction filtered through silica gel, rinsed with CH₂Cl₂ (4×20 mL), the yellow filtrate solution was concentrated onto celite, and purified via silica gel chromatography; hexanes—50% CH₂Cl₂ in hexanes to afford the disubstituted carbazole as a white foam (1.542 g, 3.821 mmol, 62%). NMR indicated pure product.

¹H NMR (500 MHz, Chloroform-d) δ 8.04 (s, 1H), 7.90-7.86 (m, 2H), 7.53 (dd, J=8.2, 0.7 Hz, 2H), 7.28 (dd, J=8.2, 1.6 Hz, 2H), 7.08 (s, 4H), 2.45 (s, 6H), 2.15 (s, 12H). ¹³C NMR (126 MHz, Chloroform-d) δ 139.73, 138.67, 136.76, 136.44, 132.36, 128.13, 127.48, 123.56, 120.85, 110.66, 21.16, 21.12.

Example 109: Synthesis of Intermediate to Ligand 25

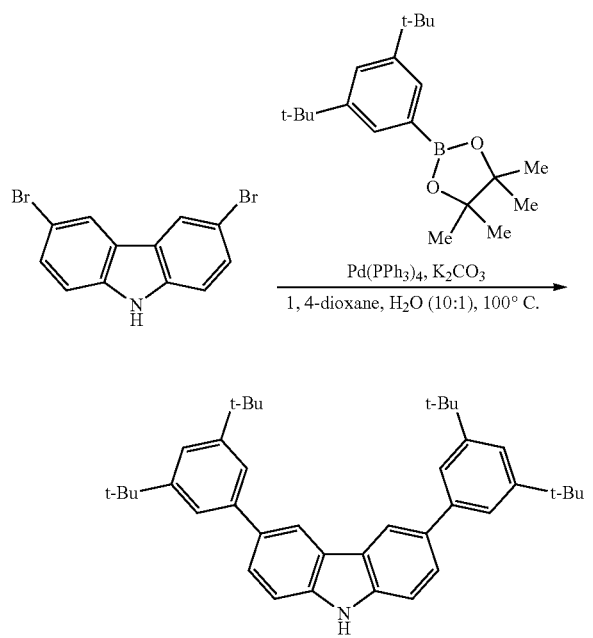

A mixture of the carbazole (1.062 g, 3.267 mmol, 1.00 eq), 3,5-di-t-butylphenyl boropinacolate ester (3.100 g, 9.801 mmol, 3.00 eq), Pd(PPh₃)₄ (0.755 g, 0.6534 mmol, 0.20 eq), and K₃PO₄ (6.241 g, 29.403 mmol, 9.00 eq) equipped with a reflux condenser was evacuated, then back-filled with nitrogen, this evacuation/re-fill process was repeated 3× more, freshly deoxygenated 1,4-dioxane (30 mL) and H₂O (5.0 mL) were added simultaneously via syringes, the golden yellow mixture was placed in a mantle heated to 100° C., stirred vigorously (1000 rpm) for 48 hrs, removed from the mantle, allowed to cool gradually to 23° C., the golden yellow suspension was suction filtered through silica gel, rinsed with CH₂Cl₂ (4×20 mL), the yellow filtrate solution was concentrated onto celite, and purified via silica gel chromatography; hexanes—50% CH₂Cl₂ in hexanes to afford the disubstituted carbazole as a white foam (1.551 g, 2.852 mmol, 87%). NMR indicated pure product.

¹H NMR (500 MHz, Chloroform-d) δ 8.34-8.29 (m, 2H), 8.10 (s, 1H), 7.68 (dd, J=8.4, 1.8 Hz, 2H), 7.54 (d, J=1.7 Hz, 4H), 7.51 (d, J=8.3 Hz, 2H), 7.45 (t, J=1.8 Hz, 2H), 1.43 (s, 36H). ¹³C NMR (126 MHz, Chloroform-d) δ 151.03, 141.57, 139.25, 134.55, 126.04, 123.93, 122.02, 120.74, 119.18, 110.71, 35.01, 31.60.

Example 110: Synthesis of Intermediate to Ligand 18

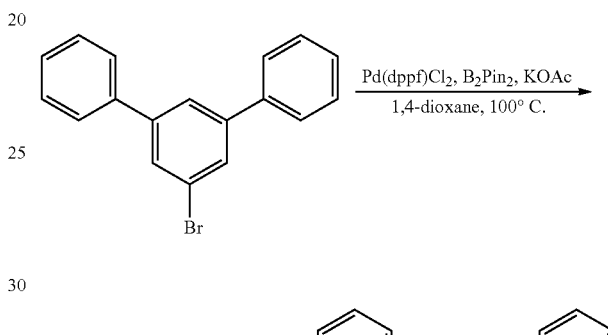

In a nitrogen filled glovebox a mixture of the bromo-m-terphenyl (3.350 g, 10.834 mmol, 1.00 eq), Pd(dppf)Cl₂ (0.442 g, 0.5417 mmol, 0.05 eq), B₂Pin₂ (4.127 g, 16.251 mmol, 1.50 eq), and KOAc (3.190 g, 32.502 mmol, 3.00 eq) in anhydrous deoxygenated 1,4-dioxane (100 mL) was placed in a mantle heated to 100° C., stirred vigorously (1000 rpm) for 24 hrs, removed from the heating mantle, allowed to cool gradually to 23° C., suction filtered through a pad of silica gel, rinsed with CH₂Cl₂ (4×25 mL), the resulting filtrate solution was concentrated onto celite, and purified via silica gel chromatography; 10% CH₂Cl₂-100% CH₂Cl₂ in hexanes to afford the boropinacolate ester as a white solid (3.446 g, 9.672 mmol, 89%). NMR indicated pure product.

¹H NMR (500 MHz, Chloroform-d) δ 8.08 (dt, J=2.7, 1.7 Hz, 2H), 7.95 (p, J=2.0 Hz, 1H), 7.73 (dq, J=7.9, 1.5 Hz, 4H), 7.48 (tt, J=8.0, 1.5 Hz, 4H), 7.39 (ddt, J=8.3, 6.9, 1.3 Hz, 2H), 1.42 (s, 6H), 1.41 (s, 6H). ¹³C NMR (126 MHz, Chloroform-d) δ 141.15, 141.09, 132.49, 128.91, 128.68, 127.36, 127.31, 83.95, 24.90.

Example 111: Synthesis of Intermediate to Ligand 19

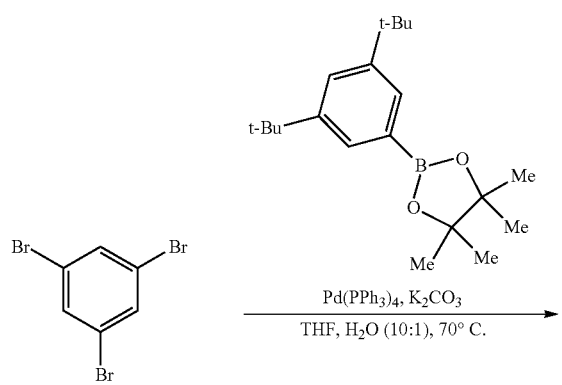

A mixture of the tribromobenzene (2.299 g, 7.303 mmol, 1.00 eq), 3,5-di-t-butylphenyl boropinacolate ester (6.237 g, 19.719 mmol, 2.70 eq), Pd(PPh₃)₄(0.844 g, 0.7303 mmol, 0.10 eq), and K₂CO₃ (8.176 g, 59.154 mmol, 8.10 eq) equipped with a reflux condenser was evacuated, then back-filled with nitrogen, this evacuation/re-fill process was repeated 3× more, freshly deoxygenated THF (50 mL) and H₂O (5.0 mL) were added simultaneously via syringes, the golden yellow mixture was placed in a mantle heated to 70° C., stirred vigorously (1000 rpm) for 24 hrs, removed from the mantle, allowed to cool gradually to 23° C., the golden yellow suspension was suction filtered through silica gel, rinsed with CH₂Cl₂ (4×20 mL), the yellow filtrate solution was concentrated onto celite, and purified via silica gel chromatography; hexanes to afford the 3,5-bis-(3,5-di-t-Buphenyl)phenyl bromide as a white solid (0.990 g, 1.855 mmol, 25%). NMR indicated pure product.

¹H NMR (500 MHz, Chloroform-d) δ 7.72-7.69 (m, 3H), 7.52 (t, J=1.8 Hz, 2H), 7.44 (d, J=1.8 Hz, 4H), 1.42 (s, 38H). ¹³C NMR (126 MHz, Chloroform-d) δ 151.45, 144.95, 139.54, 128.98, 125.69, 122.87, 122.12, 121.81, 35.05, 31.54.

Example 112: Synthesis of Intermediate to Ligand 19

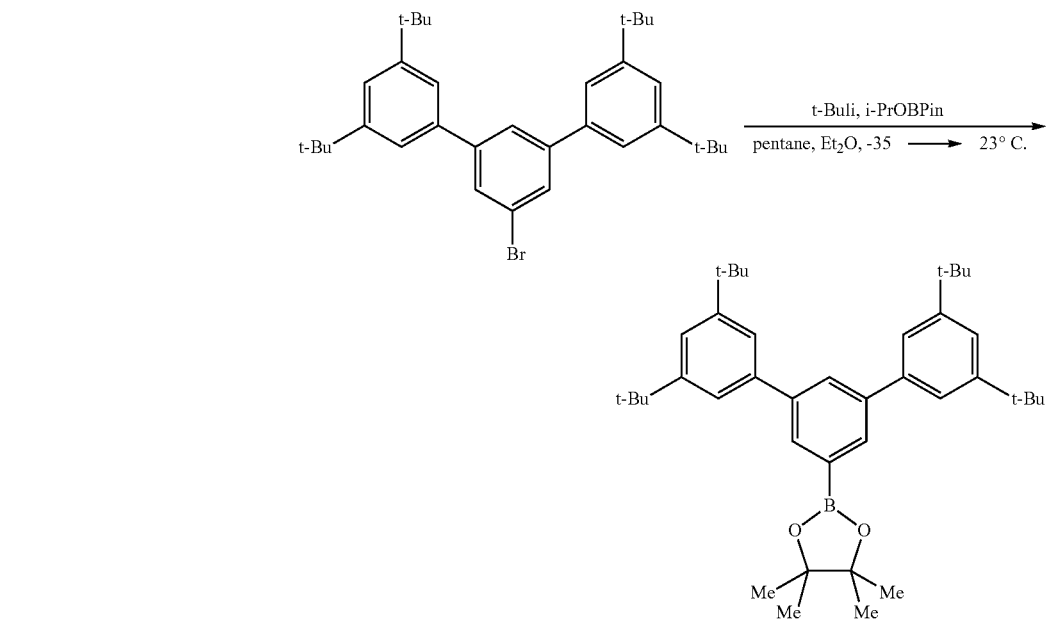

To a precooled solution of t-BuLi (3.6 mL, 6.122 mmol, 3.30 eq, 1.7 M in pentane) in anhydrous deoxygenated pentane (20 mL) in a nitrogen filled glovebox at −35° C. (precooled for 16 hrs) was added a precooled solution of the 3,5-bis-(3,5-di-t-Buphenyl)-m-terphenyl bromide (0.990 g, 1.855 mmol, 1.00 eq) in pentane/Et₂O (20 mL, 1:1) in a dropwise manner over 10 mins. The now golden yellow mixture was allowed to sit in the freezer (−35° C.) for 4 hrs upon which neat i-PrOBPin (1.25 mL, 6.122 mmol, 3.30 eq) was added via syringe. The now pale yellow heterogeneous mixture was allowed to stir at 23° C. for 3 hrs, i-PrOH (3 mL) was added to neutralize any residual t-BuLi, the mixture was removed from the glovebox, water (20 mL) and Et₂O (30 mL) was added, the biphasic mixture was stirred for 2 mins, poured into a separatory funnel, partitioned, organics were washed with water (2×25 mL), residual organics were extracted with Et₂O (2×25 mL), combined, dried over solid Na₂SO₄, decanted, concentrated onto celite, and purified via silica gel chromatography on the ISCO; hexanes—50% CH$_2$Cl$_2$ in hexanes to afford the mesityl-m-terphenyl boropinacolate ester as a white foam (0.689 g, 1.187 mmol, 64%). NMR indicated pure product.

$^1$H NMR (400 MHz, Chloroform-d) δ 8.07 (s, 2H), 7.95 (s, 1H), 7.60-7.50 (m, 6H), 1.48 (s, 36H), 1.46 (s, 12H). $^{13}$C NMR (101 MHz, Chloroform-d) δ 151.11, 142.63, 141.07, 132.62, 130.23, 122.12, 121.46, 83.93, 35.08, 31.67, 24.95.

Example 113: Synthesis of Intermediate to Ligand 20

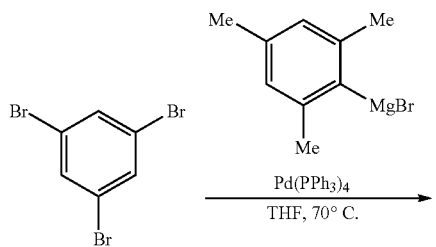

To a solution of the tribromobenzene (1.000 g, 3.177 mmol, 1.00 eq) and Pd(PPh$_3$)$_4$(0.367 g, 0.3177 mmol, 0.10 eq) in anhydrous deoxygenated THF (30 mL) in a nitrogen filled glovebox at 23° C. was added a solution of 2,4,6-trimethylphenylmagnesium bromide (8.0 mL, 7.943 mmol, 2.50 eq, 1.0 M in THF) in a quick dropwise manner. The resultant red-black solution was placed in a mantle heated to 70° C., stirred vigorously (1000 rpm) for 18 hrs, removed from the mantle, allowed to cool gradually to 23° C., neutralized with i-PrOH (5 mL), removed from the glovebox, concentrated, the resultant dark red-black mixture was suspended in CH$_2$Cl$_2$ (25 mL), suction filtered over a pad of silica gel, rinsed with CH$_2$Cl$_2$ (4×25 mL), the resultant golden brown solution was concentrated onto celite, and purified via silica gel chromatography; hexanes to afford the 3,5-bis-(2,4,6-trimethylphenyl)-phenybromide as a white solid (0.428 g, 1.088 mmol, 34%). NMR indicated pure product.

$^1$H NMR (400 MHz, Chloroform-d) δ 7.28 (d, J=1.5 Hz, 2H), 6.93 (s, 4H), 6.87 (d, J=1.6 Hz, 1H), 2.32 (s, 6H), 2.05 (s, 12H). $^{13}$C NMR (101 MHz, Chloroform-d) δ 143.21, 137.47, 136.96, 135.63, 130.43, 129.27, 128.13, 122.41, 21.01, 20.71.

Example 114: Synthesis of Intermediate to Ligand 20

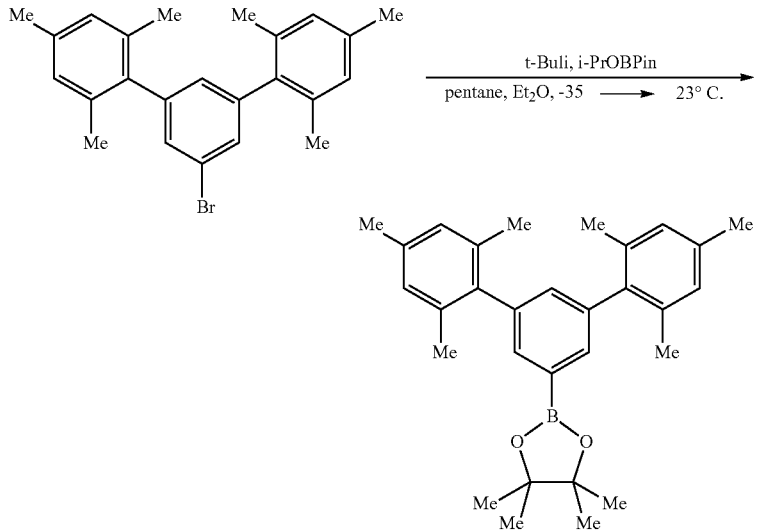

-continued

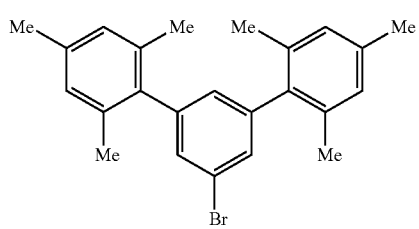

To a precooled solution of t-BuLi (10.0 mL, 16.938 mmol, 3.30 eq, 1.7 M in pentane) in anhydrous deoxygenated pentane (45 mL) in a nitrogen filled glovebox at −35° C. (precooled for 16 hrs) was added a precooled suspension of the mesityl-m-terphenyl bromide (2.019 g, 5.133 mmol, 1.00 eq) in pentane/Et$_2$O (30 mL, 1:1) in a dropwise manner over 10 mins. The now golden yellow mixture was allowed to sit in the freezer (−35° C.) for 4 hrs upon which neat i-PrOBPin (3.50 mL, 16.938 mmol, 3.30 eq) was added via syringe. The now pale yellow heterogeneous mixture was allowed to stir at 23° C. for 3 hrs, i-PrOH (3 mL) was added to neutralize any residual t-BuLi, the mixture was removed from the glovebox, water (20 mL) and Et$_2$O (30 mL) was added, the biphasic mixture was stirred for 2 mins, poured into a separatory funnel, partitioned, organics were washed with water (2×25 mL), residual organics were extracted with Et$_2$O (2×25 mL), combined, dried over solid Na$_2$SO$_4$, decanted, concentrated onto celite, and purified via silica gel chromatography on the ISCO; hexanes—50% $CH_2Cl_2$ in hexanes to afford the mesityl-m-terphenyl boropinacolate ester as a white foam (2.095 g, 4.757 mmol, 93%). NMR indicated pure product.

$^1$H NMR (500 MHz, Chloroform-d) δ 7.58 (dt, J=2.9, 1.7 Hz, 2H), 7.07 (p, J=1.8 Hz, 1H), 6.94 (d, J=2.0 Hz, 4H), 2.34 (s, 6H), 2.07 (s, 12H), 1.37 (s, 12H). $^{13}$C NMR (126 MHz, Chloroform-d) δ 140.52, 138.93, 136.27, 135.80, 133.84, 133.10, 127.95, 83.70, 24.98, 21.04, 20.90.

Example 115: Synthesis of Intermediate to Ligand 21

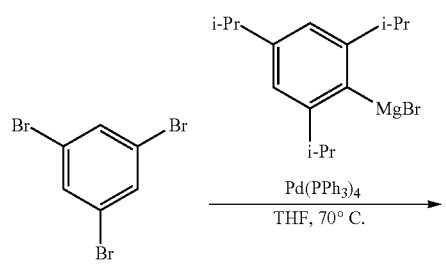

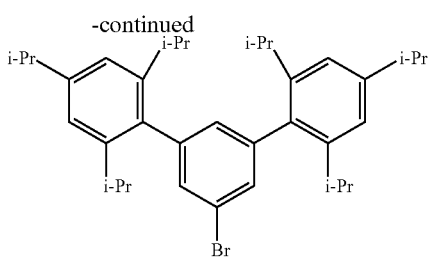

To a solution of the tribromobenzene (0.500 g, 1.588 mmol, 1.00 eq) and Pd(PPh$_3$)$_4$(0.184 g, 0.1588 mmol, 0.10 eq) in anhydrous deoxygenated THF (10 mL) in a nitrogen filled glovebox at 23° C. was added a solution of 2,4,6-triisopropylphenylmagnesium bromide (8.0 mL, 3.970 mmol, 2.50 eq, 0.5 M in THF) in a quick dropwise manner. The resultant red-black solution was placed in a mantle heated to 70° C., stirred vigorously (1000 rpm) for 24 hrs, removed from the mantle, allowed to cool gradually to 23° C., neutralized with i-PrOH (5 mL), removed from the glovebox, concentrated, the resultant dark red-black mixture was suspended in $CH_2Cl_2$ (25 mL), suction filtered over a pad of silica gel, rinsed with $CH_2Cl_2$ (4×25 mL), the resultant golden brown solution was concentrated onto celite, and purified via silica gel chromatography; hexanes to afford the 3,5-bis-(2,4,6-isopropylphenyl)-phenylbromide as a white solid (0.368 g, 0.6543 mmol, 41%). NMR indicated pure product.

$^1$H NMR (500 MHz, Chloroform-d) δ 7.33 (d, J=1.4 Hz, 2H), 7.03 (s, 4H), 6.95 (t, J=1.5 Hz, 1H), 2.92 (hept, J=6.9 Hz, 2H), 2.68 (hept, J=6.9 Hz, 4H), 1.28 (d, J=6.9 Hz, 12H), 1.15 (d, J=6.8 Hz, 12H), 1.04 (d, J=6.9 Hz, 12H). $^{13}$C NMR (126 MHz, Chloroform-d) δ 148.32, 146.33, 142.58, 135.39, 130.66, 130.34, 121.88, 120.55, 34.30, 30.44, 24.34, 24.06.

Example 116: Synthesis of Intermediate to Ligand 21

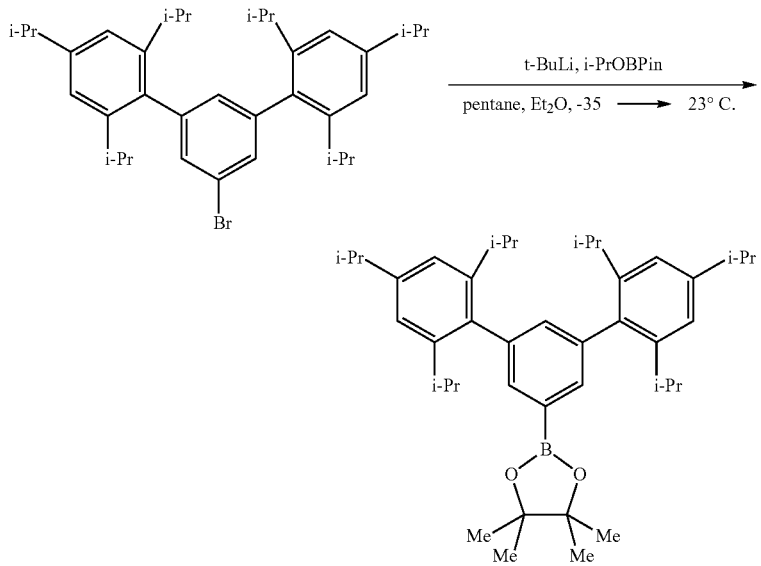

The procedure was similar to the procedure of Example 114. The reaction provided a 93% yield of a white solid.

$^1$H NMR (500 MHz, Chloroform-d) δ 7.61 (d, J=1.7 Hz, 2H), 7.15 (t, J=1.8 Hz, 1H), 7.04 (s, 4H), 2.94 (p, J=6.9 Hz, 2H), 2.73 (p, J=6.8 Hz, 4H), 1.34 (s, 12H), 1.31 (d, J=6.9 Hz, 12H), 1.16 (d, J=6.9 Hz, 12H), 1.05 (d, J=6.9 Hz, 12H). $^{13}$C NMR (126 MHz, Chloroform-d) δ 147.64, 146.47, 139.69, 136.95, 134.16, 133.95, 120.31, 83.60, 34.30, 30.33, 28.85, 25.01, 24.82, 24.48, 24.12, 24.03.

Example 117: Polymers Yielded from Procatalysts

Catalyst activity (in terms of quench time and polymer yield) and resulting polymer characteristics were assessed for Procatalysts 10-31, and 34-65. The polymerization reactions were carried out in a parallel polymerization reactor (PPR).

The olefin polymerization reactions were carried out initially in a parallel polymerization reactor (PPR) using either isolated metal complexes (See experimental examples) or in situ generated complexes (Ligand (L-1 to L-14) and $ZrBn_4$ or $HfBn_4$ in a 1:1 or 2:1 mixture prepared 30 mins before the polymerization experiments), and then in a 2-L semi-batch reactor. (Procatalysts 10-13, 16-19, 24-25, and 34-35 were generated in situ.) The activator was [HNMe $(C_{18}H_{37})_2$][B$(C_6F_5)_4$] in amounts of 1.5 molar equivalents. Procatalysts 26, 27, 30, and 31 were premixed in 0.005 M solution with excess MMAO-3A (10.0 eq) for 10 mins prior to subjection to the polymerization experiment. The data in Table 1 was obtained at 120° C. and 150° C. using ethylene pressures of 150 or 213 psi and 1-octene. The molar ratio of 1-octene and ethylene was 2.24:1. The quench times were measured based on the time at which the reaction reached 50 or 75 psi ethylene uptake or after 1800 seconds, whichever is first, and then the polymerizations were quenched with CO to destroy the catalyst and end the experiment.

TABLE 1

Polymerization Data from PPR Experiments

| Procatalyst No. | Procatalyst nmoles | Temp. (° C.) | Quench Time (s) | Polymer Yield (mg) | Mw (g/mol) | PDI | Mol % Octene |
|---|---|---|---|---|---|---|---|
| MC-10 | 100 | 120 | 426 | 92 | 710 | 3.2 | 1.1 |
| MC-11 | 100 | 120 | 1,801 | 75 | 2,511 | 7.2 | 10.0 |
| MC-12 | 100 | 120 | 221 | 161 | 15,935 | 4.6 | 21.0 |
| MC-13 | 100 | 120 | 1,802 | 131 | 79,766 | 2.6 | 20.7 |
| MC-14 | 100 | 120 | 36 | 301 | 73,448 | 10.0 | 25.5 |
| MC-14 | 50 | 150 | 197 | 229 | 43,258 | 10.3 | 13.8 |
| MC-14 | 100 | 150 | 132 | 244 | 45,202 | 7.9 | 13.5 |
| MC-15 | 100 | 120 | 56 | 266 | 293,544 | 6.8 | 24.4 |
| MC-15 | 50 | 150 | 108 | 215 | 173,772 | 2.3 | 15.8 |
| MC-15 | 100 | 150 | 103 | 231 | 158,009 | 2.6 | 22.7 |
| MC-16 | 100 | 120 | 39 | 204 | 85,730 | 16.1 | 11.8 |
| MC-17 | 100 | 120 | 1,801 | 48 | 99,474 | 82.9 | 9.9 |
| MC-18 | 100 | 120 | 484 | 187 | 5,394 | 4.2 | 20.5 |
| MC-19 | 100 | 120 | 1,802 | 129 | 19,203 | 4.4 | 22.2 |
| MC-20 | 100 | 120 | 62 | 130 | 130,588 | 7.0 | 7.9 |
| MC-20 | 50 | 150 | 1801 | 87 | 60,427 | 13.5 | 7.3 |
| MC-20 | 100 | 150 | 1801 | 103 | 59,760 | 8.9 | 9.5 |
| MC-21 | 100 | 120 | 179 | 158 | 107,689 | 2.9 | 6.8 |
| MC-21 | 50 | 150 | 1801 | 83 | 53,183 | 4.7 | 5.9 |
| MC-21 | 100 | 150 | 1801 | 107 | 40,079 | 2.6 | 6.0 |
| MC-22 | 100 | 120 | 66 | 234 | 556,451 | 26.7 | 16.8 |
| MC-22 | 50 | 150 | 1802 | 115 | 192,038 | 42.7 | 9.7 |
| MC-22 | 100 | 150 | 825 | 153 | 178,047 | 36.2 | 24.0 |
| MC-23 | 100 | 120 | 145 | 302 | 209,388 | 4.1 | 13.7 |
| MC-23 | 50 | 150 | 974 | 147 | 121,945 | 2.4 | 15.1 |
| MC-23 | 100 | 150 | 285 | 179 | 88,636 | 2.7 | 22.2 |
| MC-24 | 100 | 120 | 304 | 55 | 109,466 | 179.2 | 6.6 |
| MC-25 | 100 | 120 | 1,801 | 12 | N.D. | N.D. | N.D. |
| MC-26 | 25 | 120 | 31 | 462 | 59,768 | 2.9 | 19.4 |
| MC-26 | 50 | 120 | 24 | 544 | 63,871 | 3.1 | 20.4 |
| MC-26 | 50 | 150 | 49 | 276 | 42,886 | 4.0 | 15.0 |
| MC-27 | 25 | 120 | 157 | 384 | 389,654 | 3.6 | 13.3 |
| MC-27 | 50 | 120 | 128 | 482 | 407,945 | 3.2 | 16.3 |
| MC-27 | 50 | 150 | 144 | 289 | 224,525 | 2.7 | 10.7 |
| MC-27 | 75 | 150 | 96 | 349 | 227,314 | 2.9 | 10.4 |
| MC-28 | 100 | 120 | 27 | 421 | 97,064 | 4.8 | 22.8 |
| MC-29 | 100 | 120 | 47 | 417 | 330,466 | 3.3 | 24.7 |
| MC-30 | 25 | 120 | 33 | 600 | 62,935 | 2.8 | 19.6 |
| MC-30 | 50 | 120 | 26 | 686 | 72,206 | 3.4 | 21.2 |
| MC-30 | 50 | 150 | 45 | 335 | 44,545 | 2.6 | 16.9 |
| MC-30 | 75 | 150 | 46 | 407 | 183,311 | 9.1 | 18.7 |
| MC-31 | 25 | 120 | 180 | 381 | 61,222 | 2.7 | 18.2 |
| MC-31 | 50 | 120 | 149 | 519 | 47,419 | 2.5 | 16.1 |
| MC-31 | 50 | 150 | 159 | 293 | 193,080 | 2.4 | 13.0 |
| MC-31 | 75 | 150 | 117 | 371 | 189,270 | 2.5 | 12.2 |
| MC-34 | 100 | 120 | 1,801 | 54 | 352,416 | 37.6 | 2.5 |
| MC-35 | 100 | 120 | 1,801 | 36 | 725,363 | 12.5 | 1.5 |
| MC-36 | 100 | 120 | 21 | 573 | 37,685 | 3.9 | 21.6 |
| MC-37 | 100 | 120 | 40 | 629 | 181,746 | 4.3 | 17.6 |

TABLE 1-continued

Polymerization Data from PPR Experiments

| Procatalyst No. | Procatalyst nmoles | Temp. (° C.) | Quench Time (s) | Polymer Yield (mg) | Mw (g/mol) | PDI | Mol % Octene |
|---|---|---|---|---|---|---|---|
| MC-38 | 100 | 120 | 22 | 420 | 54,258 | 7.0 | 22.6 |
| MC-38 | 150 | 150 | 71 | 406 | 40,470 | 6.1 | 17.7 |
| MC-39 | 100 | 120 | 46 | 270 | 191,198 | 7.4 | 21.0 |
| MC-39 | 150 | 150 | 85 | 243 | 114,972 | 7.9 | 17.7 |
| MC-40 | 50 | 120 | 32 | 439 | 127,050 | 6.5 | 22.0 |
| MC-40 | 100 | 120 | 33 | 489 | 146,394 | 10.1 | 22.5 |
| MC-40 | 100 | 150 | 133 | 334 | 88,347 | 9.0 | 16.4 |
| MC-41 | 50 | 120 | 59 | 385 | 399,126 | 4.5 | 16.9 |
| MC-41 | 100 | 120 | 48 | 378 | 362,624 | 4.8 | 22.5 |
| MC-41 | 100 | 150 | 120 | 260 | 217,791 | 7.6 | 18.2 |
| MC-42 | 100 | 120 | 1,802 | 65 | 132,124 | 11.9 | 11.0 |
| MC-42 | 150 | 150 | 1,802 | 21 | 121,004 | 47.2 | 4.9 |
| MC-43 | 100 | 120 | 1,802 | 57 | 88,316 | 4.0 | 12.5 |
| MC-43 | 150 | 150 | 1,801 | 29 | 67,047 | 6.4 | 11.0 |
| MC-44 | 100 | 120 | 66 | 213 | 236,624 | 13.0 | 15.6 |
| MC-45 | 100 | 120 | 366 | 279 | 142,388 | 3.6 | 13.2 |
| MC-46 | 100 | 120 | 31 | 466 | 95,603 | 3.6 | 13.2 |
| MC-47 | 100 | 120 | 152 | 712 | 222,741 | 3.7 | 14.4 |
| MC-48 | 50 | 120 | 74 | 274 | 215,569 | 9.4 | 22.2 |
| MC-48 | 100 | 120 | 53 | 341 | 209,451 | 19.8 | 25.9 |
| MC-49 | 50 | 120 | 314 | 266 | 301,258 | 5.2 | 20.1 |
| MC-49 | 100 | 120 | 165 | 375 | 232,788 | 4.7 | 22.6 |
| MC-50 | 50 | 120 | 99 | 229 | 92,422 | 11.8 | 18.1 |
| MC-50 | 100 | 120 | 52 | 306 | 72,795 | 10.6 | 20.8 |
| MC-50 | 50 | 150 | 1,221 | 158 | 72,321 | 24.0 | 10.7 |
| MC-50 | 100 | 150 | 291 | 191 | 113,474 | 31.3 | 10.2 |
| MC-51 | 50 | 120 | 423 | 179 | 214,842 | 6.3 | 15.3 |
| MC-51 | 100 | 120 | 187 | 256 | 205,828 | 8.1 | 16.1 |
| MC-51 | 50 | 150 | 1,801 | 46 | 104,755 | 9.5 | 11.5 |
| MC-51 | 100 | 150 | 1,801 | 107 | 255,907 | 3.3 | 13.4 |
| MC-52 | 50 | 120 | 22 | 482 | 58,078 | 4.7 | 22.7 |
| MC-52 | 100 | 120 | 22 | 542 | 54,748 | 4.8 | 24.9 |
| MC-53 | 50 | 120 | 43 | 562 | 261,070 | 5.0 | 24.8 |
| MC-53 | 100 | 120 | 37 | 596 | 254,289 | 7.3 | 27.6 |
| MC-54 | 50 | 120 | 52 | 369 | 256,998 | 3.3 | 15.1 |
| MC-54 | 100 | 120 | 46 | 396 | 233,900 | 3.8 | 16.1 |
| MC-54 | 50 | 150 | 84 | 277 | 216,430 | 3.2 | 10.8 |
| MC-54 | 100 | 150 | 60 | 336 | 178,973 | 3.6 | 12.9 |
| MC-55 | 50 | 120 | 57 | 338 | 650,506 | 3.9 | 11.6 |
| MC-55 | 100 | 120 | 59 | 416 | 538,165 | 4.2 | 14.7 |
| MC-55 | 50 | 150 | 203 | 224 | 484,831 | 3.4 | 7.7 |
| MC-55 | 100 | 150 | 117 | 298 | 425,204 | 3.1 | 9.5 |
| MC-56 | 50 | 120 | 41 | 357 | 219,229 | 5.3 | 20.2 |
| MC-56 | 100 | 120 | 32 | 415 | 221,662 | 6.2 | 20.9 |
| MC-56 | 50 | 150 | 103 | 209 | 177,405 | 4.9 | 13.3 |
| MC-56 | 100 | 150 | 121 | 227 | 144,004 | 5.9 | 15.5 |
| MC-57 | 50 | 120 | 92 | 319 | 429,528 | 3.7 | 15.6 |
| MC-57 | 100 | 120 | 68 | 358 | 392,159 | 3.7 | 17.4 |
| MC-57 | 50 | 150 | 605 | 154 | 313,747 | 3.0 | 12.2 |
| MC-57 | 100 | 150 | 203 | 216 | 272,251 | 3.4 | 13.8 |
| MC-58 | 50 | 120 | 33 | 390 | 40,515 | 4.1 | 27.3 |
| MC-58 | 100 | 120 | 34 | 398 | 51,271 | 5.2 | 29.6 |
| MC-58 | 50 | 150 | 908 | 245 | 29,868 | 5.0 | 19.5 |
| MC-58 | 100 | 150 | 502 | 288 | 35,155 | 6.4 | 20.5 |
| MC-59 | 50 | 120 | 76 | 447 | 215,114 | 3.7 | 25.4 |
| MC-59 | 100 | 120 | 55 | 451 | 192,698 | 3.9 | 27.4 |
| MC-59 | 50 | 150 | 1,800 | 213 | 157,011 | 5.4 | 19.6 |
| MC-59 | 100 | 150 | 119 | 325 | 122,397 | 3.8 | 22.4 |
| MC-60 | 25 | 120 | 33 | 383 | 60,245 | 3.1 | 23.8 |
| MC-60 | 50 | 120 | 24 | 457 | 54,019 | 2.9 | 25.0 |
| MC-60 | 25 | 150 | 85 | 237 | 46,700 | 2.9 | 16.3 |
| MC-60 | 50 | 150 | 55 | 313 | 46,447 | 3.1 | 17.9 |
| MC-61 | 25 | 120 | 100 | 197 | 305,579 | 4.0 | 12.9 |
| MC-61 | 50 | 120 | 69 | 316 | 307,773 | 3.9 | 17.2 |
| MC-61 | 50 | 150 | 119 | 241 | 202,940 | 3.2 | 13.4 |
| MC-62 | 25 | 120 | 47 | 288 | 119,859 | 3.9 | 20.8 |
| MC-62 | 50 | 120 | 42 | 335 | 130,527 | 4.6 | 22.6 |
| MC-62 | 50 | 150 | 136 | 257 | 91,748 | 5.2 | 15.9 |
| MC-63 | 25 | 120 | 200 | 133 | 393,038 | 3.8 | 11.9 |
| MC-63 | 50 | 120 | 53 | 255 | 365,175 | 3.7 | 15.0 |
| MC-63 | 50 | 150 | 113 | 231 | 233,600 | 3.1 | 13.2 |
| MC-64 | 25 | 120 | 39 | 293 | 66,781 | 2.9 | 22.7 |
| MC-64 | 50 | 120 | 28 | 365 | 71,875 | 3.6 | 23.9 |
| MC-64 | 50 | 150 | 100 | 230 | 78,899 | 5.2 | 17.0 |

TABLE 1-continued

Polymerization Data from PPR Experiments

| Procatalyst No. | Procatalyst nmoles | Temp. (° C.) | Quench Time (s) | Polymer Yield (mg) | Mw (g/mol) | PDI | Mol % Octene |
|---|---|---|---|---|---|---|---|
| MC-65 | 25 | 120 | 377 | 139 | 393,584 | 3.6 | 13.3 |
| MC-65 | 50 | 120 | 101 | 231 | 346,017 | 3.3 | 17.2 |
| MC-65 | 50 | 150 | 149 | 228 | 238,854 | 3.0 | 14.1 |
| Zr(Bn)$_4$ | 100 | 120 | 1,802 | 74 | 372,812 | 105.1 | 3.4 |
| Zr(Bn)$_4$ | 100 | 120 | 1,801 | 75 | 269,001 | 70.7 | 8.2 |

*Mol % Octene or C8/olefin is defined as: (moles 1-octene/(total moles 1-octene and ethylene)) × 100.

The procatalysts in Table 1 produced polymer at temperatures up to 190° C. (see Table 2 for semi-batch reactor data). The tetradentate procatalysts, Procatalysts 10-31, and 36-65 were more active than compared to Procatalysts 34 and 35 as determined by the PPR data recorded in Table 1. Generally, the tetradentate procatalysts produced ethylene/octene copolymers with high activity as observed by the fast quench times (less than 100 seconds), good molecular weight capability of greater than 100,000 grams per mole, and high 1-octene incorporation of greater than 20% in the preliminary PPR experiments.

TABLE 2

Polymerization Data from Semi-Batch Reactor Experiments

| Procatalyst No. | Temp. (° C.) | Efficiency (g poly/g Metal) | Mw (g/mol) | PDI (Mw/Mn) | Mol % Octene | T$_M$ (° C.) |
|---|---|---|---|---|---|---|
| 14 | 120 | 5,831,799 | 68,112 | 2.3 | 10.4 | 75.3 |
| 14 | 150 | 745,418 | 53,024 | 2.3 | 13.0 | 49.3 |
| 15 | 120 | 896,409 | 431,535 | 2.3 | 11.8 | 54.9 |
| 15 | 150 | 336,153 | 278,591 | 2.2 | 12.9 | 50.6 |
| 21 | 120 | 13,726 | 250,776 | 2.1 | 5.7 | 83.9 |
| 21 | 150 | 14,490 | 62,618 | 2.2 | 7.1 | 83.0 |
| 22 | 120 | 396,825 | 1,223,356 | 3.4 | 10.9 | 63.1 |
| 22 | 150 | 92,629 | 609,069 | 24.6 | 11.0 | 67.6 |
| 23 | 120 | 20,169 | 504,923 | 2.3 | 9.7 | 60.2 |
| 23 | 150 | 8,124 | 162,680 | 2.7 | 10.5 | 55.4 |
| 26 | 120 | 591,949 | 58,047 | 2.2 | 9.1 | 78.0 |
| 26 | 150 | 649,289 | 45,241 | 2.0 | 10.4 | 67.6 |
| 26 | 190 | 142,506 | 26,860 | 21.1 | 10.9 | 61.3 |
| 28 | 120 | 2,959,747 | 71,894 | 2.4 | 10.6 | 70.6 |
| 28 | 150 | 1,132,743 | 50,792 | 2.2 | 11.6 | 65.8 |
| 30 | 120 | 1,753,924 | 63,408 | 2.2 | 9.6 | N.D. |
| 30 | 150 | 734,456 | 49,917 | 2.1 | 9.9 | N.D. |
| 32 | 120 | 243,357 | 902,915 | 2.6 | 11.4 | 55.3 |
| 32 | 150 | 122,775 | 632,172 | 4.0 | 12.6 | 55.2 |
| 32 | 190 | 18,087 | 96,624 | 8.7 | 8.7 | 67.2 |
| 38 | 120 | 5,919,495 | 68,440 | 3.3 | 6.8 | 95.2 |
| 38 | 150 | 1,425,064 | 54,721 | 2.5 | 6.9 | 95.1 |
| 38 | 190 | 118,390 | 44,188 | 2.4 | 6.9 | 93.7 |
| 39 | 120 | 327,189 | 417,312 | 2.5 | 7.8 | 84.6 |
| 39 | 150 | 291,333 | 281,855 | 2.3 | 8.3 | 78.8 |
| 39 | 190 | 62,749 | 142,505 | 2.4 | 8.1 | 80.1 |
| 40 | 120 | 13,702,534 | 95,914 | 2.0 | 10.1 | 69.3 |
| 40 | 150 | 3,124,178 | 69,935 | 2.1 | 11.5 | 66.1 |
| 40 | 190 | 246,646 | 68,435 | 2.3 | 10.7 | 65.7 |
| 41 | 120 | 263,320 | 619,169 | 2.1 | 13.5 | 51.9 |
| 41 | 150 | 242,030 | 371,937 | 2.1 | 14.3 | 47.7 |
| 44 | 120 | 331,053 | 388,712 | 3.1 | 12.0 | 56.3 |
| 44 | 150 | 76,734 | 197,268 | 2.8 | 13.0 | 53.7 |
| 46 | 120 | 1,034,815 | 197,244 | 2.1 | 8.8 | 68.1 |
| 46 | 150 | 381,479 | 139,976 | 2.0 | 9.7 | 67.0 |
| 47 | 120 | 30,114 | 259,089 | 2.6 | 11.4 | 53.8 |
| 47 | 150 | 12,450 | 129,674 | 2.6 | 9.2 | 63.0 |
| 48 | 120 | 252,127 | 235,985 | 3.8 | 19.0 | 0.4 |
| 48 | 150 | 97,745 | 178,300 | 5.3 | 19.3 | 0.0 |
| 50 | 120 | 91,350 | 123,626 | 5.0 | 16.7 | N.D. |
| 50 | 150 | 41,656 | 94,379 | 5.5 | 15.8 | N.D. |
| 52 | 120 | 8,660,002 | 106,352 | 5.0 | 10.8 | 67.1 |
| 52 | 150 | 3,135,140 | 50,360 | 3.0 | 11.1 | 69.9 |
| 52 | 190 | 1,041,393 | 37,279 | 2.9 | 10.3 | 66.0 |
| 53 | 120 | 1,086,896 | 363,058 | 2.4 | 14.1 | 48.0 |
| 53 | 150 | 252,115 | 241,376 | 2.3 | 13.3 | 46.7 |
| 53 | 190 | 138,943 | 131,835 | 2.2 | 13.6 | 50.4 |
| 54 | 120 | 1,753,924 | 483,691 | 2.1 | 8.7 | 72.2 |
| 54 | 150 | 652,241 | 323,091 | 2.1 | 9.5 | 66.4 |
| 55 | 120 | 141,184 | 1,045,031 | 3.0 | 8.9 | 67.1 |
| 55 | 150 | 44,820 | 680,671 | 2.3 | 10.2 | 61.4 |
| 56 | 120 | 5,163,115 | 239,014 | 2.9 | 12.8 | 53.4 |
| 56 | 150 | 1,172,937 | 174,037 | 3.0 | 13.0 | 48.5 |
| 58 | 120 | 16,267,649 | 36,717 | 2.3 | 18.0 | 17.7 |
| 58 | 150 | 2,937,823 | 31,830 | 2.1 | 17.0 | 22.2 |

TABLE 2-continued

Polymerization Data from Semi-Batch Reactor Experiments

| Procatalyst No. | Temp. (° C.) | Efficiency (g poly/g Metal) | Mw (g/mol) | PDI (Mw/Mn) | Mol % Octene | $T_M$ (° C.) |
|---|---|---|---|---|---|---|
| 59 | 120 | 946,832 | 277,427 | 4.8 | 20.2 | 4.2 |
| 59 | 150 | 425,794 | 210,059 | 2.9 | 20.8 | 3.1 |
| 60 | 120 | 21,441,726 | 81,869 | 2.2 | 11.2 | 66.4 |
| 60 | 150 | 4,165,570 | 57,119 | 2.2 | 11.8 | 62.4 |
| 61 | 120 | 1,525,100 | 463,799 | 3.7 | 12.4 | 52.6 |
| 61 | 150 | 285,730 | 280,931 | 3.1 | 13.6 | 46.4 |
| 62 | 120 | 20,257,827 | 140,954 | 2.5 | 13.6 | 62.2 |
| 62 | 150 | 6,401,824 | 112,772 | 2.3 | 10.1 | 65.9 |
| 63 | 120 | 1,708,779 | 773,963 | 3.1 | 12.1 | 53.0 |
| 63 | 150 | 733,935 | 461,662 | 2.4 | 12.3 | 52.5 |
| 64 | 120 | 9,624,660 | 101,897 | 2.3 | 12.4 | 60.5 |
| 64 | 150 | 3,912,559 | 87,291 | 2.4 | 15.2 | 45.3 |

*Standard Semi-batch reactor conditions: 120° C.-46 g ethylene and 303 g 1-octene in 611 g of IsoparE, 150° C.-43 g ethylene and 303 g 1-octene in 547 g of IsoparE, and 190° C.-46 g ethylene and 292 g of 1-octene in 515 g of IsoparE. *Mol % Octene or C8/olefin is defined as: (moles 1-octene/(total moles 1-octene and ethylene)) × 100.

The tetradentate procatalysts, recorded in Table 2, produced polymers in a semi-batch process at temperatures up to 190° C. with modest to high efficiency, for example from 100,000 g of polymer/g of metal. The procatalysts having a substituted m-terphenyl, substituted anthracenyl, or substituted carbazolyl (for example 3,6-disubstituted carbazolyl), in the $R^1$ positions had the highest efficiencies when compared to other procatalysts in Table 2 as evidenced by the efficiencies of procatalysts 14, 15, 27-30, 38-41, 46, 48, 52, 53, 54, 56, and 58-64.

In Table 2, when $R^1$ of a procatalyst is 3,5-di-tert-butylphenyl, 3,6-di-tert-butylcarbazolyl, 3,6-di-(2,4,6-trimethylphenyl), or 3,6-di-(2,4,6-triisopropylphenyl) carbazolyl, the procatalyst produced polymers having highest molecular weight as observed by procatalysts 22, 32, 41, 55, 57, 61, and 63 (up to 1.2 million g/mol). Most of the procatalysts recorded in Table 2 produce polymer with narrow PDI of less than 3, and a medium to high range of comonomer incorporation (8.7-20.8 mol %). Under the polymerization conditions described for the results summarized in Table 2, the procatalysts having 3,5-bis-(2,4,6-trimethylphenyl)phenyl or 3,6-bis-(3,5-di-tert-butylphenyl) carbazolyl in the $R^1$ positions produced polymers with an increased comonomer incorporation (19.0-20.8 mol % of 1-octene incorporated) when compared to the other procatalysts record in Table 2).

The polymers in Table 3 were produced in a parallel polymerization reactor (PPR) using isolated metal complexes. The activator was [HNMe($C_{18}H_{37}$)$_2$][B($C_6F_5$)$_4$] in amounts of 1.5 molar equivalents with MMAO used as a scavenger in amounts of 5.0 molar equivalents. The data in Table 1 was obtained at 110° C. using propylene pressures of 110 psi. The quench times were measured based on the time at which the reaction reached 70 psi propylene uptake or after 1,800 seconds, whichever occurs first, and then the polymerizations reactions were quenched with carbon monoxide.

TABLE 3

Propylene Polymerization Data from PPR Experiments

| Procatalyst No. | Procatalyst nmoles | Temp. (° C.) | Quench Time (s) | Polymer Yield (mg) | Mw (g/mol) | PDI | $T_M$ (° C.) |
|---|---|---|---|---|---|---|---|
| MC-32 | 100 | 110 | 1,801 | 107 | 191,711 | 10.8 | 119.1 |
| MC-33 | 100 | 110 | 1,801 | 62 | 36,327 | 4.2 | N.D. |
| MC-38 | 100 | 110 | 514 | 173 | 19,503 | 4.1 | 33.7 |

TABLE 3-continued

Propylene Polymerization Data from PPR Experiments

| Procatalyst No. | Procatalyst nmoles | Temp. (° C.) | Quench Time (s) | Polymer Yield (mg) | Mw (g/mol) | PDI | $T_M$ (° C.) |
|---|---|---|---|---|---|---|---|
| MC-39 | 100 | 110 | 255 | 146 | 100,053 | 3.2 | 23.1 |
| MC-40 | 100 | 110 | 51 | 366 | 50,148 | 3.8 | 27.2 |
| MC-41 | 100 | 110 | 79 | 351 | 247,367 | 3.4 | 95.2 |
| MC-44 | 100 | 110 | 1,801 | 99 | 256,635 | 16.4 | 93.3 |
| MC-45 | 100 | 110 | 1,801 | 55 | 66,423 | 9.4 | 105.5 |
| MC-46 | 100 | 110 | 168 | 188 | 64,626 | 3.0 | 97.3 |
| MC-47 | 100 | 110 | 758 | 214 | 116,874 | 3.3 | 77.5 |
| MC-48 | 100 | 110 | 458 | 174 | 113,579 | 14.7 | 95.1 |
| MC-49 | 100 | 110 | 403 | 241 | 95,403 | 3.6 | 86.7 |
| MC-52 | 100 | 110 | 55 | 379 | 48,373 | 4.9 | 101.1 |
| MC-53 | 100 | 110 | 57 | 474 | 160,421 | 3.7 | 74.6 |

The procatalysts in Table 3 produced polypropylene polymers at temperatures of 110° C. with a tacticity as indicated by the $T_M$ of the polymers produced as well as a range of molecular weights (up to 257 kg/mol) with the highest $M_w$ produced by MC-41 and MC-44. Disparate catalyst activity was observed with the most active catalysts being MC-40, 41, 55, and 57 as indicated by the lowest observed quench times.

The invention claimed is:

1. A catalyst system comprising a metal-ligand complex according to formula (I):

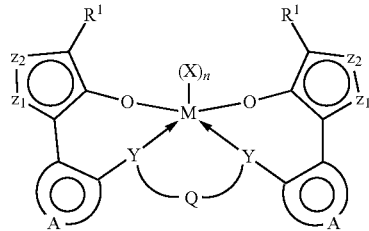

(I)

where
  M is titanium, zirconium, or hafnium having a formal oxidation state of +2, +3, or +4;
  each X is a monodentate or bidentate ligand independently selected from the group consisting of unsaturated $(C_2-C_{50})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, —N(R$^N$)$_2$, and —NCOR$^C$;
  n is 1, 2, or 3;
  the metal-ligand complex has 6 or fewer metal-ligand bonds;
  each Y is independently oxygen or sulfur;
  each R$^1$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, —P(O)(R$^P$)$_2$, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen, and —H;
  Q is $(C_2-C_{12})$alkylene, $(C_2-C_{12})$heteroalkylene, $(C_6-C_{50})$arylene, $(C_4-C_{50})$heteroarylene, (—CH$_2$Si(R$^C$)$_2$CH$_2$—), (—CH$_2$CH$_2$Si(R$^C$)$_2$CH$_2$CH$_2$—), (—CH$_2$Ge(R$^C$)$_2$CH$_2$—), or (—CH$_2$CH$_2$Ge(R$^C$)$_2$CH$_2$CH$_2$—);
  for each individual ring containing groups $z_1$ and $z_2$, each of $z_1$ and $z_2$ is independently selected from the group consisting of sulfur, oxygen, —N(R$^R$)—, =N—, and —C(R$^R$)—, provided that at least one of $z_1$ or $z_2$ is —C(R$^R$)—;
  each A is independently selected from the group consisting of -$z_3$-$z_4$-$z_5$- and —C(R$^3$)C(R$^4$)C(R$^5$)C(R$^6$)—, where:
    each of $z_3$, $z_4$, and $z_5$ is selected from the group consisting of sulfur, oxygen, —N(R$^R$)—, and —C(R$^R$)—, provided that exactly one of $z_3$, $z_4$, or $z_5$ is —C(R$^R$)—or that exactly two of $z_3$, $z_4$, or $z_5$ are —C(R$^R$)—; and
    each R$^3$, R$^4$, R$^5$, and R$^6$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen, and —H;
  each R$^C$, R$^N$, and R$^P$ in formula (I) is independently a $(C_1-C_{50})$hydrocarbyl; and
  each R$^R$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen, and —H, wherein any two R$^R$ groups bonded to neighboring atoms are optionally linked.

2. The catalyst system according to claim 1, wherein:
  M is zirconium or hafnium;
  each X is independently selected from the group consisting of $(C_6-C_{20})$aryl, $(C_4-C_{20})$heteroaryl, $(C_4-C_{12})$diene, and a halogen;
  each Y is oxygen; and
  each R$^1$ is independently selected from the group consisting of $(C_1-C_{50})$aryl and $(C_4-C_{50})$heteroaryl.

3. The catalyst system according to claim 1, wherein for each individual ring containing groups $z_1$ and $z_2$, one of $z_1$ and $z_2$ is sulfur, and the other is —C(H)—.

4. The catalyst system according to claim 1, wherein each A is —C(R$^3$)C(R$^4$)C(R$^5$)C(R$^6$)— each R$^3$, R$^4$, R$^5$, and R$^6$ is —H.

5. The catalyst system according to claim 1, wherein each R$^1$ is carbazolyl.

6. The catalyst system according to claim 1, wherein each R$^1$ is phenyl or a substituted phenyl.

7. The catalyst system according to claim 1, wherein R$^1$ is independently selected from the group consisting of carbazole; 3,6-di-tert-butylcarbazole; 3,6-bis-(2,4,6-trimethylphenyl)carbazole; 3,6-bis-(2,4,6-triisopropylphenyl)carbazole; 3,6-bis-(3,5-di-tert-butylphenyl)carbazole; 2,4,6-tri-iso-propylphenyl; 3,5-di-iso-propylphenyl; m-terphenyl; 3,5-bis-(2,4,6-trimethylphenyl)phenyl; 3,5-bis-(2,4,6-triisopropylphenyl)phenyl; and 3,5-bis-(3,5-di-tert-butylphenyl) phenyl groups.

8. The catalyst system according to claim 1, wherein each R$^1$ is a substituted phenyl selected from the group consisting of 2,4,6-trimethylphenyl; 2,4,6-tri(iso-propyl)phenyl; 3,5-di-tert-butylphenyl, and 3,5-diphenylphenyl.

9. The catalyst system according to claim 1, wherein each R$^1$ is independently 3,6-di-tert-butylcarbazol-9-yl or 2,7-di-tert-butylcarbazol-9-yl.

10. The catalyst system according to claim 1, wherein each R$^1$ is 3,5-di-tert-butylphenyl.

11. The catalyst system according to claim 1, wherein each R$^1$ is 2,4,6-trimethylphenyl.

12. The catalyst system according to claim 1, where Q is $(C_2-C_{12})$alkylene, $(C_2-C_{12})$heteroalkylene, $(C_6-C_{50})$arylene, $(C_4-C_{50})$heteroarylene, (—CH$_2$Si(R$^C$)$_2$CH$_2$—), (—CH$_2$CH$_2$Si(R$^C$)$_2$CH$_2$CH$_2$—), (—CH$_2$Ge(R$^C$)$_2$CH$_2$—), or (—CH$_2$CH$_2$Ge(R$^C$)$_2$CH$_2$CH$_2$—).

13. The catalyst system according to claim 1, wherein Q is chosen from —(CH$_2$)$_x$—, where x is from 2 to 5.

14. The catalyst system according to claim 1, wherein Q is —(CH$_2$)$_4$—.

15. A polymerization process for producing an ethylene-based polymer, the polymerization process comprising:
  polymerizing ethylene and at least one additional α-olefin in the presence of a catalyst system according to claim 1 and at least one activator to form a polymer.

16. A polymerization process for producing a propylene-based polymer, the polymerization process comprising:
  polymerizing propylene and optionally one or more additional α-olefin in the presence of a catalyst system according to claim 1 and at least one activator to form a polymer.

17. The polymerization process according claim 16, wherein the activator comprises MMAO, bis(hydrogenated tallow alkyl)methylammonium, tetrakis(pentafluorophenyl)borate, or tris(pentafluorophenyl)borane.

* * * * *